United States Patent
Bennett et al.

(10) Patent No.: US 10,911,872 B2
(45) Date of Patent: Feb. 2, 2021

(54) CONTEXT-AWARE VOICE GUIDANCE

(71) Applicant: Apple Inc., Cupertino, CA (US)

(72) Inventors: Jonathan A. Bennett, San Francisco, CA (US); Stephen O. Lemay, San Francisco, CA (US); Marcel Van Os, San Francisco, CA (US); Scott Forstall, Mountain View, CA (US); Bradford A. Moore, San Francisco, CA (US); Emanuele Vulcano, San Francisco, CA (US); Seejo K. Pylappan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/046,658

(22) Filed: Jul. 26, 2018

(65) Prior Publication Data

US 2018/0335312 A1 Nov. 22, 2018

Related U.S. Application Data

(63) Continuation of application No. 13/632,121, filed on Sep. 30, 2012.
(Continued)

(51) Int. Cl.
*H04R 5/04* (2006.01)
*G10L 21/00* (2013.01)
(Continued)

(52) U.S. Cl.
CPC .......... *H04R 5/04* (2013.01); *G01C 21/3629* (2013.01); *G06F 3/167* (2013.01); *G10L 21/00* (2013.01);
(Continued)

(58) Field of Classification Search
CPC ........ H04R 5/00; H04R 5/04; H04R 2430/01; H04R 2499/13; G06F 3/04815;
(Continued)

(56) References Cited

U.S. PATENT DOCUMENTS

| 4,797,836 A | 1/1989 | Witek et al. |
| 4,914,605 A | 4/1990 | Loughmiller et al. |

(Continued)

FOREIGN PATENT DOCUMENTS

| AU | 2011218683 A1 | 9/2011 |
| AU | 2013272003 A1 | 12/2014 |

(Continued)

OTHER PUBLICATIONS

Haala N, Kada M. Panoramic scenes for texture mapping of 3D city models. International Archives of Photogrammetry and Remote Sensing. Feb. 2005;36(Part 5/W8).
(Continued)

*Primary Examiner* — Davetta W Goins
*Assistant Examiner* — Daniel R Sellers
(74) *Attorney, Agent, or Firm* — Invoke

(57) ABSTRACT

A context-aware voice guidance method is provided that interacts with other voice services of a user device. The voice guidance does not provide audible guidance while the user is making a verbal request to any of the voice-activated services. Instead, the voice guidance transcribes its output on the screen while the verbal requests from the user are received. In some embodiments, the voice guidance only provides a short warning sound to get the user's attention while the user is speaking on a phone call or another voice-activated service is providing audible response to the user's inquires. The voice guidance in some embodiments distinguishes between music that can be ducked and spoken words, for example from an audiobook, that the user wants (Continued)

to pause instead of being skipped. The voice guidance ducks music but pauses spoken words of an audio book in order to provide voice guidance to the user.

23 Claims, 115 Drawing Sheets

Related U.S. Application Data

(60) Provisional application No. 61/699,855, filed on Sep. 11, 2012, provisional application No. 61/699,842, filed on Sep. 11, 2012, provisional application No. 61/699,851, filed on Sep. 11, 2012, provisional application No. 61/657,880, filed on Jun. 10, 2012, provisional application No. 61/657,864, filed on Jun. 10, 2012, provisional application No. 61/656,043, filed on Jun. 6, 2012, provisional application No. 61/656,032, filed on Jun. 6, 2012, provisional application No. 61/656,015, filed on Jun. 6, 2012, provisional application No. 61/656,080, filed on Jun. 6, 2012, provisional application No. 61/655,995, filed on Jun. 5, 2012, provisional application No. 61/655,997, filed on Jun. 5, 2012.

(51) Int. Cl.
| | |
|---|---|
| *H04R 5/00* | (2006.01) |
| *G01C 21/36* | (2006.01) |
| *G06F 3/16* | (2006.01) |
| *G10L 17/22* | (2013.01) |
| *G10L 15/22* | (2006.01) |
| *G01C 21/00* | (2006.01) |
| *G06F 16/68* | (2019.01) |
| *G06F 16/432* | (2019.01) |
| *G06F 16/44* | (2019.01) |
| *G01C 21/34* | (2006.01) |
| *G06F 3/0481* | (2013.01) |
| *G06F 3/0484* | (2013.01) |
| *G06F 3/0488* | (2013.01) |

(52) U.S. Cl.
CPC ............. *H04R 5/00* (2013.01); *G01C 21/00* (2013.01); *G01C 21/34* (2013.01); *G01C 21/3608* (2013.01); *G01C 21/3617* (2013.01); *G01C 21/3632* (2013.01); *G01C 21/3638* (2013.01); *G01C 21/3667* (2013.01); *G06F 3/04815* (2013.01); *G06F 3/04845* (2013.01); *G06F 3/04883* (2013.01); *G06F 16/433* (2019.01); *G06F 16/444* (2019.01); *G06F 16/68* (2019.01); *G06F 2203/04803* (2013.01); *G06F 2203/04808* (2013.01); *G10L 15/22* (2013.01); *G10L 17/22* (2013.01); *G10L 2015/223* (2013.01); *H04R 2430/01* (2013.01); *H04R 2499/13* (2013.01); *Y02D 30/70* (2020.08)

(58) Field of Classification Search
CPC .. G06F 3/04845; G06F 3/04883; G06F 3/167; G06F 17/30026; G06F 17/30061; G06F 17/30749; G06F 2203/04803; G06F 2203/04806; G06F 2203/04808; G01C 21/3608; G01C 21/3617; G01C 21/3629; G01C 21/3632; G01C 21/3667; G01C 21/00; G01C 21/34; G01C 21/3638; G10L 15/22; G10L 21/00; G10L 17/22; G10L 2015/223; Y02D 70/10
USPC .......................................................... 381/17
See application file for complete search history.

(56) References Cited

U.S. PATENT DOCUMENTS

| | | |
|---|---|---|
| 5,031,104 A | 7/1991 | Ikeda et al. |
| 5,289,572 A | 2/1994 | Yano et al. |
| 5,321,161 A | 6/1994 | Vreugdenhil et al. |
| 5,353,319 A | 10/1994 | Challberg |
| 5,359,712 A | 10/1994 | Cohen et al. |
| 5,406,492 A | 4/1995 | Suzuki |
| 5,459,667 A | 10/1995 | Odagaki et al. |
| 5,459,702 A | 10/1995 | Greenspan |
| 5,592,173 A | 1/1997 | Lau et al. |
| 5,629,854 A | 5/1997 | Schulte |
| 5,654,892 A | 8/1997 | Fujii et al. |
| 5,692,173 A | 11/1997 | Chew |
| 5,717,848 A | 2/1998 | Watanabe et al. |
| 5,748,194 A | 5/1998 | Chen |
| 5,787,233 A | 7/1998 | Akimoto |
| 5,848,375 A | 12/1998 | Nunobiki et al. |
| 5,862,511 A | 1/1999 | Croyle et al. |
| 5,878,368 A | 3/1999 | Degraaf |
| 5,913,918 A | 6/1999 | Nakano et al. |
| 5,928,308 A | 7/1999 | Nanba et al. |
| 5,938,718 A | 8/1999 | Morimoto et al. |
| 5,966,129 A | 10/1999 | Matsukuma et al. |
| 5,990,898 A | 11/1999 | Urano |
| 6,029,111 A | 2/2000 | Croyle |
| 6,102,253 A | 8/2000 | Gallina et al. |
| 6,107,961 A | 8/2000 | Takagi |
| 6,141,568 A | 10/2000 | Sakaguchi |
| 6,141,588 A | 10/2000 | Cox et al. |
| 6,153,269 A | 11/2000 | Gleason et al. |
| 6,163,269 A | 12/2000 | Millington et al. |
| 6,173,232 B1 | 1/2001 | Nanba et al. |
| 6,176,380 B1 | 1/2001 | Glories et al. |
| 6,178,380 B1 | 1/2001 | Millington |
| 6,202,026 B1 | 3/2001 | Nimura et al. |
| 6,253,151 B1 | 6/2001 | Ohler et al. |
| 6,259,446 B1 | 7/2001 | Matheny et al. |
| 6,295,503 B1 | 9/2001 | Inoue et al. |
| 6,311,125 B1 | 10/2001 | Okano et al. |
| 6,321,158 B1 | 11/2001 | Delorme et al. |
| 6,321,161 B1 | 11/2001 | Herbst et al. |
| 6,360,167 B1 | 3/2002 | Millington et al. |
| 6,363,145 B1 | 3/2002 | Shaffer et al. |
| 6,363,322 B1 | 3/2002 | Millington |
| 6,374,180 B1 | 4/2002 | Slominski et al. |
| 6,381,534 B2 | 4/2002 | Takayama et al. |
| 6,396,475 B1 | 5/2002 | Ellenby et al. |
| 6,415,224 B1 | 7/2002 | Wako et al. |
| 6,434,482 B1 | 8/2002 | Oshida et al. |
| 6,480,783 B1 | 11/2002 | Myr |
| 6,487,305 B2 | 11/2002 | Kambe et al. |
| 6,496,189 B1 | 12/2002 | Yaron et al. |
| 6,526,335 B1 | 2/2003 | Treyz et al. |
| 6,538,655 B1 | 3/2003 | Kubota |
| 6,539,300 B2 | 3/2003 | Myr |
| 6,577,946 B2 | 6/2003 | Myr |
| 6,587,784 B1 | 7/2003 | Okude et al. |
| 6,597,354 B2 | 7/2003 | Sakamoto et al. |
| 6,597,654 B2 | 7/2003 | Tosaki et al. |
| 6,598,016 B1 | 7/2003 | Zavoli et al. |
| 6,600,654 B2 | 7/2003 | Loebach |
| 6,611,753 B1 | 8/2003 | Millington |
| 6,615,130 B2 | 9/2003 | Myr |
| 6,654,024 B1 | 11/2003 | Voelkel |
| 6,693,564 B2 | 2/2004 | Niitsuma |
| 6,704,645 B1 | 3/2004 | Beesley et al. |
| 6,710,774 B1 | 3/2004 | Kawasaki et al. |
| 6,792,349 B1 | 9/2004 | Chen et al. |
| 6,891,525 B2 | 5/2005 | Ogoro |
| 6,972,757 B2 | 12/2005 | Arikawa et al. |
| 7,054,742 B2 | 5/2006 | Khavakh et al. |
| 7,054,745 B1 | 5/2006 | Couckuyt et al. |
| 7,065,448 B1 | 6/2006 | Gearhart |
| 7,119,819 B1 | 10/2006 | Robertson et al. |
| 7,148,908 B2 | 12/2006 | Riek et al. |
| 7,149,625 B2 | 12/2006 | Mathews et al. |

(56) References Cited

U.S. PATENT DOCUMENTS

| | | |
|---|---|---|
| 7,158,876 B2 | 1/2007 | Crook |
| 7,194,356 B2 | 3/2007 | Sano |
| 7,242,966 B1 | 7/2007 | Averkamp |
| 7,373,244 B2 | 5/2008 | Kreft |
| 7,379,811 B2 | 5/2008 | Rasmussen et al. |
| 7,392,133 B2 | 6/2008 | Maruyama et al. |
| 7,413,211 B2 | 8/2008 | Hendry et al. |
| 7,433,780 B2 | 10/2008 | Machino |
| 7,437,279 B2 | 10/2008 | Agrawala et al. |
| 7,440,875 B2 | 10/2008 | Cuthbert et al. |
| 7,460,565 B2 | 12/2008 | Dally et al. |
| 7,460,953 B2 | 12/2008 | Herbst et al. |
| 7,467,356 B2 | 12/2008 | Gettman et al. |
| 7,480,565 B2 | 1/2009 | Ikeuchi et al. |
| 7,539,606 B2 | 5/2009 | Comair et al. |
| 7,542,882 B2 | 6/2009 | Agrawala et al. |
| 7,551,172 B2 | 6/2009 | Yaron et al. |
| 7,561,169 B2 | 7/2009 | Carroll |
| 7,589,732 B2 | 9/2009 | Burtnyk et al. |
| 7,620,494 B1 | 11/2009 | Matthews et al. |
| 7,623,965 B2 | 11/2009 | Green |
| 7,634,352 B2 | 12/2009 | Soulchin et al. |
| 7,692,658 B2 | 4/2010 | Moore |
| 7,697,027 B2 | 4/2010 | McMahon et al. |
| 7,698,063 B2 | 4/2010 | Kim |
| 7,701,434 B2 | 4/2010 | Kreek et al. |
| 7,702,456 B2 | 4/2010 | Singh |
| 7,706,973 B2 | 4/2010 | McBride et al. |
| 7,729,854 B2 | 6/2010 | Muramatsu |
| 7,734,415 B2 | 6/2010 | Oumi et al. |
| 7,743,337 B1 | 6/2010 | Maeda et al. |
| 7,746,343 B1 | 6/2010 | Charaniya et al. |
| 7,761,227 B2 | 7/2010 | Kropp |
| 7,830,243 B2 | 11/2010 | Buckley et al. |
| 7,831,433 B1 | 11/2010 | Belvin et al. |
| 7,831,917 B1 | 11/2010 | Karam |
| 7,860,645 B2 | 12/2010 | Kim et al. |
| 7,865,306 B2 | 1/2011 | Mays |
| 7,917,285 B2 | 3/2011 | Rothschild |
| 7,917,288 B2 | 3/2011 | Cheung et al. |
| 7,925,427 B2 | 4/2011 | Zehler |
| 7,933,395 B1 | 4/2011 | Bailly et al. |
| 7,945,546 B2 | 5/2011 | Bliss et al. |
| 7,949,546 B1 | 5/2011 | Klieman et al. |
| 7,957,871 B1 | 6/2011 | Echeruo |
| 8,010,407 B1 | 8/2011 | Santoro et al. |
| 8,031,164 B2 | 10/2011 | Herz et al. |
| 8,041,503 B2 | 10/2011 | Choi et al. |
| 8,102,253 B1 | 1/2012 | Brady, Jr. |
| 8,103,440 B2 | 1/2012 | Sengoku et al. |
| 8,103,445 B2 | 1/2012 | Smith et al. |
| 8,111,258 B2 | 2/2012 | Ajioka et al. |
| 8,115,764 B2 | 2/2012 | Kameda et al. |
| 8,151,210 B2 | 4/2012 | Nezu et al. |
| 8,190,326 B2 | 5/2012 | Nezu et al. |
| 8,195,383 B2 | 6/2012 | Wipplinger et al. |
| 8,200,847 B2 | 6/2012 | Lebeau et al. |
| 8,214,142 B2 | 7/2012 | Cerecke et al. |
| 8,237,713 B2 | 8/2012 | Yaron et al. |
| 8,237,745 B1 | 8/2012 | Cornell et al. |
| 8,249,259 B2 | 8/2012 | Marumoto et al. |
| 8,274,524 B1 | 9/2012 | Cornell et al. |
| 8,301,371 B2 | 10/2012 | Sheha et al. |
| 8,301,378 B2 | 10/2012 | Nishibashi et al. |
| 8,306,730 B2 | 11/2012 | Nishibashi et al. |
| 8,321,126 B2 | 11/2012 | Mays |
| 8,326,444 B1* | 12/2012 | Classen ............... H03G 3/3005 381/106 |
| 8,335,642 B2 | 12/2012 | Wipplinger et al. |
| 8,335,675 B1 | 12/2012 | Diverdi et al. |
| 8,339,403 B2 | 12/2012 | Zhao et al. |
| 8,339,990 B1 | 12/2012 | Tzamaloukas |
| 8,359,389 B1 | 1/2013 | Cohen et al. |
| 8,364,398 B2 | 1/2013 | Rossio et al. |
| 8,370,060 B2 | 2/2013 | Rossio et al. |
| 8,375,325 B2 | 2/2013 | Wuttke |
| 8,411,087 B2 | 4/2013 | Wei et al. |
| 8,428,871 B1 | 4/2013 | Matthews et al. |
| 8,438,481 B2 | 5/2013 | Lau et al. |
| 8,489,641 B1 | 7/2013 | Seefeld et al. |
| 8,498,812 B2 | 7/2013 | Ren et al. |
| 8,515,766 B1 | 8/2013 | Bringert et al. |
| 8,589,069 B1 | 11/2013 | Lehman |
| 8,589,075 B1 | 11/2013 | Jones |
| 8,595,014 B2 | 11/2013 | Rychlik |
| 8,600,654 B2 | 12/2013 | Kishikawa et al. |
| 8,606,514 B2 | 12/2013 | Rowley et al. |
| 8,606,516 B2 | 12/2013 | Vertelney et al. |
| 8,612,151 B2 | 12/2013 | Winkler et al. |
| 8,635,019 B2 | 1/2014 | Tertoolen |
| 8,645,056 B2 | 2/2014 | Wipplinger et al. |
| 8,645,366 B1 | 2/2014 | Acharya |
| 8,665,112 B2 | 3/2014 | Chen et al. |
| 8,665,278 B2 | 3/2014 | Zhao et al. |
| 8,667,562 B2 | 3/2014 | Lebeau et al. |
| 8,676,466 B2 | 3/2014 | Mudalige |
| 8,681,176 B1 | 3/2014 | Maurer et al. |
| 8,694,242 B2 | 4/2014 | Nagase |
| 8,738,284 B1 | 5/2014 | Jones |
| 8,739,070 B2 | 5/2014 | Mullen |
| 8,762,048 B2 | 6/2014 | Kosseifi et al. |
| 8,774,470 B1 | 7/2014 | Schmidt et al. |
| 8,798,918 B2 | 8/2014 | Onishi et al. |
| 8,818,618 B2 | 8/2014 | Follmer et al. |
| 8,825,403 B1 | 9/2014 | Kadous et al. |
| 8,849,564 B2 | 9/2014 | Mutoh |
| 8,880,345 B2 | 11/2014 | Kazama et al. |
| 8,880,568 B2 | 11/2014 | Perczynski et al. |
| 8,890,863 B1 | 11/2014 | Lininger |
| 8,933,960 B2 | 1/2015 | Lindahl et al. |
| 8,970,592 B1 | 3/2015 | Petterson |
| 9,159,153 B2 | 10/2015 | Chen et al. |
| 9,212,918 B1 | 12/2015 | Newlin et al. |
| 9,250,092 B2 | 2/2016 | Blumenberg et al. |
| 9,266,536 B2 | 2/2016 | Loria et al. |
| 9,304,008 B2 | 4/2016 | Poppen et al. |
| 9,465,890 B1 | 10/2016 | Wilson |
| 9,466,127 B2 | 10/2016 | Lindahl et al. |
| 9,588,987 B1 | 3/2017 | Wailes et al. |
| 9,741,149 B2 | 8/2017 | Myung et al. |
| 2001/0028350 A1 | 10/2001 | Matsuoka et al. |
| 2001/0056325 A1 | 12/2001 | Pu et al. |
| 2002/0010655 A1 | 1/2002 | Kjallstrom |
| 2002/0059296 A1 | 5/2002 | Hayashi et al. |
| 2002/0103599 A1 | 8/2002 | Sugiyama et al. |
| 2002/0156556 A1 | 10/2002 | Ruffner |
| 2002/0156572 A1 | 10/2002 | Bullock et al. |
| 2002/0164998 A1 | 11/2002 | Younis |
| 2003/0016850 A1 | 1/2003 | Kaufman et al. |
| 2003/0018427 A1 | 1/2003 | Yokota et al. |
| 2003/0023350 A1 | 1/2003 | Tan et al. |
| 2003/0040864 A1 | 2/2003 | Stein |
| 2003/0083851 A1 | 5/2003 | Nagamune |
| 2003/0109266 A1 | 6/2003 | Rafiah et al. |
| 2003/0137515 A1 | 7/2003 | Cederwall et al. |
| 2003/0154079 A1 | 8/2003 | Ota et al. |
| 2003/0182183 A1 | 9/2003 | Pribe |
| 2003/0231190 A1 | 12/2003 | Jawerth et al. |
| 2004/0001114 A1 | 1/2004 | Fuchs et al. |
| 2004/0024524 A1 | 2/2004 | Miyazawa |
| 2004/0046600 A1 | 3/2004 | Fujimoto et al. |
| 2004/0048600 A1 | 3/2004 | Madour et al. |
| 2004/0048620 A1 | 3/2004 | Nakahara et al. |
| 2004/0070602 A1 | 4/2004 | Kobuya et al. |
| 2004/0128066 A1 | 7/2004 | Kudo et al. |
| 2004/0158395 A1 | 8/2004 | Yamada et al. |
| 2004/0169653 A1 | 9/2004 | Endo et al. |
| 2004/0172418 A1 | 9/2004 | Dorum et al. |
| 2004/0176908 A1 | 9/2004 | Senda et al. |
| 2004/0204840 A1 | 10/2004 | Hashima et al. |
| 2004/0212627 A1 | 10/2004 | Sumizawa et al. |
| 2004/0212827 A1 | 10/2004 | Otsuji et al. |
| 2004/0215389 A1 | 10/2004 | Hirose |
| 2004/0236498 A1 | 11/2004 | Le et al. |

(56) References Cited

U.S. PATENT DOCUMENTS

| | | |
|---|---|---|
| 2004/0236507 A1 | 11/2004 | Maruyama et al. |
| 2004/0257363 A1 | 12/2004 | Veach |
| 2005/0027705 A1 | 2/2005 | Sadri et al. |
| 2005/0049786 A1 | 3/2005 | Odachi et al. |
| 2005/0055159 A1 | 3/2005 | Song et al. |
| 2005/0107993 A1 | 5/2005 | Cuthbert et al. |
| 2005/0125148 A1 | 6/2005 | Van et al. |
| 2005/0131631 A1 | 6/2005 | Nakano et al. |
| 2005/0137791 A1 | 6/2005 | Agrawala et al. |
| 2005/0143914 A1 | 6/2005 | Yamada et al. |
| 2005/0149261 A9 | 7/2005 | Lee et al. |
| 2005/0159945 A1 | 7/2005 | Otsuka et al. |
| 2005/0177305 A1 | 8/2005 | Han |
| 2005/0222760 A1 | 10/2005 | Cabral et al. |
| 2005/0228553 A1 | 10/2005 | Tryon |
| 2005/0243104 A1 | 11/2005 | Kinghorn |
| 2005/0251331 A1 | 11/2005 | Kreft |
| 2005/0273251 A1 | 12/2005 | Nix et al. |
| 2005/0273252 A1 | 12/2005 | Nix et al. |
| 2006/0015246 A1 | 1/2006 | Hui |
| 2006/0015249 A1 | 1/2006 | Gieseke |
| 2006/0025923 A1 | 2/2006 | Dotan et al. |
| 2006/0026521 A1 | 2/2006 | Hotelling et al. |
| 2006/0031786 A1 | 2/2006 | Hillis et al. |
| 2006/0041372 A1 | 2/2006 | Kubota et al. |
| 2006/0041379 A1 | 2/2006 | Brulle-Drews |
| 2006/0058849 A1 | 3/2006 | Chen et al. |
| 2006/0058949 A1 | 3/2006 | Fogel et al. |
| 2006/0074553 A1 | 4/2006 | Foo et al. |
| 2006/0122872 A1 | 6/2006 | Stevens et al. |
| 2006/0135259 A1 | 6/2006 | Nancke-Krogh et al. |
| 2006/0161440 A1 | 7/2006 | Nakayama et al. |
| 2006/0184323 A1 | 8/2006 | Park |
| 2006/0195255 A1 | 8/2006 | Kim |
| 2006/0195257 A1 | 8/2006 | Nakamura |
| 2006/0195259 A1 | 8/2006 | Pinkus et al. |
| 2006/0217879 A1 | 9/2006 | Ikeuchi et al. |
| 2006/0224316 A1 | 10/2006 | Ishida et al. |
| 2006/0247845 A1 | 11/2006 | Cera et al. |
| 2006/0253245 A1 | 11/2006 | Cera et al. |
| 2006/0270025 A1 | 11/2006 | Zarur et al. |
| 2006/0284879 A1 | 12/2006 | Nagata et al. |
| 2006/0285743 A1 | 12/2006 | Oh et al. |
| 2006/0287818 A1 | 12/2006 | Okude et al. |
| 2007/0032912 A1 | 2/2007 | Jung et al. |
| 2007/0061071 A1 | 3/2007 | Torii |
| 2007/0076137 A1 | 4/2007 | Chiang |
| 2007/0080830 A1 | 4/2007 | Sacks |
| 2007/0088502 A1 | 4/2007 | Oumi et al. |
| 2007/0088897 A1 | 4/2007 | Wailes et al. |
| 2007/0140187 A1 | 6/2007 | Rokusek et al. |
| 2007/0143676 A1 | 6/2007 | Chen |
| 2007/0150179 A1 | 6/2007 | Pinkus et al. |
| 2007/0150842 A1 | 6/2007 | Chaudhri et al. |
| 2007/0174006 A1 | 7/2007 | Kusumoto |
| 2007/0185650 A1 | 8/2007 | Yokota et al. |
| 2007/0192020 A1 | 8/2007 | Brulle-Drews et al. |
| 2007/0195089 A1 | 8/2007 | Furukado |
| 2007/0200674 A1 | 8/2007 | Moore et al. |
| 2007/0208502 A1 | 9/2007 | Sakamoto et al. |
| 2007/0208719 A1 | 9/2007 | Tran |
| 2007/0213092 A1 | 9/2007 | Geelen |
| 2007/0219706 A1 | 9/2007 | Sheynblat |
| 2007/0219718 A1 | 9/2007 | Pennock et al. |
| 2007/0233371 A1 | 10/2007 | Stoschek et al. |
| 2007/0245245 A1 | 10/2007 | Blue et al. |
| 2007/0265772 A1 | 11/2007 | Geelen |
| 2007/0273624 A1 | 11/2007 | Geelen |
| 2007/0273712 A1 | 11/2007 | O'Mullan et al. |
| 2007/0276596 A1 | 11/2007 | Solomon et al. |
| 2007/0276597 A1 | 11/2007 | Kato et al. |
| 2007/0293958 A1 | 12/2007 | Stehle et al. |
| 2008/0016145 A1 | 1/2008 | Takase et al. |
| 2008/0032663 A1 | 2/2008 | Doyle |
| 2008/0040024 A1 | 2/2008 | Silva |
| 2008/0059061 A1 | 3/2008 | Lee |
| 2008/0059889 A1 | 3/2008 | Parker et al. |
| 2008/0062126 A1 | 3/2008 | Algreatly |
| 2008/0062173 A1 | 3/2008 | Tashiro |
| 2008/0068221 A1 | 3/2008 | Park |
| 2008/0068223 A1 | 3/2008 | Behr et al. |
| 2008/0077324 A1 | 3/2008 | Hatano et al. |
| 2008/0082225 A1 | 4/2008 | Barrett |
| 2008/0086356 A1 | 4/2008 | Glassman et al. |
| 2008/0091344 A1 | 4/2008 | Mikuriya et al. |
| 2008/0109404 A1 | 5/2008 | Holm |
| 2008/0114534 A1 | 5/2008 | Yamazaki et al. |
| 2008/0114541 A1 | 5/2008 | Shintani et al. |
| 2008/0122796 A1 | 5/2008 | Jobs et al. |
| 2008/0133124 A1 | 6/2008 | Sarkeshik |
| 2008/0140314 A1 | 6/2008 | Park |
| 2008/0154489 A1 | 6/2008 | Kaneda et al. |
| 2008/0167798 A1 | 7/2008 | Tertoolen |
| 2008/0167801 A1 | 7/2008 | Geelen et al. |
| 2008/0168396 A1 | 7/2008 | Matas et al. |
| 2008/0168398 A1 | 7/2008 | Geelen et al. |
| 2008/0171559 A1 | 7/2008 | Frank et al. |
| 2008/0174570 A1 | 7/2008 | Jobs et al. |
| 2008/0195307 A1 | 8/2008 | Raynaud et al. |
| 2008/0195638 A1 | 8/2008 | Winberry et al. |
| 2008/0198158 A1 | 8/2008 | Iwamura et al. |
| 2008/0204462 A1 | 8/2008 | Reed et al. |
| 2008/0208450 A1 | 8/2008 | Katzer |
| 2008/0215234 A1 | 9/2008 | Geelen |
| 2008/0228393 A1 | 9/2008 | Geelen et al. |
| 2008/0238941 A1 | 10/2008 | Kinnan et al. |
| 2008/0270025 A1 | 10/2008 | Wlotzka |
| 2008/0288884 A1 | 11/2008 | Daughtrey |
| 2008/0320419 A1 | 12/2008 | Matas et al. |
| 2009/0005981 A1 | 1/2009 | Forstall et al. |
| 2009/0012708 A1 | 1/2009 | Wu et al. |
| 2009/0018764 A1 | 1/2009 | Ishibashi et al. |
| 2009/0028440 A1 | 1/2009 | Elangovan et al. |
| 2009/0037094 A1 | 2/2009 | Schmidt |
| 2009/0040240 A1 | 2/2009 | Grotjohn et al. |
| 2009/0043491 A1 | 2/2009 | Haatainen |
| 2009/0063041 A1 | 3/2009 | Hirose et al. |
| 2009/0063048 A1 | 3/2009 | Tsuji |
| 2009/0064014 A1 | 3/2009 | Nelson et al. |
| 2009/0074249 A1 | 3/2009 | Moed et al. |
| 2009/0082960 A1 | 3/2009 | Ramaswamy et al. |
| 2009/0093957 A1 | 4/2009 | Se et al. |
| 2009/0096753 A1 | 4/2009 | Lim |
| 2009/0100018 A1 | 4/2009 | Roberts |
| 2009/0100342 A1 | 4/2009 | Jakobson |
| 2009/0105944 A1 | 4/2009 | Urano et al. |
| 2009/0119001 A1 | 5/2009 | Moussaeiff et al. |
| 2009/0143054 A1* | 6/2009 | Drescher ............... H04M 19/04 455/418 |
| 2009/0143977 A1 | 6/2009 | Beletski et al. |
| 2009/0150373 A1 | 6/2009 | Davis et al. |
| 2009/0154666 A1 | 6/2009 | Rios et al. |
| 2009/0156234 A1 | 6/2009 | Sako et al. |
| 2009/0164115 A1 | 6/2009 | Kosakowski et al. |
| 2009/0171561 A1 | 7/2009 | Geelen |
| 2009/0171575 A1 | 7/2009 | Kim et al. |
| 2009/0171577 A1 | 7/2009 | Roumeliotis et al. |
| 2009/0171578 A1 | 7/2009 | Kim et al. |
| 2009/0171580 A1 | 7/2009 | Nezu |
| 2009/0177385 A1 | 7/2009 | Matas et al. |
| 2009/0181650 A1 | 7/2009 | Dicke |
| 2009/0182497 A1 | 7/2009 | Hagiwara |
| 2009/0187335 A1 | 7/2009 | Muhlfelder et al. |
| 2009/0198767 A1 | 8/2009 | Jakobson et al. |
| 2009/0207121 A1 | 8/2009 | Shih et al. |
| 2009/0216434 A1 | 8/2009 | Panganiban et al. |
| 2009/0216442 A1 | 8/2009 | Luert |
| 2009/0222199 A1 | 9/2009 | Nishiura |
| 2009/0228195 A1 | 9/2009 | Lutz et al. |
| 2009/0228841 A1 | 9/2009 | Hildreth |
| 2009/0237510 A1 | 9/2009 | Chen et al. |
| 2009/0244100 A1 | 10/2009 | Schwegler et al. |
| 2009/0248420 A1 | 10/2009 | Basir et al. |
| 2009/0254273 A1 | 10/2009 | Gill et al. |

(56) References Cited

U.S. PATENT DOCUMENTS

| | | |
|---|---|---|
| 2009/0262117 A1 | 10/2009 | Soulchin et al. |
| 2009/0267954 A1 | 10/2009 | Cupps et al. |
| 2009/0273601 A1 | 11/2009 | Kim |
| 2009/0284478 A1 | 11/2009 | De et al. |
| 2009/0287408 A1 | 11/2009 | Gerdes et al. |
| 2009/0305742 A1 | 12/2009 | Caballero et al. |
| 2009/0306891 A1 | 12/2009 | Jeon et al. |
| 2009/0312942 A1 | 12/2009 | Froeberg |
| 2009/0326803 A1 | 12/2009 | Neef et al. |
| 2009/0326810 A1 | 12/2009 | Callaghan et al. |
| 2009/0327947 A1 | 12/2009 | Schreiner et al. |
| 2010/0002007 A1 | 1/2010 | Rajagopalan |
| 2010/0004852 A1 | 1/2010 | Kawamura |
| 2010/0017110 A1 | 1/2010 | Sengoku et al. |
| 2010/0030578 A1 | 2/2010 | Siddique et al. |
| 2010/0045703 A1 | 2/2010 | Kornmann et al. |
| 2010/0045704 A1 | 2/2010 | Kim |
| 2010/0057358 A1 | 3/2010 | Winer et al. |
| 2010/0074538 A1 | 3/2010 | Mishra et al. |
| 2010/0094533 A1 | 4/2010 | Wu |
| 2010/0100310 A1 | 4/2010 | Eich et al. |
| 2010/0100317 A1 | 4/2010 | Jones et al. |
| 2010/0104174 A1 | 4/2010 | Rohlf et al. |
| 2010/0110314 A1 | 5/2010 | Kusano |
| 2010/0115030 A1 | 5/2010 | Hong et al. |
| 2010/0118065 A1 | 5/2010 | Song et al. |
| 2010/0120471 A1 | 5/2010 | Uchikawa et al. |
| 2010/0123737 A1 | 5/2010 | Williamson et al. |
| 2010/0125386 A1 | 5/2010 | Ibrahim |
| 2010/0125410 A1 | 5/2010 | Hicks |
| 2010/0131189 A1 | 5/2010 | Geelen et al. |
| 2010/0134425 A1 | 6/2010 | Storrusten |
| 2010/0146436 A1 | 6/2010 | Jakobson et al. |
| 2010/0153010 A1 | 6/2010 | Huang |
| 2010/0185382 A1 | 7/2010 | Barker et al. |
| 2010/0190513 A1 | 7/2010 | Andreasson |
| 2010/0205060 A1 | 8/2010 | Athsani et al. |
| 2010/0207751 A1 | 8/2010 | Follmer et al. |
| 2010/0211199 A1* | 8/2010 | Naik ................ G10L 21/00 700/94 |
| 2010/0211632 A1 | 8/2010 | Saarinen |
| 2010/0225644 A1 | 9/2010 | Swope et al. |
| 2010/0232626 A1* | 9/2010 | Paquier ............... H04S 1/007 381/119 |
| 2010/0246889 A1 | 9/2010 | Nara et al. |
| 2010/0250536 A1 | 9/2010 | Broadbent |
| 2010/0253549 A1 | 10/2010 | Kim et al. |
| 2010/0256902 A1 | 10/2010 | Coch et al. |
| 2010/0266161 A1 | 10/2010 | Kmiecik et al. |
| 2010/0280853 A1 | 11/2010 | Petralia et al. |
| 2010/0287024 A1 | 11/2010 | Ward et al. |
| 2010/0306191 A1 | 12/2010 | Lebeau et al. |
| 2010/0306659 A1 | 12/2010 | Shahine et al. |
| 2010/0309149 A1 | 12/2010 | Blumenberg et al. |
| 2010/0312466 A1 | 12/2010 | Katzer et al. |
| 2010/0312468 A1 | 12/2010 | Withanawasam |
| 2010/0313146 A1 | 12/2010 | Nielsen et al. |
| 2010/0324816 A1 | 12/2010 | Highstrom et al. |
| 2010/0324817 A1 | 12/2010 | Hansen et al. |
| 2010/0325104 A1 | 12/2010 | Kawauchi |
| 2010/0325194 A1 | 12/2010 | Williamson et al. |
| 2010/0328100 A1 | 12/2010 | Fujiwara et al. |
| 2010/0328316 A1 | 12/2010 | Stroila et al. |
| 2010/0332468 A1 | 12/2010 | Cantrell |
| 2011/0004589 A1 | 1/2011 | Rischar et al. |
| 2011/0006190 A1 | 1/2011 | Alameh et al. |
| 2011/0007000 A1 | 1/2011 | Lim |
| 2011/0022393 A1 | 1/2011 | Waeller et al. |
| 2011/0054772 A1 | 3/2011 | Rossio et al. |
| 2011/0055065 A1 | 3/2011 | Brenner |
| 2011/0055187 A1 | 3/2011 | Cai et al. |
| 2011/0060523 A1 | 3/2011 | Baron |
| 2011/0077852 A1 | 3/2011 | Ragavan et al. |
| 2011/0081889 A1 | 4/2011 | Gao et al. |
| 2011/0082616 A1 | 4/2011 | Small et al. |
| 2011/0083167 A1 | 4/2011 | Carpenter et al. |
| 2011/0098917 A1 | 4/2011 | Lebeau et al. |
| 2011/0098918 A1 | 4/2011 | Siliski et al. |
| 2011/0106439 A1 | 5/2011 | Huang et al. |
| 2011/0106534 A1 | 5/2011 | Lebeau et al. |
| 2011/0106595 A1 | 5/2011 | Vande Velde |
| 2011/0112750 A1 | 5/2011 | Lukassen |
| 2011/0112762 A1 | 5/2011 | Gruijters et al. |
| 2011/0118971 A1 | 5/2011 | Petzold et al. |
| 2011/0122126 A1 | 5/2011 | Han et al. |
| 2011/0130949 A1 | 6/2011 | Arrasvuori |
| 2011/0131376 A1 | 6/2011 | Fischer |
| 2011/0131500 A1 | 6/2011 | Ohazama |
| 2011/0137561 A1 | 6/2011 | Kankainen |
| 2011/0144904 A1 | 6/2011 | Pinkus et al. |
| 2011/0153186 A1 | 6/2011 | Jakobson |
| 2011/0159844 A1 | 6/2011 | Gillet et al. |
| 2011/0161843 A1 | 6/2011 | Bennett et al. |
| 2011/0163874 A1 | 7/2011 | Van Os |
| 2011/0164029 A1 | 7/2011 | King et al. |
| 2011/0167058 A1 | 7/2011 | Van Os |
| 2011/0173229 A1 | 7/2011 | Choudhury et al. |
| 2011/0193795 A1 | 8/2011 | Seidman et al. |
| 2011/0196610 A1 | 8/2011 | Waldman et al. |
| 2011/0202862 A1 | 8/2011 | Kramer et al. |
| 2011/0207446 A1 | 8/2011 | Iwuchukwu |
| 2011/0208421 A1 | 8/2011 | Sakashita |
| 2011/0218711 A1 | 9/2011 | Mathur et al. |
| 2011/0231086 A1 | 9/2011 | Montealegre et al. |
| 2011/0246203 A1 | 10/2011 | Byrne et al. |
| 2011/0249030 A1 | 10/2011 | Hirose et al. |
| 2011/0252364 A1 | 10/2011 | Anzures et al. |
| 2011/0264708 A1 | 10/2011 | Smartt |
| 2011/0270517 A1 | 11/2011 | Benedetti |
| 2011/0271230 A1 | 11/2011 | Harris et al. |
| 2011/0276264 A1 | 11/2011 | Plocher et al. |
| 2011/0282567 A1 | 11/2011 | Nortrup |
| 2011/0282759 A1 | 11/2011 | Levin et al. |
| 2011/0285717 A1 | 11/2011 | Schmidt et al. |
| 2011/0289506 A1* | 11/2011 | Trivi .................. G06F 9/526 718/104 |
| 2011/0291860 A1 | 12/2011 | Ozaki et al. |
| 2011/0291863 A1 | 12/2011 | Ozaki et al. |
| 2011/0301728 A1* | 12/2011 | Hamilton ........... G11B 27/034 700/94 |
| 2011/0302527 A1 | 12/2011 | Chen et al. |
| 2011/0313649 A1 | 12/2011 | Bales et al. |
| 2012/0016577 A1 | 1/2012 | Kim et al. |
| 2012/0016678 A1 | 1/2012 | Gruber et al. |
| 2012/0019513 A1 | 1/2012 | Fong et al. |
| 2012/0023097 A1 | 1/2012 | Lebeau et al. |
| 2012/0035924 A1 | 2/2012 | Jitkoff et al. |
| 2012/0036556 A1 | 2/2012 | Lebeau et al. |
| 2012/0041674 A1 | 2/2012 | Katzer |
| 2012/0044243 A1 | 2/2012 | Kim et al. |
| 2012/0047134 A1 | 2/2012 | Hansson et al. |
| 2012/0050489 A1 | 3/2012 | Gupta et al. |
| 2012/0059812 A1 | 3/2012 | Bliss et al. |
| 2012/0060121 A1 | 3/2012 | Goldberg et al. |
| 2012/0062602 A1 | 3/2012 | Vadhavana et al. |
| 2012/0062604 A1 | 3/2012 | Lobo et al. |
| 2012/0078870 A1 | 3/2012 | Bazaz |
| 2012/0081404 A1 | 4/2012 | Maclellan et al. |
| 2012/0084670 A1 | 4/2012 | Momchilov |
| 2012/0092325 A1 | 4/2012 | Katano |
| 2012/0092541 A1 | 4/2012 | Tuulos et al. |
| 2012/0096393 A1 | 4/2012 | Shim et al. |
| 2012/0099804 A1 | 4/2012 | Aguilera et al. |
| 2012/0109509 A1 | 5/2012 | Nesbitt et al. |
| 2012/0127170 A1 | 5/2012 | Varadhan |
| 2012/0130625 A1 | 5/2012 | Srivastava |
| 2012/0143504 A1 | 6/2012 | Kalai et al. |
| 2012/0150428 A1 | 6/2012 | Niem et al. |
| 2012/0158290 A1 | 6/2012 | Bharathan et al. |
| 2012/0159402 A1 | 6/2012 | Nurmi et al. |
| 2012/0162267 A1 | 6/2012 | Shimazu |
| 2012/0166281 A1 | 6/2012 | Sartipi |
| 2012/0197839 A1 | 8/2012 | Vervaet et al. |
| 2012/0198002 A1 | 8/2012 | Goulart et al. |

(56) References Cited

U.S. PATENT DOCUMENTS

| | | |
|---|---|---|
| 2012/0200604 A1 | 8/2012 | Imaeda et al. |
| 2012/0206367 A1 | 8/2012 | Griffin et al. |
| 2012/0206469 A1 | 8/2012 | Hulubei et al. |
| 2012/0209518 A1 | 8/2012 | Nowak et al. |
| 2012/0214457 A1 | 8/2012 | Iaccarino |
| 2012/0216139 A1 | 8/2012 | Ording et al. |
| 2012/0223845 A1 | 9/2012 | Schumann |
| 2012/0233480 A1 | 9/2012 | Tanaka |
| 2012/0245849 A1 | 9/2012 | Spindler et al. |
| 2012/0249343 A1 | 10/2012 | Thomas |
| 2012/0253659 A1 | 10/2012 | Pu et al. |
| 2012/0254804 A1 | 10/2012 | Sheha et al. |
| 2012/0259539 A1 | 10/2012 | Sumizawa |
| 2012/0259541 A1 | 10/2012 | Downey et al. |
| 2012/0262592 A1 | 10/2012 | Rabii |
| 2012/0265433 A1 | 10/2012 | Viola et al. |
| 2012/0284247 A1 | 11/2012 | Jiang et al. |
| 2012/0284297 A1 | 11/2012 | Aguera-Arcas et al. |
| 2012/0287114 A1 | 11/2012 | Hallock et al. |
| 2012/0290972 A1 | 11/2012 | Yook et al. |
| 2012/0303263 A1 | 11/2012 | Alam et al. |
| 2012/0303268 A1 | 11/2012 | Su et al. |
| 2012/0311438 A1 | 12/2012 | Cranfill et al. |
| 2012/0314040 A1 | 12/2012 | Kopf et al. |
| 2012/0316774 A1 | 12/2012 | Yariv et al. |
| 2012/0316780 A1 | 12/2012 | Huth |
| 2012/0316955 A1 | 12/2012 | Panguluri et al. |
| 2012/0322458 A1 | 12/2012 | Shklarski et al. |
| 2013/0006775 A1 | 1/2013 | Jordan et al. |
| 2013/0018867 A1 | 1/2013 | Regan et al. |
| 2013/0021382 A1 | 1/2013 | Morlock et al. |
| 2013/0030954 A1 | 1/2013 | Liu et al. |
| 2013/0035853 A1 | 2/2013 | Stout et al. |
| 2013/0046456 A1 | 2/2013 | Scofield et al. |
| 2013/0046967 A1 | 2/2013 | Fullerton et al. |
| 2013/0069987 A1 | 3/2013 | Choe |
| 2013/0076249 A1 | 3/2013 | Chuang et al. |
| 2013/0076784 A1 | 3/2013 | Maurer et al. |
| 2013/0078784 A1 | 3/2013 | Minamihaba et al. |
| 2013/0086028 A1 | 4/2013 | Hebert |
| 2013/0110633 A1 | 5/2013 | Waldman et al. |
| 2013/0132019 A1 | 5/2013 | Suzuno |
| 2013/0162632 A1 | 6/2013 | Varga et al. |
| 2013/0169579 A1 | 7/2013 | Havnor |
| 2013/0173654 A1 | 7/2013 | Lerman et al. |
| 2013/0176334 A1 | 7/2013 | Boldyrev et al. |
| 2013/0176384 A1 | 7/2013 | Jones et al. |
| 2013/0191020 A1 | 7/2013 | Emani et al. |
| 2013/0218450 A1 | 8/2013 | Miyamoto |
| 2013/0222378 A1 | 8/2013 | Koivusalo |
| 2013/0227473 A1 | 8/2013 | Corvo |
| 2013/0230804 A1 | 9/2013 | Sakakibara et al. |
| 2013/0230840 A1 | 9/2013 | Parkar |
| 2013/0253933 A1 | 9/2013 | Maruta |
| 2013/0261856 A1 | 10/2013 | Sharma et al. |
| 2013/0273978 A1 | 10/2013 | Ohlmeier |
| 2013/0290400 A1 | 10/2013 | Zhou et al. |
| 2013/0297321 A1 | 11/2013 | Raux et al. |
| 2013/0304373 A1 | 11/2013 | Kuo et al. |
| 2013/0307875 A1 | 11/2013 | Anderson |
| 2013/0321400 A1 | 12/2013 | Van et al. |
| 2013/0321401 A1 | 12/2013 | Piemonte et al. |
| 2013/0321402 A1 | 12/2013 | Moore et al. |
| 2013/0322634 A1 | 12/2013 | Bennett et al. |
| 2013/0322665 A1 | 12/2013 | Bennett et al. |
| 2013/0322702 A1 | 12/2013 | Piemonte et al. |
| 2013/0324164 A1 | 12/2013 | Vulcano |
| 2013/0325319 A1 | 12/2013 | Moore et al. |
| 2013/0325340 A1 | 12/2013 | Forstall et al. |
| 2013/0325341 A1 | 12/2013 | Van et al. |
| 2013/0325343 A1 | 12/2013 | Blumenberg et al. |
| 2013/0325481 A1 | 12/2013 | Van et al. |
| 2013/0326380 A1 | 12/2013 | Lai et al. |
| 2013/0326384 A1 | 12/2013 | Moore et al. |
| 2013/0326407 A1 | 12/2013 | Van et al. |
| 2013/0326467 A1 | 12/2013 | Nair et al. |
| 2013/0328861 A1 | 12/2013 | Arikan et al. |
| 2013/0328862 A1 | 12/2013 | Piemonte |
| 2013/0328883 A1 | 12/2013 | Sethia |
| 2013/0328915 A1 | 12/2013 | Arikan et al. |
| 2013/0328916 A1 | 12/2013 | Arikan et al. |
| 2013/0328924 A1 | 12/2013 | Arikan et al. |
| 2013/0328937 A1 | 12/2013 | Pirwani et al. |
| 2013/0345959 A1 | 12/2013 | Van et al. |
| 2013/0345962 A1 | 12/2013 | Van et al. |
| 2013/0345975 A1 | 12/2013 | Vulcano et al. |
| 2013/0345980 A1 | 12/2013 | Van et al. |
| 2013/0345981 A1 | 12/2013 | Van et al. |
| 2014/0019036 A1 | 1/2014 | Lemay et al. |
| 2014/0025298 A1 | 1/2014 | Spindler et al. |
| 2014/0025973 A1 | 1/2014 | Schillings et al. |
| 2014/0057683 A1 | 2/2014 | Li |
| 2014/0071119 A1 | 3/2014 | Piemonte et al. |
| 2014/0071130 A1 | 3/2014 | Piemonte |
| 2014/0095066 A1 | 4/2014 | Bouillet et al. |
| 2014/0122911 A1 | 5/2014 | Gunn et al. |
| 2014/0123062 A1 | 5/2014 | Nguyen |
| 2014/0152670 A1 | 6/2014 | Miyamoto et al. |
| 2014/0156187 A1 | 6/2014 | Goddard |
| 2014/0221051 A1 | 8/2014 | Oguri |
| 2014/0358438 A1 | 12/2014 | Cerny et al. |
| 2015/0067008 A1 | 3/2015 | Kamath et al. |
| 2015/0142314 A1 | 5/2015 | Lemay et al. |
| 2015/0149080 A1 | 5/2015 | McCarthy |
| 2015/0161254 A1 | 6/2015 | Boswell |
| 2015/0300833 A1 | 10/2015 | Van et al. |
| 2015/0323342 A1 | 11/2015 | Forstall et al. |
| 2015/0353082 A1 | 12/2015 | Lee et al. |
| 2016/0028824 A1 | 1/2016 | Stenneth et al. |
| 2016/0055669 A1 | 2/2016 | Piemonte et al. |
| 2016/0084668 A1 | 3/2016 | Van et al. |
| 2016/0153803 A1 | 6/2016 | Clark et al. |
| 2016/0161254 A1 | 6/2016 | Nakajima et al. |
| 2016/0216127 A1 | 7/2016 | Van et al. |
| 2017/0038941 A1 | 2/2017 | Pylappan et al. |
| 2017/0052672 A1 | 2/2017 | Forstall et al. |

FOREIGN PATENT DOCUMENTS

| | | |
|---|---|---|
| AU | 2016213819 A1 | 9/2016 |
| CN | 101162153 A | 4/2008 |
| CN | 101346755 A | 1/2009 |
| CN | 101701829 A | 5/2010 |
| CN | 101739633 A | 6/2010 |
| CN | 101939740 A | 1/2011 |
| CN | 102214368 A | 10/2011 |
| CN | 102359791 A | 2/2012 |
| CN | 102426015 A | 4/2012 |
| CN | 102840866 A | 12/2012 |
| CN | 102967304 A | 3/2013 |
| DE | 69628091 T2 | 4/2004 |
| DE | 69928387 T2 | 8/2006 |
| DE | 102007022226 A1 | 11/2008 |
| EP | 2672226 A2 | 12/2013 |
| EP | 2672227 A2 | 12/2013 |
| EP | 2672228 A1 | 12/2013 |
| EP | 2672230 A1 | 12/2013 |
| EP | 2672231 A2 | 12/2013 |
| WO | 2007/057857 A1 | 5/2007 |
| WO | 2009/151036 A1 | 12/2009 |
| WO | 2013/018448 A1 | 2/2013 |
| WO | 2013/184348 A2 | 12/2013 |
| WO | 2013/184391 A1 | 12/2013 |
| WO | 2013/184444 A2 | 12/2013 |
| WO | 2013/184445 A2 | 12/2013 |
| WO | 2013/184446 A2 | 12/2013 |
| WO | 2013/184447 A2 | 12/2013 |
| WO | 2013/184448 A2 | 12/2013 |
| WO | 2013/184449 A2 | 12/2013 |
| WO | 2013/184450 A2 | 12/2013 |
| WO | 2013/184472 A2 | 12/2013 |

(56) References Cited

FOREIGN PATENT DOCUMENTS

WO         2013/184533 A2    12/2013
WO         2013/184534 A2    12/2013

OTHER PUBLICATIONS

Author unknown, Maths—Angle between vectors, retrieved from https://web.archive.org/web/20061110112226/http://www.euclideanspace.com/maths/algebra/vectors/angleBetween/index.htm on Aug. 22, 2018, archived from http://www.euclideanspace.com/maths/algebra/vectors/angleBetween/index.htm on Nov. 10, 2006.
Global, Touch surface screen with ripple effect at Lisbon's Oceanarium, Mar. 11, 2009, https://www.youtube.com/watch?v=O2b6VSKWPJM.
Joshua Johnson MapQuest4 Mobile: Free GPS Spoken Driving Directions Feb. 13, 2011 10 pages (Year: 2011).
Slash Lane MapQuest unveils alternative to Google Maps for iPhone Jun. 15, 2009 7 pages (Year: 2009).
Working with Autorouting Garmin Receivers Jul. 1, 2002 5 pages (Year: 2002).
The Volpe Center "Visualization for Right-of-Way Acquisition" Nov. 2011 63 pages (Year: 2011).

\* cited by examiner

| Map Display | Virtual Camera Inside Scene |
|---|---|
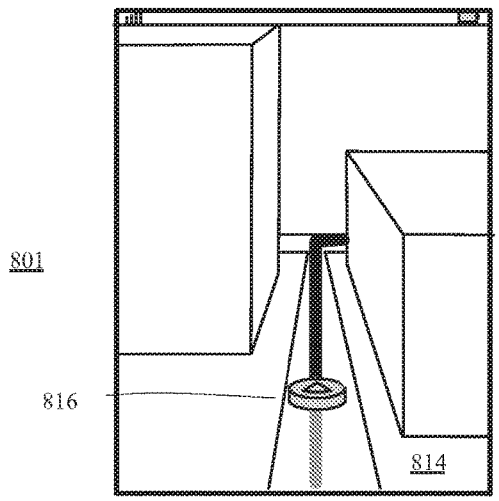 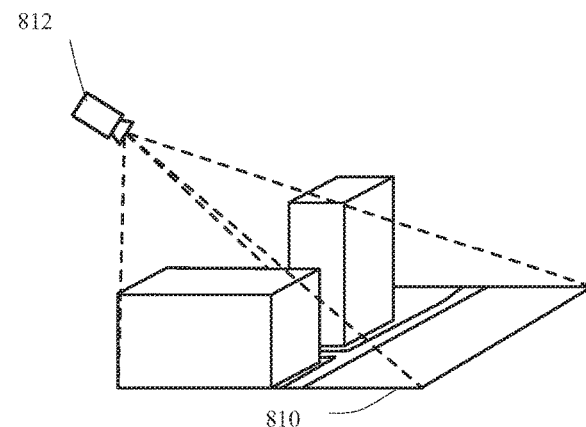
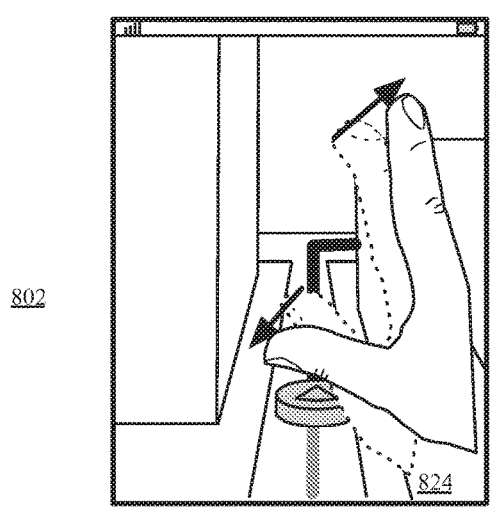 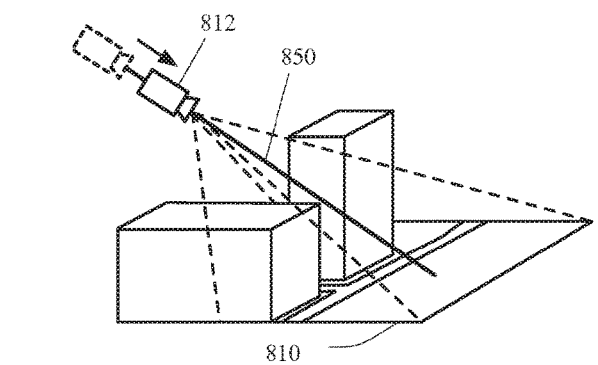
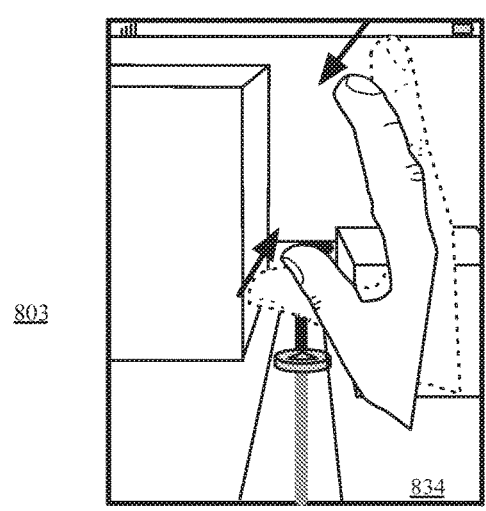 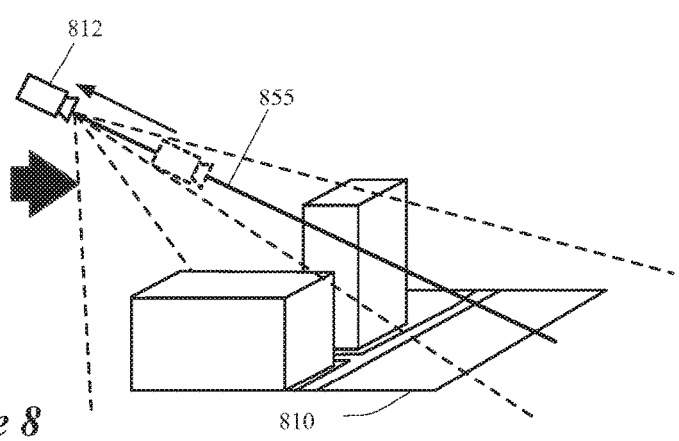
*Figure 8*

Map Display | Virtual Camera Inside Scene
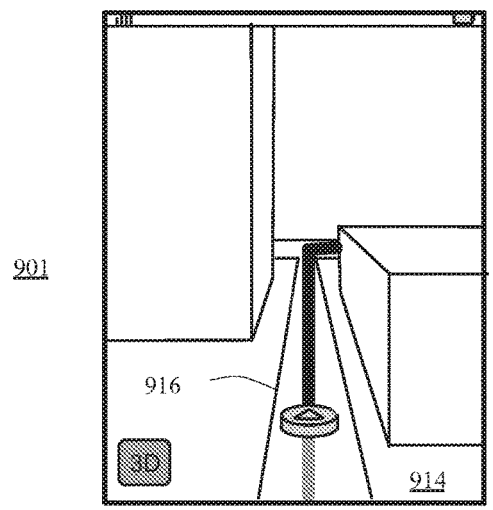
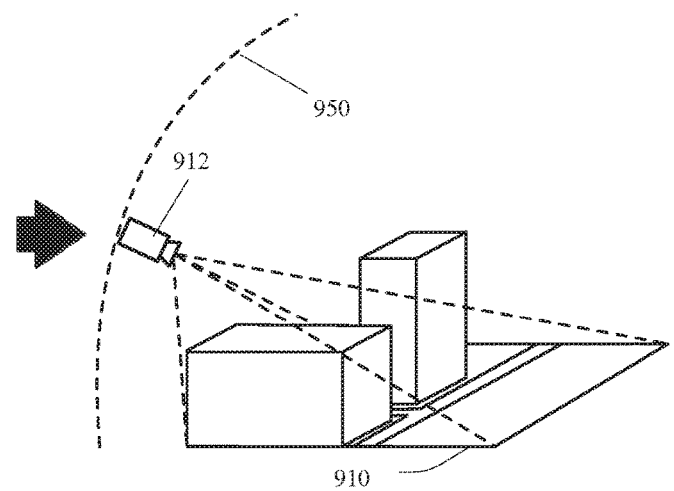
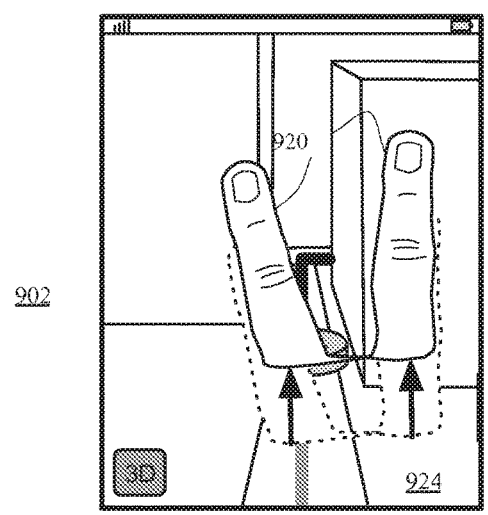
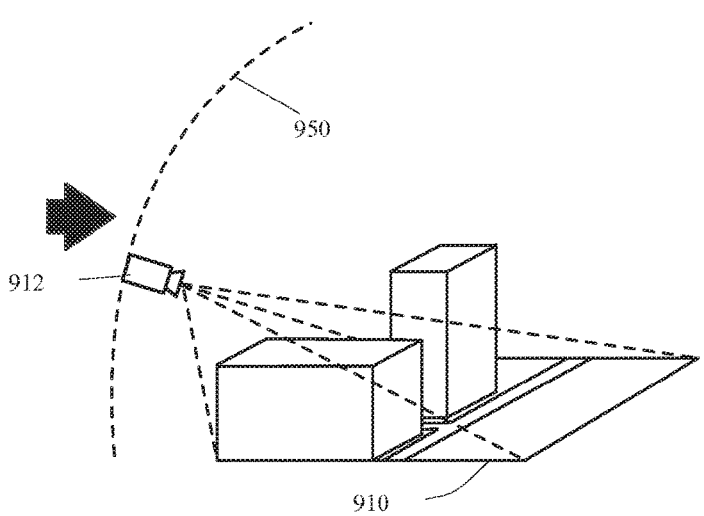
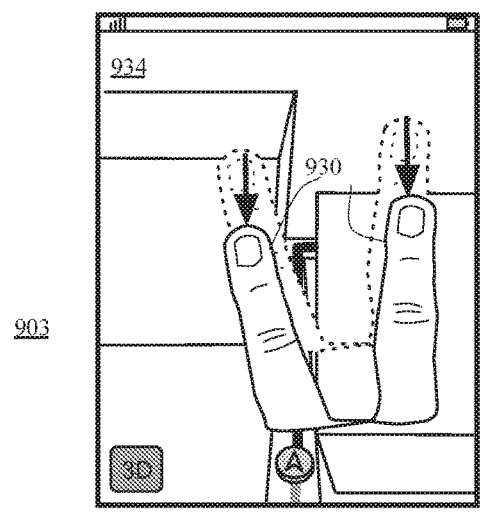
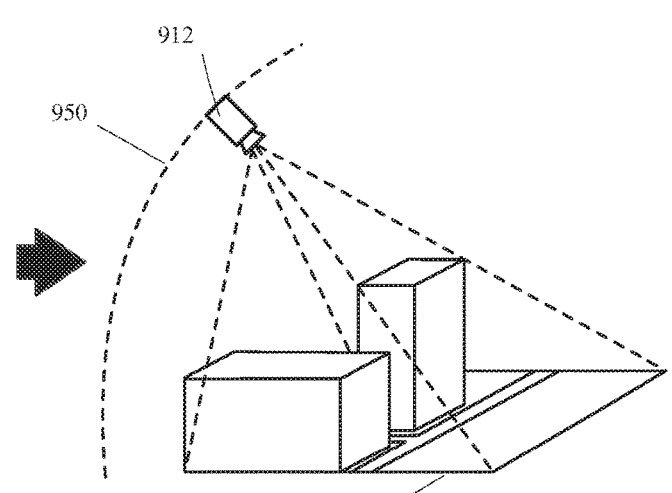
*Figure 9*

3700

| Intersection |  |
|---|---|
| Junction ID ||
| Map Data Association ||
| Branch Type (Point) | Angle (0°) |
| Branch Type (Point) | Angle (90°) |
| Branch Type (Point) | Angle (180°) |
| Branch Type (Point) | Angle (-90°) |

| Intersection |  |
|---|---|
| Junction ID ||
| Map Data Association ||
| Branch Type (Roundabout) | Angle (0°) |
| Branch Type (Roundabout) | Angle (90°) |
| Branch Type (Roundabout) | Angle (180°) |
| Branch Type (Roundabout) | Angle (-90°) |

*Figure 38*

| juncture # | At | Turn | Onto | Towards | For |
|---|---|---|---|---|---|
| 1 | At the end of road | turn right | onto 1st St. | towards B St. | for 0.1 miles |
| 2 | At next light | turn left | onto B. St. | towards 405S | for 2 miles |
| ... | ... | ... | ... | ... | ... |

5205

5200

| juncture # | Rank # | Instruction |
|---|---|---|
| 1 | 1 | At the end of the road, turn right onto 1st St., towards B St. for 0.1 Miles |
| 1 | 2 | At the end of road, turn right onto 1st St. towards B St. |
| 1 | 3 | Turn right onto 1st St. towards B. St. |
| 1 | 4 | Turn right onto 1st St. |
| 1 | 5 | Turn right |
| ... | ... | ... |
| 2 | 1 | At next light, turn left onto B. St. towards 405S for 2 miles. |

*Figure 52*

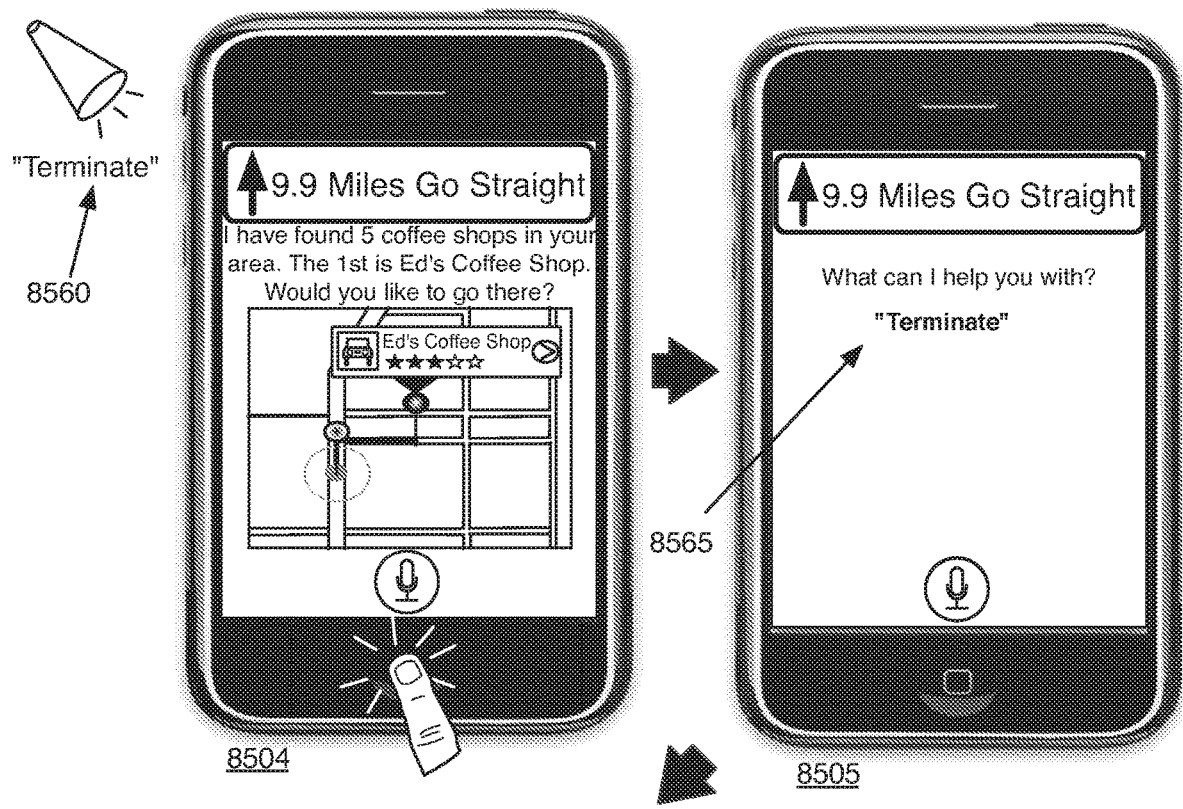
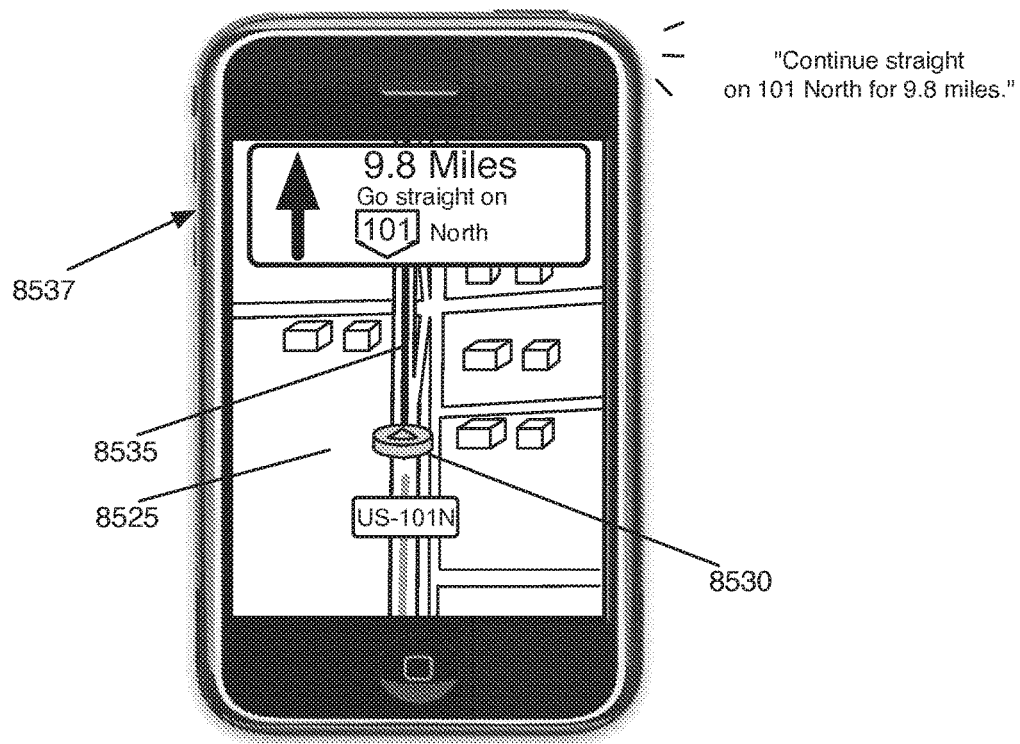
*Figure 85B*

CONTEXT-AWARE VOICE GUIDANCE

INCORPORATION BY REFERENCE; DISCLAIMER

Each of the following applications are hereby incorporated by reference: application Ser. No. 13/632,121 filed on Sep. 30, 2012; application No. 61/699,855 filed on Sep. 11, 2012; application No. 61/699,842 filed on Sep. 11, 2012; application No. 61/699,851 filed on Sep. 11, 2012; application No. 61/657,880 filed on Jun. 10, 2012; application No. 61/657,864 filed on Jun. 10, 2012; application No. 61/656,043 filed on Jun. 6, 2012; application No. 61/656,032 filed on Jun. 6, 2012; application No. 61/656,015 filed on Jun. 6, 2012; application No. 61/656,080 filed on Jun. 6, 2012; application No. 61/655,995 filed on Jun. 5, 2012; application No. 61/655,997 filed on Jun. 5, 2012. The Applicant hereby rescinds any disclaimer of claim scope in the parent application(s) or the prosecution history thereof and advises the USPTO that the claims in this application may be broader than any claim in the parent application(s)

BACKGROUND

Many map-based applications available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes relative locations of streets, highways, points of interest, etc., in the map.

The maps used in such applications are usually two-dimensional (2D) maps or three-dimensional (3D) maps. However, a large number of the applications use 2D maps due in part to the processing-intensive demands of viewing 3D maps. For the same reason, the applications that use 3D maps are often slow, inefficient, plain, and/or simple, to the point that renders the application useless.

BRIEF SUMMARY

Some embodiments of the invention provide a device that includes a navigation application with several novel features. In some embodiments, the device has a touch-sensitive screen that displays the output of the application, and a multi-touch interface that allows a user to provide touch and gestural inputs through the screen to interact with the application.

In some embodiments, the novel features of the navigation application include (1) multiple different views (e.g., a two-dimensional turn-by-turn view, a three-dimensional turn-by-turn view, an overall route view, etc.) and smooth transitions between these views during the navigation, (2) novel user interface (UI) controls for navigation, (3) realistic looking road signs for identifying maneuvers along a navigated route, (4) dynamic generation of instructions and directional indicators for road signs and other presentations of the identified maneuvers, (5) informative navigation displays when the navigation application is operating in the background on the device, (6) novel voice recognition navigation guidance, and (7) integration with other routing applications available on or for the device.

While all these features are part of the navigation application in some embodiments, other embodiments do not employ all of these features in the navigation application. Also, in some embodiments, the navigation application is part of an integrated mapping application that provides several other useful operations, including location browsing, map searching, and route identifying operations. However, one of ordinary skill will realize that in other embodiments, the navigation application is a stand-alone application that does not include some or all of these other operations.

Each of the above-described features are described here. As mentioned above, the navigation application of some embodiments provides multiple different views during navigation and smooth transitions between these views. In some embodiments, examples of such views include a two-dimensional (2D) turn-by-turn view, a three-dimensional (3D) turn-by-turn view, and an overall route view. The application in some embodiments generates the turn-by-turn views from a perspective rendering position within a 3D navigation scene that the device renders. This perspective rendering position in some embodiments is adjustable and can be viewed as a virtual camera that can capture the 3D navigation scene from a variety of different perspectives (e.g., from a variety of different positions and orientations). Accordingly, in some embodiments, the turn-by-turn navigation is an animated rendering of navigated route that is rendered from the vantage point of a virtual camera that traverses along the direction of the route based on the traversal direction and speed of the user carrying the device, which in some embodiments is captured by directional data (e.g., GPS data, triangulated cell-tower data, etc.) associated with the device.

During navigation, the navigation application of some embodiments allows a user to change the position of the virtual camera (i.e., the position from which the navigated route is rendered) through gestural input on the device's screen. Movement of the virtual camera (i.e., movement of the position from which the route is rendered) allows the navigation application to present alternative 3D view. Some embodiments even use the virtual camera to render a top-down 2D view for the turn-by-turn navigation, while other embodiments render the top-down 2D view by zooming in and out of a 2D map.

In some embodiments, the navigation application presents a 3D control (e.g., button) that serves both as a 3D indicator and a 3D initiator/toggle. The 3D control is implemented in some embodiments as a floating control that can "float" above the 2D or 3D navigation presentation when it is needed and "float" out of the presentation when it is not needed. This control also serves as an indicator that the current view is a 3D view. The 3D control may have different appearances (e.g., colored as grey, black, blue, etc.) to provide different indications. In some embodiments, the 3D control is grey when 3D data is not available for the user's current location, black when the 3D data is available but the user is currently viewing the map in 2D, and purple when the user is viewing the map in 3D mode. In some embodiments, the 3D control displays an image of a building when the user is at a certain zoom level and provides a "flyover" of the buildings in the area when selected by the user. It also provides a quick mechanism of getting into and out of 3D navigation. As further described below, the navigation application allows transitions between the 2D and 3D navigation views through other gestural inputs of the multi-touch interface of the device.

The navigation application in some embodiments uses floating controls in order to keep the on-screen controls to a minimum and thereby display as much of the interactive navigation as possible. In some embodiments, the floating controls are part of a cluster of controls that adapt to the task at hand by adjusting its contents in an animated fashion when a user moves between different navigation views, or between different application modalities for embodiments in which the navigation is just one of several modalities of another application. This adaptive nature allows the navigation application to optimize for different tasks while maintaining a consistent look and interaction model while moving between those tasks.

When the navigation application starts a navigation presentation, the application in some embodiments (1) automatically hides the floating controls and a bar (containing other UI controls) on the top of a map along which the navigation is displayed, and (2) starts a full-screen turn-by-turn navigation presentation. In this mode, the application restricts touch interaction with the map. In some embodiments, a tap is required to access the controls that were automatically hidden. In some embodiments, these controls are adapted towards a full-screen navigation look, including a prominent display of the estimated time of arrival (ETA) in the bar along the top.

In some embodiments, one of the controls in the top bar is an overview button. By selecting this button at any time during the navigation, a user can seamlessly switch between the full-screen; turn-by-turn presentation that displays a view optimized for turn-by-turn directions; and an overview presentation that displays a view of the remaining route that better accommodate browsing.

In some embodiments, the constant set of controls and the in-place transition in the map provide continuity between the overview mode and the full-screen mode. These controls also include a control that allows the user to end the navigation in either the overview mode or full-screen model. Some embodiments also allow for a search to be performed while navigating. For instance, some embodiments provide a pull down handle that allows the search field to be pulled into the overview display while navigating in the overview mode. Alternatively, or conjunctively, some embodiments allow for searches to be performed during navigation through a voice-recognition input of the device of some embodiments. Also, in some embodiments, the application allows a user to perform searches (e.g., voice-initiated and/or text-based searches) during turn-by-turn navigation. The navigation application of some embodiments also allows navigation to be initiated through voice-recognition input of the device.

During navigation, the navigation application of some embodiments also allows a user to provide some gestural input without reference to the floating controls or the top-bar controls. For instance, different embodiments provide different gestural inputs to adjust the 2D/3D view during turn-by-turn navigation. In some embodiments, the gestural input is a two-finger pinching/spreading operation to adjust the zoom level. This adjustment of the zoom level inherently adjusts the position and rotation of the camera with respect to the route direction, and thereby changes the 2D/3D perspective view of the route direction. Alternatively, other embodiments provide other gestural inputs (e.g., a finger drag operation) that change the position of the camera instead of or in addition to the zoom operation. In yet other embodiments, a gestural input (e.g., a finger drag operation) momentarily changes the viewing direction of the camera to allow a user to momentarily glance to a side of the navigated route. In these embodiments, the application returns the camera to its previous view along the route after a short time period.

Another novel feature of the navigation application are the realistic-looking road signs that are used during navigation. In some embodiments, the signs are textured images that bear a strong resemblance to actual highway signs. These signs in some embodiments include instructional arrows, text, shields, and distance. The navigation application of some embodiments presents a wide number of sign variants in a large number of different contexts. Also, in some embodiments, the application presents signs in different colors according to the regional norms.

For maneuvers that are close together, the application in some embodiments presents a secondary sign beneath the primary sign. Also, as one maneuver is passed, the navigation application animates the sign passing away with a motion that mimics a sign passing overhead on the highway. When an upcoming maneuver is approaching, the navigation application draws attention to the sign with a subtle animation (e.g., a shimmer across the entire sign).

In some embodiments, the navigation application dynamically generates instructions for a road sign and other presentation (e.g., a list view) associated with a navigation maneuver based on the context under which the application is displaying the sign or presentation. For a given context, the instruction text is chosen by considering factors such as the available space, the availability of information conveyed by means other than text (e.g., the availability of voice guidance), the localized length of each of the instruction variants, the size of the display screen of the device, etc. By locally synthesizing and evaluating several alternatives, the application can pick an optimal instruction string in every scenario.

Similarly, the navigation application of some embodiments adaptively generates directional graphical indicators for a road sign and other presentation (e.g., a list view) associated with a navigation maneuver based on the context under which the application is displaying the sign or presentation. For instance, when there is sufficient space on a sign or presentation for the use of a bigger sign, the navigation application of some embodiments identifies a maneuver to perform at a juncture along a route by using a larger graphical directional indicator that includes (1) a prominent stylized arrow roughly representing the path of the vehicle, and (2) a de-emphasized set of lines and curves corresponding to other elements of the junction. In some embodiments that use this approach, a right turn at a T-junction is represented by a large arrow with a right-angle joined with a smaller, dimmer segment that runs parallel to one of the large arrow's segments. The smaller segment in some embodiments is also pushed off to the side so that the path taken by the vehicle dominates.

Such a representation of a maneuver (that includes a prominent stylized arrow and a de-emphasized set of lines) provides fairly complete information about the maneuver while remaining abstract and easily understandable. However, there may not be sufficient space on the sign or other presentation for such a representation in other contexts. Accordingly, for such cases, the navigation application of some embodiments uses an alternate representation of the maneuver that omits displaying the junction and instead only displays an arrow in the direction of movement.

To generate either the prominent stylized arrow or the simplified arrow for a juncture maneuver along a route, the navigation application in some embodiments receives from a server a description of the juncture and maneuver. In some embodiments, the server performs an automated process to generate this description based on map data, and provides this information in terms of compressed, geometric point data. Also, at the beginning of a route navigation, the server in some embodiments supplies to the navigation application the description of all junctures and maneuvers along the route, and occasionally updates this description when the user strays from the route and the server computes a new route.

When the navigation application receives the juncture and maneuver description, the application of some embodiments initially performs a process to simplify the characterization of the juncture and the maneuver, and then uses this simplified characterization to generate the prominent stylized graphical directional indicator for the juncture. To display a maneuver at a juncture, some navigation applications often provide a plain arrow that is not expressed in terms of the juncture and does not convey much information, while other navigation applications provide a very detailed representation of the juncture and a complex directional representation through this detailed representation. Thus, one existing approach provides very little information, while another approach provides so much information that the information is rendered practically useless. By generating the prominent stylized directional indicator based on the simplified description of the juncture, the navigation application of some embodiments displays a detailed representation of the maneuver at the juncture while eliminating some of the unnecessary complexities of the juncture.

In some embodiments, the navigation application provides navigation instructions while the application is operating in the background and even while the device is locked. In some embodiments, the device is locked when only a reduced set of controls can be used to provide input into the device. For instance, in some embodiments, the locking of the device greatly limits the number of inputs that a user can provide through the touch-sensitive screen of the device.

In some embodiments, voice guidance instructions are one example of instructions that can be provided while the navigation application is operating in the background or while the device is locked. Alternatively to, or conjunctively with, the voice guidance, the navigation application can provide text and/or graphical instructions in at least two modes while operating in the background.

First, the application of some embodiments incorporates in the lock screen background, a live navigation view (e.g., a turn-by-turn view) that includes text and graphical navigation description in the lock-screen display. With this presentation, the user can see the navigation instructions while the application is running in the background without unlocking the device. In some embodiments, the application further refines the lock screen experience by sending notifications that would normally occupy the space being taken by the navigation display to a drawer in the lock-screen display, which in some embodiments is done immediately while in other embodiments is done after a short time period in which the notification is shown on the lock screen view. Also, whenever a user unlocks the device, some embodiments return without animation to the navigation display in order to make the experience seamless.

In some embodiments, the application turns off the lock screen navigation display after a time period if no maneuvers are impending. However, the application in some of these embodiments lights up the screen when approaching an imminent maneuver and/or new navigation instructions need to be provided. This is a small amount of time relative to the duration of each step, so the display of the navigation instructions does not come at the expense of noticeably degraded battery life. To enhance the experience, the navigation application in some embodiments activates an ambient light sensor well before the navigation prompt so that the ambient light settings can be used to light the screen to the correct brightness when it comes time to show the navigation map.

Second, in some embodiments, the navigation application operates in the background even when the device is unlocked. This is the case when the navigation application operates on a device (e.g., a smartphone) that executes several other applications. In such a device, the navigation application would operate in the background when the device is presenting a view (e.g., a page) that is provided by the operating system of the device or a view that is provided by another application on the device.

When the navigation application operates in the background on an unlocked device, the device in some embodiments (1) uses a double-height status bar to indicate the background operation of the navigation application when far from an upcoming maneuver, and (2) uses a sign-like navigation banner that includes dynamically updated distance to a maneuver when approaching a maneuver or when guidance instructions are audible. Further, the application maintains the sign-like banner until the maneuver is complete and suppresses other notifications in that space. Selection of either the double-height status bar or the navigation banner in some embodiments directs the device to switch to a navigation view generated by the navigation application.

The above-described features as well as some other features of the navigation application of some embodiments are further described below. In the description above and below, many of the features are described as part of an integrated mapping application that provides novel location browsing, location searching, route identifying and route navigating operations. However, one of ordinary skill will realize that these novel operations are performed in other embodiments by applications that do not perform all of these operations, or perform other operations in addition to these operations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 8 illustrates the adjustment of the distance of a virtual camera by contracting and expanding gestures.

FIG. 9 illustrates an embodiment of a camera whose angle can be adjusted by gestures.

FIG. 37 conceptually illustrates an example of a data structure of some embodiments for a point type intersection.

FIG. 38 illustrates a data structure of some embodiments for a roundabout intersection.

FIG. 52 illustrates an example of the synthesis of different instructions for a particular maneuver at a juncture according to some embodiments.

FIGS. 85A-85D illustrate 12 stages of a user interface of some embodiments in which a user is using the voice-activated service to search for points of interest and destinations.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Navigation User Interface

A. Start

The navigation application of some embodiments is part of an integrated mapping application that includes several useful modalities, including location browsing, map searching, route identifying and route navigating operations. This integrated application (referred to below as the mapping application, the navigation application, or the integrated application) in some embodiments is defined to be executed by a device that has a touch-sensitive screen that displays the output of the application. In some embodiments, this device has a multi-touch interface for allowing a user to provide touch and gestural inputs through the screen to interact with the application. Examples of such devices are smartphones (e.g., iPhone® sold by Apple Inc., phones operating the Android® operating system, phones operating the Windows 8® operating system, etc.).

Figure 1:
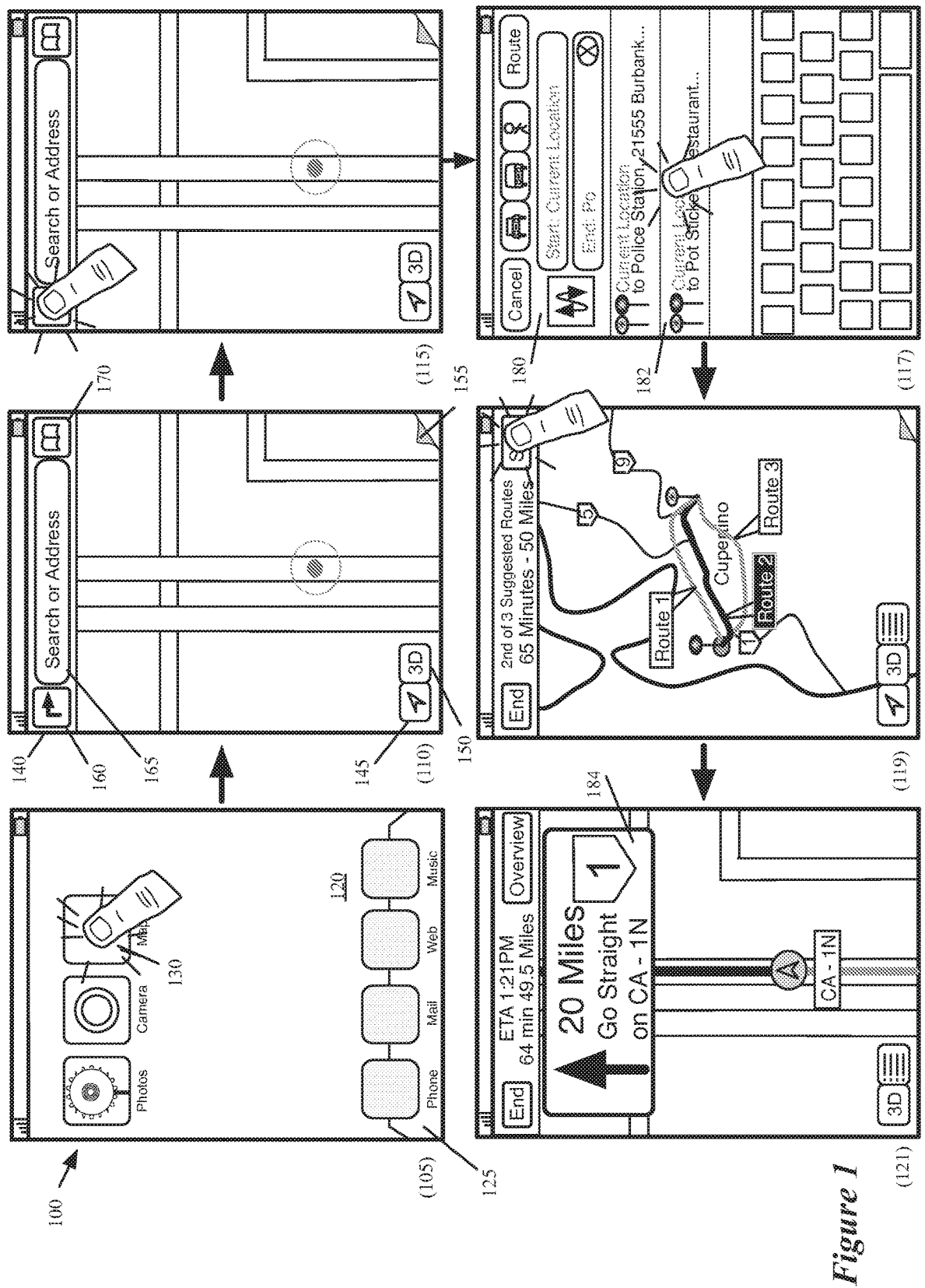
FIG. 1 illustrates an example of a device that executes an integrated mapping application of some embodiments of the invention.

FIG. 1 illustrates an example of a device 100 that executes an integrated mapping application of some embodiments of the invention. This figure also illustrates an example of launching a route navigation in this application. This application has a novel user interface (UI) design that seamlessly and cohesively integrates the controls for each of its different modalities by using a minimum set of on-screen controls that float on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

FIG. 1 shows six stages 105, 110, 115, 117, 119, 121 of interaction with the mapping application. The first stage 105 shows the device's UI 120, which includes several icons of several applications in a dock area 125 and on a page of the UI. One of the icons on this page is the icon for the mapping application 130. The first stage shows a user's selection of the mapping application through touch contact with the device's screen at the location of this application on the screen.

The second stage 110 shows the device after the mapping application has opened. As shown in this stage, the mapping application's UI has a starting page that in some embodiments displays (1) a map of the current location of the device and (2) several UI controls arranged in a top bar 140, and as floating controls. As shown in FIG. 1, the floating controls include an indicator 145, a 3D control 150, and a page curl control 155, while the top bar 140 includes a direction control 160, a search field 165, and a bookmark control 170.

In some embodiments, a user can initiate a search by tapping in the search field 165. This directs the application to present an animation that (1) presents an on-screen keyboard and (2) opens a search table full of invaluable completions. This table has some important subtleties. When the search field is tapped and before the terms are edited, or when the search field is empty, the table contains a list of "recents," which in some embodiments are recent searches and route directions that the user has requested. This makes it very easy to quickly bring up recently accessed results.

After any input on the search field, the table is filled with search completions both from local sources (e.g., bookmarks, contacts, recent searches, recent route directions, etc.) and remote servers. The incorporation of the user's contact card into the search interface adds additional flexibility to the design. When showing recents, a route from the current location to the user's home is always offered in some embodiments, while it is offered in the contexts that are deemed to be "appropriate" in other embodiments. Also, when the search term matches at least part of an address label (e.g., 'ork' for 'Work'), the application presents the user's labeled address as a completion in the search table in some embodiments. Together these behaviors make the search UI a very powerful way to get results onto a map from a variety of sources. In addition to allowing a user to initiate a search, the presence of the text field in the primary map view in some embodiments also allows users to see the query corresponding to search results on the map and to remove those search results by clearing the query.

The bookmark control 170 (e.g., button) allows location and routes to be bookmarked by the application. The position indicator 145 allows the current position of the device to be specifically noted on the map. Once this indicator is selected, the application maintains the current position of the device in the center of the map. In some embodiments, it can also identify the direction to which the device currently points.

The 3D control 150 is a control for viewing a map or inspecting a route in three dimensions (3D). The mapping application provides the 3D control as a quick mechanism of getting into and out of 3D. This control also serves as (1) an indicator that the current view is a 3D view, (2) an indicator that a 3D perspective is available for a given map view (e.g., a map view that is zoomed out might not have a 3D view available), (3) an indicator that a 3D perspective is not available (e.g., the 3D data is not available for the map region), and (4) an indicator that a flyover animation is available at the given zoom level. The 3D control may provide a different appearance corresponding to each indication. For instance, the 3D control may be colored grey when the 3D view is unavailable, black when the 3D view is available but the map is in the 2D view, and blue when the map is in the 3D view. In some embodiments, the 3D control changes to an image of a building when the flyover animation is available for the user's given zoom level and location on the map.

The page curl control 155 is a control that allows the application to minimize the number of on-screen controls, by placing certain less frequently used actions in a secondary UI screen that is accessible through the page curl control that is displayed on the map. In some embodiments, the page curl is permanently displayed on at least some of the map views that the application provides. For instance, in some embodiments, the application displays the page curl permanently on the starting page (illustrated in the second stage 110) that it provides for allowing a user to browse or search for a location or to identify a route.

The direction control 160 opens a direction entry page 180 through which a user can request a route to be identified between a starting location and an ending location. The third stage 115 of FIG. 1 illustrates that the selection of the direction control 160 opens the direction entry page 180, which is shown in the fourth stage 117. The direction control is one of three mechanisms through which the mapping application can be directed to identify and display a route between two locations; the two other mechanisms are (1) a control in an information banner that is displayed for a selected item in the map, and (2) recent routes identified by the device that are displayed in the search field 165. Accordingly, the information banner control and the search field 165 are two UI tools that the application employs to make the transition between the different modalities seamless.

The fourth stage 117 shows that the direction entry page 180 includes starting and ending fields for providing starting and ending locations for a route, and a table that lists recent routes that the application has provided to the user. Other controls on this page are controls for starting a route, for reversing the order of the start and end locations, for canceling the direction request, for picking walking, auto, or public transit routes. These controls and other aspects of the mapping application are described in U.S. patent application Ser. No. 13/632,102, filed Sep. 30, 2012, now published as U.S. Patent Publication 2013/0326407, entitled "Problem Reporting in Maps," concurrently filed with this application. This concurrently filed U.S. Patent Application is incorporated herein by reference.

The fourth stage illustrates the user selecting one of the recent directions that was auto-populated in the table 182. The fifth stage 119 then shows three routes on a 2D map view between the specified start and end locations specified through the page 180. It also shows the selection of the second route and some information about this route in a bar at the top of the layout. This bar is shown to include start and end buttons. The start button is shown to be selected in the fifth stage.

As shown in the sixth stage, the selection of the start button directs the application to enter a turn-by-turn navigation mode. In this example, the application has entered a 2D turn-by-turn navigation mode. In other embodiments, the application will enter by default into a 3D turn-by-turn navigation mode. In this mode, the application displays a realistic sign 184 that identifies the distance from the current location of the device to the next juncture maneuver in the navigated route and some other pertinent information. The application also displays a top bar that includes some information about the navigation as well as End and Overview buttons, for respectively ending the navigation and obtaining an overview of the remaining portion of the navigated route or the entire portion of the navigated route in other embodiments.

The mapping application of some embodiments identifies the location of the device using the coordinates (e.g., longitudinal, altitudinal, and latitudinal coordinates) in the GPS signal that the device receives at the location of the device. Alternatively or conjunctively, the mapping application uses other methods (e.g., cell tower triangulation) to compute the current location. When the user carrying the device deviates from the route, the mapping application of some embodiments tracks the location of the device and re-calculates a new route from the deviated location in order to re-direct the user to the destination location from the deviated location. In other words, the mapping application of some embodiments operating in the navigation mode requires the device to be on a route at all times.

The application further displays the floating 3D control and the floating list control, which were described above. It should be noted that the list control was adaptively added to the floating control cluster upon entering the route inspection and route navigation modalities, while the position indicator was removed from the floating control upon entering the route navigation modality. Also, upon transition from the route inspection mode to the route navigation mode, the application performs an animation in some embodiments that involves the page curl uncurling completely before the application transitions into the navigation presentation.

In some embodiments, the animation transition includes removing the top bar, its associated controls and the floating controls from the navigation presentation, and moving the sign 184 to the top edge of the presentation a short time period after starting the navigation presentation. As further described below, the application requires the user tap on the navigated map to bring back the top bar, its controls and the floating controls, and requires another tap to remove these controls again from the map, in some embodiments. Other embodiments provide other mechanisms for viewing and removing these controls.

Figure 2:
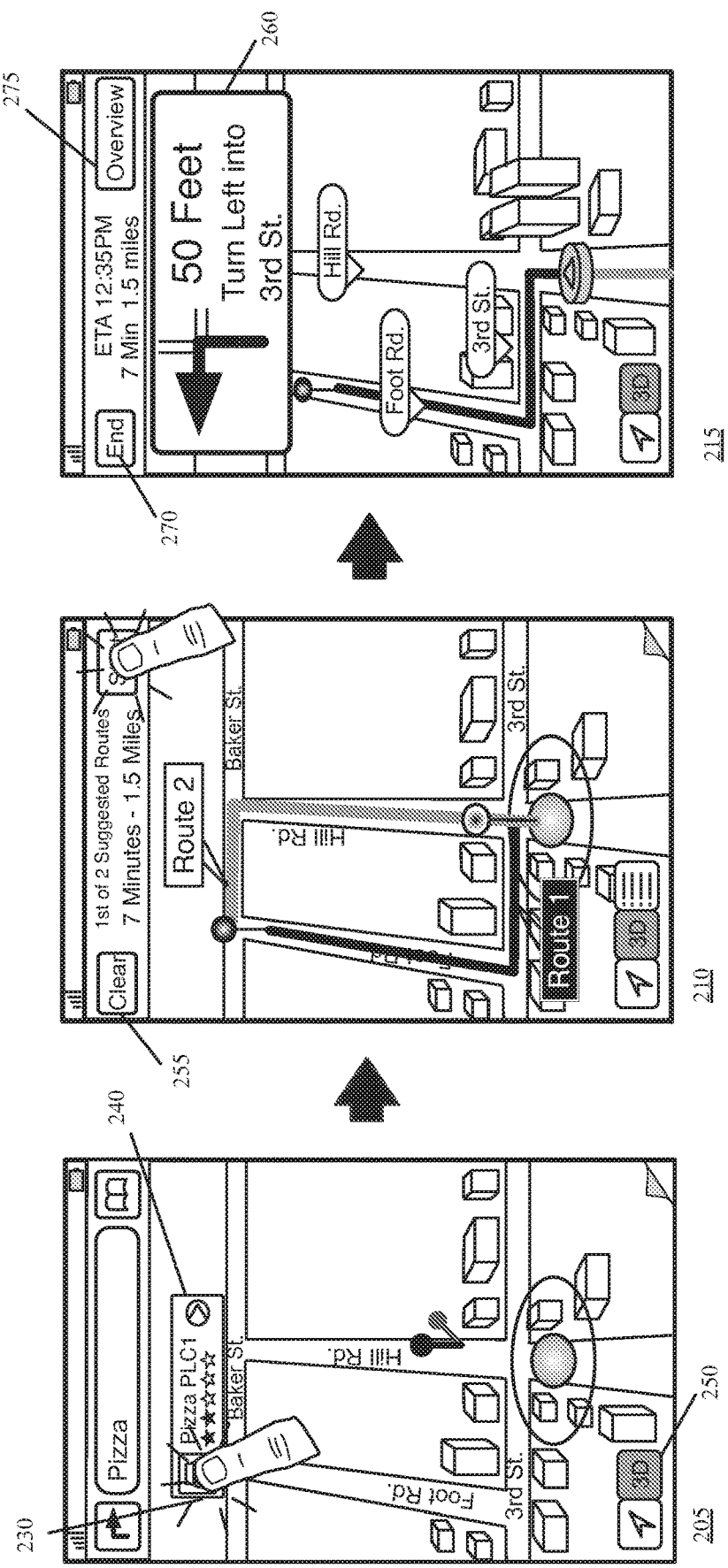
FIG. 2 illustrates an example in terms of three stages of a user's interaction with the mapping application to obtain routing directions.

As another way of allowing the user to get navigation experience, the mapping application of some embodiments provides a UI item in an informational banner that appears by a pin that represents a point of interest (POI). FIG. 2 illustrates an example in terms of three stages 205-215 of a user's interaction with the mapping application to obtain routing directions. This example is provided in the context of using a car icon 230.

The first stage 205 illustrates a map in a 3D map view. As shown, a 3D control 250 appears highlighted to indicate that the map is in a 3D map view. The first stage 205 also illustrates two informational banners for the two pins for the search resulting from running a search with a search query "Pizza" as shown. The user selects the car icon 230. As mentioned above, the car icon 230 is for showing one or more routes to the location that is represented by a pin with which the banner that includes the car icon 230 is associated. The banner 240 which includes the car icon 230 also shows a brief description of the place, a star rating, and an arrow for launching a "stage" for the POI.

The second stage 210 illustrates the two routes, route 1 and route 2, that the mapping application of some embodiments shows in response to the selection of the car icon 230 in the previous stage 205. The user has selected route 1 as indicated by the highlight on the route 1. The user also selects the start button. As mentioned above, the start button in some embodiments is for starting the navigation according to the selected route.

The third stage 215 illustrates that the mapping application displays an instruction sign 260, which is the sign for the first instruction. The mapping application has replaced the clear control 255 and the start button with an end button 270 and an overview control 275 in the top bar 140. The end button is for ending the navigation of the route and the overview control 275 is for showing the entire route in the map view by adjusting the zoom level of the displayed map if adjusting the zoom level is necessary to show the entire route. In some embodiments, the mapping application displays in the top bar 140 the ETA, the amount of time to get to the destination, and the remaining distance to the destination as shown.

When the mapping application receives a selection of the end button while the mapping application is operating in the route inspection mode, the mapping application of some embodiments stops inspection of the selected route by going back to map browsing mode. The mapping application of some embodiments goes back to the map browsing mode by removing the selected route from the map, putting back the page curl, and replacing the information and controls in the top bar with a set of other controls including a direction control, a search field, and a bookmark control. That is, the mapping application takes the appearance of the UI page back to a UI page similar to the UI page shown in the first stage 205. The mapping application of some embodiments does not shift the map to another region when switching to the map browsing mode from the inspection mode.

B. 2D and 3D Navigation

Figure 3:
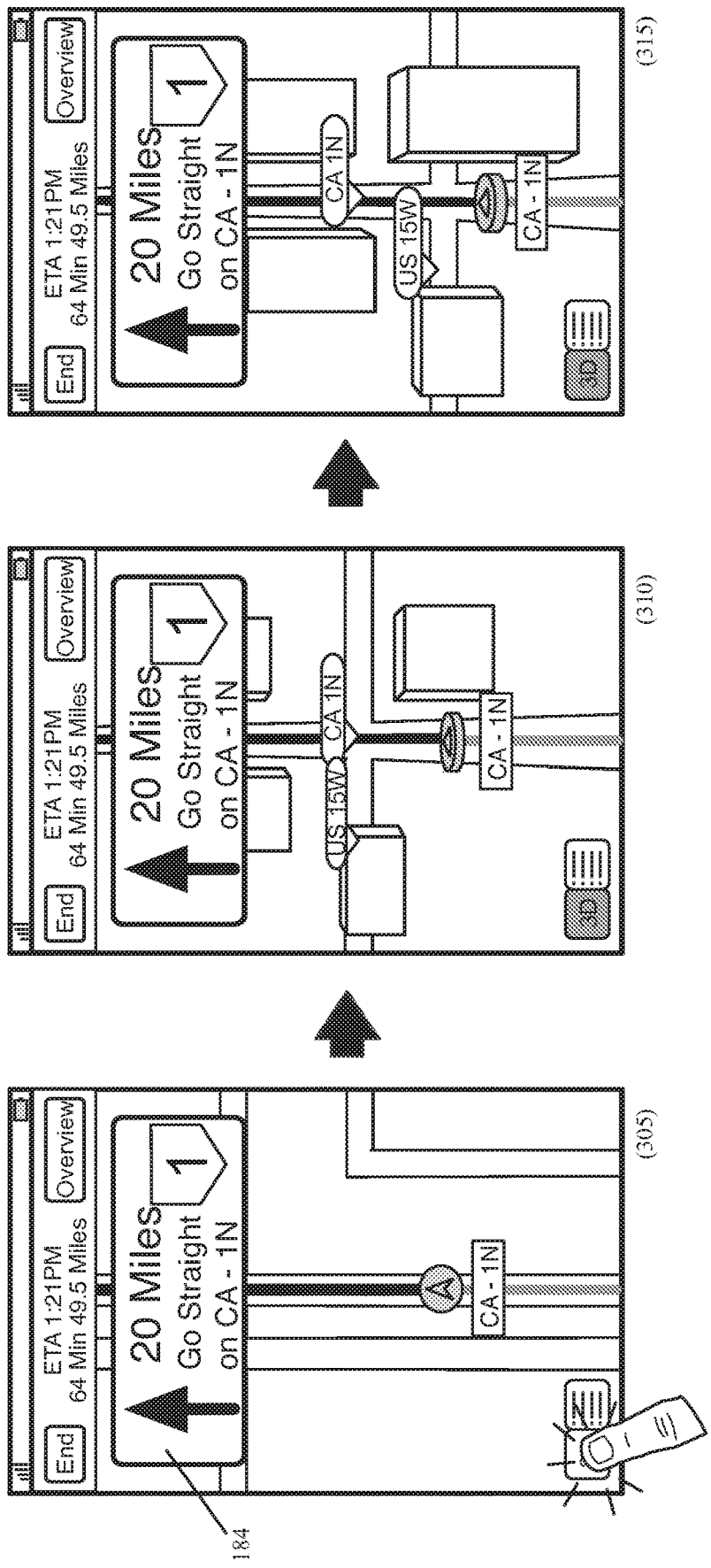
FIG. 3 illustrates how the navigation application of some embodiments provides the 3D control as a quick mechanism for entering a 3D navigating mode.

The navigation application of some embodiments can display navigation in either a 2D mode or a 3D mode. As mentioned above, one of the floating controls is the 3D control 250 that allows a user to view a navigation presentation in three dimensions (3D). FIG. 3 illustrates how the navigation application of some embodiments provides the 3D control 250 as a quick mechanism for entering a 3D navigating mode. This figure illustrates this operation in three stages 305-315. The first stage 305 illustrates the user selecting the 3D control 150 while viewing a two-dimensional navigation presentation.

The second stage 310 illustrates the navigation presentation in the midst of its transition into a 3D presentation. As shown in this figure, the 3D control appears highlighted at this stage to indicate that the navigation presentation has entered a 3D mode. As mentioned above, the navigation application generates the 3D view of the navigated map in some embodiments by rendering the map view from a particular position in the three dimensional scene that can be conceptually thought of as the position of a virtual camera that is capturing the map view. This rendering is further described below by reference to FIG. 5.

The third stage 315 then illustrates the navigation presentation at the end of its transition into its 3D appearance. As shown by the difference between the heights of the buildings in the second and third stages, the transition from 2D to 3D navigation in some embodiments includes an animation that shows three-dimensional objects in the navigated map becoming larger. Generating such animation that shows objects rising/falling and becoming larger/smaller is further described in the U.S. patent application Ser. No. 13/632,027, filed Sep. 30, 2012, now published as U.S. Patent Publication 2014/0071119, entitled "Displaying 3D Objects in a 3D Map Presentation," concurrently filed with this application. This concurrently filed U.S. Patent Application is incorporated herein by reference.

Some embodiments use a cinematic transition from the 2D map view to the 3D map view or vice versa. For instance, when the mapping application receives a selection of the 3D control 250 while showing a starting location of a route, the mapping application begins from the 2D map view and transitions smoothly from a first virtual camera view for the 2D to a new virtual camera 3D view that is more zoomed in and pointing in the direction of the start of the route. In doing so, the virtual camera performs a combination of translation, zoom, and rotation operations in order to reach the start of the route for navigation. That is, the virtual camera moves in an arc and rotates upward as the camera moves downward along the arc. Also, the mapping application may rotate the arc itself to align the virtual camera viewpoint to the initial road segment of the route. In other words, the mapping application rotates the map during the cinematic transition.

Figure 4:
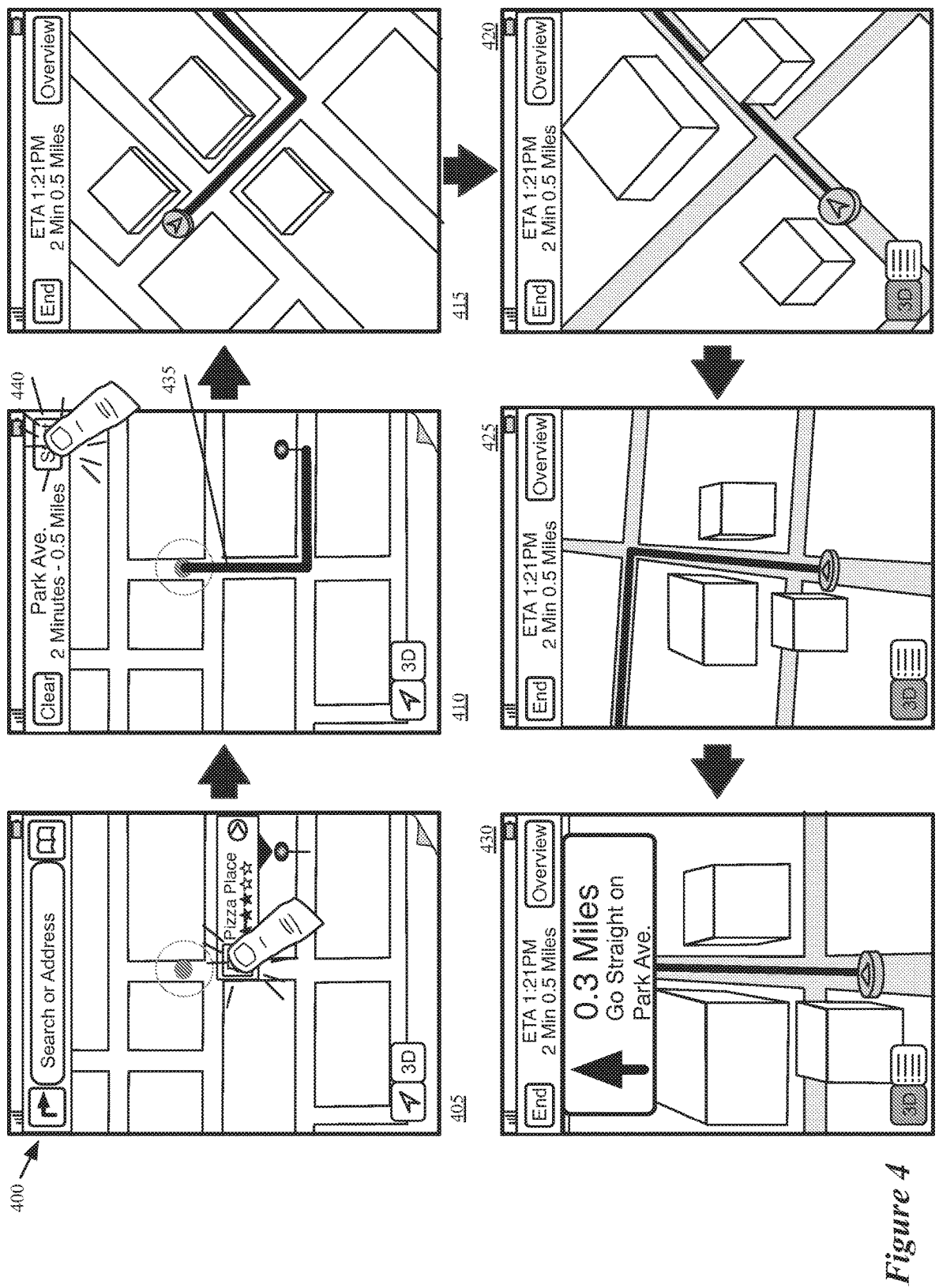
FIG. 4 illustrates a device that displays a mapping application as the application transitions from a non-immersive map view for map browsing into an immersive map view for navigation.

FIG. 4 illustrates a device 400 that displays a mapping application as the application transitions from a non-immersive map view for map browsing into an immersive map view for navigation, over six stages 405-430.

The first stage 405 illustrates a user selecting a quick-route button for a location "Pizza Place" in order to generate a route from the user's current location (near the center of the screen of device 400) to the selected location. The second stage 410 illustrates the mapping application displaying a route 435 to reach the location "Pizza Place." At the second stage 410, the user selects the "Start" UI control 440. Accordingly, the application begins entering navigation. As shown at the third through sixth stages 415-430, some embodiments use a cinematic transition from the 2D (or 3D) non-immersive map view into the 3D immersive map view. The application display begins from its current state (that shown at 410) and transitions smoothly from the first virtual camera view to the new virtual camera view that is more zoomed in and pointing in the direction of the start of the route. In doing so, the virtual camera may perform a combination of translation, zoom, and rotation operations in order to reach the start of the route for navigation. As shown in these stages, the virtual camera moves and rotates into its eventual location behind the navigation location indicator (i.e., the puck) shown in the sixth stage 430.

Also, in some embodiments, the mapping application provides two different types of 3D presentations—an immersive 3D presentation and a non-immersive 3D presentation. The immersive presentation in some embodiments not only displays more geometries but also displays more details for the geometries that are displayed in the non-immersive presentation. The mapping application also provides smooth transitions between the non-immersive and immersive presentations.

To achieve such smooth transitions and generate other novel effects, the mapping application of some embodiments uses a novel image processing pipeline. This pipeline performs a variety of pre-load operations to download, retrieve and/or decompress map tiles that may be needed for a navigation presentation, to prepare its rendering pipeline for its rendering operations, and to prepare a duplicate pipeline to smoothly transition between the immersive and non-immersive 3D presentations. In order to display immersive and non-immersive 3D map presentations, some embodiments have to generate a variety of tiles for client devices to render in order to generate roads, building, and surrounding scenery. In some embodiments, examples of such tiles include road and building tiles used for non-immersive 3D presentations, and navigation and building tiles used for immersive 3D presentations. This pipeline is described in above-incorporated U.S. patent application Ser. No. 13/632,102, filed Sep. 30, 2012, now published as U.S. Patent Publication 2013/0326407, entitled "Problem Reporting in Maps," concurrently filed with this application. This pipeline is also described in detail in the U.S. patent application Ser. No. 13/632,040, filed Sep. 30, 2012, now published as U.S. Patent Publication 2013/0321401, entitled "Virtual Camera for 3D Maps," concurrently filed with this application. This concurrently filed U.S. Patent Application is incorporated herein by reference.

In some embodiments, the non-immersive and immersive viewing modes are viewing modes for viewing different 3D maps that have different constructs and/or geometries. For instance, the non-immersive viewing mode of some embodiments is for viewing a 3D map that includes roads, buildings, land cover, etc. The immersive viewing mode is for viewing a more detailed 3D map that includes the same or similar elements (e.g., roads, buildings, land cover, etc.) as the 3D map for the non-immersive viewing mode. However, this more detailed 3D map also includes higher detail constructs (e.g., trees, foliage, sidewalks, medians, lanes of roads, road asphalt, medians, cross walks, etc.) that provide a more realistic and rich 3D map.

In addition, the non-immersive and immersive viewing modes may be defined for viewing 3D maps at different ranges of zoom levels. For example, the non-immersive viewing mode of some embodiments is defined for viewing a 3D map at low zoom levels (e.g., zoom levels 0-14) while the immersive viewing mode of some embodiments is defined for viewing the 3D map at high zoom levels (e.g., zoom levels 16-21). The viewing modes may be defined to view any number of different zoom levels in different embodiments. In some instances, the range of zoom levels of the immersive viewing mode are defined as higher zoom levels than, lower zoom levels than, the same zoom levels as, or zoom levels that overlap with the zoom levels defined for the non-immersive viewing mode. These viewing modes and other aspects of the mapping application are described in the U.S. patent application Ser. No. 13/632,040, filed Sep. 30, 2012, now published as U.S. Patent Publication 2013/0321401, entitled "Virtual Camera for 3D Maps," concurrently filed with this application. This concurrently filed U.S. Patent Application is incorporated herein by reference.

1. Virtual Camera

Figure 5:
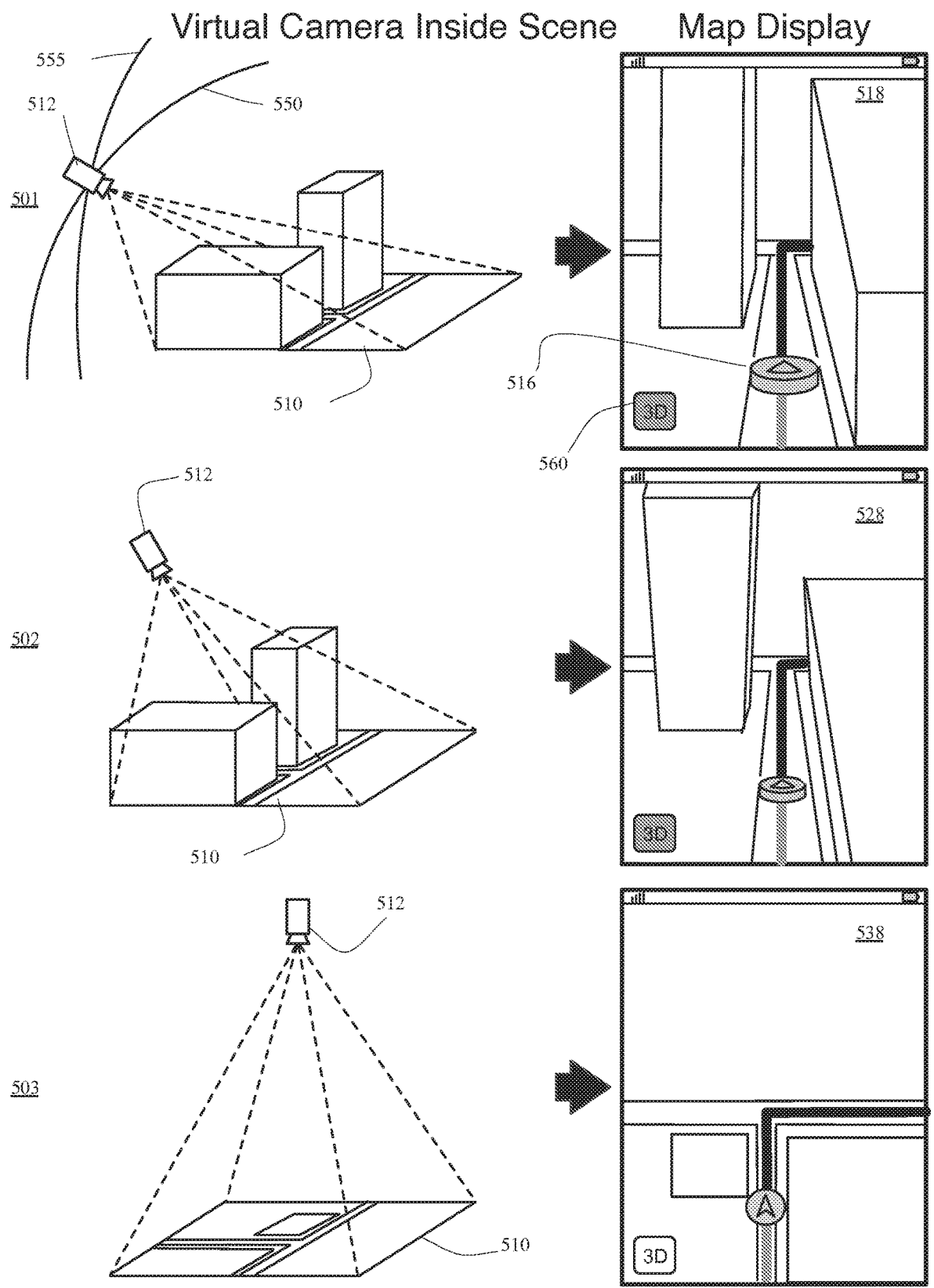
FIG. 5 presents a simplified example to illustrate the concept of a virtual camera.

The navigation application of some embodiments is capable of displaying navigation maps from multiple perspectives. The application can show maps in three dimensions (3D) or in two dimensions (2D). The 3D maps are generated simulations of a virtual scene as seen by a virtual camera. FIG. 5 presents a simplified example to illustrate the concept of a virtual camera 512. When rendering a 3D navigation map, a virtual camera is a conceptualization of the position in the 3D map scene from which the device renders a 3D view of the scene. FIG. 5 illustrates a location in a 3D navigation map scene 510 that includes four objects, which are two buildings and two intersecting roads. To illustrate the virtual camera concept, this figure illustrates three scenarios, each of which corresponds to a different virtual camera location (i.e., a different rendering position) and a different resulting view that is displayed on the device.

The first stage 501 shows the virtual camera 512 at a first position pointing downwards at an angle (e.g., a 30 degree angle) towards the 3D scene 510. By rendering the 3D scene from the position and angle shown in stage 501 the application generates the 3D map view 518. From this position, the camera is pointing at a location that is a moving position in front of the device. The virtual camera 512 is kept behind the current location of the device. "Behind the current location" in this case means backward along the navigation application's defined path in the opposite direction from the current direction that the device is moving in.

The navigation map view 518 looks as though it was shot by a camera from above and behind the device's location indicator 516. The location and angle of the virtual camera places the location indicator 516 near the bottom of the navigation map view 518. This also results in the majority of the screen being filled with the streets and buildings ahead of the present location of the device. In contrast, in some embodiments, the location indicator 516 is in the center of the screen, with half of the screen representing things ahead of the device and the other half representing things behind the device. To simplify the figure, no road signs are depicted for the views 518, 528, and 538.

The second stage 502 shows the virtual camera 512 at a different position, pointing downwards towards the scene 510 at a larger second angle (e.g., −45°). The application renders the scene 510 from this angle, resulting in the 3D navigation map view 528. The buildings and the roads are smaller than their illustration in the first navigation map view 518. Once again the virtual camera 512 is above and behind the location indicator 516 in the scene 510. This again results in the location indicator appearing in the lower part of the 3D map view 528. The location and orientation of the camera also results again in the majority of the screen displaying things ahead of the location indicator 516 (i.e., the location of the car carrying the device), which is what someone navigating needs to know.

The third stage 503 shows the virtual camera 512 at a top-down view that looks downwards on a location in the 3D map scene 510 that was used to render the 3D views 518 and 528. The scene that is rendered from this perspective is the 2D map view 538. Unlike the 3D rendering operations of the first and second stages that in some embodiments are perspective 3D rendering operations, the rendering operation in the third stage is relatively simple as it only needs to crop a portion of the 2D map that is identified by a zoom level specified by the application or the user. Accordingly, the virtual camera characterization in this situation somewhat unnecessarily complicates the description of the operation of the application as cropping a portion of a 2D map is not a perspective rendering operation.

At the third stage 503, the mapping application in some embodiments switches from rendering a 3D scene from a particular perspective direction to cropping a 2D scene when the camera switches from the 3D perspective view to a 2D top-down view. This is because in these embodiments, the application is designed to use a simplified rendering operation that is easier and that does not generate unnecessary perspective artifacts. In other embodiments, however, the mapping application uses a perspective rendering operation to render a 3D scene from a top-down virtual camera position. In these embodiments, the 2D map view that is generated is somewhat different than the map view 538 illustrated in the third stage 503, because any object that is away from the center of the view is distorted, with the distortions being greater the further the object's distance from the center of the view.

The virtual camera 512 moves along different trajectories in different embodiments. Two such trajectories 550 and 555 are illustrated in FIG. 5. In both these trajectories, the camera moves in an arc and rotates downward as the camera moves upward along the arc. The trajectory 555 differs from the trajectory 550 in that in the trajectory 555 the camera moves backward from the current location as it moves up the arc.

While moving along one of the arcs, the camera rotates to maintain a point ahead of the location indicator at the focal point of the camera. In some embodiments, the user can turn off the three dimensional view and go with a purely two dimensional view. For example, the application of some embodiments allows a three dimensional mode to be turned on and off by use of a 3D button 560. The 3D button 560 is essential to the turn-by-turn navigation feature, where it has a role as an indicator and a toggle. When 3D is turned off, the camera will maintain a 2D navigation experience, but when 3D is turned on, there may still be some top-down perspectives when 3D viewing angles are not appropriate (e.g., when going around a corner that would be obstructed in 3D mode).

2. 3D Control

Figure 6:
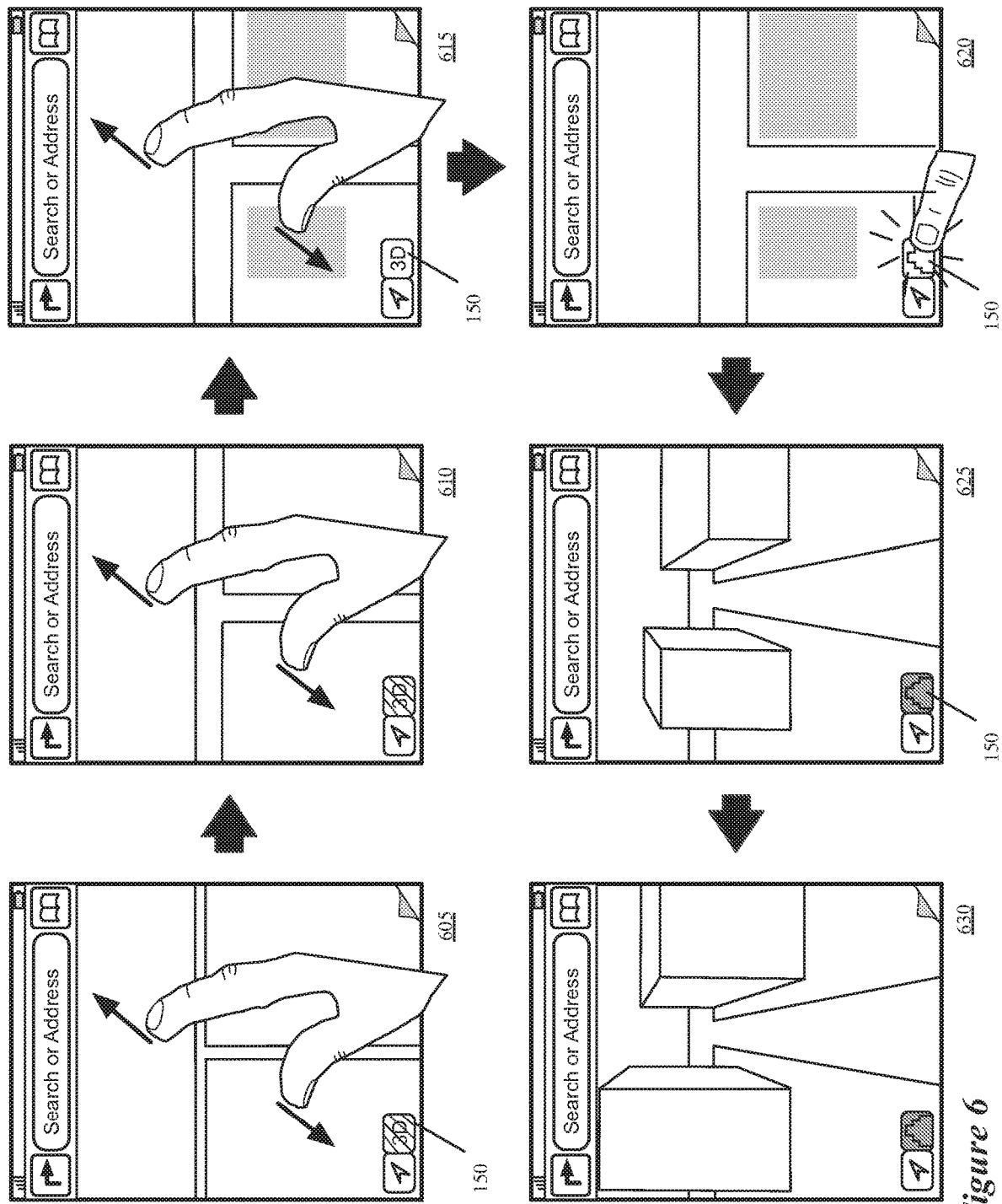
FIG. 6 illustrates that the mapping application of some embodiments changes the appearance of the 3D control to indicate different 2D and 3D states of the map view.

FIG. 6 illustrates in six different stages 605-630 that the mapping application of some embodiments changes the appearance of the 3D control to indicate different 2D and 3D states of the map view. The first stage 605 illustrates that the mapping application is displaying a map and the floating controls including the 3D control 150. The mapping application is displaying the map in 2D at a certain low zoom level (map has not been zoomed in much) as shown. The 3D control 150 is displayed using a first appearance (e.g., grey letters "3D") to indicate the 3D map data is not available at this particular zoom level. The first stage 605 also shows that the mapping application is receiving the user's gestural input to zoom in on the map (i.e., to increase the zoom level).

The second stage 610 shows that the mapping application is displaying the map at a higher zoom level than it did at the previous stage 605. However, the 3D control 150 is maintaining the first appearance because the 3D map data is still not available even at this particular higher zoom level. The second stage 610 also shows that the mapping application is receiving another gestural input to zoom in on the map further.

The third stage 615 shows that the mapping application is displaying the map at a higher zoom level than it did at the previous stage 610. The mapping application has changed the appearance of the 3D control 150 into a second appearance (e.g., "3D" in black letters) to indicate that the 3D map data is available at this zoom level. When the mapping application receives a selection of the 3D control 150, the mapping application of some embodiments would change the appearance of the 3D control 150 to a third appearance (e.g., "3D" in blue letters) and display the map in 3D (e.g., by changing into a perspective view from a straight-down view for 2D). The third appearance therefore would indicate that the map is displayed in 3D. The third stage 615 shows that the mapping application is receiving yet another gestural input to zoom in the map even further to a higher zoom level. The third stage 615 shows that the mapping application is displaying buildings in the map as grey boxes at this zoom level.

The fourth stage 620 shows that the mapping application is displaying the map at a higher zoom level than it did at the previous stage 615. The mapping application has changed the appearance of the 3D control 150 into a fourth appearance (e.g., a building icon in a first color as shown) in order to indicate that 3D immersive map data for rendering an immersive 3D map view is available at this zoom level. The fourth stage 620 also shows that the mapping application of some embodiments is receiving a selection of the 3D control 150.

The fifth and sixth stages 625 and 630 show subsequent views (though not necessarily successive views) that the mapping application provides after it starts to provide a 3D immersive map view. The zoom level does not change between the fifth and sixth stages in some embodiments but the height of the buildings in the map views increases to provide an animation that conveys that the view is moving into the 3D immersive map view from the 2D view. Also, from the fourth stage 620 to the fifth stage 625, the mapping application has changed the appearance of the 3D control into the fifth appearance (e.g., a building icon in a second color as shown) in order to indicate that the map is displayed in the 3D immersive view.

3. Automatic Changing of Views

The application of some embodiments allows any particular virtual camera angle to be used, not just the 30 degree and 60 degree angles specified here. The application of some embodiments allows the user to set the downward angle for the camera. The application of some embodiments automatically adjusts the angle of the camera for various reasons, (e.g., to keep a particular point of focus near the top of the screen). In still other embodiments, the navigation application automatically sets the angle of the camera, but allows the user to override the automatically set angle.

Figure 7:
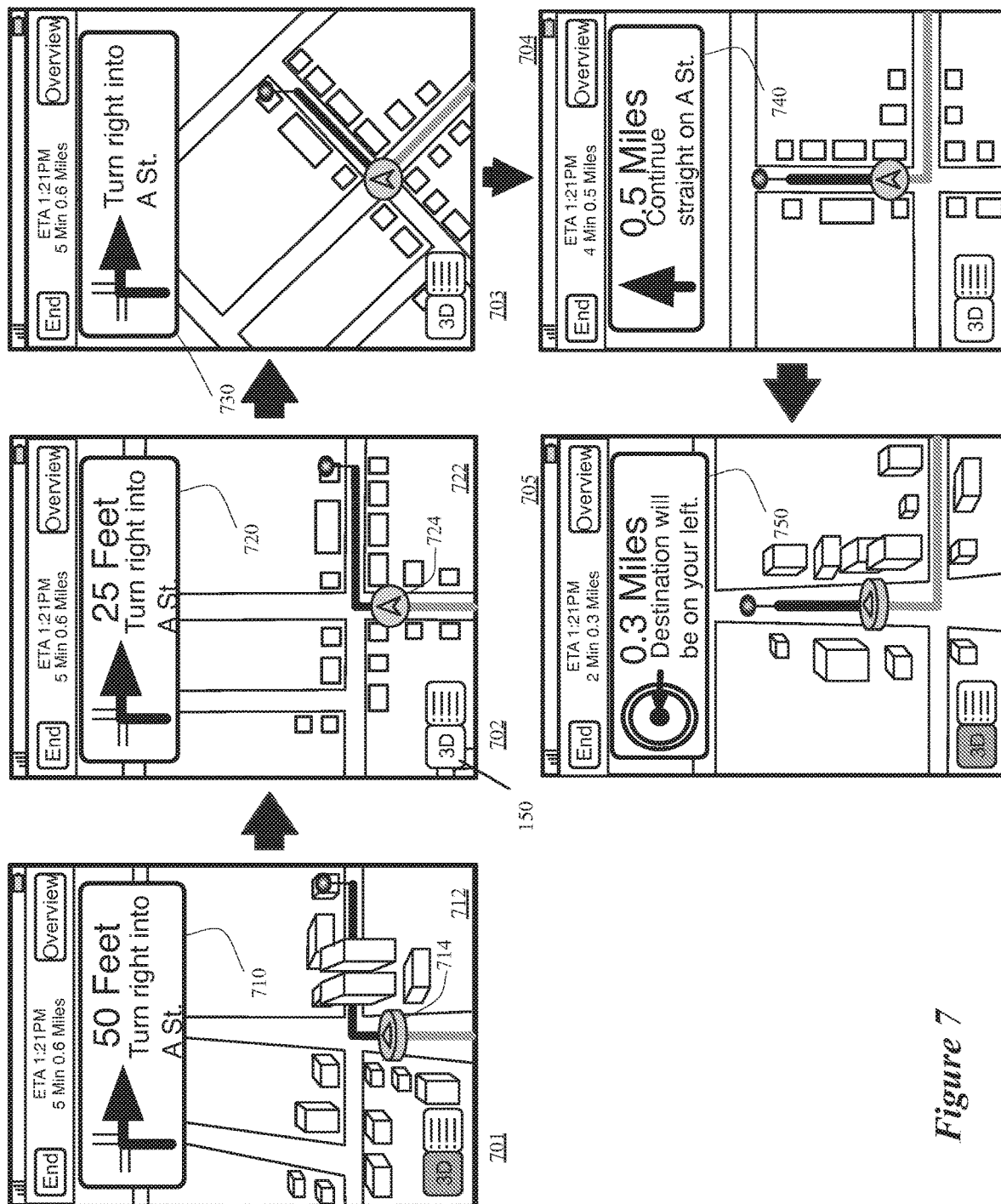
FIG. 7 illustrates switching from 3D mode to 2D mode in some embodiments.

In some embodiments, when a device running the navigation application in a 3D mode is about to reach a junction with a turn, the navigation application switches to a 2D mode in order to enable the user to more clearly identify the turn. FIG. 7 illustrates the switching from 3D mode to 2D mode of some embodiments. The figure is shown in five stages 701-705. In stage 701, the application shows a navigation map in a 3D view. The navigation box 710 shows a right turn in 50 feet. The map 712 is in 3D as is the location identifier 714.

As the device approaches the junction in stage 702 (as indicated by navigation box 720) the 3D map 712 switches to a 2D map 722 with the location indicator 724 in 2D as well. The mapping application also changes the appearance of the 3D control 150 to indicate that the map is now in 2D. The map 722 remains in 2D as the device rounds the corner in stage 703. As the device rounds the corner, the navigation box 730 with the instructions "turn right into A St." in stage 703 is replaced by the navigation box 740 with the instructions "0.5 miles continue straight on A St." in stage 704. The map remains in 2D in stage 704 until the corner has been fully navigated at which point, in stage 705, the map returns to a 3D view with new instructions "0.3 miles Destination will be on your left" in navigation box 750. The mapping application also has changed the appearance of the 3D control 150 to indicate the map is now back in 3D.

In some embodiments, the navigation application determines some or all of the following five pieces of information for every location update (e.g., 1 time per second). First, the navigation application determines the location of the point of reference (i.e. the user's location).

Second, the navigation application determines the location of the point of focus of the virtual camera, which is used to determine which direction the virtual camera should face. If the user is off-route, the point of focus will be a fixed distance ahead of the user along the user's direction of travel (if that can be determined) or a fixed distance north of the user (if the user's direction of travel cannot be determined). If the user is on-route, the point of focus will be a fixed distance ahead of the user along the route, with the angle between the vector from the user and this point of focus and the user's travel direction capped at a maximum value. This allows the virtual camera to subtly peek around turns before the user actually turns. For example, if the route turns a corner shortly ahead, the point of focus will be a point around the corner from the current location of the device. As turning the virtual camera to face that actual point could cause the virtual camera to directly face a building, the virtual camera is capped as to how far off the present direction it can look. Third, the navigation application determines the location of the point of interest (e.g., the location of an upcoming intersection).

Fourth, the navigation application determines the virtual camera view style (top-down centered, top-down forward, or rooftop). "Top-down centered" means that the virtual camera should look straight down on the user's location such that the user's location is in the center of the screen. "Top-down forward" means the virtual camera should look straight down on the user's location such that the user's location is toward the bottom of the screen. "Rooftop" means the virtual camera should be behind the user's location and pitched so that it is looking forward along the vector from the user's location to the point of focus. If the user is off-route or the user's direction of travel cannot be determined (e.g., when the user is parked), the virtual camera will be in top-down centered view style. Otherwise, the view style will be determined by whether the user has requested "2D" navigation or not. If the user has requested 2D navigation, the view style will be top-down forward. Otherwise, the view style will be rooftop.

Fifth, the navigation application determines the virtual camera focus style (e.g., cruise or hard focus). "Cruise focus style" means the virtual camera should adopt a preset height and pitch angle based on the view style. "Hard focus" means that the virtual camera should adjust its height (in the case of top-down centered or top-down forward view styles) or pitch (in the case of rooftop view style) so that the given point-of-interest is just on screen (i.e. the virtual camera should focus in on the point-of-interest as the user approaches it). When far from an intersection, the navigation application puts the virtual camera in cruise focus mode. When approaching an 'interesting' intersection, the navigation application puts the virtual camera in hard focus mode as described above and the location of the intersection (point of interest) will be passed to the virtual camera. When in hard focus mode, the application adjusts the virtual camera's height (in the case of top-down centered or top-down forward view styles) or pitch (in the case of rooftop view style) so that the intersection is at a reasonable position on screen. A given intersection is determined to be 'interesting' enough to focus on using the angle at which the user will leave the intersection. If the angle is large enough (e.g., a 90 degree right turn), the intersection is considered to be 'interesting' and the virtual camera will focus on it. If the angle is too small (e.g., merging onto a freeway), the virtual camera will stay in cruise focus style From these five pieces of information, the navigation application computes the virtual camera's desired position and orientation. From the desired position and orientation, the positions of the following three key points can be extracted: (1) the virtual camera's position, (2) the intersection between the virtual camera's forward vector and the ground, and (3) a point along the virtual camera's right vector. The three points are animated independently from each other as follows: (1) when a new point is available, the application fits a cubic polynomial between the last evaluated position/tangent for that point and the new point and (2) every step of the animation, the navigation application evaluates the cubic polynomials for each curve and extracts the virtual camera position and orientation from them.

4. User Adjustment of Camera Height

Besides (or instead of) having the navigation application control the camera (e.g., turning from 3D to 2D when going around corners) some embodiments also allow the user to adjust the level of the camera. Some embodiments allow the user to make a command gesture with two fingers to adjust the distance (height) and angle of the camera. Some embodiments even allow multiple types of gestures to control the camera. FIG. 8 illustrates the adjustment of the distance of a virtual camera by contracting and expanding gestures. The figure is shown in three stages 801-803. In stage 801, the application shows a basic scene 810 with a virtual camera 812 at the default level for 3D viewing and the screen view 814 rendered from the scene 810. The basic scene contains two buildings and a T-junction. In stage 801, the buildings are viewed from a 45 degree downward angle and a particular height that makes them seem a particular size. The location indicator 816 is also shown at a particular size.

In stage 802, the user makes a gesture by placing two fingertips near each other on the screen of the device, on the screen view 824 and moving the fingertips apart while they are on the screen. Moving the fingertips apart has the effect of making the map (both the part between the fingers and the rest of the map) larger. In order to make the things in the map appear larger, the application causes the virtual camera 812 to zoom in. In some embodiments, the line 850 that the mapping application uses to move the virtual camera 812 along is a line formed by the front of the virtual camera 812 and the virtual camera 812's point of focus. The mapping application of some embodiments moves the virtual camera 812 along a line formed by the front of the virtual camera 812 and a location in the 3D map 810 based on the user's input to zoom to zoom into the view of the 3D map 810.

After zooming in for stage 802, the user decides to zoom out for stage 803. In this stage the user has placed two fingers on the screen and brought them closer together. Bringing the fingers closer together has the effect of shrinking the map (both the part between the fingers and the rest of the map). The zoom-out adjustment is accomplished by moving the virtual camera 812 moving farther away from the 3D map 810 along the line 855. In some embodiments, the line 855 that the mapping application uses to move the virtual camera 812 along is a line formed by the front of the virtual camera 812 and the virtual camera 812's point of focus. The mapping application of some embodiments moves the virtual camera 812 along a line formed by the front of the virtual camera 812 and a location in the 3D map 810 based on the user's input to zoom into the view of the 3D map 810.

Rendering a 3D map view using the virtual camera 812 at this position results in a 3D map view 834 in which the buildings and the roads appear farther than the position illustrated in the 3D map view 824. As shown by the dashed-line version of the virtual camera 812, the virtual camera 812 moved farther from the 3D map 810 along the line 855.

In addition to being controllable by zooming in and out, some applications allow a user to change the angle of the virtual camera. FIG. 9 illustrates an embodiment of a camera whose angle can be adjusted by gestures. The figure is shown in three stages 901-903. In stage 901, the camera is pointing downward at 45 degrees at scene 910. Scene 910 contains two buildings and a T-junction which are shown in screen view 914. The buildings are shown from a particular angle and a particular size. The location indicator 916 is also shown at a particular size.

In stage 902, the user has placed two fingers 920 on the screen approximately horizontal to each other and dragged up. This has the apparent effect of dragging the scene up with the fingers. The scene rising is accomplished by the virtual camera 912 lowering and changing its viewing angle from 45 degrees to 30 degrees. In the screen view 924, the buildings and the location indicator look taller than in stage 901.

After the user drags the scene up in stage 902, the user then drags the scene down in stage 903. To do this, the user again placed two fingers 930 on the screen and drags them down. This drags the scene down along with the fingers 930. The scene dropping is accomplished by the virtual camera 912 rising and changing its angle with the scene 910 to 60 degrees downward. In stage 903, the camera 912 has moved farther up and is angled down more than in stage 901. Accordingly, the buildings and location identifier 916 again look shorter and smaller in stage 903 than in stage 901.

In some embodiments, the mapping application provides an inertia effect for different operations (e.g., panning, rotating, entering from 2D to 3D). When a user provides a particular type of input (e.g., input that terminates at a velocity greater than a threshold velocity) to pan the 3D map, the mapping application generates an inertia effect that causes the 3D map to continue panning and decelerate to a stop. The inertia effect in some embodiments provides the user with a more realistic interaction with the 3D map that mimics behaviors in the real world. Details of inertia effects and implementations of inertia effects are described in U.S. patent application Ser. No. 13/632,040, filed Sep. 30, 2012, now published as U.S. Patent Publication 2013/0321401, entitled "Virtual Camera for 3D Maps"; this concurrently filed U.S. Patent Application is incorporated herein by reference.

The application of some embodiments allows the distance and angle of the camera to be independently controlled. For example, it allows the distance to be controlled by the contracting and expanding finger gestures and the angle to be controlled by the dragging of horizontally placed fingers. Other embodiments use whichever gesture is being performed to set either a distance or an angle of the camera, with the other variable being set automatically. While FIGS. 8 and 9 show gestures being performed in a certain direction leading to certain results, in some embodiments, one or both of these gestures could be reversed. For example, in some embodiments, dragging horizontally placed fingers down may bring the camera down rather than bringing the scene down. That would have the effect of moving the scene down when the fingers move up and moving the scene up when the fingers move down.

Figure 10:
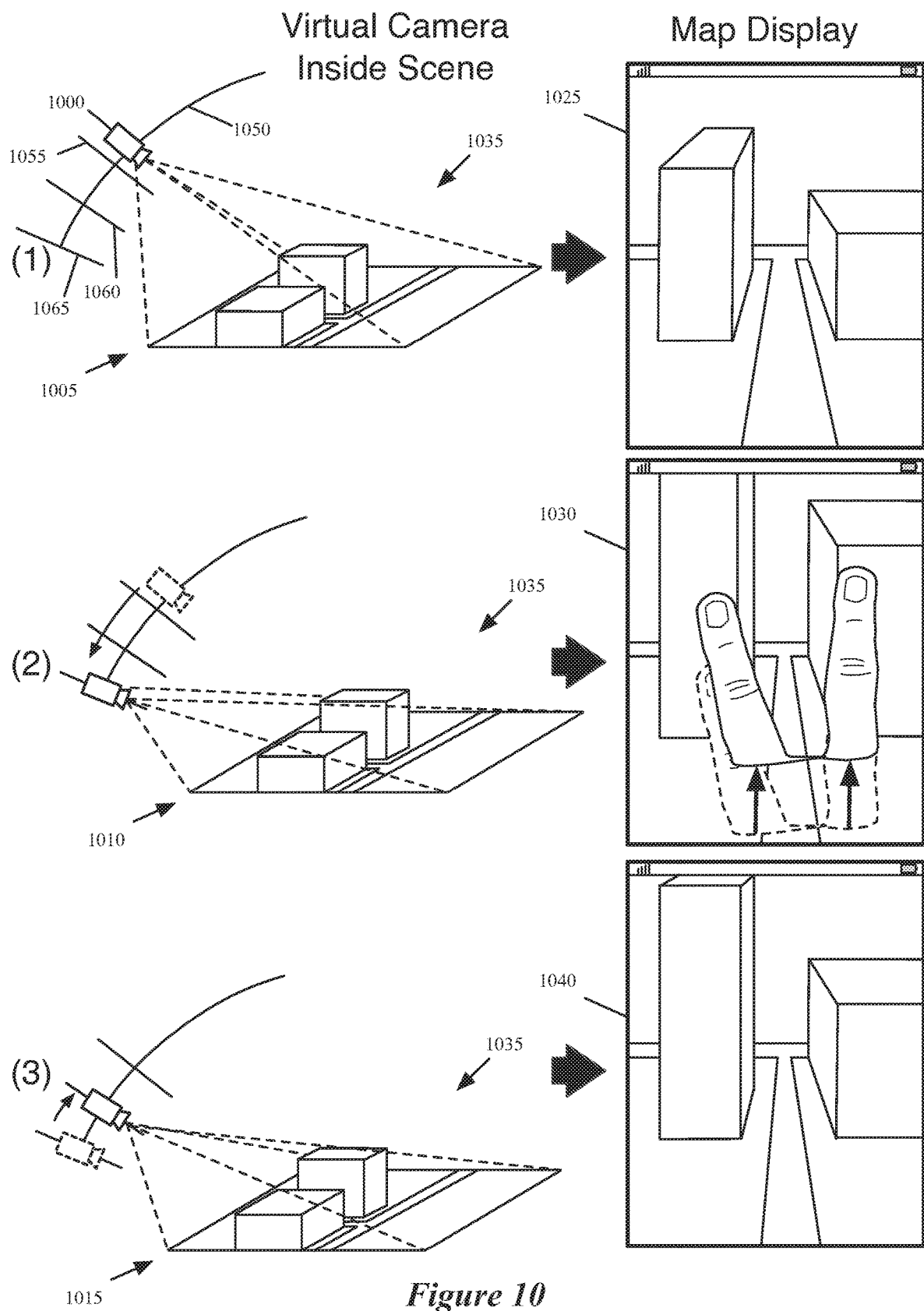
FIG. 10 conceptually illustrates a feature provided by the mapping application of some embodiments for maintaining the position of a virtual camera within a defined range along an arc.

FIG. 10 conceptually illustrates a feature provided by the mapping application of some embodiments for maintaining the position of a virtual camera within a defined range along an arc. In particular, FIG. 10 illustrates the virtual camera 1000 at three different stages 1005-1015 that show the virtual camera 1000's position maintained within a defined range of arc 1050. As shown in FIG. 10, a location in a 3D map 1035 includes two buildings and two roads forming a T-junction.

The first stage 1005 shows the virtual camera 1000 at a particular position along the arc 1050. As shown, the arc 1050 represents a defined range (e.g., angular range) within which the virtual camera 1000 is movable. The first stage 1005 also shows three positions 1055-1065 along the arc 1050 (e.g., perspective view angles). In this example, the mapping application moves the virtual camera 1000 along the arc 1050 between the high perspective end of the arc 1050 (e.g., the position along the arc 1050 when the virtual camera 1000 is most tilted downwards) and the position 1055 in a manner similar to that described above by reference to FIG. 9. Rendering a 3D map view based on the virtual camera 1000's position in the first stage 1005 results in 3D map view 1025.

When the virtual camera 1000 passes the position 1055 while moving towards the low perspective end of the arc 1050, the mapping application reduces the speed (e.g., decelerates) that the virtual camera 1000 moves towards the low perspective end of the arc 1050 regardless of the input provided by a user. In some embodiments, the mapping application reduces the speed of the virtual camera 1000 at a constant rate while, in other embodiments, the mapping application reduces the speed of the virtual camera 1000 at an exponential rate. Additional and/or different methods for decreasing the speed of the virtual camera 1000 are used in some embodiments.

The second stage 1010 shows that the virtual camera 1000 has moved to a position along the arc 1050 at or near the low perspective end of the arc 1050. As shown, a user is providing input to adjust the perspective of the view of the 3D map 1035 by touching two fingers on the screen and dragging the two fingers in an upward direction (e.g., a swipe gesture). In response to the input, the mapping application moved the virtual camera 1000 toward the low perspective end of the arc 1050 while tilting the virtual camera 1050 upwards. When the virtual camera reaches the position 1065 along the arc 1050, the mapping application prevents the virtual camera 1000 from moving lower and beyond the position 1065 even while the user continues to provide input to decrease the perspective of the view of the 3D map 1035 (e.g., the user continues to drag the two fingers upwards on the touchscreen).

In some embodiments, when the user stops providing input to decrease the perspective of the view of the 3D map 1035 (e.g., the user lifts the two fingers off the touchscreen), the mapping application "bounces" or "snaps" the position of the virtual camera 1000 from the position 1065 up to the position 1060 along the arc 1050. As the mapping application is generating or rendering 3D map views of the 3D map 1035 based on the view of the virtual camera 1000 during the bounce or snap motion, the generated 3D map views provide a bounce animation that displays the 3D map view briefly bouncing or snapping down in order to indicate to the user that the perspective of the map view cannot be decreased any farther. Rendering a 3D map view using the virtual camera 1000 positioned at this angle results in a 3D map view 1030 in which the buildings and the roads are taller compared to the map view 1025.

The third stage 1015 shows the virtual camera 1000 after the mapping application has bounced or snapped the position of the virtual camera 1000 to the position 1060 in response to the user ceasing to provide input. Different embodiments use different techniques for implementing the bounce or snap of the virtual camera 1000. For instance, the mapping application of some embodiments starts quickly accelerating the virtual camera 1000 along the arc 1050 for a defined distance or until the virtual camera 1000 reaches a defined speed. Then the mapping application decelerates the virtual camera 1000 for the remaining distance to the position 1060 along the arc 1050. Other ways to implement the bounce or snap effect are used in some embodiments. Rendering a 3D map view using the virtual camera 1000 positioned at the position 1060 along the arc 1050 in the third stage 1015 results in a 3D map view 1040 in which the buildings appear a little smaller and flatter and the roads appear a little smaller compared to the map view 1030.

As described above, FIG. 10 illustrates a technique for preventing a virtual camera from moving beyond the low perspective end of an arc. Alternatively or in conjunction with preventing the virtual camera from moving beyond the low perspective end of the arc, the mapping application of some embodiments utilizes a similar technique for preventing the virtual camera from moving beyond the high perspective end of the arc. In addition, FIG. 10 shows an example of a position along an arc at which to slow down a virtual camera, a position along the arc to prevent the virtual camera from moving past, and a position along the arc to which the virtual camera snaps or bounces back. Different embodiments define the positions any number of different ways. For instance, in some embodiments, the position along the arc at which to slow down the virtual camera is the same or near the position along the arc to which the virtual camera snaps or bounces back.

C. Other User Interactions

1. Appearing and Disappearing Controls

Figure 11:
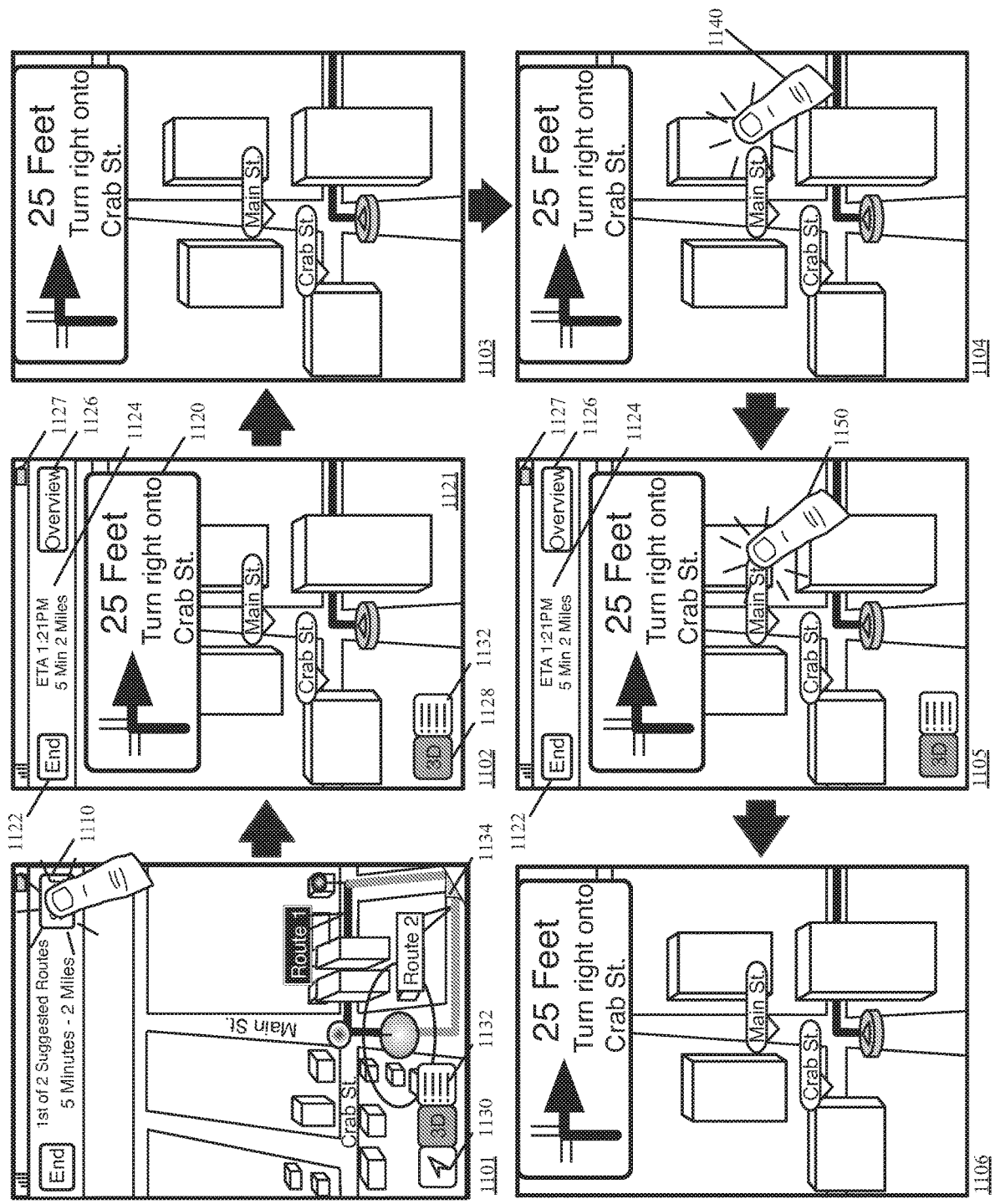
FIG. 11 illustrates a full screen mode of some embodiments.

The applications of some embodiments, while navigating, have a full screen mode. That is, during the actual providing of directions, the controls that ordinarily take up some of the screen surface are hidden. FIG. 11 illustrates a full screen mode of some embodiments. The figure is shown in six stages 1101-1106. In stage 1101 a set of navigation instructions is activated by the selection of a start button 1110. By selecting the start button, the user selects the highlighted route from two possible routes. The non-highlighted route disappears, and a smaller scale navigation map 1121 appears in stage 1102. The first stage 1101 shows that the road names are on the roads because the mapping application is displaying a map view. The first stage 1101 also shows that the position control 1130 is displayed for the mapping application is displaying a map view. The selection of the list control 1132 will cause the mapping application to display the available routes in a list format.

Also in stage 1102, the first instruction 1120 is shown along with an end control 1122, trip status area 1124 (including an ETA, a trip duration estimate, and a distance of planned route indicator), an overview button 1126, status bar 1127, and a 3D control 1128. The end button 1122 ends the running of the navigation instructions. The status area 1124 displays information about the planned route. The overview button 1126 displays an overview of the route. The 3D control is an indicator of whether the navigation application is showing a scene in 3D or 2D and a toggle for entering and leaving 3D mode. The selection of the list control 1132 at this stage will cause the mapping application to display the set of navigation instructions in a list format. This stage also shows that the road names are displayed in banners rather than on the roads because the mapping application is operating in the navigation mode.

After a brief amount of time, the end control 1122, the list control 1132, status area 1124, overview button 1126, and 3D control 1128 disappear. In some embodiments, the controls disappear abruptly, while in other embodiments the controls fade away. In some embodiments, the status bar 1127 at the top of the screen also vanishes and navigation box 1120 moves to the top of the screen.

The absence of the controls and movement of navigation box 1120 is shown in stage 1103, in which the navigation map 1121 is seen without the controls except for the raised navigation box 1120. The user can restore the hidden controls by tapping the screen in some embodiments. This is demonstrated in stages 1104 and 1105. In stage 1104, the user taps the screen with finger 1140. In stage 1105, as a result of the tap in the previous stage, the controls are back and the navigation box 1120 has dropped back down to its original position. The restored controls include end control 1122, status area 1124, overview button 1126, status bar 1127, and 3D control 1128. Once the controls are back, the user can make the controls vanish again by tapping, as shown in stage 1105 where a user taps the screen with finger 1150 to restore the navigation application to full screen mode in stage 1106. In addition to the hidden controls, in full-screen in some embodiments the touch interaction with the map is greatly restricted. In some embodiments, more controls exist that are shown in some modes, but hidden in full screen mode (e.g., a list control).

Figure 12:
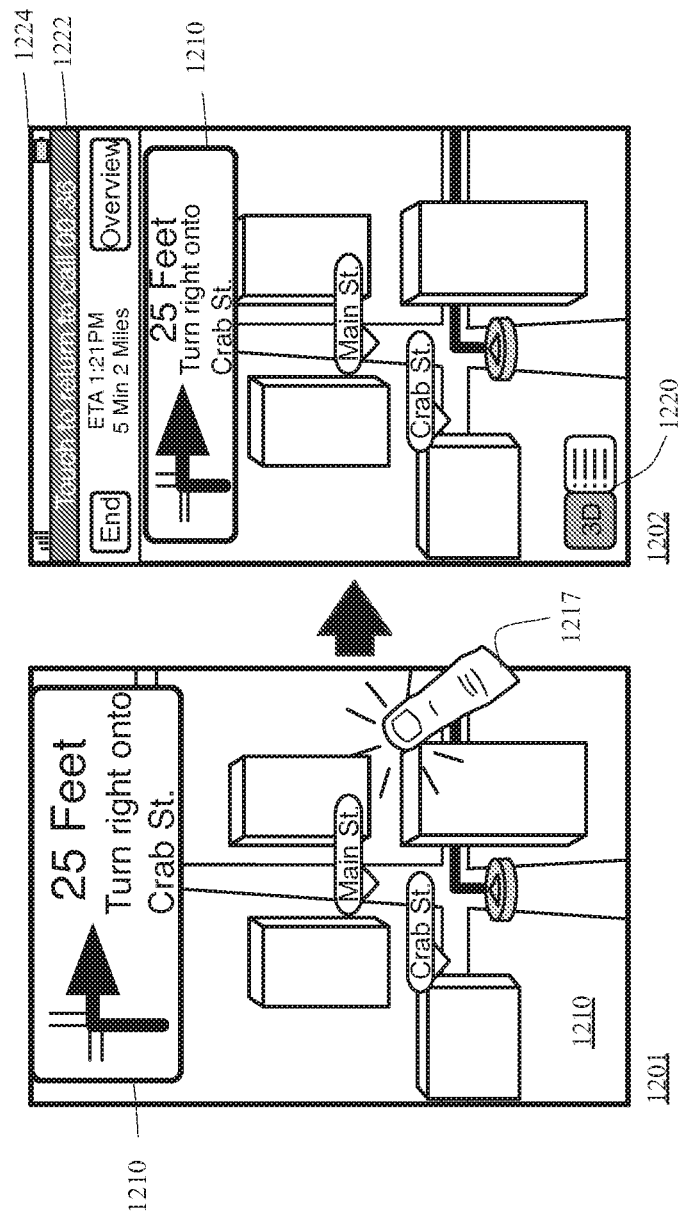
FIG. 12 illustrates the navigation application with the controls hidden and revealed during a phone call on the device in some embodiments.

In some embodiments, when the controls are shown and there is an addition to the status bar (e.g., a phone call status bar showing the length of an ongoing call) the navigation box is shortened in order to make more room for the expanded status bar. This is shown in FIG. 12, which illustrates the navigation application with the controls hidden and revealed during a phone call on the device. FIG. 12 includes stages 1201 and 1202. In stage 1201 the controls of the navigation application are hidden and the navigation box 1210 and map 1215 are visible. The user taps on the touchscreen with finger 1217 to command the navigation application to show its controls. In stage 1202, the navigation application shows its controls 1220 and also shows a phone call status bar 1222 under the status bar 1224. The navigation application has less room due to the phone call status bar 1222. To compensate for the smaller amount of screen area available to the navigation application, the navigation application of some embodiments shrinks the navigation box 1210 when the phone call status bar 1222 is on the screen. In some embodiments, when the navigation box shrinks, the text and/or direction arrow in the box is altered to fit the reduced amount of area available for the text and arrow.

2. Ending Navigation

Figure 13:
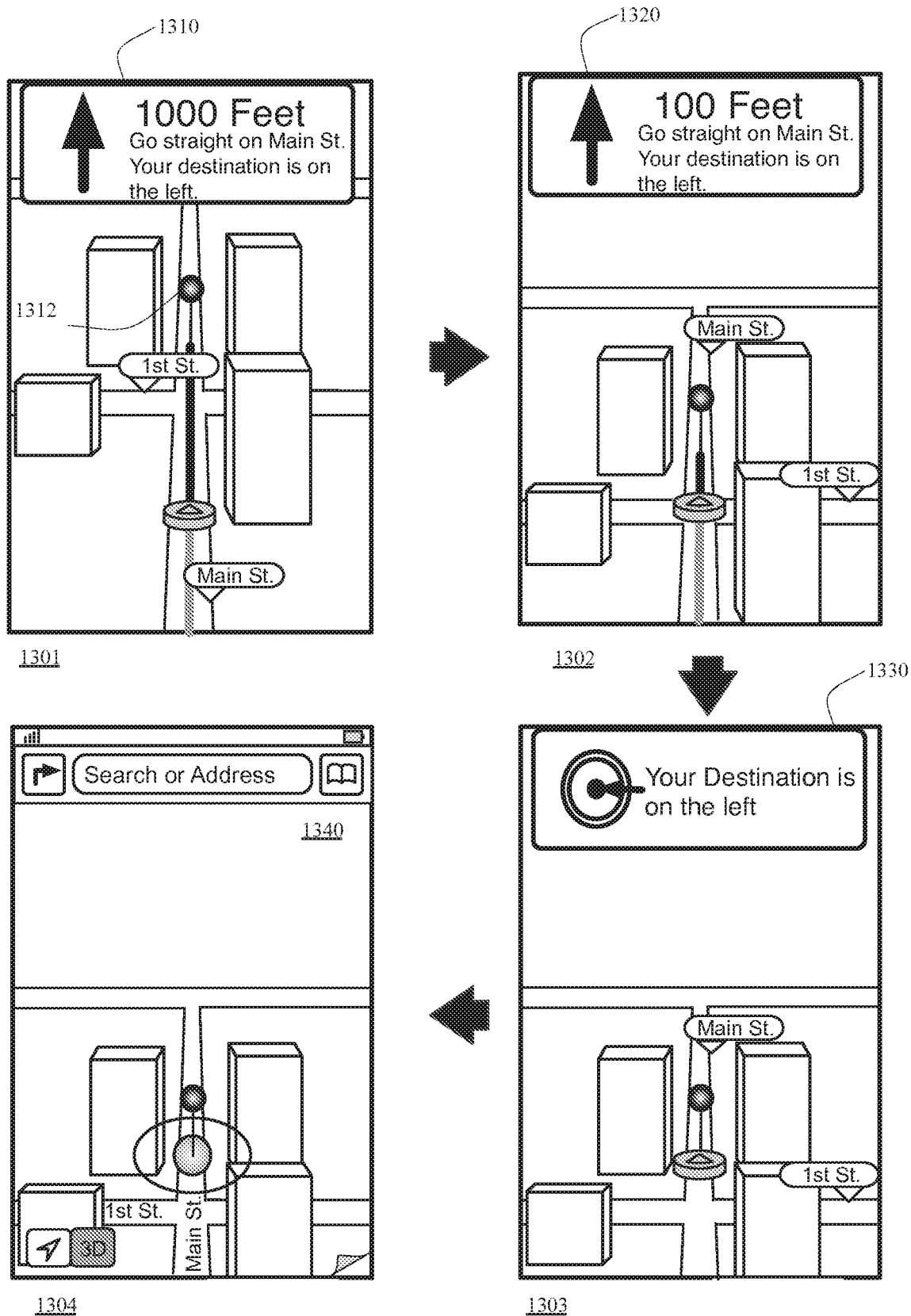
FIG. 13 illustrates the end of a programmed route in some embodiments.

In the ordinary course of the running of a set of navigation instructions by a navigation application, as the device reaches each new junction that needs navigation instructions, the instructions for the next such junction appear. This continues until the device reaches its destination. When the destination is reached, the navigation application stops providing instructions and the running of the programmed route ends. FIG. 13 illustrates in four stages 1301-1304 the end of a programmed route. In stage 1301, the application is running with hidden controls and the navigation box 1310 is showing that the destination is only 1000 feet away. The destination is shown on the map as a pin 1312 with a round head. However, one of ordinary skill in the art will understand that other symbols could be used in applications of other embodiments and that in some embodiments no symbol is used and the line merely ends. As the device moves closer to its destination, the navigation application counts down the distance. In stage 1302, the navigation box 1320 shows that there are only 100 feet to go to the destination. In stage 1303, the device has just reached its destination. Navigation box 1330 indicates that the destination is on the left and includes a symbol of an arrow pointing at the center of a target. Later, in stage 1304, with the device having reached its destination, the navigation application has shut navigation box 1320 down leaving the user with a map 1340, but no further directions.

In some embodiments, destinations can be in places not reachable by car, for example, the end pin could be in the middle of a park. In some such embodiments, the driving directions will end, but there will be continued directions for foot travel. In other such embodiments, the application will not give textual directions for travel on foot, but will still maintain a pin on the location (e.g., the middle of a park) when displaying maps in map mode or in locked mode. In some such embodiments, the last instruction after the automotive portion of the journey ends will be a direction "please reach on foot".

Figure 14:
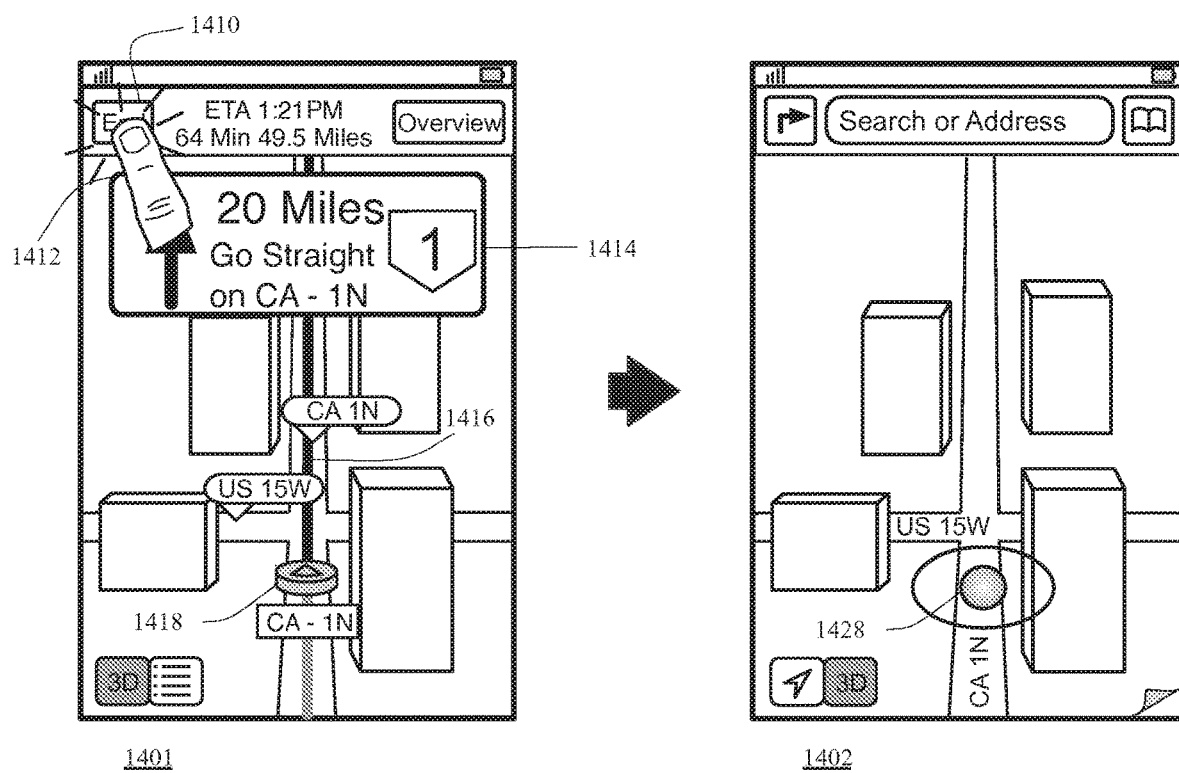
FIG. 14 illustrates a navigation program ending control in some embodiments.

FIG. 13 illustrates what happens when a navigation application guides the user all the way to its final destination. However, in some embodiments, the user may change the user's mind about getting directions. The user may want to stop along the way, change destinations, or for some other reason, may want to end the running of the set of navigation instructions. Accordingly, the application of some embodiments includes an "end" button. The end button stops the running of a set of navigation instructions and in some embodiments leaves the user in the same condition as if they had reached the destination (e.g., no instructions but with a map). FIG. 14 illustrates a navigation program ending control. The figure is shown in two stages 1401 and 1402. Stage 1401 shows a navigation application with its controls visible. The controls include an "end" button 1410. The user is tapping the button with finger 1412. The navigation application is far from its destination, as indicated by navigation box 1414, which states that the next junction is 20 miles away, and by route 1416, which stretches off into the distance ahead of position indicator 1418. In stage 1402, because the user has tapped the end button 1410, the navigation box 1414 disappears as does the route 1416. The position indicator 1418 is also gone in this stage, replaced by a spherical position indicator 1428.

3. Gestures to Look to the Side of the Route During Navigation

As described above, the default behavior for the virtual camera is to follow the location of the device through a virtual world and point down and in the direction the device is moving, or at least to a part of its route a short way ahead of the device's present position. However, it is not always desirable to have the camera pointing straight ahead. Sometimes the user wants the camera to point at an angle instead. Accordingly, the navigation application of some embodiments rotates the virtual camera around when the user drags the map sideways.

Figure 15:
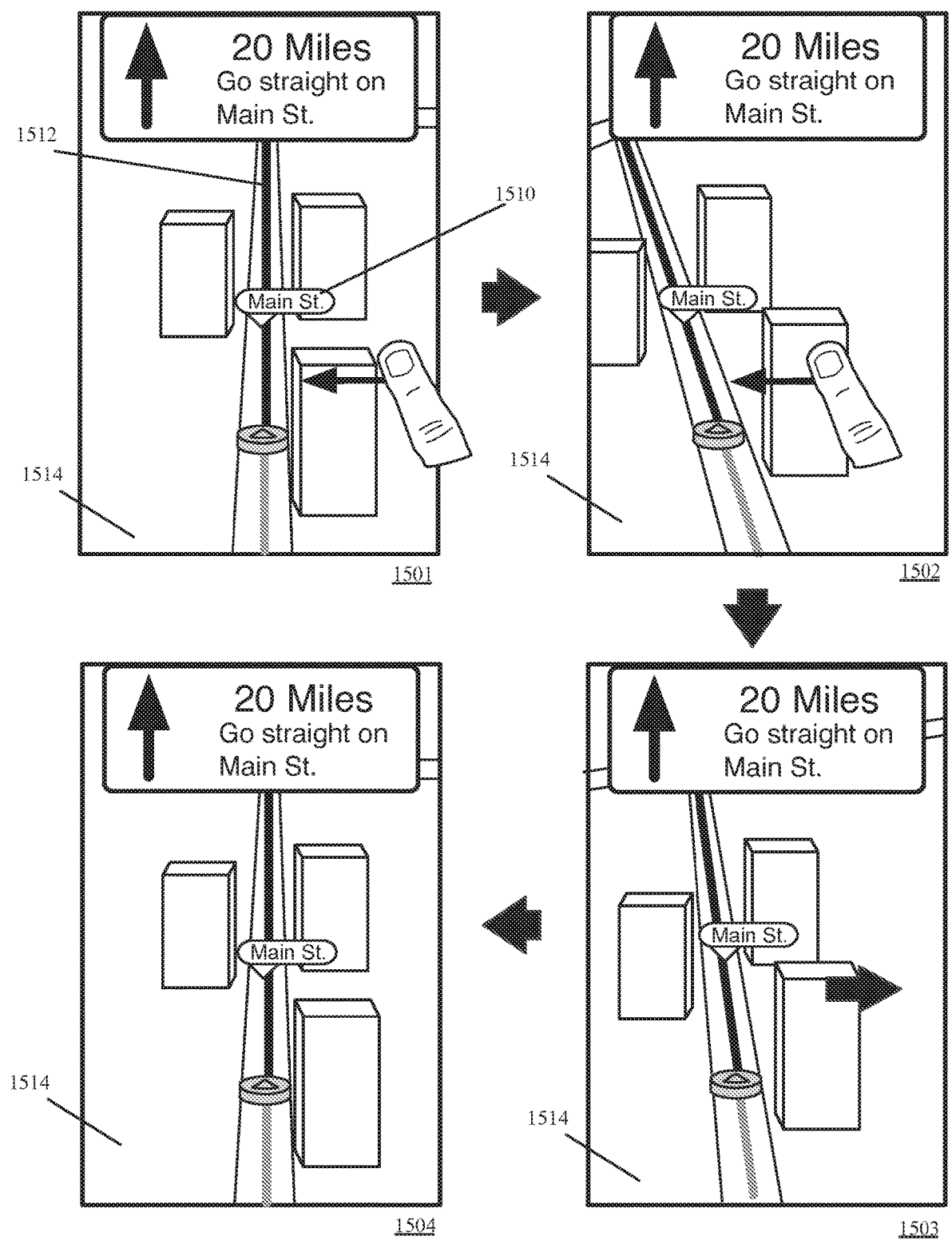
FIG. 15 illustrates the rotation of a map when a user pushes it sideways in some embodiments.

FIG. 15 illustrates the rotation of a map when a user pushes it sideways. The figure includes four stages 1501-1504. In stage 1501, the application is shown in its default mode, with the street 1510 (Main St.) and the current route 1512 running parallel to the sides of the screen on the 3D map 1514. In this stage 1501 the user begins pushing the map to the left. In the next stage 1502, the virtual camera has moved to the left and rotated to the right. That is, the 3D map 1514 has changed as though the virtual camera has moved to the left and rotated to the right. The map 1514, having been rotated, now shows the faces of the buildings on the right side of the street. In some embodiments, there is a maximum threshold to how far the map will rotate. In some embodiments, as well as being able to move the map from side to side, the user can move to a view slightly ahead of or slightly behind the location indicator (e.g., by dragging down or up with one finger). In some such embodiments, the amount that the map can be moved ahead or behind by dragging is also capped.

In the illustrated embodiment, the application only rotates the buildings while the user is dragging the map to the left (or right), or for a short time after (e.g., with simulated inertia). Once the user stops dragging the map 1514 or holding his finger in place to hold the map 1514 in place, the map 1514 reverts to its default view in the direction of the route the camera is taking. This is shown in stage 1503 in which the user has stopped dragging the map 1514 and the virtual camera is rotating and/or moving back to its original position directly behind the device as it moves on its route. By stage 1504, the map 1514 has resumed its previous orientation. In some embodiments, the virtual camera merely rotates when the map is dragged sideways, rather than moving as well as rotating. While in other embodiments, the camera revolves around the location identifier so that the location identifier appears to be a fixed point while the map revolves around it.

4. Route Overview Mode

Figure 16:
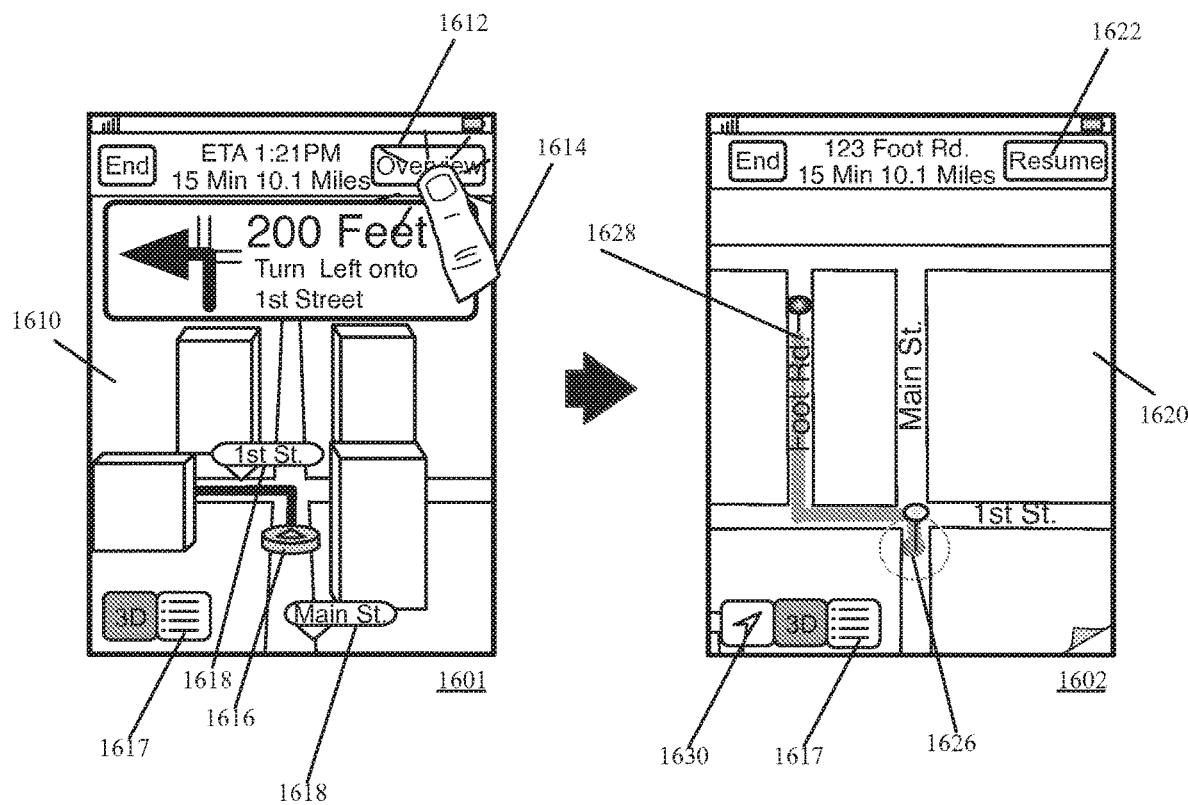
FIGS. 16 and 17 illustrate overview controls in some embodiments.
Figure 17:
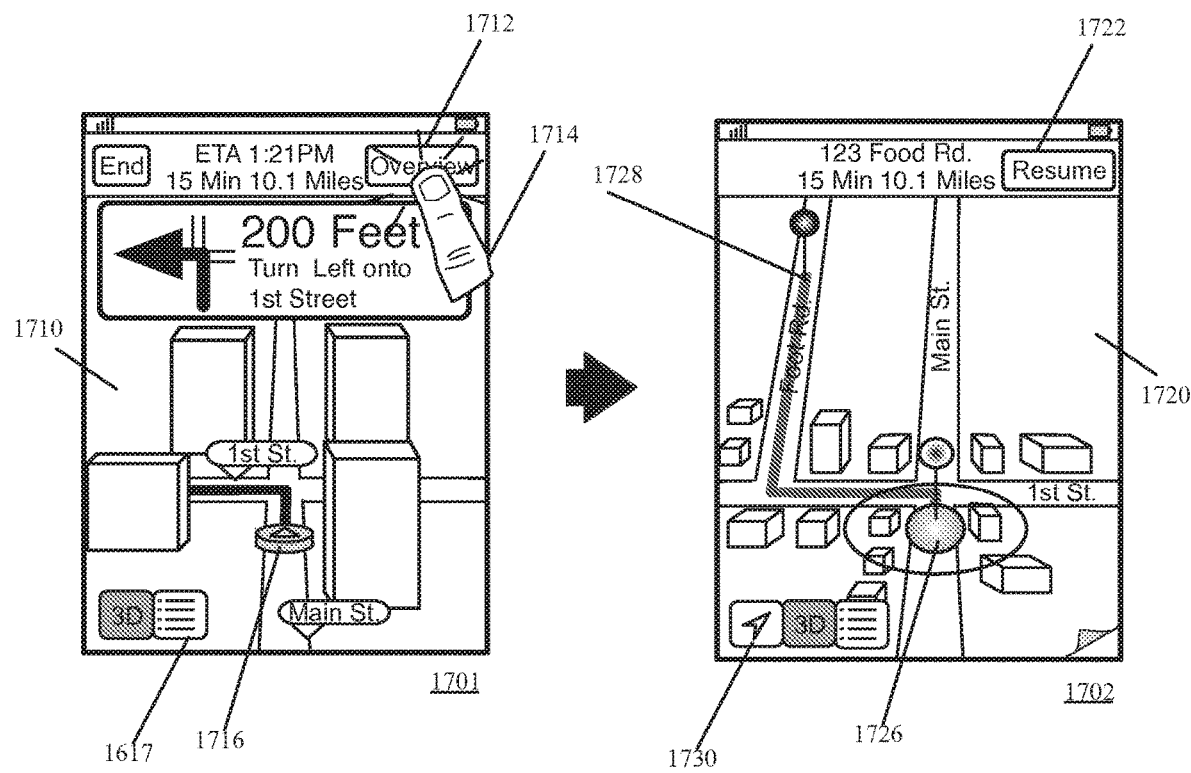

In some cases, rather than looking at only a small scale map that shows the next junction, some users may sometimes want to get a look at the big picture. That is, the users may want to look at the entirety of their navigation application's planned route while the user is traveling over the route. Therefore some embodiments provide an overview option that shows the user the entire route. FIGS. 16 and 17 illustrate overview controls. FIG. 16 includes two stages 1601 and 1602. In stage 1601 a navigation map 1610, overview button 1612, finger 1614, and list control 1617 are shown. In navigation map 1610, the location indicator 1616, shows that the device is on Main St. close to 1st St. The stage 1601 also shows that the mapping application is displaying the road names in banners 1618 because the mapping application is operating in the navigation mode. In this stage the finger 1614 hits overview button 1612 causing the overview to be displayed in stage 1602.

In stage 1602, the navigation application has displayed an overview map 1620, resume button 1622, location indicator pin 1626, end pin 1628 and position indicator control 1630. The overview map 1620 shows the user his entire planned route starting from the present position. In the illustrated embodiment, the overview map focuses on the remaining route, not the entire route from the beginning, as it does not show a light colored line indicating the previously traveled route. However, in some embodiments, the overview map shows the entire route rather than just the route from the current location of the device. In some embodiments, list control 1617 is also present in the overview map to allow the user to go directly from the overview map to a list of maneuvers (e.g., upcoming turns). The second stage 1602 also shows that the road names are displayed on the road because the mapping application is displaying the overview map (i.e., not in the navigation mode). It is to be noted that the mapping application of some embodiments alternatively or conjunctively uses banners to display the road names regardless of the mode in which the mapping application is operating.

The resume button 1622 switches the navigation application back to the navigation view of stage 1601. The location indicator pin 1626 and the end pin 1628 show the current location of the device and the final destination of the navigation route, respectively. In some embodiments, the application allows a user to move the map around, zoom in and out, and otherwise focus on different parts of the overview map 1620. The position indicator control 1630 in some embodiments centers the map on the location indicator pin 1626.

In some embodiments, the overview mode has a search box that allows a user to enter search queries for items that may be found in the overview map. For example, the user could search for gas stations on the map so that the user can determine where to refuel his car. Another example would be a search for coffee shops so the user could stop for coffee. Some embodiments allow a user to switch from an original end destination to a destination found in a search before resuming navigation.

In some embodiments all overview maps are 2D. In other embodiments, some or all overview maps are in 3D. For example, some embodiments use 2D overview maps for routes that cover large distances, but use 3D overview maps for navigation routes that cover short distances. FIG. 17 illustrates an embodiment that uses 3D overview maps. FIG. 17 includes two stages 1701 and 1702. In stage 1701 a navigation map 1710, overview button 1712, finger 1714, and list button 1617 are shown. In navigation map 1710, the location indicator 1716 shows that the device is on Main St. close to 1st St. In this stage the finger 1714 hits overview button 1712 causing the overview to be displayed in stage 1702.

In stage 1702, the navigation application has displayed an overview map 1720, resume button 1722, location indicator pin 1726, end pin 1728 and position indicator control 1730. The overview map 1720 shows the user their entire planned route. The resume button 1722 switches the navigation application back to the navigation view of stage 1701. The location indicator pin 1726 and end pin 1728 show the current location of the device and the final destination of the navigation route, respectively. The position indicator control 1730 centers the map on the location indicator pin 1726.

In some embodiments, the 3D overview maps include a search function as described with respect to FIG. 16. Also, in some embodiments, the overview mode includes a control to center the map on the end pin. In some embodiments, the position indicator control allows a user to toggle between centering on the present location of the device and the destination of the device. In some embodiments, the overview mode can be activated at any time while navigating.

D. Multi-Mode Application

1. Rendering Module

Figure 18:
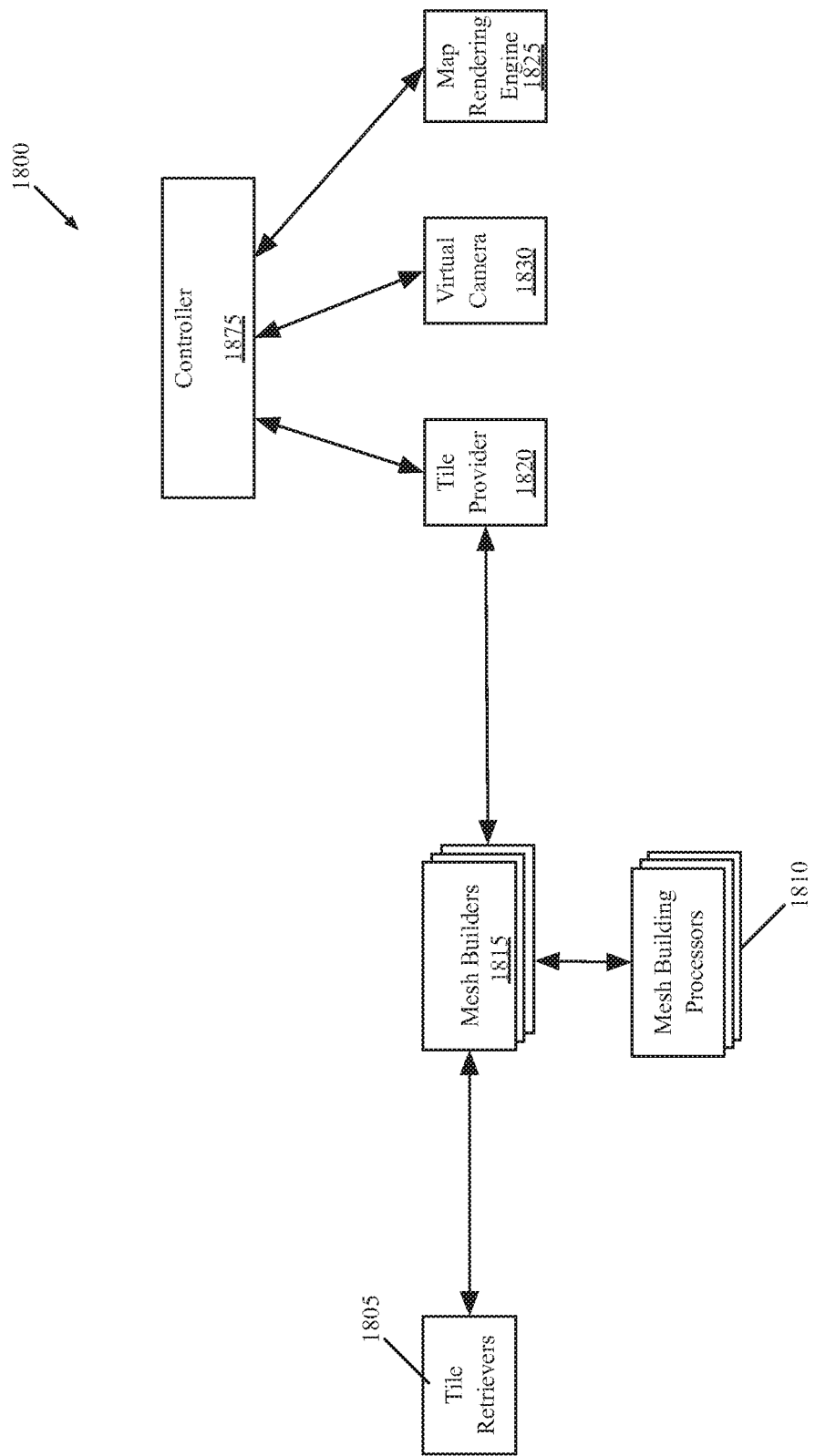
FIG. 18 conceptually illustrates a processing, or map rendering, pipeline performed by the mapping application of some embodiments in order to render a map for display at the client device.

FIG. 18 conceptually illustrates a processing, or map rendering, pipeline 1800 performed by the mapping application of some embodiments in order to render a map for display at the client device (e.g., on the display of the client device). In some embodiments, the map rendering pipeline 1800 may be referred to collectively as a map rendering module. A more detailed version of this processing pipeline is described in U.S. patent application Ser. No. 13/632,040, filed Sep. 30, 2012, now published as U.S. Patent Publication 2013/0321401, entitled "Virtual Camera for 3D Maps," concurrently filed with this application. This concurrently filed U.S. Patent Application is incorporated herein by reference. As illustrated, the processing pipeline 1800 includes tile retrievers 1805, a set of mesh builders 1815, a set of mesh building processors 1810, a tile provider 1820, a virtual camera 1830, and a map rendering engine 1825.

The tile retrievers 1805 perform various processes to retrieve map tiles in some embodiments, according to requests for the map tiles from the mesh builders 1815. The mesh builders 1815, as will be described below, identify existing map tiles (that are stored on a mapping service server or in a cache on the device performing the processing pipeline 1800) needed to build their respective meshes. The tile retrievers 1805 receive the requests for the map tiles, determine the best location from which to retrieve the map tiles (e.g., from the mapping service, from a cache on the device) and decompress the map tiles if required.

The mesh builders 1815 (also referred to as tile sources) of some embodiments are instantiated by the tile provider 1820 in order to build different layers of view tiles. Depending on the type of map being displayed by the mapping application, the tile provider 1820 may instantiate a different number and different types of mesh builders 1815. For instance, for a flyover (or satellite) view map, the tile provider 1820 might only instantiate one mesh builder 1815, as the flyover map tiles of some embodiments do not contain multiple layers of data. In fact, in some embodiments, the flyover map tiles contain an already-built mesh generated at the mapping service for which the flyover images (taken by a satellite, airplane, helicopter, etc.) are used as textures. However, in some embodiments, additional mesh builders may be instantiated for generating the labels to overlay on the flyover images when the application is in a hybrid mode. For a 2D or 3D rendered vector map (i.e., a non-satellite image map), some embodiments instantiate separate mesh builders 1815 to build meshes for landcover polygon data (e.g., parks, bodies of water, etc.), roads, place of interest markers, point labels (e.g., labels for parks, etc.), road labels, traffic (if displaying traffic), buildings, raster data (for certain objects at certain zoom levels), as well as other layers of data to incorporate into the map.

The mesh builders 1815 of some embodiments, receive "empty" view tiles from the tile provider 1820 and return "built" view tiles to the tile provider 1820. That is, the tile provider 1820 sends to each of the mesh builders 1815 one or more view tiles (not shown). Each of the view tiles indicates an area of the world for which to draw a mesh. Upon receiving such a view tile, a mesh builder 1815 identifies the map tiles needed from the mapping service, and sends its list to the tile retrievers 1805.

Upon receiving the tiles back from the tile retrievers 1805, the mesh builder uses vector data stored in the tiles to build a polygon mesh for the area described by the view tile. In some embodiments, the mesh builder 1815 uses several different mesh building processors 1810 to build the mesh. These functions may include a mesh generator, a triangulator, a shadow generator, and/or a texture decoder. In some embodiments, these functions (and additional mesh building functions) are available to each mesh builder, with different mesh builders 1815 using different functions. After building its mesh, each mesh builder 1815 returns its view tiles to the tile provider 1820 with its layer of the mesh filled in.

The tile provider 1820 receives from the controller 1875 a particular view (i.e., a volume, or viewing frustrum) that represents the map view to be displayed (i.e., the volume visible from the virtual camera 1830). The tile provider performs any culling (e.g., identifying the surface area to be displayed in the view tile), then sends these view tiles to the mesh builders 1815.

The tile provider 1820 then receives the built view tiles from the mesh builders and, in some embodiments, performs culling on the built mesh using the particular view from the virtual camera 1830 (e.g., removing surface area too far away, removing objects that will be entirely behind other objects, etc.). In some embodiments, the tile provider 1820 receives the built view tiles from the different mesh builders at different times (e.g., due to different processing times to complete more and less complicated meshes, different time elapsed before receiving the necessary map tiles from the tile retrievers 1805, etc.). Once all of the layers of view tiles have been returned, the tile provider 1820 of some embodiments puts the layers together and releases the data to the controller 1875 for rendering.

The virtual camera 1830 generates a volume or surface for the pipeline 1800 to render, and sends this information to the controller 1875. Based on a particular location and orientation from which the map will be rendered (i.e., the point in 3D space from which the user "views" the map), the virtual camera identifies a field of view to actually send to the tile provider 1820. In some embodiments, when the mapping application is rendering the 3D perspective view for navigation, the field of view of the virtual camera is determined according to an algorithm that generates a new virtual camera location and orientation at regular intervals based on the movement of the user device.

The controller 1875 is responsible for managing the tile provider 1820, virtual camera 1830, and map rendering engine 1825 in some embodiments. In some embodiments, multiple tile providers may actually be instantiated, and the controller puts together several view tiles (e.g., map tiles and building tiles) to create a scene that is handed off to the map rendering engine 1825.

The map rendering engine 1825 is responsible for generating a drawing to output to a display device based on the mesh tiles (not shown) sent from the virtual camera. The map rendering engine 1825 of some embodiments has several sub-processes. In some embodiments, each different type of map element is rendered by a different sub-process, with the rendering engine 1825 handling the occlusion of different layers of objects (e.g., placing labels above or behind different buildings, generating roads on top of land cover, etc.). Examples of such rendering processes include a road rendering process, a building rendering process, a label rendering process, a vegetation rendering process, a raster traffic rendering process, a raster road rendering process, a satellite rendering process, a polygon rendering process, a background raster rendering process, etc.

The operation of the rendering pipeline 1800 in some embodiments will now be described. Based on user input to view a particular map region at a particular zoom level, the virtual camera 1830 specifies a location and orientation from which to view the map region, and sends this viewing frustrum, or volume, to the controller 1875. The controller 1875 instantiates one or more tile providers. While one tile provider 1820 is shown in this figure, some embodiments allow the instantiation of multiple tile providers at once. For instance, some embodiments instantiate separate tile providers for building tiles and for map tiles.

The tile provider 1820 performs any culling necessary to generate an empty view tile identifying regions of the map for which a mesh needs to be built, and sends the empty view tile to the mesh builders 1815, which are instantiated for the different layers of the drawn map (e.g., roads, land cover, POI labels, etc.). The mesh builders 1815 use a manifest received from the mapping service that identifies the different tiles available on the mapping service server (i.e., as nodes of a quadtree). The mesh builders 1815 request specific map tiles from the tile retrievers 1805, which return the requested map tiles to the mesh builders 1815.

Once a particular mesh builder 1815 has received its map tiles, it begins using the vector data stored in the map tiles to build the mesh for the view tiles sent from the tile provider 1820. After building the mesh for its map layer, the mesh builder 1815 sends the built view tile back to the tile provider 1820. The tile provider 1820 waits until it has received all of the view tiles from the various mesh builders 1815, then layers these together and sends the completed view tile to the controller 1875. The controller stitches together the returned tiles from all of its tile providers (e.g., a map view tile and a building view tile) and sends this scene to the rendering engine 1825. The map rendering engine 1825 uses the information in the map tiles to draw the scene for display.

2. State Diagram for Different Modes

Figure 19A:
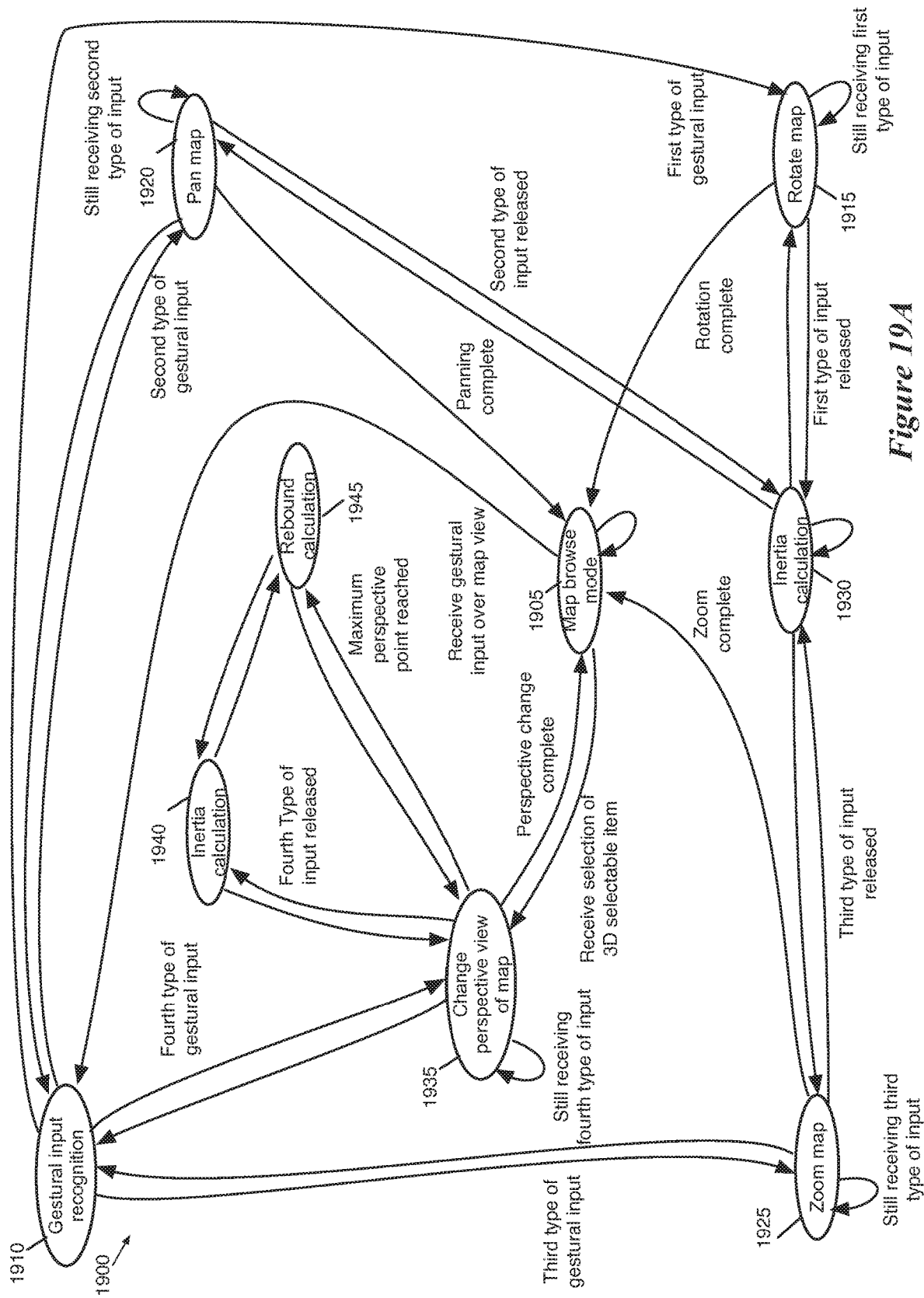
FIGS. 19A and 19B conceptually illustrate a state diagram that describes different states and transitions between these states of the integrated mapping, search, and navigation application of some embodiments (e.g., the application described in the above sections).
Figure 19B:
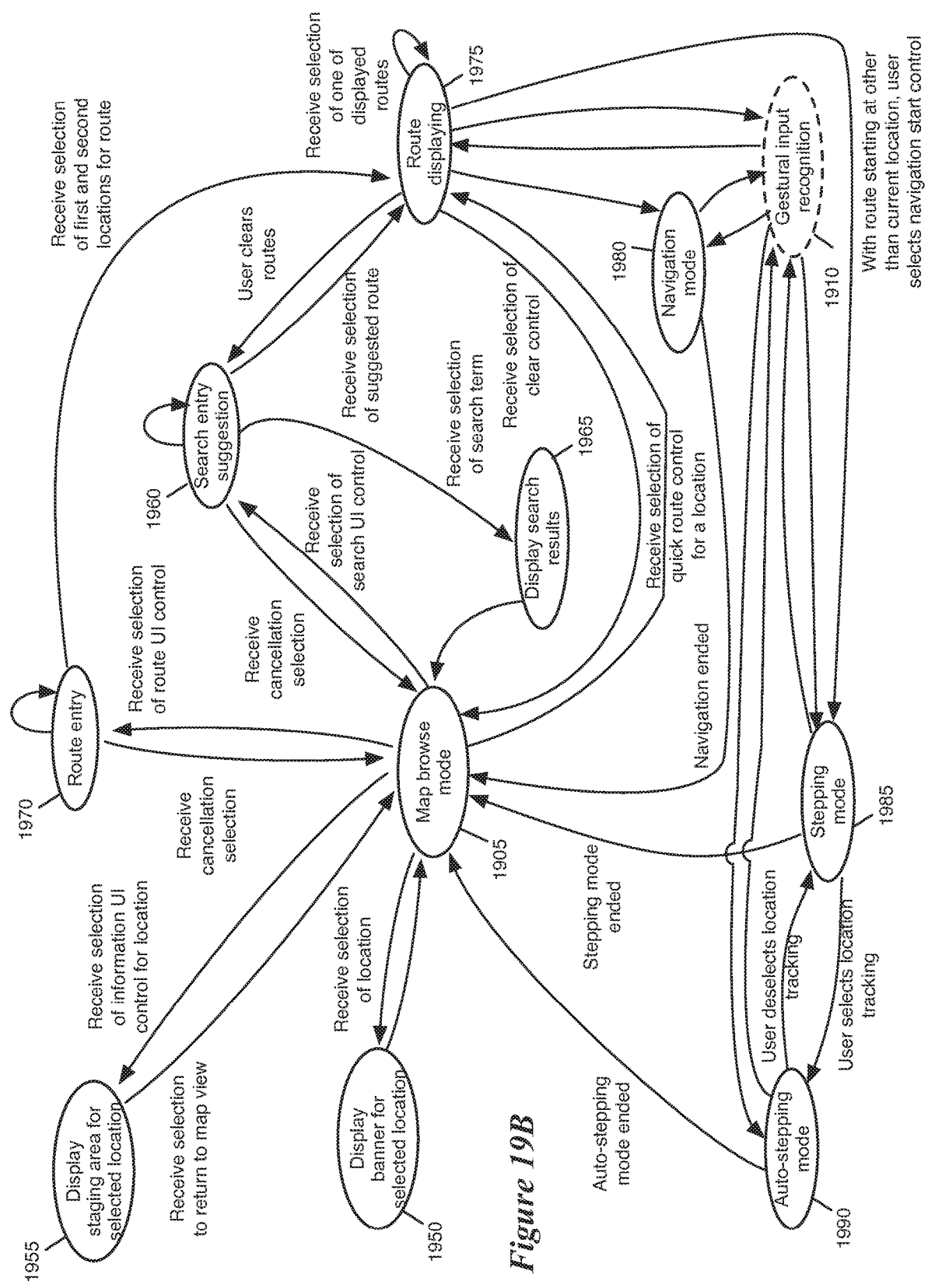

FIG. 19 conceptually illustrates a state diagram 1900 that describes different states and transitions between these states of the integrated mapping, search, and navigation application of some embodiments (e.g., the application described in the above sections). One of ordinary skill in the art will recognize that the application of some embodiments will have many different states relating to all different types of input events, and that the state diagram 1900 is specifically focused on a subset of these events. The state diagram 1900 describes and refers to various gestural interactions (e.g., multi-touch gestures) for changing states of the application. One of ordinary skill in the art will recognize that various other interactions, such as cursor controller gestures and button clicks, keyboard input, touchpad/trackpad input, etc., may also be used for similar selection operations.

When a user initially opens the mapping application, the application is in state 1905, the map browsing state. In this state 1905, the application will have generated and displayed a map view. To generate and display this map view, the application of some embodiments identifies a required set of map tiles for a region, requests the map tiles (e.g., from a mapping service server), generates a view of the map tiles from a particular location, orientation, and perspective of a virtual camera, and renders the map view to a device display. When in state 1905, the map view is static. With the application in state 1905, the user can perform numerous operations to modify the map view, search for entities (e.g., places of interest, addresses, etc.), retrieve a route for navigation, etc.

In some embodiments, the integrated application is displayed on a device with an integrated touch-sensitive display. Various gestural interactions over the map may cause the application to perform different modifications to the map view (e.g., panning, rotating, zooming, modifying the map perspective, etc.). When the integrated application receives gestural interactions over the map display (as opposed to touch inputs over various floating or non-floating controls overlaid on the map display), the application transitions to state 1910 to perform gestural input recognition.

The gestural input recognition state 1910 differentiates between different types of gestural input and translates these types of input into different map view modification operations. In some embodiments, the mapping application receives the gestural input as translated by the operating system of the device with the integrated touch-sensitive display. The operating system translates the touch input into gesture types and locations (e.g., a "tap" at coordinates (x,y), a "pinch" operation with separate touch inputs at two different locations, etc.). At state 1910, the integrated mapping application of some embodiments translates these into the different map view modification operations.

When the application receives a first type of gestural input (e.g., two separate touch inputs moving together in a rotational motion over the map view), the application transitions to state 1915 to rotate the map. To rotate the map view, some embodiments modify the location and/or orientation of the virtual camera that determines which portion of the map is rendered to create the map view. When in 3D mode, for example, the mapping application rotates the virtual camera about a particular position (e.g., the center of the touch inputs, the center of the display, a location indicator identifying the user's location, etc.). As the first type of gestural input continues, the mapping application remains in state 1915 to continue rotating the map.

When the user releases the first type of gestural input, the application of some embodiments transitions to state 1930 to perform an inertia calculation. In some embodiments, after the user releases certain types of touch inputs, the application continues to perform the associated map view modification for a particular amount of time and/or distance. In this case, after the user releases the rotation input, the application transitions to the inertia calculation state 1930 to calculate the additional rotation amount and the time over which this rotation should be performed. In some embodiments, the application slows down the rotation from the (angular) velocity at which the map was being rotated, as if a "frictional" force was applied to the map. As such, the inertia calculation of some embodiments is based on the speed of the first type of gestural input. From state 1930, the application transitions back to the map modification state that the application was previously in. That is, when the application transitions from state 1915 (the rotation state) to the inertia calculation state 1930, it then transitions back to state 1915 after performing the inertia calculation. After the rotation of the map is complete, the application transitions back to state 1905.

When the application receives a second type of gestural input (e.g., a single touch input moving over the map view), the application transitions to state 1920 to pan the map. To pan the map view, some embodiments modify the location of the virtual camera that determines which portion of the map is rendered to create the map view. This causes the map to appear to slide in a direction derived from the direction of the second type of gestural input. In some embodiments, when the map view is in a 3D perspective mode, the panning process involves performing a correlation of the location of the touch input to a location on the flat map, in order to avoid sudden unwanted jumps in the map view. As the second type of gestural input continues, the mapping application remains in state 1920 to continue panning the map.

When the user releases the second type of gestural input, the application of some embodiments transitions to state 1930 to perform an inertia calculation. In some embodiments, after the user releases certain types of touch inputs, the application continues to perform the associated map view modification for a particular amount of time and/or distance. In this case, after the user releases the panning input, the application transitions to the inertia calculation state 1930 to calculate the additional amount to move the map view (i.e., move the virtual camera) and the time over which this movement should be performed. In some embodiments, the application slows down the panning movement from the velocity at which the map was being panned, as if a "frictional" force was applied to the map. As such, the inertia calculation of some embodiments is based on the speed of the second type of gestural input. From state 1930, the application transitions back to the map modification state that the application was previously in. That is, when the application transitions from state 1920 (the panning state) to the inertia calculation state 1930, it then transitions back to state 1920 after performing the inertia calculation. After the panning of the map is complete, the application transitions back to state 1905.

When the application receives a third type of gestural input (e.g., two separate touch inputs moving closer together or farther apart), the application transitions to state 1925 to zoom in on or out of the map. To change the zoom level of the map view, some embodiments modify the location (i.e., height) of the virtual camera that determines which portion of the map is rendered to create the map view. This causes the map view to include more (if zooming out) or less (if zooming in) of the map. In some embodiments, as the user zooms in or out, the application retrieves different map tiles (for different zoom levels) to generate and render the new map view. As the third type of gestural input continues, the mapping application remains in state 1925 to continue zooming in on or out of the map.

When the user releases the second type of gestural input, the application of some embodiments transitions to state 1930 to perform an inertia calculation. In some embodiments, after the user releases certain types of touch inputs, the application continues to perform the associated map view modification for a particular amount of time and/or distance (i.e., moving the virtual camera higher or lower). In this case, after the user releases the zoom input, the application transitions to the inertia calculation state 1930 to calculate the additional amount to zoom the map view (i.e., move the virtual camera) and the time over which this movement should be performed. In some embodiments, the application slows down the zooming movement from the velocity at which the map was being zoomed in on or out of (i.e., the speed at which the virtual camera changes height), as if a "frictional" force was applied to the camera. As such, the inertia calculation of some embodiments is based on the speed of the third type of gestural input.

From state 1930, the application transitions back to the map modification state that the application was previously in. That is, when the application transitions from state 1925 (the zooming state) to the inertia calculation state 1930, it then transitions back to state 1925 after performing the inertia calculation. After the zooming of the map is complete, the application transitions back to state 1905.

For simplicity, the state diagram 1900 illustrates the map panning, zooming, and rotation processes using the same inertia calculation process (state 1930). However, in some embodiments, each of these different map modification processes actually uses a different inertia calculation to identify the slow-down and stop for its particular type of movement. In addition, some embodiments calculate and modify the inertia variables as the input is received rather than when the user removes the gestural input.

When the application receives a fourth type of gestural input (e.g., two separate touch inputs moving up or down the touch-sensitive display in unison), the application transitions to state 1935 to modify the perspective view of the map. To change the perspective view of the map, some embodiments move the virtual camera along an arc over the map, modifying both the location and orientation of the virtual camera (as the camera keeps the center of its field of view at a particular location on the map). In some embodiments, different zoom levels use different arcs along which the virtual camera moves. Each of these arcs has a top point at which the virtual camera is pointing straight down, giving a 2D perspective view of the map. In addition, each arc has a bottom point, that is the lowest point on the arc to which the virtual camera can be moved. Thus, the fourth type of gestural input can cause the application to change between a 2D map view and a 3D perspective map view in some embodiments. As the fourth type of gestural input continues, the mapping application remains in state 1935 to continue modifying the perspective view of the map.

When the user releases the fourth type of gestural input, the application of some embodiments transitions to state 1940 to perform an inertia calculation. In some embodiments, after the user releases certain types of touch inputs, the application continues to perform the associated map view modification for a particular amount of time and/or distance (i.e., moving the virtual camera higher or lower). In this case, after the user releases the perspective view change input, the application transitions to the inertia calculation state 1940 to calculate the additional amount to modify the perspective of the map view (i.e., move the virtual camera along its arc) and the time over which this movement should be performed. In some embodiments, the application slows down the movement from the velocity at which the map was changing perspective (i.e., the speed at which the virtual camera moves along its arc), as if a "frictional" force was applied to the camera. As such, the inertia calculation of some embodiments is based on the speed with which the fourth type of gestural input was performed.

In addition, for the perspective change operation, some embodiments transition to a rebound calculation state 1945. As stated, the perspective change operation has a maximum and minimum perspective shift allowed in some embodiments, which may depend on the zoom level of the current map view. Thus, in addition to an inertia calculation, the application performs a rebound calculation at state 1945. The rebound calculation uses the inertia calculation to determine whether the maximum point along the virtual camera arc will be reached and, if so, the velocity of the virtual camera at this point. Some embodiments allow the virtual camera to move slightly past the maximum point to hit a "rebound" point, at which point the application turns the virtual camera around on its arc, moving it back towards the maximum point. Some embodiments include such a bounce-back functionality only on one end of the virtual camera arc (e.g., the bottom of the arc), while other embodiments include the functionality on both ends of the arc. From the rebound calculation state 1945, the application transitions back to the inertia calculation state 1940, then back to the perspective changing state 1935 to display the map view movement. In addition, when the user performs the fourth type of touch input for long enough and the perspective reaches its maximum point, the application transitions directly from the state 1935 to state 1945 to calculate the rebound information and then transitions back to state 1935. After the modification to the perspective view of the map is complete, the application transitions back to state 1905.

The above states relate to the various multi-touch gestures over the map presentation that the integrated mapping, search, and navigation application translates into different modifications to the map presentation. Various other touch inputs can also cause the application to change states and perform various functions. For instance, some embodiments overlay a 3D selectable item on the map view (e.g., as a floating control), and selecting (e.g., with a tap input) the 3D item causes the application to transition to 1935 to modify the perspective of the map view. When the map view starts in a 3D perspective view, the application modifies the perspective into a 2D view; when the map view starts in the 2D view, the application modifies the perspective into a 3D view. After the modification, the application returns to state 1905.

When a user is viewing a map in state 1905, the application presents various labels as part of the map view. Some of these labels indicate places of interest, or other locations. When a user selects certain labels (e.g., for certain businesses, parks, etc.), the application transitions to state 1950 to display a banner for the selected location (e.g., an information display banner), then returns to the map browsing state (with the banner displayed over the map). In some embodiments, this banner includes (1) a quick-route navigation U control (e.g., a button) that causes the application to retrieve a route (e.g., a driving route) from a current location of the device to the selected location without leaving the map view and (2) an information UI control (e.g., button) that causes the application to provide additional information about the location.

When a user selects the UI control button, the application transitions from state 1905 to state 1955 to display a staging area for the selected location. In some embodiments, this staging area displays a media presentation of the selected location (e.g., a 3D video presentation, a flyover view of the selected location, a series of images captured for the location, etc.), as well as various information for the selected location (contact information, reviews, etc.). The application stays in the state 1955 as the user performs various operations to navigate the staging area and view information within the staging area. When a user selects a UI control to transfer back to the map view, the application transitions to state 1905.

From the map browsing view, the user can also easily access the search function of the application. When a particular UI control (e.g., a search bar) is selected, the application transitions to a search entry suggestion state 1960. At the search entry state, some embodiments display a touchscreen keyboard with which the user can enter a search term. The search term may be a business name, an address, a type of location (e.g., coffee shops), etc. While the user enters characters, the application remains in state 1960 and provides suggestions based on recent searches, the letters already entered, etc. Some embodiments may use prefix-based suggestions (e.g., suggestions starting with the characters already entered) as well as other suggestions (e.g., making spelling corrections to add characters at the beginning of the already-entered string, transpose characters, etc.). In some embodiments, the selections may also include recently entered routes in addition to locations. If the user selects a cancellation UI control at this stage, the application transfers back to state 1905 without performing a search.

When the user selects a search term (either a suggested term or a term entered completely by the user), the application transitions to state 1965 to display the search results over the map view, then transitions to state 1905 with the search results displayed. Some embodiments display the search results as selectable items (e.g., pins) on the map; selection of one of the items causes a transition to state 1950 to display the banner for the selected item. In addition, the application of some embodiments automatically selects one of the search results (e.g., a "best" result) and displays this banner as part of the state 1965.

As the application is a tightly integrated mapping, search, routing, and navigation application, the user can easily access the routing function from the map browsing state. When a particular UI control (e.g., a route entry button) is selected, the application transitions to the route entry state 1970. At the route entry state, some embodiments display a touchscreen keyboard with which the user can enter locations (e.g., addresses, place names, place types, etc.) into both "to" and "from" fields in order to request a route. While the user enters characters, the application remains in state 1970 and provides suggestions based on recent routes, recent searches, an autocomplete similar to that described for the search entry, etc. If the user selects a cancellation UI control at this stage, the application transfers back to state 1905 without retrieving a route.

When the user selects a route (e.g., by entering a "to" location and a "from" location), the application transitions to the route displaying state 1975. At this state, the application displays one or more routes from a first selected location to a second selected location over the map view (e.g., by overlaying route lines on the map view). Some embodiments automatically select a first one of the routes. The user can select any of the other routes (e.g., by tapping over an unselected route), with the application remaining in state 1975 (but modifying the display of the route lines to indicate the selection of the other route). In addition, when in state 1975, the application of some embodiments displays different UI controls related to routing and navigation, including a direction list control, a navigation start control, and others.

Also, various gestural interactions over the map on which the routes are displayed may cause the application to perform different modifications to the map view (e.g., panning, rotating, zooming, modifying the map perspective, etc.). When the integrated application receives gestural interaction over the map display while in the route display state 1975, the application transitions to state 1910 to perform gestural input recognition, with all of the gestural map modification operations (e.g., corollaries to states 1915-1945) available. That is, the application translates the gestural input into panning, rotation, zoom, and/or perspective change operations similar to those described above for states 1915-1945, with similar inertia and rebound features for the virtual camera movement. Whereas the operations 1915-1945 return to the map browsing state 1905, the corollary operations accessed from the route display state 1975 return to the route display state 1975.

In some embodiments, the route display state 1975 is accessible from other states as well. For instance, if a user selects the quick-route UI control on a banner while in state 1905, the application retrieves one or more routes from the current location of the device to the location with which the banner is associated. In addition, some embodiments display previously requested routes among the search suggestions at state 1960. When the user selects one of these suggested routes, the application transitions directly from state 1960 to state 1975 to display one or more routes over the map.

From the route display state 1975, the application can transition into various different modes depending on different controls selected by the user. When the user selects a UI control to clear the routes, the application transitions back to state 1905 to display the map without any routes. In addition, the integrated application may enter one or more navigation modalities from the route displaying state 1975.

When the selected route displayed at state 1975 starts at the current location of the device and the user selects a navigation starting control, the application transitions to the navigation state 1980. In some embodiments, the application displays a cinematic transition from the map view into a more immersive 3D view for navigation. Within the navigation state 1980 of some embodiments, a virtual camera follows the location of the user along the selected route in order to present the upcoming portions of the route. When either the route is completed (the device reaches the destination location) or the user selects a control to end navigation, the application transitions to state 1905 to present the map browsing view 1905.

In some embodiments, various gestural interactions over the map on which the routes are displayed may cause the application to perform different modifications to the map view (e.g., panning, rotating, zooming, modifying the map perspective, etc.) while in the navigation mode 1980. In some embodiments, only some of the described map modification operations are available in the navigation mode. For instance, some embodiments allow the user to zoom in or out, but do not allow any other modifications to the map. Thus, when the user provides gestural input, the gestural input recognition state 1910 filters out types of gestural input not associated with the zoom operation (and subsequently the application returns to state 1980). When the type of gestural input associated with the zoom operation is received, the gestural input recognition state recognizes this input and the application transitions to a state similar to state 1925, for changing the zoom level of the map (with the inertia calculation, in some embodiments).

Other embodiments may enable different map modification operations. For instance, in some embodiments all of the gestural map modification operations (e.g., corollaries to states 1915-1945) are available while in the navigation mode. Some embodiments allow a subset of the gestural map modification operations, such as zooming and a limited panning operation. The panning operation of some embodiments, upon receiving the type of gestural input associated with panning, moves the virtual camera (while in the navigation mode) to the side, then returns the virtual camera back to pointing along the route. Whereas the operations 1915-1945 return to the map browsing state 1905, the corollary operations accessed from the navigation state 1980 return to the navigation state 1980.

When the selected route displayed at state 1975 starts at a location other than the current location of the device (or the route is a walking route) and the user selects a navigation starting control, the application transitions to the stepping mode, or route inspection mode, at state 1985. In some embodiments, the application displays the maneuvers performed along the route one at a time (e.g., as navigation signs). By providing gestural input (e.g., swipe gestures) to the maneuvers, the user can view the different maneuvers while in the route inspection mode. The maneuvers are overlaid on a map and at least a portion of the route is displayed in the map.

As in the route display mode, various gestural interactions over the map may cause the application to perform different modifications to the map view (e.g., panning, rotating, zooming, modifying the map perspective, etc.). When the integrated application receives gestural interaction over the map display while in the stepping mode 1985, the application transitions to state 1910 to perform gestural input recognition, with all of the gestural map modification operations (e.g., corollaries to states 1915-1945) available. That is, the application translates the gestural input into panning, rotation, zoom, and/or perspective change operations similar to those described above for states 1915-1945, with similar inertia and rebound features for the virtual camera movement. Whereas the operations 1915-1945 return to the map browsing state 1905, the corollary operations accessed from the stepping mode 1985 return to the stepping mode 1985.

Furthermore, in some embodiments the gestural input recognition recognizes at least one type of gestural input over the displayed maneuvers in order to switch between the maneuvers. When a particular type of gestural input (e.g., a swipe gesture) is received over the displayed maneuver (as opposed to over the map view), the application transitions to a state (not shown) for changing the displayed maneuver, then returns to state 1985.

When the integrated application receives gestural interaction over the map displayed while in the stepping state 1985, the application transitions to state 1910 to perform gestural input recognition, with all of the gestural map modification operations (e.g., corollaries to states 1915-1945) available. When the modification operations are done, the application returns to state 1985. When the user selects a control to end stepping through the maneuvers, the application transitions to state 1905 to present the map browsing view.

In addition, in some embodiments the application can transition from the stepping mode 1985 to an auto-stepping state 1990. When the user selects a location tracking control while the application is in state 1985, the application transitions to an automatic stepping mode 1990, which is a different navigation modality. When in the automatic stepping mode of some embodiments, the integrated mapping, search, and navigation application displays the maneuver to which the device's location is closest (e.g., as measured by a juncture at which the maneuver is performed). When the device moves (e.g., along the route) to a location closer to a different maneuver, the auto-stepping mode automatically displays the different maneuver. When the user deselects the location tracking control, the application transitions back to the stepping mode 1985. When the user selects a control to end navigation while in the auto-stepping state 1990, the application transitions to state 1905 to present the map browsing view.

As in the stepping mode 1985, various gestural interactions over the map may cause the application to perform different modifications to the map view (e.g., panning, rotating, zooming, modifying the map perspective, etc.). When the integrated application receives gestural interaction over the map display while in the auto-stepping mode 1990, the application transitions to state 1910 to perform gestural input recognition, with all of the gestural map modification operations (e.g., corollaries to states 1915-1945) available. That is, the application translates the gestural input into panning, rotation, zoom, and/or perspective change operations similar to those described above for states 1915-1945, with similar inertia and rebound features for the virtual camera movement. Whereas the operations 1915-1945 return to the map browsing state 1905, the corollary operations accessed from the auto-stepping mode 1990 return to the auto-stepping mode 1990. In addition, some embodiments automatically turn the location tracking control off when the user pans the map a particular distance, in which case the application returns to the stepping mode state 1985 rather than auto-stepping state 1990.

II. Display of Navigation Signs

The above sections introduce the turn-by-turn navigation features of some embodiments. One such feature is the navigation signs provided by the mapping application describing the different maneuvers for the user to perform. These signs may indicate turns, a distance over which to continue traveling straight, when to take a freeway off-ramp, or other maneuvers for the user to perform. Some embodiments provide various animations for the signs, including showing the signs as passing over the user location indicator in 3D mode, modifying the appearance of a sign to indicate an upcoming maneuver, and using secondary signs when two maneuvers will be performed in rapid succession.

A. Realistic Look and Different Formats in Different Contexts

The navigation signs, in some embodiments, may have different appearances in different contexts. Some of these differences are described in greater detail further below. Specifically, graphical indicators of maneuvers to perform (e.g., direction indicators that are described further below) and instruction text describing those maneuvers may be adapted to fit the context of the navigation signs being displayed. For example, different-sized signs may have either simple or complex maneuver descriptions, and instruction text may be adapted to the size of the sign and may be based on other information displayed within the sign.

Some embodiments display the navigation signs in such a way as to give the signs the appearance of a realistic road sign. Some embodiments display the navigation signs as rich, textured images (e.g., using shadows, shading, etc.) as opposed to simply displaying a flat image on the map display. In addition, some embodiments use shading for the navigation sign that matches the color(s) of road signs in the area through which the application is navigating. The application also uses realistic highway shields to mark roads in some embodiments. For instance, for numbered state and federal highways, the application will either use the highway shield associated with the road within the navigation sign (e.g., off to the side of the sign), replace the name of the road in navigation instructions with the highway shield, or otherwise include the highway shield in the graphical display.

Figure 20:
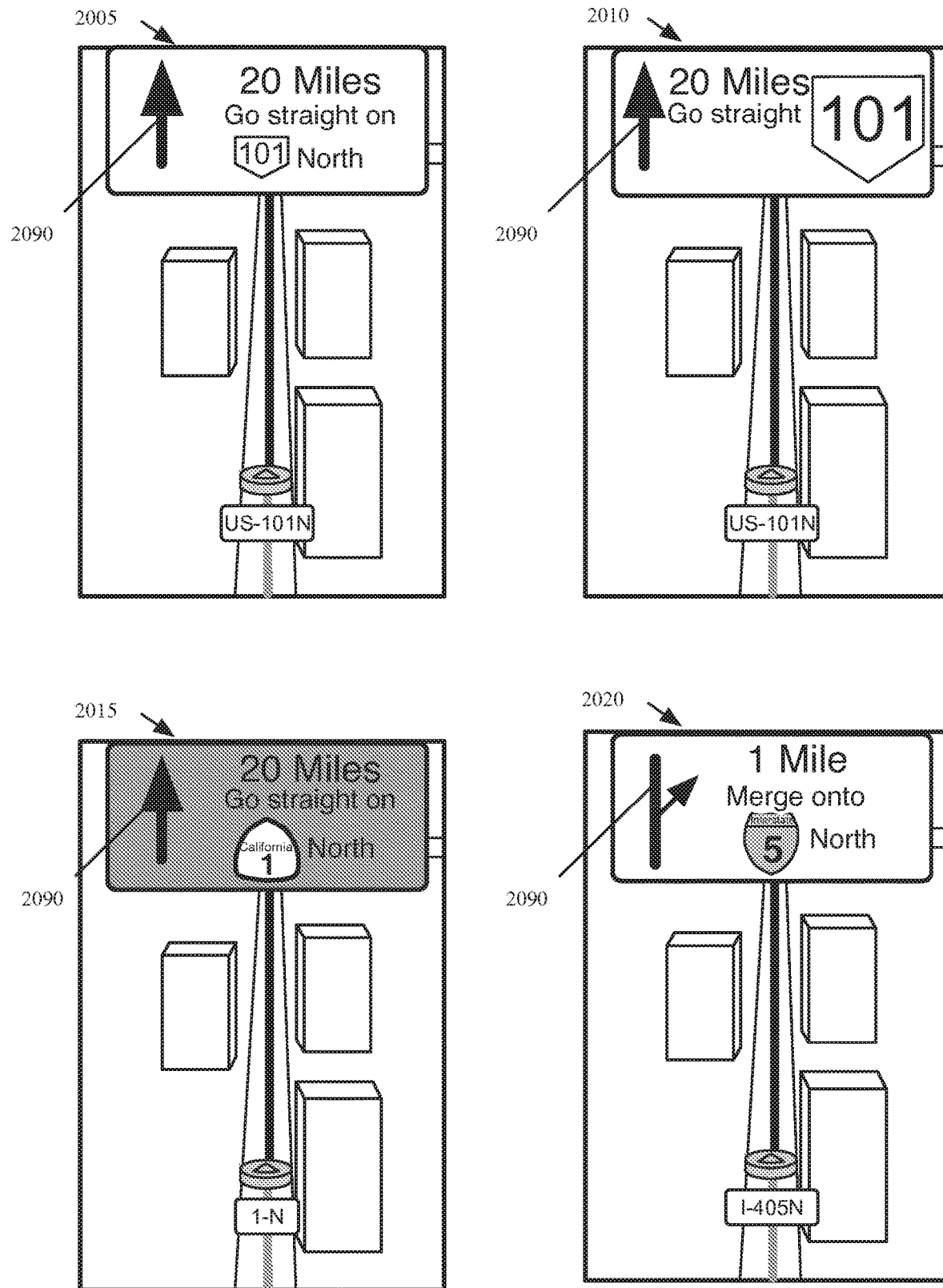
FIG. 20 illustrates several GUI scenarios in which such highway shields are used in some embodiments.

FIG. 20 illustrates several GUI scenarios in which such highway shields are used. The first such scenario 2005 illustrates the mapping application in turn-by-turn navigation mode, showing an instruction to proceed straight on US-101 North for 20 miles. In this example, the road sign for US-101 is displayed inline within the text instruction "Go straight on US-101 North", as a substitute for the actual text "US-101". Some embodiments replace text names of roads with road signs when the road has a sign and that sign is available as an image to the mapping application.

The second example 2010 illustrates the highway shield displayed on the right side of the navigation sign rather than inline in the text instruction. This scenario illustrates an alternative display used by some embodiments for the same instruction as in example 2005. The highway shield in this case is displayed as the same size as the graphical indicator arrow on the left side of the navigation sign. In addition, because the information is presented in the road sign, the application removes the "on 101 North" portion of the text that would otherwise be present.

The third example 2015 illustrates the case in which the navigation sign is shaded to match the type of road shown in the highway shield. In this scenario, the instruction tells the user to go straight on CA-1 North. The "CA-1" is replaced with the highway shield sign for CA-1. While some embodiments shade this sign using green (the color of signs used for California state highways), other embodiments shade the navigation sign using the color of the road shield signs found along the actual highway. Other embodiments use green to match the color of road instruction signs found above freeways in the region in which the device is located (e.g., green for California).

The fourth scenario 2020 illustrates a merge maneuver onto Interstate-5 within the navigation sign. Much like the first example 2005, this illustrates the road shield sign as inline text. Furthermore, shading is used within the road shield in order to match the look of the actual interstate signs, with the top portion shaded red and the bottom portion shaded blue. As mentioned, some embodiments instead shade the entire navigation sign using a combination of these colors.

Although FIG. 20 does not illustrate different appearances of direction indicators 2090, the mapping application of some embodiments uses different appearances in order to adapt the direction indicators to fit the context of the navigation signs being displayed.

B. Dynamic and Animated Presentation of Signs

The above-described situations of FIG. 20 illustrate static display of the navigation signs (i.e., not showing any changes made to the signs). Some embodiments provide animation or other dynamic displays of these navigation signs. These displays include displaying the appearance of the sign passing over the head of the user representation (the navigation puck) in the map display as a user makes a maneuver and the sign is removed. In addition, subtle animation may be applied to a sign as a maneuver approaches in order to bring the upcoming maneuver to the user's attention. Finally, when two maneuvers occur in short succession, the application displays the navigation sign for the second maneuver as queued up behind the first sign.

1. Animated Removal and Presentation of Navigation Sign

Figure 21:
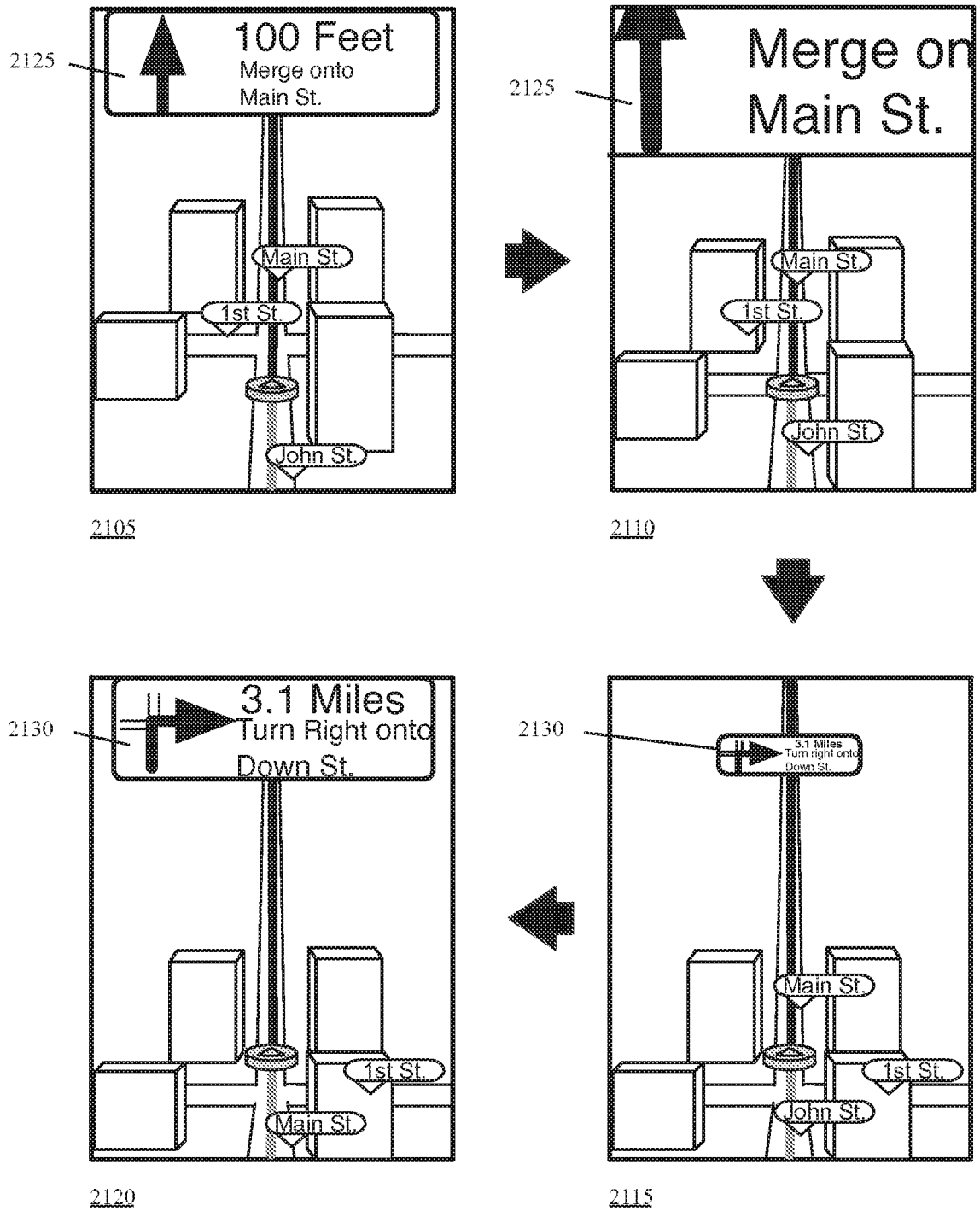
FIG. 21 illustrates, over four stages, the animation of some embodiments for removing a navigation sign and introducing the next sign.

FIG. 21 illustrates, over four stages 2105-2120, the animation of some embodiments for removing a navigation sign and introducing the next sign. In some embodiments, the animation of the removed sign mimics that of a road sign passing overhead on a highway. While this figure illustrates the animation within the context of 3D mode, some embodiments also include the animation in 2D mode. Other embodiments specifically provide the animation for 3D mode.

The first stage 2105 illustrates a navigation sign 2125 indicating a maneuver of merging onto Main St. for the user to perform in 100 ft. The second stage 2110 illustrates the animation to remove the navigation sign 2125 as the user performs the maneuver. As the user physically merges onto Main St., the navigation sign 2125 enlarges and begins disappearing from the field of view, as would a road sign above a freeway. In some embodiments, the mapping application also applies a perspective tilt to the sign, to further mimic the appearance of the sign passing overhead.

At the third stage 2115, the subsequent navigation sign 2130 begins to appear from the horizon, or a closer approximation of the horizon. Some embodiments do not actually render the map all the way out to the horizon in 3D mode, and start animating the upcoming navigation sign from the distance at which the 3D rendering ends. This animation is meant to resemble the approach towards a road sign on the freeway, though often at a faster speed (in order to quickly bring the navigation sign to full size, and avoid the distraction of a lengthy animation). The fourth stage 2120 illustrates the resultant display, with the subsequent navigation sign 2130 displayed at the top of the screen in the normal position.

In addition to the animations shown in FIG. 21, some embodiments also include more complex animations in some cases. As one example, some embodiments rotate a navigation sign as it leaves the display when a user makes a turning maneuver, in order to mimic the appearance of a user turning underneath the sign.

2. Occasional Emphasis

In some cases, the mapping application may display a navigation sign well before the maneuver described by the navigation sign will be performed. For instance, if a user enters a freeway, and the next maneuver involves a freeway exit in 15 miles, the application may display a navigation sign indicating the upcoming freeway exit well before the user needs to begin preparing to actually exit the freeway. When it comes time to alert the user that the juncture at which to perform the maneuver is approaching, different embodiments use different techniques. Some embodiments include audio alerts, with the user device providing voice navigation to indicate that the juncture is approaching.

Some embodiments, either in conjunction with the audio alert or whenever the audio alert is turned off, provide a visual indication that the maneuver is upcoming through the display of the sign. For instance, in some embodiments the application modifies the color of the sign (e.g., from green to white or green to yellow) along with the color of the graphical indicator arrow (e.g., from white to black). Other embodiments display a less obtrusive shimmer over the navigation sign, intended to catch the user's attention without being overly obtrusive.

Figure 22:
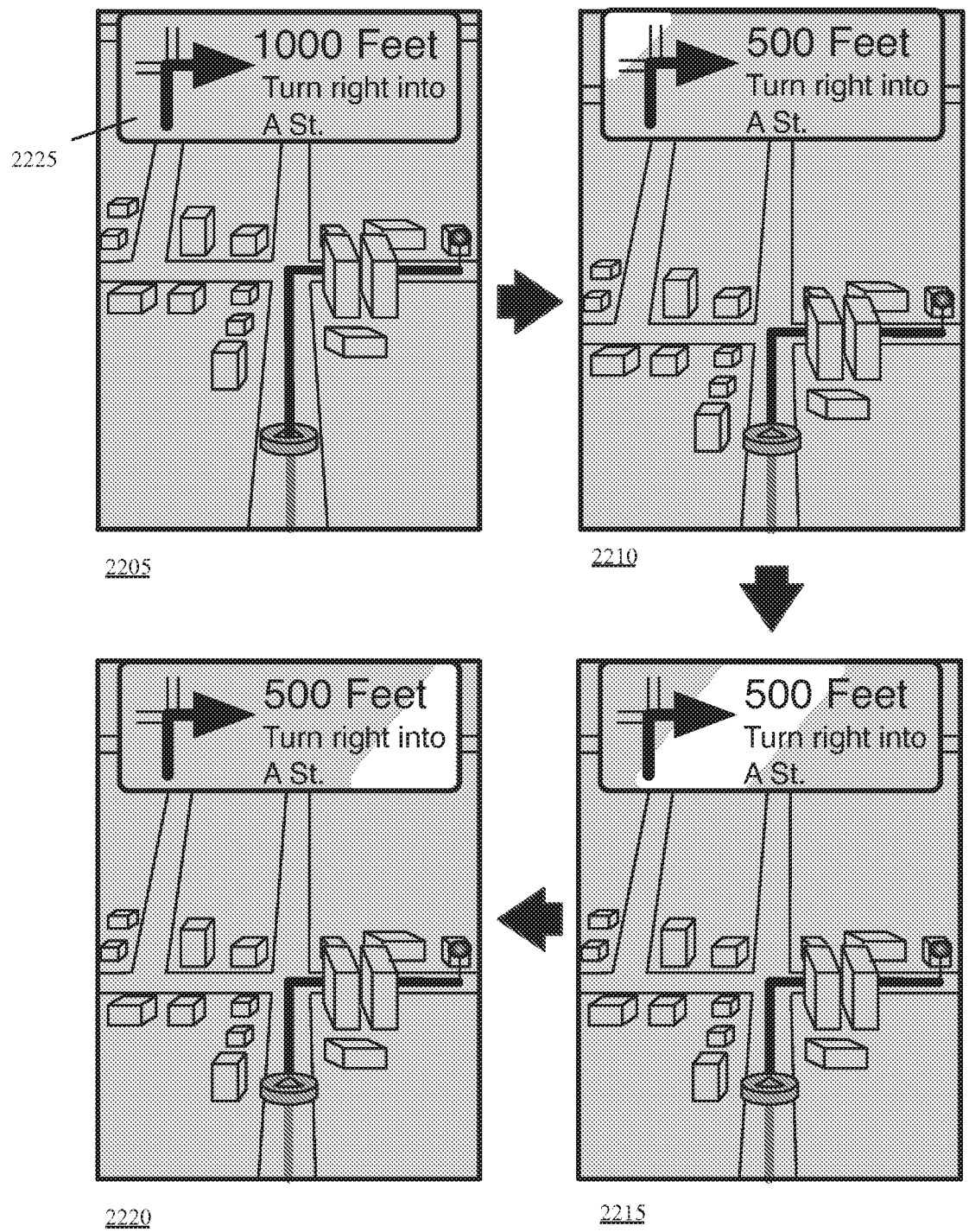
FIG. 22 illustrates such a shimmer animation over four stages that illustrate the background of the display as gray, in order to contrast with the shimmer as it moves across the sign in some embodiments.

FIG. 22 illustrates such a shimmer animation over four stages 2205-2220. These stages illustrate the background of the display as gray, in order to contrast with the shimmer as it moves across the sign (shown in white). The first stage 2205 illustrates a navigation sign 2225, currently indicating a right turn maneuver in 1000 ft.

At the second stage 2210, the right turn is now only 500 ft. away. The application has judged that this is the appropriate distance at which to alert the user to the upcoming maneuver, and therefore has begun displaying a shimmer across the navigation sign 2225. The third and fourth stages 2215 and 2220 illustrate the continuation of this animation. In some embodiments, the animation resembles a light being moved across the sign from left to right. Other embodiments display a similar animation from right to left, or other such animations (e.g., a light radiating out from the center of the sign, etc.).

Some embodiments vary the distance from the maneuver at which the animation begins based on various factors, such as the speed at which the device is moving (based on location tracking information) and the speed limit of the road on which the user is currently traveling. For example, some embodiments have a set time before the intersection that the animation should be displayed, and use this speed information to calculate the appropriate distance. Some embodiments also vary the distance based on the type of maneuver being made (e.g., allowing more time for exiting a freeway than for making a right turn off of a one-lane road).

3. Secondary Signs

When a route requires two distinct maneuvers in rapid succession, some embodiments display the navigation sign for the second maneuver as stacked underneath the navigation sign for the first maneuver. This alerts the user to the impending nature of the second maneuver. When several maneuvers will be performed in succession, some embodiments stack more than two navigation signs on top of each other.

Figure 23:
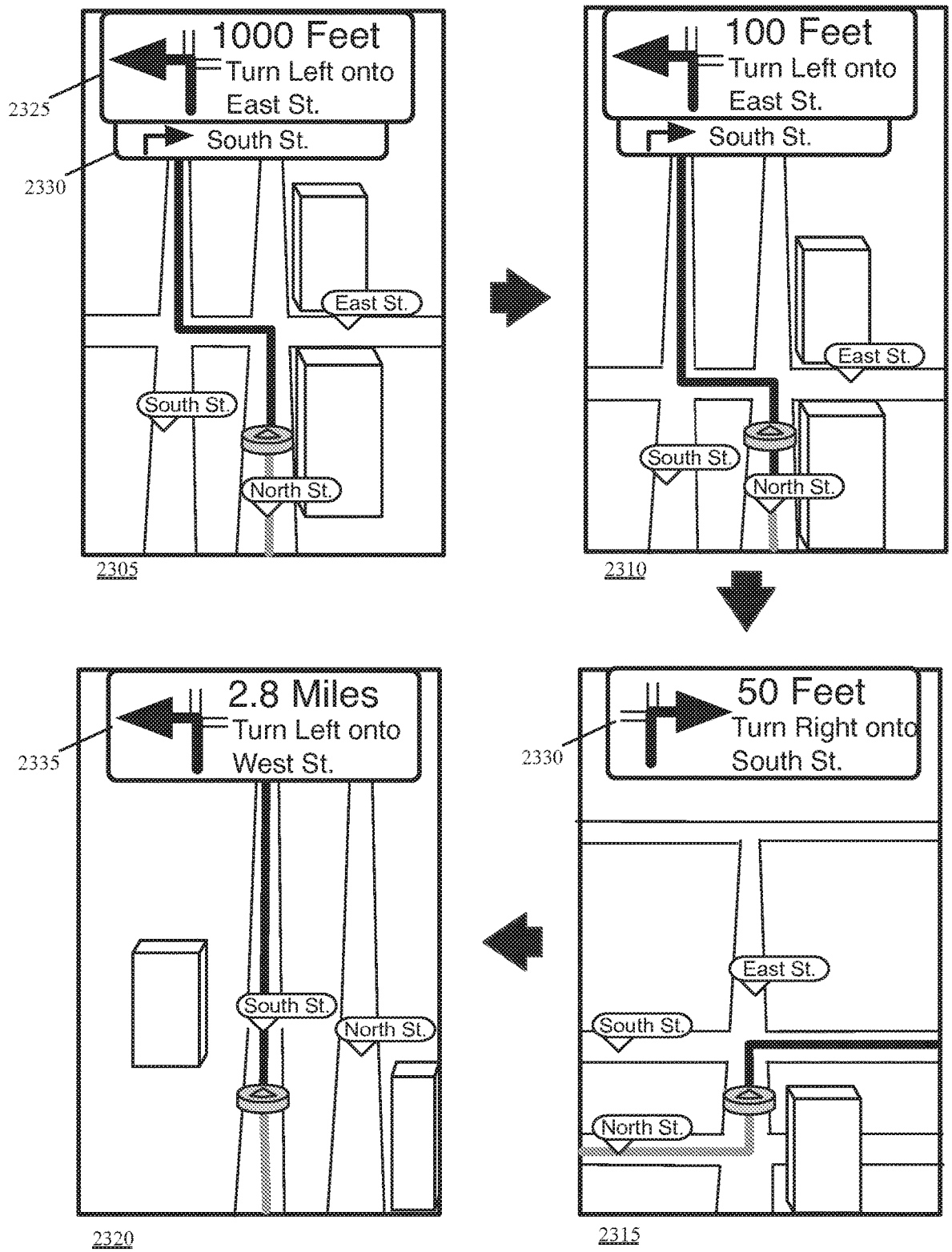
FIG. 23 illustrates the display of two signs for maneuvers in quick succession over four stages in some embodiments.

FIG. 23 illustrates the display of two signs for maneuvers in quick succession over four stages 2305-2320. In the first stage 2305, a first navigation sign 2325 indicates that the upcoming maneuver, at a distance of 1000 ft., is a left turn onto East St. As this is a full size turn-by-turn navigation sign, the application displays a first type of graphical indicator arrow (i.e., a complex arrow) for this maneuver. As can be seen on the map with more careful review than may be available to a driver (who will mostly be looking at the road), a right turn onto South St. will be required shortly after the left turn onto East St. in order to follow the given route. In order to make this more apparent to the user, the application displays a second navigation sign 2330 underneath the first navigation sign 2325. The second sign includes a second type of graphical indicator arrow (i.e., a simpler arrow) as less space is provided. Furthermore, less information is provided to the user in the second sign 2330.

The second stage 2310 illustrates that the user has now traveled 900 feet, so that there are only 100 ft. from the left turn maneuver. Other than the updates to the distance in the navigation sign 2325 (and the movement of the 3D map), the display has not yet changed. The third stage 2315 illustrates the display immediately after the left turn maneuver has been performed onto East St. As shown, the second navigation sign 2330 is now a full-sized navigation sign with a complex graphical indicator arrow and additional textual information (a distance of 50 feet and text instructions to turn right). Some embodiments animate the transition from the smaller sign to the full-size sign, while other embodiments simply replace one with the other.

The fourth stage 2320 illustrates the display after the user has made the second maneuver (the right turn onto South St.). The application now displays a navigation sign 2335 for the next maneuver, a left turn onto West St. Because this maneuver is 2.8 miles away, the application did not stack sign 2335 under sign 2330. Because the navigation is in 3D mode, some embodiments do display the animation described above by reference to FIG. 21.

In the above example, the application stacks signs for maneuvers that occur 50 feet apart, but does not stack signs for maneuvers that occur several maneuvers apart. The threshold distance for when to consider two maneuvers subsequent may depend on a variety of factors. Some embodiments store a set distance that is not variable. Other embodiments look at the type of roads involved in the maneuver (e.g., based on a functional road class variable that describes the road in back-end map data) or the speed limits, assume a likely speed for the user after the maneuver, and set the threshold distance based on this data (i.e., based on a threshold time between maneuvers, such as 30 seconds).

III. Dynamic Generation of Adaptive Directional Indicators

The above section described various features of the navigation signs provided for turn-by-turn navigation. As shown, these navigation signs include directional indicators that graphically describe a maneuver for the user to perform and, in some cases, also show a context for the maneuver by indicating other branches of the intersection at which the maneuver is performed. These directional indicators may appear in various different contexts throughout the mapping and navigation application, both in various aspects of turn-by-turn navigation as well as route inspection.

In order to generate the directional indicators, the mapping application receives data about each of the intersections (also referred to in some places below as junctures) that indicates the different branches of the intersection and notes through which branches the maneuver enters and exits the intersection. In some embodiments, this intersection information is stored by a mapping service that the mapping application accesses in order to retrieve map data as well as route and navigation information. In this Section, subsection A initially describes the generation of this intersection data by the mapping service servers. Subsection B then describes the dynamic generation of the directional indicators by the mapping application operating on the client device.

A. Server Side Generation of Intersection Data

The mapping service of some embodiments receives data specifying each junction of road segments. In some embodiments, the mapping service automatically generates additional data for each of these junctions stored in the map data, and in some embodiments converts the junction data into intersection data. This junction information simplifies each received junction (or a set of related junctions that are viewed in the real world as a single intersection) into a set of branches leaving the junction at different angles. When a user requests a route through a mapping application operating on a device, the device sends the request to the mapping service, which generates a route from a starting location to an ending location. The mapping service also generates turn-by-turn navigation instructions for the route in some embodiments, using the intersection data. The mapping service identifies the intersections at which maneuvers are made, and modifies the intersection data to be specific to the maneuver made during the route. This data is then sent to the user device on which the client mapping application runs. The following subsections first introduce the creation of navigation data for a route, then discuss the precalculation of intersection data by the mapping service (so that the data is available for use in generating navigation data), and then finally describe specific types of modifications made to the intersection data for a requested route.

1. Navigation Data Creation

Figure 24:
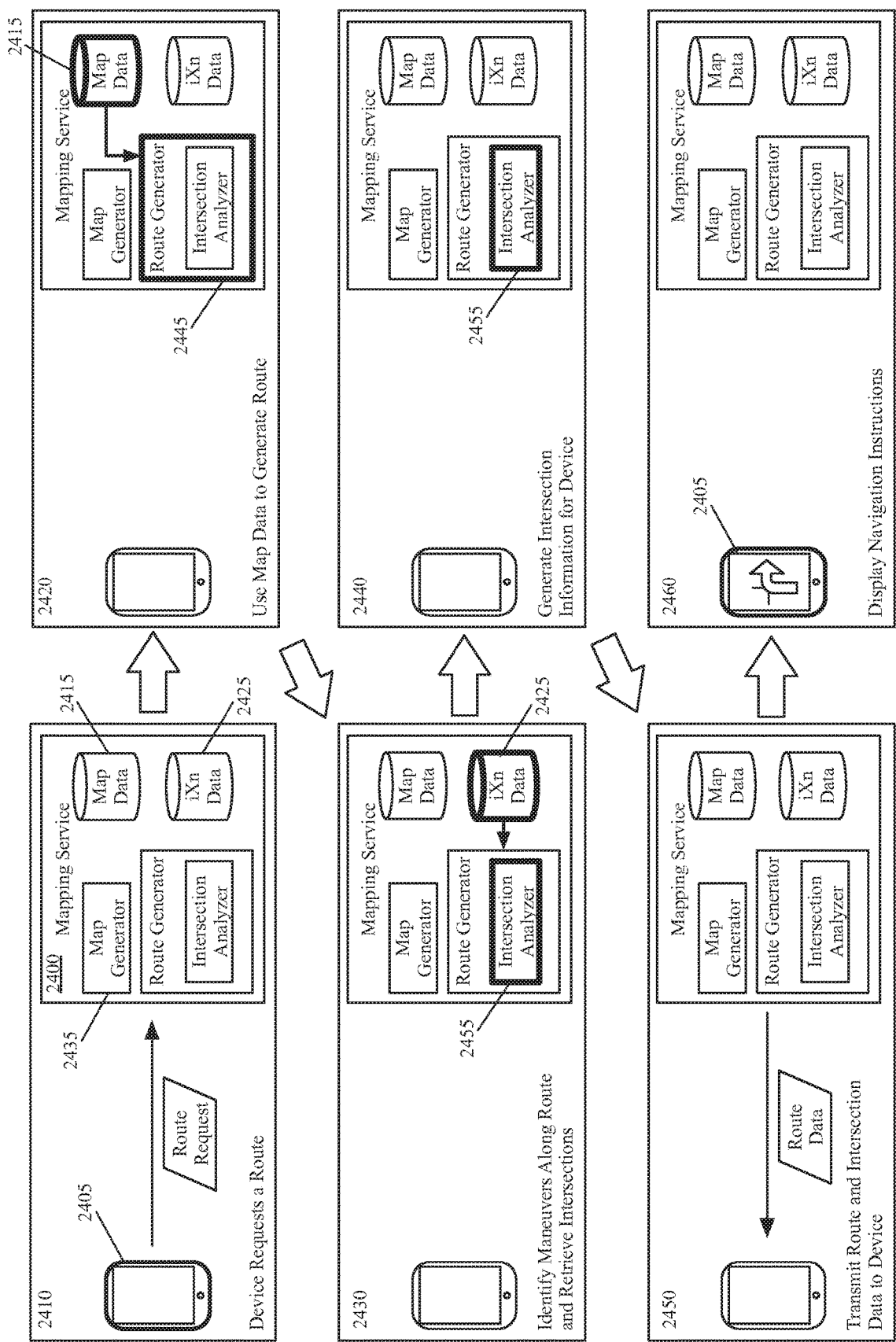
FIG. 24 conceptually illustrates an operation performed by a mapping service of some embodiments to generate a route for a requesting device and provide the route, with navigation instructions, to the requesting device.

FIG. 24 conceptually illustrates an operation performed by a mapping service of some embodiments to generate a route for a requesting device and provide the route, with navigation instructions, to the requesting device. FIG. 24 illustrates this operation over six stages 2410-2460, in which the mapping service receives a request for the route, generates the route, generates intersection data for the route, and provides the route to the device, which uses the information to display navigation instructions.

As shown, each stage of FIG. 24 illustrates a device 2405 and a mapping service 2400. The device 2405 may be a handheld device in some embodiments (e.g., a smart phone, tablet device, etc.), or may be a dedicated navigation device (e.g., a navigation system built into an automobile, a portable navigation device, etc.). In addition, in some embodiments, the device 2405 may be a non-portable device such as a desktop computer or other non-portable computing device.

The mapping service 2400 is a service to which the device 2405 connects (e.g., via a wired connection, wireless connection such as a cell network, Wi-Fi, etc.) in order to request and receive map data, route data, turn-by-turn navigation data, as well as additional information (e.g., information about places located on the map, etc.). As shown, the mapping service 2400 stores map data 2415 and intersection data 2425, and includes a map generator 2435 and route generator 2445, among other modules (not shown).

The map data 2415 provides data from which viewable map regions and routes can be generated. This map data, in some embodiments, includes latitude and longitude data, name data, as well as descriptive data about roads and other pathways (e.g., walkways, ferry routes, bike paths, etc.), natural features (e.g., rivers, lakes, mountain ranges, etc.), places of interest (e.g., buildings, businesses, parks, etc.), and other map items. In some embodiments, for example, a pathway is defined as a series of latitude/longitude vertices, a name, and descriptive data. This descriptive data may include a form of way (i.e., whether the pathway is a single carriageway or a part of a dual carriageway, whether the pathway is a one-way path), the class of road to which the path belongs (e.g., motorway, local road, private road, bicycle path, etc.), as well as other information). In some embodiments, this map data is compiled by an outside source (i.e., a map provider) and provided to the mapping service, while in other embodiments the mapping service provides its own map data. The map data may also be a hybrid of outsider-provided and internally-generated data. In addition, the map data may include geometry data for various map constructs, such as roads, land cover, etc.

The intersection data 2425 provides pretabulated data for the intersections of road paths in the map data. In some embodiments, as described below, the mapping service automatedly calculates intersection data for road pathway intersections using the map data. This intersection data 2425 may be stored by denoting an intersection type (e.g., point, roundabout) and a series of branches coming in and out of the intersection at different angles. While the map data 2415 and the intersection data 2425 are shown as separate storages, these may both be stored on the same physical storage or on separate physical storages, and the intersection data 2425 may in fact be part of the map data 2415. In addition, one or both of the map and intersection data might be distributed across several physical storages (e.g., a series of disks for storing the map data).

The map generator 2435 of some embodiments generates map information (e.g., map tiles) to transmit to the requestor device. The requestor device requests a map for a particular region (e.g., using latitude/longitude information), and the map generator 2435 creates (or uses pre-generated) map tiles for the region, then sends data for these tiles (e.g., as encoded vector and/or image data) to the device.

The route generator 2445 calculates optimal routes between two or more points in response to user requests. In some embodiments, the route generator 2445 calculates the routes based on the map data, using optimization algorithms. The routes may be defined as a series of intersections, a series of road pathways, or in other manners. In addition, when a user requests a route, the route generator 2445 provides intersection data for use by the device in turn-by-turn navigation. In some embodiments, the intersection analyzer 2455 retrieves intersection data 2425, and modifies this data for navigation of the route, as described below.

As shown, at stage 2410, the device 2405 sends a request for a route to the mapping service 2400. In some embodiments, the user enters a starting address (or place) and an ending address (or place), potentially including additional midpoint locations (e.g., starting at A, going to B, then going to C from B). The device then transmits location information to the mapping service. In some embodiments, the device translates the locations into latitude and longitude data, while in other embodiments this conversion is performed by the mapping service.

At stage 2420, the route generator 2445 accesses the map data 2415 in order to generate one or more routes for the series of locations. In some embodiments, the route generator 2445 uses an optimization algorithm to find the best (and second best, third best, etc.) route that connects the series of locations.

At stage 2430, the intersection analyzer 2455 identifies maneuvers along the route for which navigation directions need to be generated and retrieves intersection information for these maneuvers. Some embodiments generate turn-by-turn navigation directions to provide to the device along with the route. To generate these directions, the mapping service 2400 identifies each time the route changes pathways, at which point the user following the directions will have to perform a maneuver (e.g., right turn, slight left turn, U-turn, merge, etc.). In some embodiments, each of these pathway changes corresponds to a pretabulated intersection stored in the intersection data 2425. The intersection analyzer 2455 retrieves this intersection data. In some embodiments, each intersection is stored as a series of branches coming out of the intersection at various angles (e.g., based off of North=0°). In some embodiments, in addition to the intersection data, the route generator creates routing directions, that generally describe the maneuver to be performed. Examples of such descriptions include "turn left", "highway off ramp", "U-turn", etc. In other embodiments, this description is derived by the client mapping application based on the received intersection data.

Next, at stage 2440, the intersection analyzer 2455 generates intersection information designed for the route. In some embodiments, this entails modifying the angles to set the direction of travel into the junction to 0° (i.e., setting the branch on which the route enters the junction to 180°). This effectively rotates the intersection description by the difference between due North and the route's incoming direction of travel. In addition, the intersection analyzer 2455 tags one of the branches as the exit branch. Some embodiments tag an entrance branch as well, while other embodiments rely on the device to identify the 180° branch as the entrance branch.

Stage 2450 illustrates that the mapping service 2400 then transmits (e.g., via the same network that the device used to transmit the route request) the route data (i.e., route data and intersection data for navigation) to the device 2405. As shown at stage 2460, the device 2405 then uses the intersection and route data generated by the mapping service to display navigation instructions for the user of the device. In some embodiments, the navigation instructions include a display of the intersection along with a stylized arrow showing the maneuver (in this case, a right turn) through the intersection.

While the mapping service 2400 is displayed as including a map generator module and a route generator module, one of ordinary skill in the art will recognize that the mapping service may include additional modules, or different breakdowns of modules. The mapping service may consist of a single computing device (e.g., a server) storing all of the functionality and data, or the functionality may be distributed between multiple servers (e.g., one process on a first server and a second process on a second server, numerous servers that perform the same operation in parallel for different users, or other configurations of computing devices that perform the functionality described herein).

Figure 25:
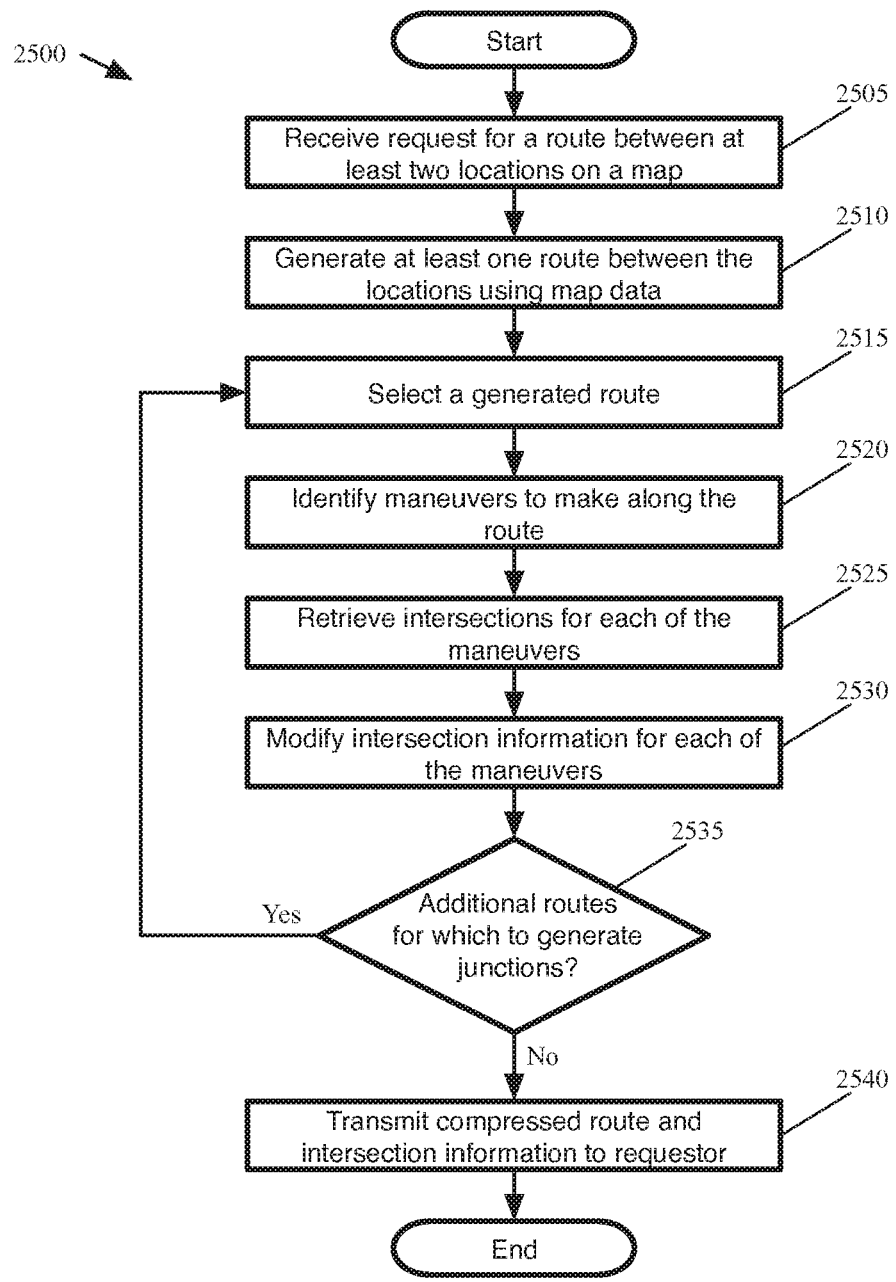
FIG. 25 conceptually illustrates a process performed by the mapping service of some embodiments in order to generate and transmit route and intersection data to a user.

FIG. 25 conceptually illustrates a process 2500 performed by the mapping service of some embodiments in order to generate and transmit route and intersection data to a user. As shown, the process 2500 begins by receiving (at 2505) a request for a route between two locations on a map. In some embodiments, when the user requests a series of more than two locations, each segment is treated as a separate route (i.e., from point A to point B is a first route, then point B to point C is a second route).

The process then generates (at 2510) at least one route between the locations using map data. In some embodiments, the process uses an optimization algorithm to identify the best (or two best, three best, etc.) routes between the two locations. These routes may be described as a series of vertices along pathways, a series of intersections between pathways, or with another description.

With the routes generated for the start and end locations, process 2500 selects (at 2515) one of the generated routes in order to create turn-by-turn instructions for the route. The process then identifies (at 2520) maneuvers to make along the route. In some embodiments, the mapping service identifies each time the route changes pathways, at which point the user following the directions will have to perform a maneuver (e.g., right turn, slight left turn, U-turn, merge, etc.).

Next, the process retrieves (at 2525) intersections for each of the maneuvers. In some embodiments, each of these pathway changes corresponds to a pretabulated intersection stored by the mapping service. The generation of these intersections is described in detail below. In some embodiments, each intersection is stored as a series of branches coming out of the intersection at various angles (e.g., based off of North=0°). In addition, the intersection data stores the type of intersection in some embodiments (e.g., point, roundabout, traffic square, etc.).

The process then modifies (at 2530) the intersection information for each of the maneuvers. In some embodiments, this entails modifying the angles to set the direction of travel into the junction to 0°(i.e., setting the branch on which the route enters the junction to 180°). This effectively rotates the intersection description by the difference between due North and the route's incoming direction of travel. In addition, some embodiments tag one of the branches as the exit branch. Some embodiments tag an entrance branch as well, while other embodiments rely on the device to identify the 180° branch as the entrance branch.

The process 2500 next determines (at 2535) whether additional routes remain for which to generate maneuver/intersection information. When additional routes remain, the process returns to 2515 to select the next route. Different variations of routes from a start location to an end location may overlap in part, in which case some embodiments reuse the already-generated set of intersections for the overlapping portions.

Once intersections are generated for all of the routes, the process transmits (at 2540) the route and intersection information to the requestor (e.g., a requesting device). As mentioned, the requesting device uses this information in some embodiments in order to generate turn-by-turn navigation, including stylized junction/maneuver arrows.

2. Precalculation of Intersection Data

As mentioned above, some embodiments precalculate intersection data from the stored map data (e.g., road segment and junction data). The mapping service then stores this intersection data for use in generating turn-by-turn navigation instructions. The following section describes several processes used to generate this intersection data, in which the mapping service receives vendor-provided junctions, identifies whether any sets of the received junctions should be consolidated into a single intersection, identifies pairs of road segments that should be joined together within an intersection, and generates angles for the intersection. Within this section, the term junction will be generally used to refer to vendor-provided information at which two path segments intersect, while the term intersection will refer to data generated from the junctions that represents where two or more roads meet in the real world. Thus, multiple junctions might be consolidated into one intersection, and junctions between two road segments that are actually just a continuation of a single road might not be considered intersections at all, in some embodiments.

The following represents pseudocode of some embodiments for generating intersection data for point intersections:

Identify all internal segments;
Identify all internal turn channels and mark them as
   internal segments;
For each internal segment:
   Gather all contiguous internal segments;
   Mark the gathered internal segments as processed;
   Build an intersection from this collection of internal
      segments;

In addition to other data (e.g., locations of parks, waterways, businesses, etc.), the map data stores information about pathways (i.e., roads, walkways, bike paths, etc.). Each pathway, in some embodiments, is received from a map provider as a series of segments (e.g., road segments). For a given segment, in some embodiments the stored data includes start and end junctions for the segment, geometry data that defines the course taken by the path between the start and end junctions, a path characterization (or "form of way"), a direction of travel (which may, in some embodiments, involve a one-way flag), one or more names for the path (e.g., "I-405 S", "San Diego Freeway", etc.), a class that indicates the level of importance of the path, and a netclass (a connected graph of paths to which the path belongs). In some embodiments, the geometry information comprises a series of latitude/longitude vertices through which the path travels. The form of way attribute, in some embodiments, includes the following characterizations: single carriageway, dual carriageway, motorway, slip road, connector, walkway, stairs. Some embodiments may include additional characterizations.

Figure 26:
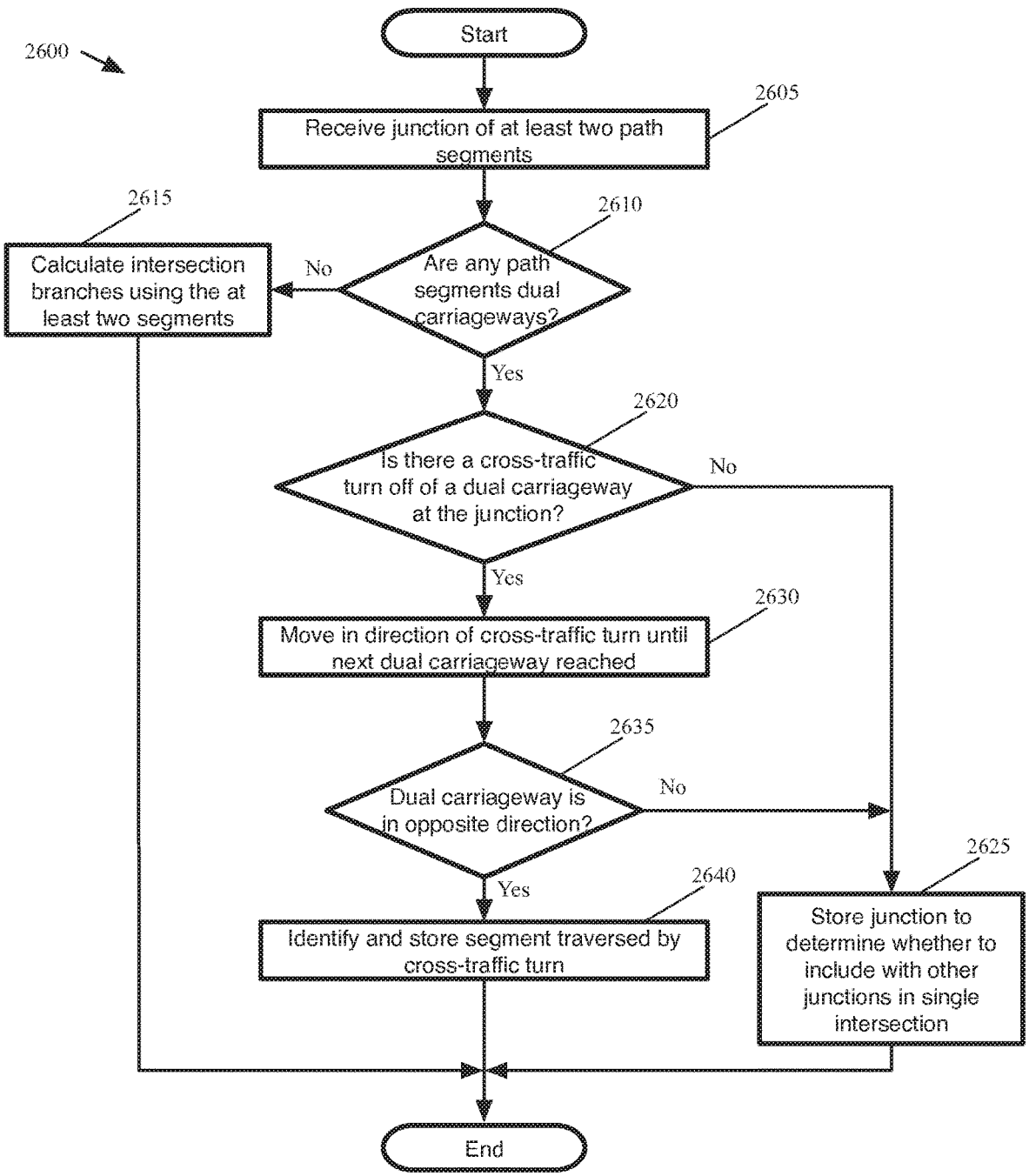
FIG. 26 conceptually illustrates a process of some embodiments for determining path segments between sets of junctions that should be treated together as single intersections.

FIG. 26 conceptually illustrates a process 2600 of some embodiments for determining path segments between sets of junctions that should be treated together as a single intersection. As shown, the process 2600 begins by receiving (at 2605) a junction between at least two path segments (e.g., road segments). In some embodiments, the mapping service receives (e.g., as precalculated data from a map vendor) a set of road segments and a set of junctions. Each road segment follows a path between two such junctions, and each junction references at least two road segments that enter and/or exit the junction. On the other hand, in some embodiments, the junctions are not received from the map data vendors and the mapping service traverses the path data to identify intersections between paths and analyzes these intersections in order to pretabulate the junctions.

The process then determines (at 2610) whether any of the path segments at the received junction are dual carriageways. As mentioned, a dual carriageway is a path characterization used in some forms of map data. Many roads that are divided (e.g., by a median, a double-yellow line, etc.) are received (and drawn) as two separate path segments, one for each direction. Each of the path segments is then marked with a direction of travel and as one-half of a dual carriageway. Because a user will typically think of an intersection of two roads that are both divided by medians as a single intersection (rather than four separate intersections), the junction generation process attempts to unify these four received junctions into a single intersection to present to a user for navigation purposes.

Figure 27:
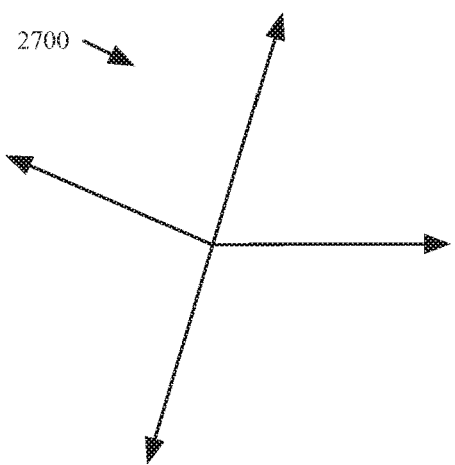
FIG. 27 illustrates an example of a junction and shows that there is no requirement that the path segments meet at right angles or that the paths continue in a straight line through the junction in some embodiments.

When none of the path segments are marked as dual carriageways, the process calculates (at 2615) the intersection branches using only the path segments specified in the received junction (i.e., the intersection will include only the one received junction). In some embodiments, the calculation of junction branches entails calculating the angle at which each of the segments specified for the junction leaves the junction location. The process then ends. FIG. 27 illustrates an example of such a junction 2700, also illustrating that there is no requirement that the path segments meet at right angles or that the paths continue in a straight line through the junction.

Figure 28:
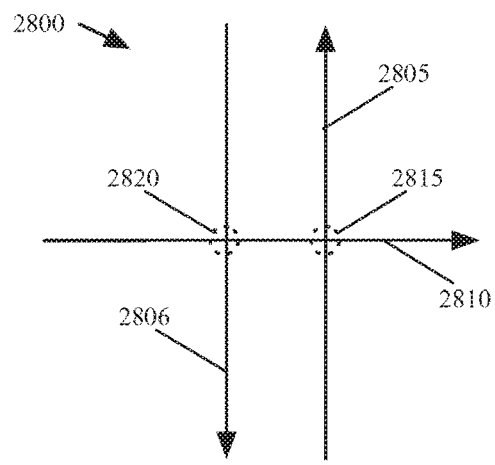
FIG. 28 illustrates an intersection that includes two dual carriageway paths and a one-way road in some embodiments.

When at least one path segment specified for the received junction is a dual carriageway, the process determines (at 2620) whether there exists a cross-traffic turn off of a dual carriageway at the junction. A cross-traffic turn is a turn off of the dual carriageway in a direction that will cross through the matching half of the dual carriageway (i.e., the other direction of the road), assuming it exists. In the United States, a left turn is a cross-traffic turn. While the examples shown in this document involve right-handed driving (i.e., driving on the right side of the road), one of ordinary skill will recognize that the examples are equally applicable to left-handed driving areas (e.g., England) as well. FIG. 28 illustrates an intersection 2800 that includes two dual carriageway paths 2805 and 2806 and a one-way road 2810. At the junction 2815, there is no cross-traffic turn off of a dual carriageway, because the only options are a right turn off of the the dual carriageway path 2805 or a left turn off of the one-way street 2810. When no such turn exists, the process 2600 stores (at 2625) the received junction while recognizing that it may still be part of a larger intersection, in order to determine whether to include the received junction with other received junctions (e.g., the junction 2820 between the one-way road 2810 and the dual carriageway path 2806) in a larger intersection. For instance, in the intersection 2800, the process will want to join the received junction 2820 with the received junction 2815 into a single larger intersection. The process then ends.

When a cross-traffic turn off of a dual carriageway exists at the junction (for instance, at junction 2820), the process moves (at 2630) in the direction of the cross-traffic turn until the next dual carriageway path is reached. In some embodiments, because the path segments start and stop at junctions, the next dual carriageway path will be reached at a different received junction (though not necessarily the next junction, if a road such as a left turn lane is received as a separate path segment). For instance, from intersection 2820, the process would traverse the path 2810 away from the junction 2820 until reaching the next dual carriageway, at junction 2815.

The process 2600 then determines (at 2635) whether the dual carriageway path reached at 2630 has a direction of travel in the opposite direction of the originating dual carriageway path. This, essentially, is a quick determinant of whether the second dual carriageway could be the matching path for the first dual carriageway (i.e., whether they are likely to be two sides of the same road). In most cases, this next dual carriageway will be the matching path, due to the nature of how roads are typically built.

In the case when the second dual carriageway is not in the opposite direction of the originating path, the process proceeds to 2625 to store the newly reached junction for later use in determining whether to include it with any other received junctions. For example, if the left turn off of path 2806 reached another dual carriageway with a downward direction of travel, then path 2806 could be assumed to not have a match in the data (as far as the junctions are concerned, at least), but the newly identified path might itself have a match.

On the other hand, if the two dual carriageways have opposite directions of travel, the process identifies and stores (at 2640) the segment traversed by the cross-traffic turn. In the example of FIG. 28, the segment from junction 2820 to junction 2815 would be stored. This segment will be used as part of additional junction consolidation processes in some embodiments. The process then ends.

Figure 30:
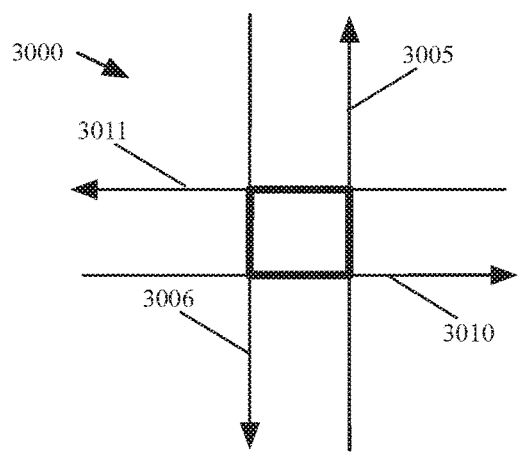
FIG. 30 illustrates a commonly existing intersection, between a dual carriageway with two paths and a dual carriageway with two paths in some embodiments.
Figure 29:
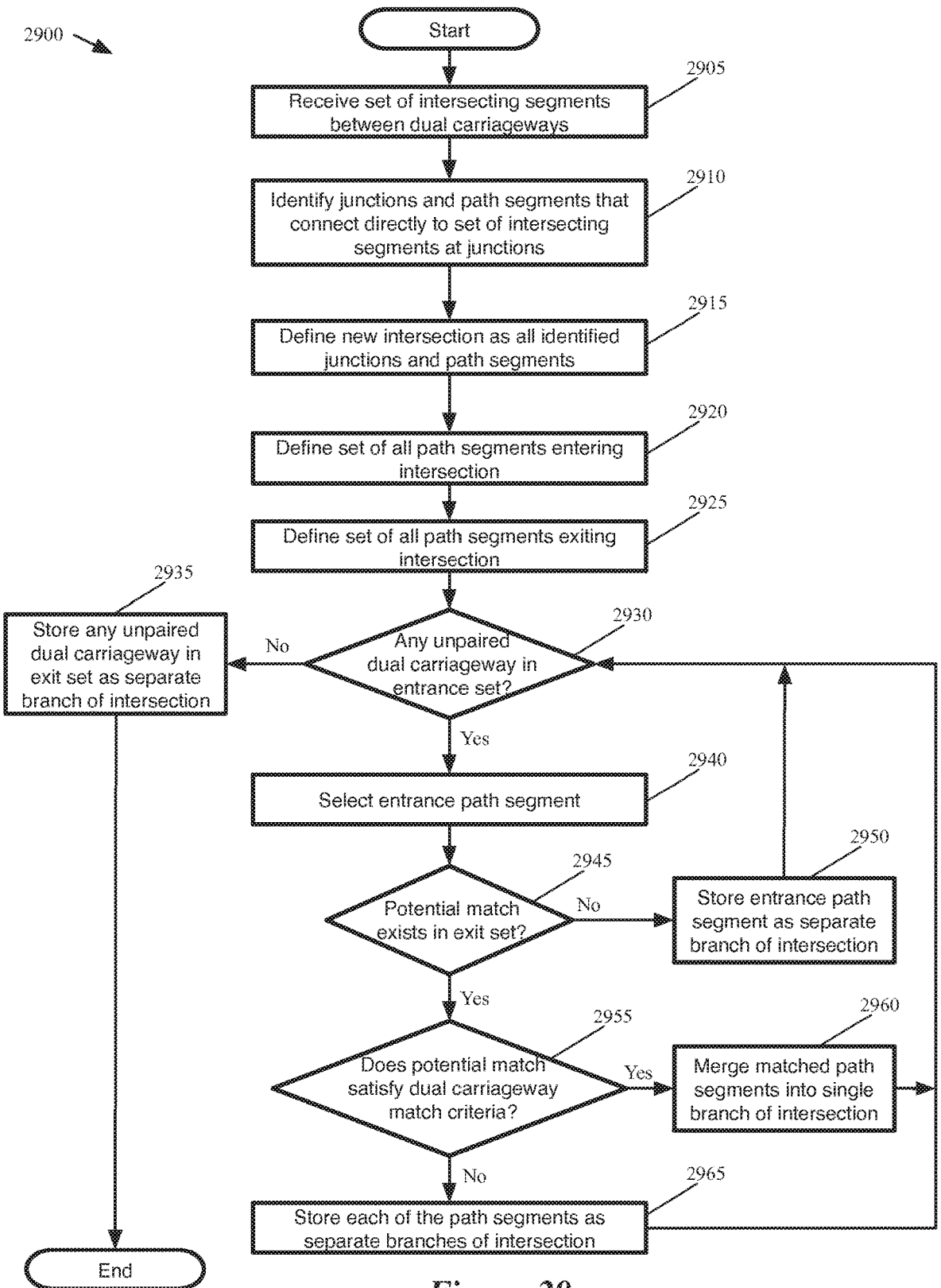
FIG. 29 conceptually illustrates a process for linking together several junctions into a single intersection and identifying the branches of the intersection in some embodiments.

The above process 2600, when applied to all the junctions within a map region, will generate a set of segments between dual carriageways. Some embodiments use these segments to link together received junctions and identify additional received junctions to include in a single intersection definition. The following represents pseudocode of some embodiments for identifying all such "internal" segments for a complex intersection:

For each segment that is a dual carriageway;
    For each connection with cross-traffic turn where a path can be assembled to other side of intersection;
        Mark all segments on the path to other side as internal segments;

This pseudocode includes a determination as to whether a path can be assembled to the other side of an intersection from a segment. The following includes pseudocode of some embodiments for such a determination:

Add first segment to path;
Get connections from last segment on path;
Iterate through each connection to either find a connection to other side or find connection that is best continuation;
    If connection is other side, note success and end;
    If no connection is other side and no connection is the best continuation, note
    failure and end;
    Otherwise:
        Add segment to end of path;
        If path is too far, note failure and end;
        If too many crossings, note failure and end;
        Otherwise return to get connections for added segment and iterate through connections;

FIG. 29 conceptually illustrates a process 2900 for linking together several junctions into a single intersection and identifying the branches of the intersection. The process 2900 begins by receiving (at 2905) a set of intersecting segments between dual carriageways. These segments may be identified using a process such as that shown in FIG. 26, in some embodiments. The mapping service then groups together sets of such segments that intersect each other (i.e., at received junctions). FIG. 30 illustrates a commonly existing intersection 3000, between a dual carriageway with paths 3005 and 3006 and a dual carriageway with paths 3010 and 3011. The set of intersecting segments are shown in this figure as thicker lines.

The process then identifies (at 2910) all junctions and path segments that connect directly to the set of intersecting segments at junctions. That is, the set of intersecting paths intersect at junctions, but these junctions may contain additional path segments. For instance, in the example intersection 3000, the eight dual carriageway path segments that leave the intersection all intersect with the internal (thicker) path segments at the four junctions. Thus, the four junctions and eight external path segments are all included in the intersection.

Figure 31:
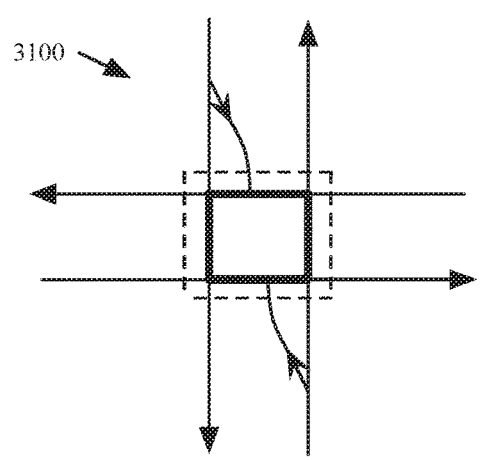
FIG. 31 illustrates an intersection in which left-turn channels are defined as separate path segments in some embodiments.

FIG. 31, on the other hand, illustrates an intersection 3100 in which left-turn channels are defined as separate path segments. In this case, because the left-turn channels intersect the internal segments at junctions received in the initial map data, these channels are identified by the process 2900. The left-turn channels may be characterized in the map data as slip roads or single carriageways, in most cases.

The following represents pseudocode of some embodiments for identifying all turn channels to treat as "internal" to an intersection:

For each segment that is a dual carriageway;
        For each connection with cross-traffic turn where a path can be assembled to internal segments;
            Mark all segments on the path to the internal segments as internal segments themselves;

This pseudocode includes a determination as to whether a path can be assembled to the internal segments from a segment (e.g., a turn channel). The following includes pseudocode of some embodiments for such a determination:

Add first segment to path;
    Get connections from last segment on path (i.e., segments connected to last segment at junction);
    Iterate through each connection to either find either an internal segment or find connection that is best continuation;
        If connection is an internal segment, note success and end;
        If no connection is internal segment and no connection is the best continuation, note failure and end;
        Otherwise:
            Add segment to end of path;
            If path is too far, note failure and end;
            If too many crossings, note failure and end;
            Otherwise return to get connections for added segment and iterate through connections;

Next, the process 2900 defines (at 2915) a new intersection as including all of the identified junctions and path segments, including those that directly intersect the initial set of path segments. In some embodiments, in the case illustrated in FIG. 31, the junctions where the left-turn channels leave their originating dual carriageway segments would be included as well as the left-turn channels that intersect the initial segments. In this situation, some embodiments identify the other junction (i.e., the start junction) for the slip road or single carriageway path segment, which will be where the path segment intersects with one of the dual carriageway path segments before entering the intersection. When the single carriageway path segment stays internal to a (presumed) pair of dual carriageway paths for a threshold distance (e.g., 1 km), some embodiments assume the path segment is a part of the road defined by the dual carriageway paths, and eliminate the junction from consideration.

Figure 32:
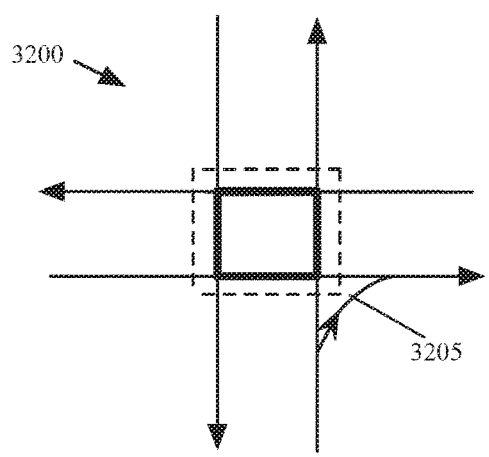
FIG. 32 illustrates a slip mad in an intersection in some embodiments.
Figure 33:
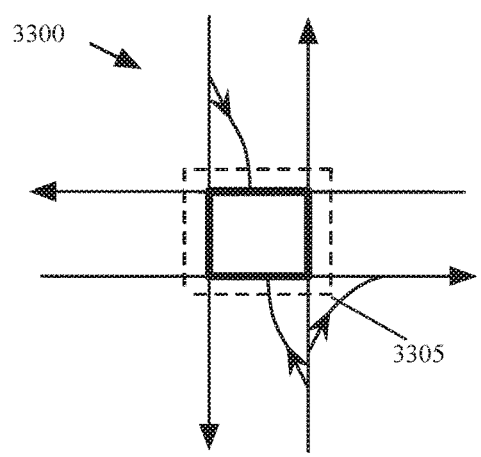
FIG. 33 illustrates a slip road in an intersection in some embodiments.

When processing a slip road or other connector outside of the dual carriageways (e.g., the slip road 3205 shown in the intersection 3200 of FIG. 32), some embodiments do not treat the slip road as a path into the dual carriageway intersection. Instead, some embodiments identify the path characterization as a slip road and attempt to form a closed loop including the start and end junctions of the slip road. When this closed loop shares a common junction with the newly defined intersection (as will typically be the case), the slip road may be associated with the intersection but not treated as an internal path of this intersection. On the other hand, when the newly defined dual carriageway intersection has grown due to the presence of, e.g., left-turn channels, such that the slip road junctions are encompassed by the intersection now including the intersecting single carriageways (as for the slip road 3305 in the intersection 3300 of FIG. 33), some embodiments treat the slip road as internal to the newly defined intersection. In the description of the intersection, these left turn channels, slip roads, etc., will typically be eliminated, as a user generally will not want complex instructions, but will instead want an instruction of "make a right turn onto San Vicente Blvd" or something similar.

Figure 34:
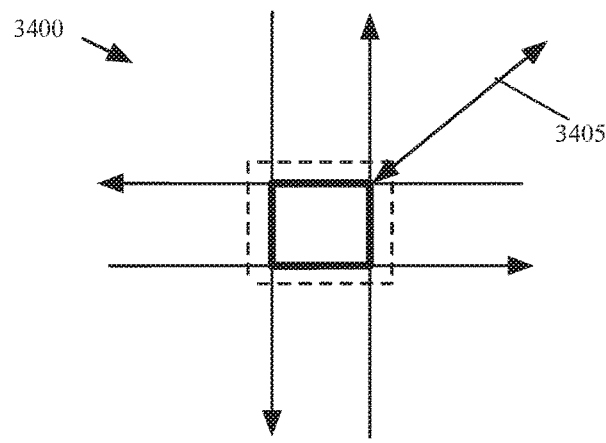
FIG. 34 illustrates additional two-way path in an intersection in some embodiments.

With the set of segments and junctions that form the intersection defined, the process needs to merge dual carriageways into single junction branches. The process 2900 next defines (at 2920) the set of all paths entering the intersection, and defines (at 2925) the set of all paths exiting the intersection. For a dual carriageway, which is a one-way path (half of a two-way road), the path will typically have an exit side and an entrance side. For purposes of merging, some embodiments treat each segment (the segment exiting the intersection and the segment entering the intersection) as separate paths. Single carriageways that are not internal to dual carriageways (e.g., the additional two-way path 3405 in the intersection 3400 of FIG. 34) will typically be treated as separate branches and are not part of the merging analysis in some embodiments.

Next, the process determines (at 2930) whether the set of entrance paths includes any unpaired dual carriageway paths. When no such paths remain in the set (or none existed in the first place), the process stores (at 2935) any unpaired dual carriageway left in the set of exit paths as separate branches of the junction. In general, this will happen in the case of mislabeled map data (the road is actually a one-way street) or merging criteria that are too strict (leaving a pair of entrance and exit paths unmerged).

When an unpaired entrance path exists, the process selects (at 2940) one of the entrance paths. The process then determines (at 2945) whether a potential match exists in the exit set. A potential match, in some embodiments, is a dual carriageway found by traversing the previously identified segment to the left (to the right, in the case of left-handed driving regions), or traversing the intersection in a clockwise fashion.

When no potential match exists (e.g., the next identified dual carriageway in the traversal is also an entrance path, or the exit set is empty), the process stores (at 2950) the entrance path as a separate branch of the intersection and then returns to 2930 to find the next unpaired entrance path. On the other hand, when a potential match exists, some embodiments determine (at 2955) whether the potential pair satisfies a set of dual carriageway match criteria. These are criteria, in some embodiments, to determine whether a pair of dual carriageways are actually the two sides of the same road. Some embodiments determine whether the two paths (1) are within a threshold distance (e.g., 25 m, 50 m, etc.) where the paths enter/exit the intersection, and (2) whether the angles at which the paths hit their junctions within the intersection is within a threshold range of each other (e.g., 5°, 10°, etc.). To calculate the angle, some embodiments use the vertex closest to the edge of the intersection (or the location of the junction at which the path segment intersects the other segments within the intersection) and a vertex located a particular predefined distance (e.g., 50 m) away. The process then calculates the angle off of North for the line between the two vertices.

In some embodiments, the mapping service additionally looks at the names of the paths to determine whether these match. When the names match, such embodiments may relax the geometry criteria for a matching pair (i.e., allow a greater distance between the paths or a greater difference in angles between the paths). Matching names might be, e.g., "CA-1 South" and "CA-1 North", or if both paths include "Wilshire Blvd." as one of their names. Some embodiments may also look at the road class data for confidence in matching dual carriageways.

Figure 35:
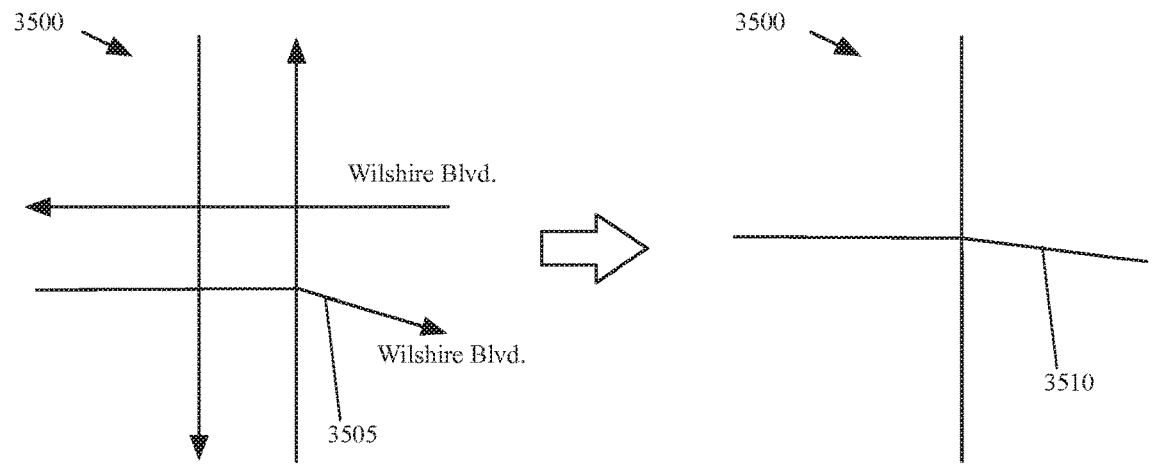
FIG. 35 illustrates the reduction of an eight-path intersection into four branches in some embodiments, in which the angle of the right branch is at half the offset from horizontal as the right exit path, because the right entrance path is on the horizontal.

If the two paths match, the process merges (at 2960) the paths into a single branch of the newly defined intersection. As indicated above, intersections are stored as a set of branches at different angles. For a merged path, some embodiments store the angle as the average of the angles of the two paths that make up the branch. FIG. 35 illustrates the reduction of an eight-path intersection 3500 into four branches, in which the angle of the right branch 3510 is at half the offset from horizontal as the right exit path 3505, because the right entrance path is on the horizontal. As shown conceptually, directions (entrance/exit) are not stored for intersection branches in some embodiments. The mapping service generates the routes using map data, which includes the intersections as well as directions of travel for the roads, so a route will not travel the wrong way on a branch of the intersection.

Figure 36:
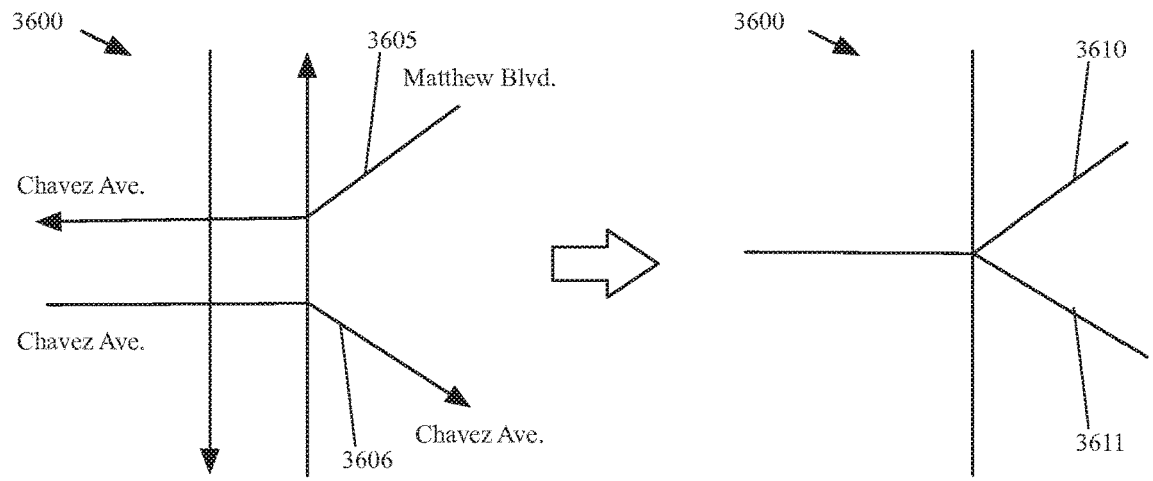
FIG. 36 illustrates the reduction of a different eight-path intersection into five branches in some embodiments.

On the other hand, when the paths do not match, the process stores (at 2965) each of the paths as separate branches of the intersection. FIG. 36 illustrates the reduction of a different eight-path intersection 3600 into five branches. In this case, the dual carriageway paths 3605 and 3606 on the right side do not merge and are therefore treated as separate branches 3610 and 3611 of the reduced intersection. In this example, the angle at which each of these branches leaves the intersection is the angle that is stored for the branch (with no averaging). The process 2900 then returns to 2930 to determine whether any entrance paths remain. As stated, once the entrance path set is empty, the process proceeds to 2935, and subsequently ends.

The following represents pseudocode of some embodiments for generating the data for an intersection once the internal segments have been identified for the intersection (e.g., operations performed by some or all of process 2900):
  Gather all external segments that touch internal segments for an intersection;
  Identify external segments that are surrounded by internal segments in the intersection and mark them as internal;
  Group together pairs of incoming and outgoing segments that represent same road;
  Compute an outgoing angle for each pair and for each unpaired road;
  Construct a template Intersection Pattern with one branch for each angle;
  If pattern exists for previously generated intersection, use existing pattern to save space (refer intersection to existing pattern);
  Else if pattern does not exist, create and store new entry for pattern:

As indicated, some embodiments store each intersection as a data structure. This data structure indicates the branches of the intersection and the angles at which the branches enter and/or exit the junction. FIG. 37 conceptually illustrates an example of such a data structure 3700 of some embodiments for a point type intersection. As shown, the intersection includes an intersection ID (which, in some embodiments is a unique identifier), a map data association, and a set of branches with angles and types. The map data association, in some embodiments, associates the intersection data structure with an actual location within the map. In some embodiments, this is simply a latitude/longitude point, but may also consist of other data in other embodiments (e.g., a list of the path segments or aggregate paths that meet at the intersection). Each branch includes a type and an angle. The type, in some embodiments, is an intersection type. Some embodiments define two intersection types: point and roundabout. However, other embodiments may include additional intersection types, such as traffic squares. Some embodiments store the intersection type as a property of the intersection rather than separately for each branch, but other embodiments recognize the possibility of an intersection partially being a roundabout but partially being a point intersection. The data structure 3700 includes four branches, at the cardinal directions of 0°(North), 90° (East), 180° (South), and −90° (West). In some embodiments, the intersection data structure also includes references to any junctions (i.e., data received from the map data provider) and path segments that are contained within the defined intersection. For a typical intersection of two dual carriageways, four junctions are referred to by such a data structure.

FIG. 38 illustrates a data structure 3800 of some embodiments for a roundabout intersection. Some embodiments provide specialized processing for roundabout intersection. The following represents pseudocode of some embodiments for generating intersection data for roundabout intersections:
  Identify all roundabout segments;
  For each roundabout segment:
    Gather all contiguous roundabout segments;
    Mark the gathered roundabout segments as processed;
    Build a roundabout intersection from this collection of roundabout segments;

In some cases, the map data identifies a roundabout (e.g., as a form of way or through another indicator). This allows the mapping service intersection calculator to begin its specialized automated roundabout processing. Specifically, when performing roundabout processing, the mapping service attempts to identify pairs of flare connectors (i.e., the portions of a road that flare into and out of a roundabout). In some embodiments, the intersection calculator traverses the roundabout (e.g., in a counterclockwise fashion for right-handed driving) looking for an exit path that is followed, within a particular distance (e.g., angular distance), by an entrance path. The process then determines whether to combine these paths, looking at factors similar to those for merging dual carriageways at point intersections. For instance, the factors used might include whether the names are similar, whether the distance between the exit/entrance paths is small enough, and potentially other factors. As a result of this processing, when a random road intersects the roundabout in between what otherwise appears to be an entrance/exit combination, some embodiments treat this as three separate branches.

Figure 39:
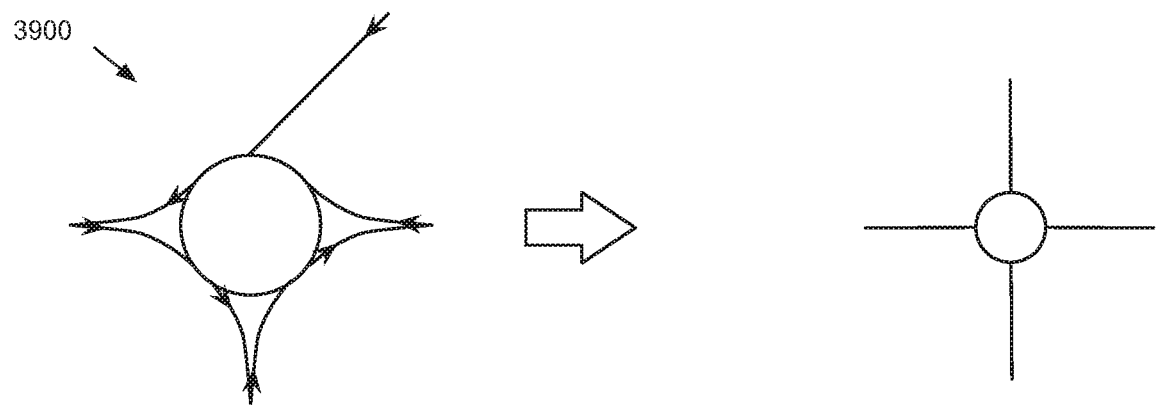
FIG. 39 conceptually illustrates the reduction of a roundabout intersection to intersection data in some embodiments.

In order to calculate the angles of the branches, some embodiments determine where the branch intersects the roundabout, rather than the angle of approach of the road. For entrance/exit combinations, the process takes the average of the two paths. FIG. 39 conceptually illustrates the reduction of a roundabout intersection 3900 to intersection data. The top path, despite approaching at approximately a 30° angle off of North, is designated as a 0°branch—the user is primarily interested in the distance around the traffic circle for the intersections, rather than the angle at which they enter and exit. The other three branches are also designated cardinal directions, because their flares average out to these directions. The data structure 3800 shows the data structure for the roundabout junction 3900. Other embodiments, however, use the angle at which the paths enter or exit the roundabout, rather than the distance around the roundabout at which the paths intersect it.

The following represents pseudocode of some embodiments for generating the data for a roundabout intersection once the roundabout segments have been identified for the intersection:

For set of roundabout segments that form a simple loop:
  Gather all non-roundabout segments that touch the loop, ordered by the direction of travel around the loop;
  Group together pairs of consecutive roundabout exit/entry segments that represent same road;
  Assign an angle to each pair and each unpaired segment;
  Subtract the smallest angle from all angles (so smallest angle=0);
  Construct a template intersection pattern with one branch for each angle;
  If pattern exists for previously generated intersection, use existing pattern to save space (refer intersection to existing pattern);
  Else if pattern does not exist, create and store new entry for pattern:

As indicated in the above examples of pseudocode, some embodiments perform additional compression when storing the intersections. The real world contains millions (or hundreds of millions) of individual intersections, but many of these intersections have the same configuration (especially when very small angular variations are tolerated). Thus, rather than storing separate data for each of the hundreds of millions of intersections, some embodiments utilize compression in storing the intersections. As each intersection is processed, some embodiments store a template pattern for that intersection. When additional intersections with the template pattern are identified, such embodiments store a reference to that pattern (while still creating a separate data structure, as the location information is different for two intersections that follow the same pattern).

3. Modification of Junction Data for Navigation

The above section described the generation of complex intersection data, typically done as an offline process prior to route generation. However, at the time of route generation, some embodiments modify the intersection data for transmission to the user. The mapping service providing the route data modifies the angles to make them relative to the direction of entry and marks one of the branches as an exit branch.

Figure 40:
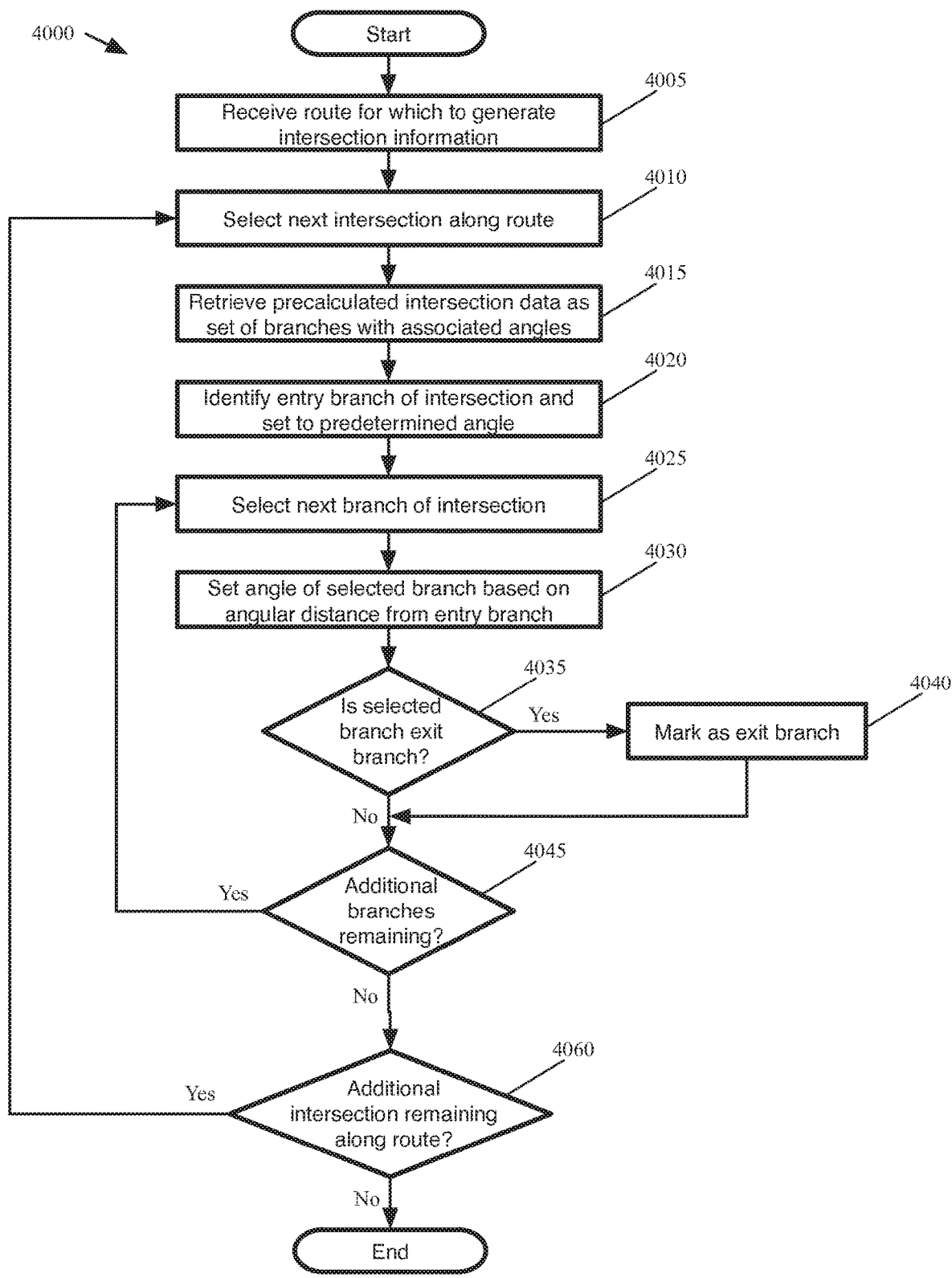
FIG. 40 conceptually illustrates a process of some embodiments for modifying intersection data in order to provide navigation information for a route.

FIG. 40 conceptually illustrates a process 4000 of some embodiments for modifying intersection data in order to provide navigation information for a route. As shown, the process begins by receiving (at 4005) a route for which to generate intersection information. As mentioned above, some embodiments generate one or more routes for each set of starting and ending locations requested by a user device. Each of these routes consists of a series of maneuvers at various path intersections (i.e., at road intersections).

As shown, with the route identified, the process 4000 selects (at 4010) the next intersection along the route. Some embodiments begin with the first intersection (i.e., the first maneuver a user following the route will make), starting from the start point of the route. Many routes involve long stretches along a particular road, going straight through numerous intersections (possibly including junctions of two road segments that are part of the same road and at which no other roads intersect). In some embodiments, the navigation instructions do not include information about the intersections at which no turning maneuver is made. Accordingly, the next intersection is actually the next intersection along the route at which a maneuver will be made.

The process then retrieves (at 4015) precalculated intersection data as a set of branches with associated angles. As described above, some embodiments store a data structure for each intersection, which lists the branches of the intersection along with angles for each branch. FIGS. 37 and 38 illustrate examples of such data structures, for both a point intersection and a roundabout intersection.

After retrieving the data structure for the selected intersection, the mapping service rotates the intersection definition to normalize the definition to the direction at which the route enters the intersection. Accordingly, the process 4000 identifies (at 4020) the entry branch of the intersection and sets the entry branch to a predetermined angle. Some embodiments set the direction of movement into the intersection as 0°, and therefore set the entry branch of the intersection to 180°.

The process then rotates the other branches of the intersection. As shown, the process selects (at 4025) a next branch of the intersection. In some embodiments, the branches and angles are stored in an array, list, or similar data structure, and the process traverses this data structure. The process sets (at 4030) the angle of the selected branch based on an angular distance from the entry branch. For example, if the entry branch was stored as 0° (i.e., pointing North), then a branch stored as 95° will be shifted 180° to −85°. In addition, the process determines (at 4035) whether the selected branch is the exit branch of the junction (i.e., the branch at which the route exits the intersection). In order for the turn-by-turn navigation instructions at the client mapping/navigation application to properly display the maneuvers, the device needs to know along which branch of the intersection the route exits. Thus, when the selected branch is the exit branch, the process 4000 marks (at 4040) the selected branch as such. The process then determines (at 4045) whether any additional branches of the intersection remain to be converted for the route. When additional branches remain, the process returns to 4025 to select the next branch of the junction. When all branches have been processed for the current intersection, the process 4000 determines (at 4060) whether additional intersections remain along the route that need to be modified. When additional intersections remain, the process returns to 4010 to select the next intersection. When the last intersection is modified, the process ends.

Figure 41:
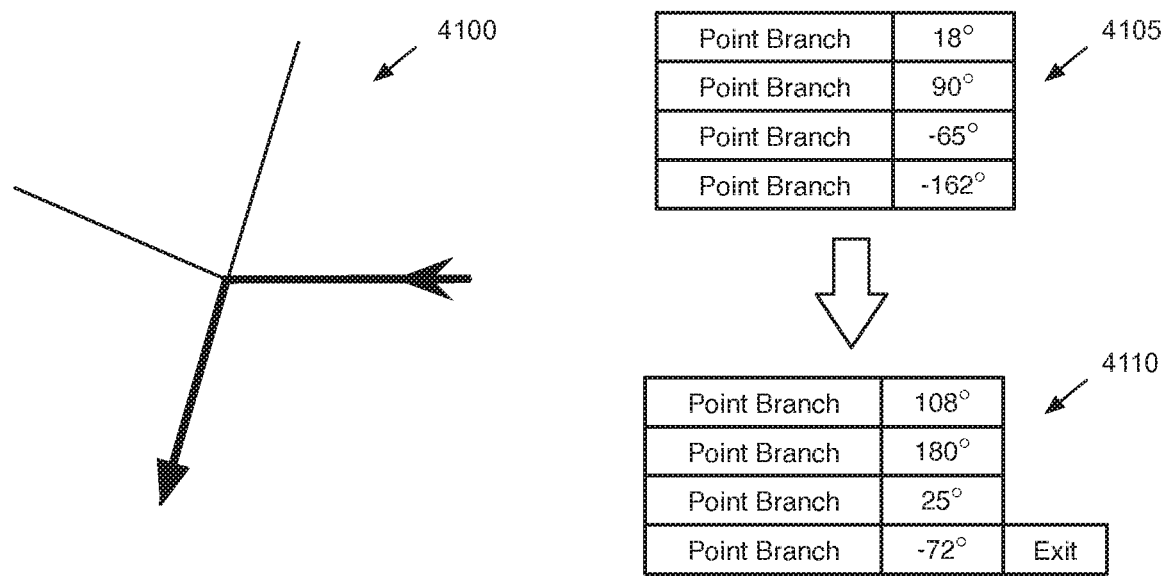
FIG. 41 illustrates a conceptual drawing of a route taken through an intersection a data structure for the intersection, and the modification of the data structure to create a new data structure for turn-by-turn navigation instructions.

FIG. 41 illustrates a conceptual drawing of a route taken through an intersection 4100, a data structure 4105 for the intersection, and the modification of the data structure to create a new data structure 4110 for turn-by-turn navigation instructions. As shown, the route enters from the right side (the 90° branch) and exits the intersection at the bottom (the −162° branch). In the modified data structure, the entry branch has been rotated to 180°, causing a 90° rotation of the other branches. The branch at 18° rotates to 108°, the branch at −65° rotates to 25°, and the branch at −162° rotates to −72°. In addition to the rotation angles, the data structure 4110 has the last branch marked as the exit for the navigation. Some embodiments include a binary exit field, with the exit branch marked with a '1' and all other branches marked with a '0'.

B. Client Side Dynamic Generation of Adaptive Displayed Graphical Indicators

The above section describes the generation of the juncture (i.e., intersection) data for use in turn-by-turn navigation.

However, once the user device receives this juncture data, the mapping client application operating on the device must dynamically generate graphical maneuver indicators based on the juncture data in order to provide intuitive turn-by-turn navigation for a route.

1. Example of Different Indicators in Different Contexts

In a navigation system, when presenting a user with graphical representations of upcoming maneuvers, there are two competing goals to satisfy, namely the completeness of the representation and the clarity and legibility of the representation. The mapping application of some embodiments uses a novel adaptive mechanism to balance these goals differently according to context.

For a currently displayed instruction, in the context of full-screen turn-by-turn navigation, the mapping application of some embodiments abstracts a maneuver down to two elements: a prominent stylized arrow roughly representing the path of the vehicle through the juncture, and a de-emphasized set of lines and curves corresponding to other elements of the juncture. For instance, a right turn at a T-junction is represented by a large arrow with a right-angle joined with a smaller, dimmer segment that runs parallel to one of the large arrow's segments. The smaller segmented will also be pushed off to the side so that the path taken by the vehicle through the juncture dominates the display. Such a representation of a maneuver which includes an arrow with junction context provides fairly complete information about the maneuver while remaining abstract and easily understandable.

An alternate representation of a maneuver may omit the juncture context entirely and simplify the primary arrow indicating the maneuver. When a user looks at maneuvers beyond the current maneuver (the next maneuver to make), the more detailed graphical representation may provide more information than is required and be harder to read with a quick glance. For example, even if there is space to display the junction context for a secondary instruction that follows the current maneuver, some embodiments display only the simplified arrow for clarity. This adaptive approach also benefits space-constrained UI elements. While multitasking or looking at lists of instructions, for example, the mapping application of some embodiments draws the simpler maneuver abstraction in order to produce something more easily discernible in a smaller area.

Figure 42:
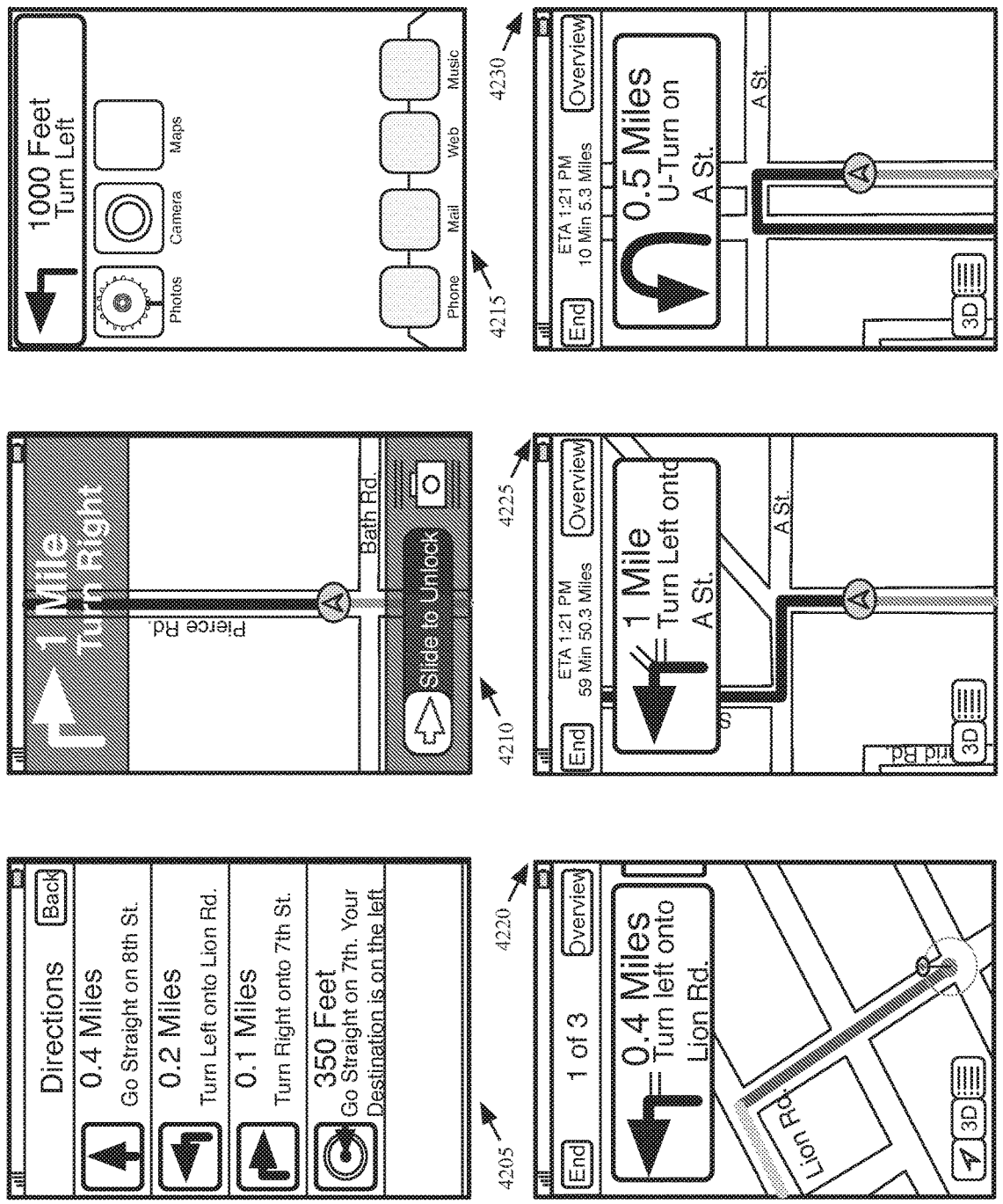
FIG. 42 illustrates several different scenarios in which the mapping application displays different types of graphical indicator arrows to visually represent maneuvers to a user in some embodiments.

FIG. 42 illustrates several different scenarios in which the mapping application displays different types of graphical indicator arrows to visually represent maneuvers to a user. The first scenario 4205 illustrates route directions shown in a list view. The list view displays a series of turn-by-turn instructions to get from a start location to an end location. In some embodiments, the user can view the turn-by-turn instructions without actually entering a navigation mode, or even following the route. In this situation, some embodiments display a simple version of the graphical indicators for each turn. This is done for space-saving reasons, as well as the fact that when the user is not actually approaching a maneuver, the intersection context is not especially helpful.

The second scenario 4210 illustrates turn-by-turn navigation when the user device on which the mapping application operates is locked. As described in detail below, the application is able to display turn-by-turn navigation instructions even when the device is locked, in order to continue providing instructions to the user. In this scenario, as shown, a simplified arrow is also displayed in some embodiments. This provides a simple graphical indication of the turn within the lock screen (in this case, a right turn), without providing the context data that might be difficult for a user to pick out in the lock screen.

The third scenario 4215 also illustrates turn-by-turn navigation when the mapping application is not open (or not presently displayed) on the device on which the application operates. As described in detail above, the application displays turn-by-turn navigation instructions within the notification banner space when the mapping application is not displayed. Much like in the lock-screen mode, the mapping application uses a simple graphical indicator for the indicated maneuver (in this case a left turn). Due to space constraints and the reasons described above for the lock-screen mode, the simple graphical indicator is used.

The previous three scenarios illustrate situations in which the simple graphical indicators are used. One of ordinary skill in the art will recognize that in some embodiments, the more complex stylized juncture plus maneuver graphical indicators might be used in the above situations. The following three scenarios illustrate indications in which these more complex indicators are used.

The fourth scenario 4220 illustrates route overview directions, in which the user can view an entire route from a starting location to ending location. The user can swipe through the different instructions (e.g., using swipe gestures) to view the route segments between maneuvers. Here, the complex juncture indication is used, showing the intersection context (a T intersection) and the maneuver made through the intersection, with the maneuver arrow emphasized over the intersection context.

The fifth scenario 4225 illustrates navigation instructions in the context of the standard turn-by-turn navigation (i.e., not in the lock-screen mode, or with a different application open, etc.). In this case, the more complex arrow graphical indicator is used. In the illustrated example, the road juncture is slightly more complicated than the previous example, with a fourth branch angling up and to the right from the direction of approach. The sixth scenario 4230 also illustrates navigation instructions during turn-by-turn navigation. In this case, the maneuver being performed is a U-turn. Representing a U-turn with the juncture branches as in scenario 4225 would result in the arrow pointing up and down the same branch (the bottom branch). As a result, the application instead displays a stored U-turn indicator arrow.

Figure 43:
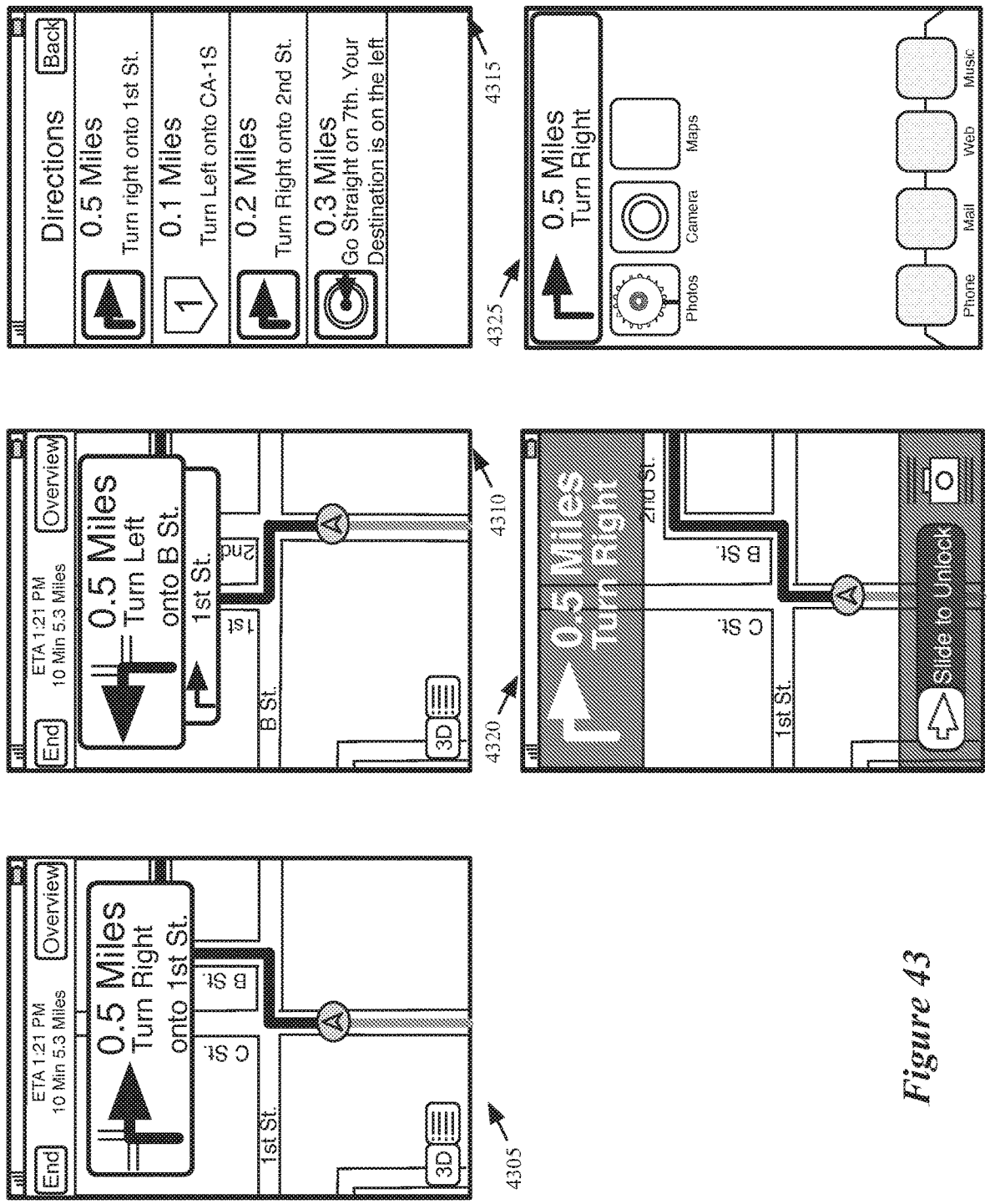
FIG. 43 illustrates several scenarios for the same turn, and how the different arrows might be used for the same turn in some embodiments.

FIG. 43 illustrates several scenarios for the same turn, and how the different arrows might be used for the same turn. The first scenario 4305 shows a right turn onto 1 St. in the turn-by-turn navigation instructions. As in FIG. 42, the complex graphical indicator is used. The second scenario 4310 illustrates the situation during turn-by-turn navigation in which the right turn onto $1^{st}$ St. is the second of two maneuvers in quick succession. In this case, the second instruction comes shortly after the first, so the application provides an indication of the upcoming two maneuvers. The second maneuver is allotted less space on the display, and therefore the simplified arrow is used. The third scenario 4315 illustrates the use of the simplified arrow indicator in the route directions list. In addition, as shown for the second maneuver in the route directions list, some embodiments replace the simplified directional indicator with a highway sign (shield) when the maneuver ends on a road for which such a shield/sign is available. The fourth and fifth scenarios 4320 and 4325 illustrate the simplified arrow indicators for the right turn in the lock-screen mode and when the mapping application is not displayed on the device.

2. Download of Juncture Data and Generation of Graphical Indicators

In some embodiments, the mapping application performs navigation based on a route selected by a user of the mapping application. For example, a user might request the mapping application to search for a route from a first location to a second location (e.g., from the user's house to a particular restaurant). In some embodiments, the application sends the request to a centralized mapping service (e.g., a set of servers running back-end map and route generation processes) and receives a set of one or more possible routes from the first location to the second location. The user then selects one of the routes to follow.

Figure 44:
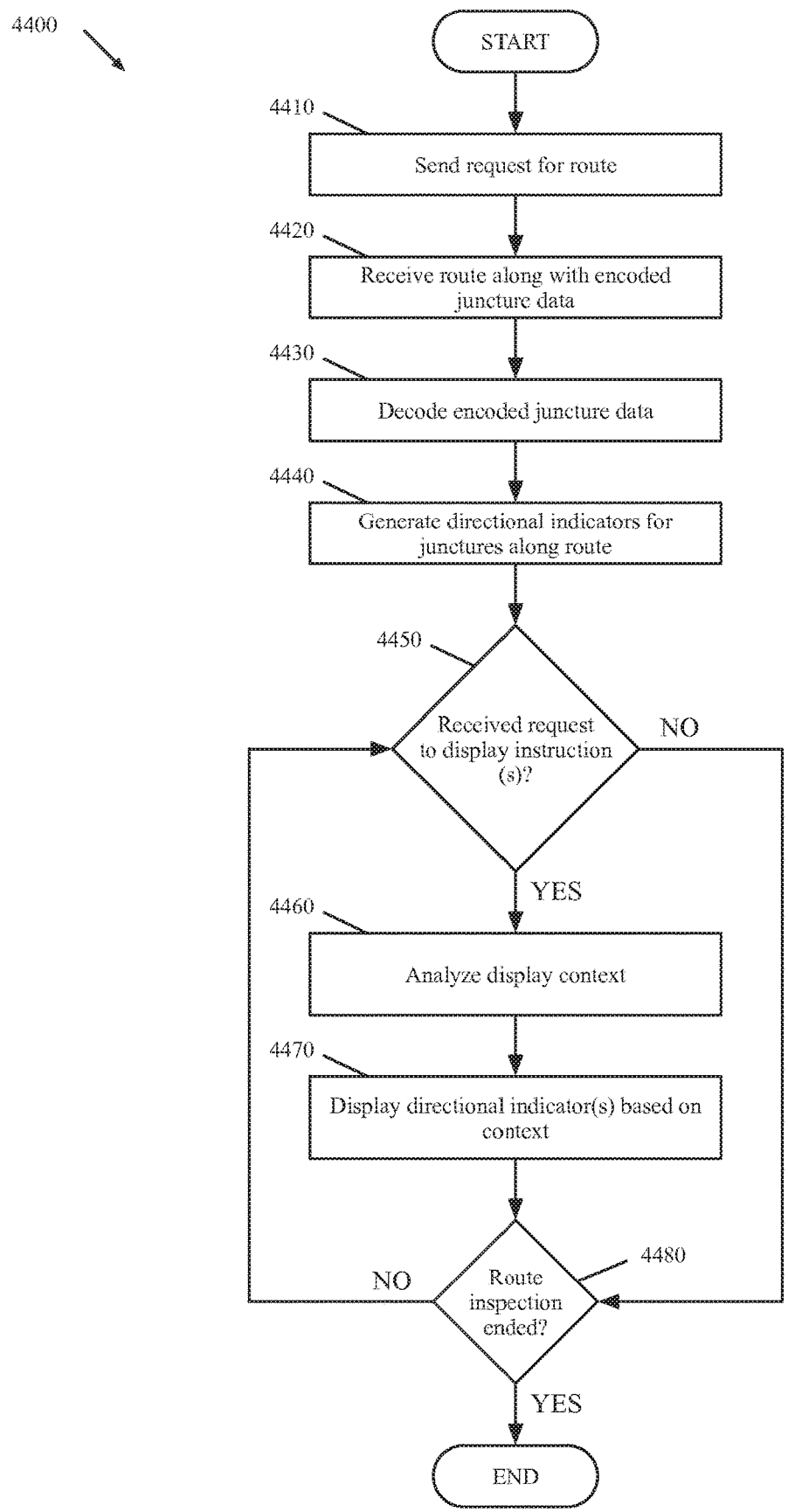
FIG. 44 conceptually illustrates a process of some embodiments for displaying graphical indicators during route inspection.

FIG. 44 conceptually illustrates a process 4400 of some embodiments for displaying graphical indicators during route inspection. In some embodiments, a user can view a list of directions for a route (e.g., by selecting a list view GUI button) or can step through the directions one at a time (e.g., via swipe gestures) while also viewing the route on the map. In some embodiments, the process 4400 is performed by a mapping application that operates on a device (e.g., a mobile device such as a smart phone or touchpad).

As shown, the process 4400 of some embodiments begins by sending (at 4410) a request for a route to a mapping service server. In some embodiments, the request comprises a starting location and an ending location, potentially with one or more intermediate locations. The user enters these locations into the mapping application GUI of some embodiments, and the application transmits a route request through a device interface to the mapping service server. The operations of the server to generate a route and navigation (juncture) instructions are described above in subsection A of this Section.

The process 4400 then receives (at 4420) the route along with encoded juncture data. In some embodiments, the mapping service transmits the juncture data in an encoded format. This encoding may simply involve identifying similar junctures and referencing these rather than repeating the same juncture information twice, or may involve additional encoding. Other embodiments do not provide any encoding. Assuming the data is encoded, the process decodes (at 4430) the encoded juncture data to arrive at juncture information for each maneuver along a route. This juncture data, in some embodiments, consists of geometry information that identifies the branches of the juncture and the angles at which those branches enter/exit the juncture. Some embodiments also include maneuver information along with the juncture information, that describes the maneuver being made (e.g., as a right turn, U-turn, freeway off ramp, etc.).

Next, the process generates (at 4440) directional indicators for all the junctures along the route. Directional indicators are graphical indicators of route maneuvers along the route. For example, a route may include a right turn at a first juncture, no turn at a second juncture, and a slight left at a third juncture. In this example, the set of route indicators may include a first graphical representation for the right turn (e.g., an arrow pointing to the right), a second graphical representation indicating no turn (e.g., a straight arrow), and a third graphical representation for the slight left maneuver (e.g., a diagonal arrow to the left). Some embodiments, however, do not generate graphical representations for junctures at which the route continues through in a straight path. In fact, some embodiments do not transmit juncture data for these junctures from the mapping service server. On the other hand, some embodiments do transmit juncture data for each juncture along the route, and in some such embodiments the mapping application generates graphical indicators for each such juncture. In some embodiments, the directional indicators are generated by the device using a process such as the process 4600 described below by reference to FIG. 46. In some embodiments, the application generates at least two directional indicators for each maneuver: a first, more complex indicator that includes contextual information about the juncture, and a second, simpler indicator that only displays the maneuver to be made.

The process then determines (at 4450) whether a request to display route instruction(s) has been received. As shown in the previous subsection, a user might step through the instructions one at a time, or request to view a list of such route instructions. When no request is received, the process transitions to 4480, to determine whether the route inspection has ended (e.g., because the user has cancelled a route, begun navigation of the route, closed the mapping application, etc.). These two operations effectively function as a 'wait' state, where the process waits until an event causing the display of route instructions is received.

When the application has received such a request, the process 4400 analyzes (at 4460) the context for displaying the one or more directional indicator(s). In some embodiments, the context depends on several factors associated with clearly displaying the route maneuvers required for navigating the route. For example, the context may be based on the amount of space available to display the graphical indicator (e.g., due to the size of the device on which the route directions are displayed), the conditions under which the indicator will be displayed (e.g., whether the maneuver is a current or future route maneuver, in which particular modality of the mapping application the sign will be displayed, etc.).

After identifying the context for the route instructions, the process 4400 displays (at 4470) the directional indicator(s) for the maneuver(s) based on the context. In some embodiments, the context for displaying a particular directional indicator determines how the directional indicator appears when displayed. The directional indicators, in some embodiments, come in different illustrative styles for different contexts. A static (or simple) illustrative style for directional indicators merely describes the maneuver by general appearance (e.g., an arrow turning right to direct the user to turn right, or an arrow turning slightly left to direct the user to turn slightly left, etc.). A dynamic illustrative style, in contrast, adapts and stylizes directional indicators to clearly illustrate important aspects of each maneuver. Such stylized directional indicators can also include additional lines to illustrate other roads at the juncture, and other information associated with the maneuver. Some embodiments, for example, use the more complex directional indicators for displaying the route instructions one maneuver at a time, and use the simpler directional indicators for displaying a list view of all of the instructions at once. The process then determines (at 4480) whether route inspection has ended, as described above. Once route inspection has ended, the process ends.

Figure 45:
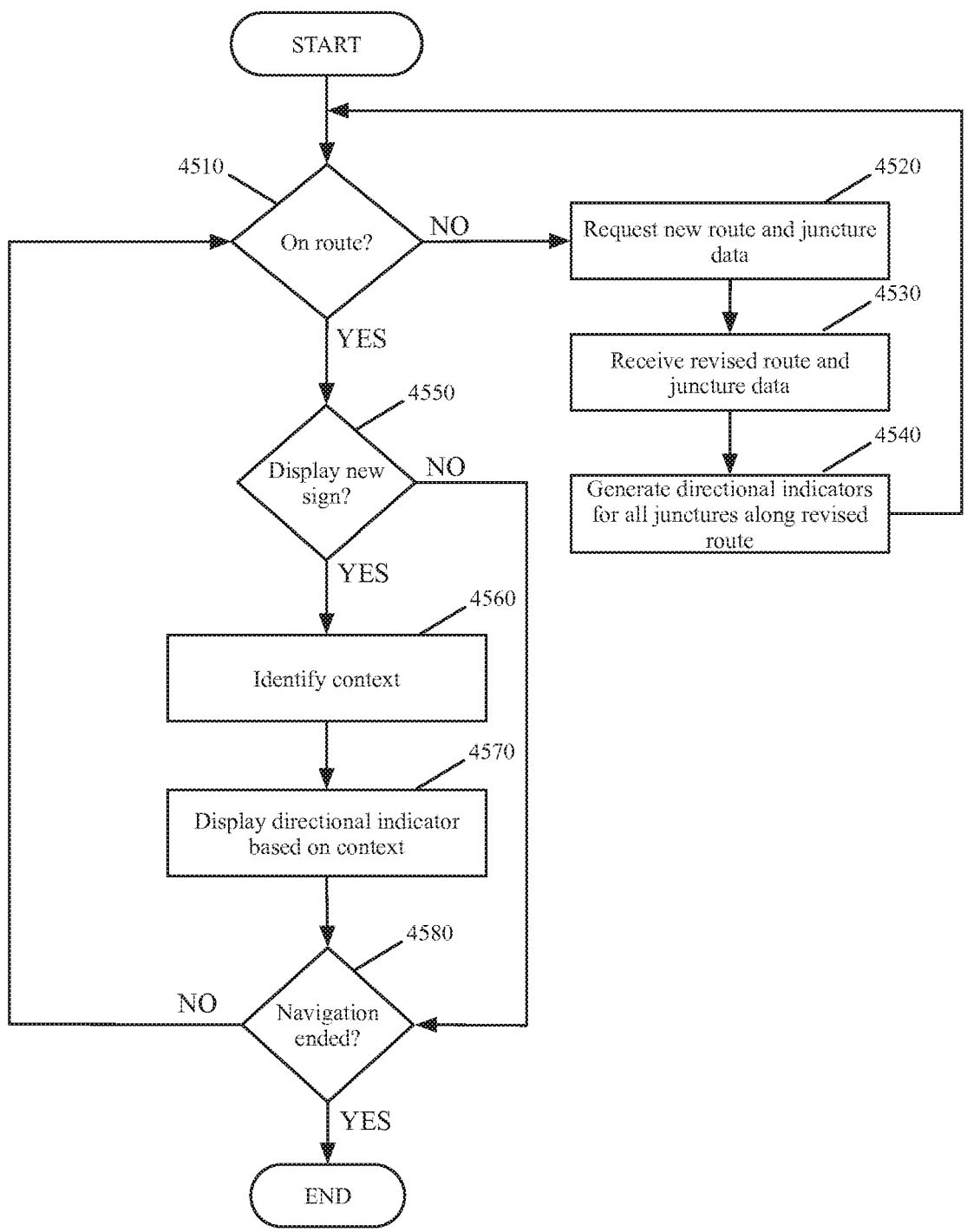
FIG. 45 conceptually illustrates a process of some embodiments that performs navigation over such a route.

In addition to displaying route instructions, the directional indicators are used in various contexts during turn-by-turn navigation. FIG. 45 conceptually illustrates a process 4500 of some embodiments that performs navigation over such a route. In some embodiments, the process 4500 is performed by a mapping application that operates on a device (e.g., a mobile device such as a smart phone or touchpad).

As shown, the process 4500 begins by determining (at 4510) whether the user is navigating the route. That is, the application determines whether the location of the user device (e.g., provided by the device's GPS capability or other location tracking mechanism) is along the path of the route, or has moved off of the route. When the user moves off of the route (e.g., because the user makes a different maneuver than those specified by the route, taking the location of the device off the route), the mapping application requires an update to the route and juncture data. Accordingly, if the device running the mapping application is no longer on route, the process requests (at 4520) new route and junction data from the mapping service server. The process then receives (at 4530) revised route and juncture data for all junctures along the route. In some embodiments, the juncture data is determined by the mapping service server for each juncture along the route. As described above, the juncture data may include the angles of the different branches of the juncture, normalized to the entry direction, along with an indication of the exit branch of the juncture. In some embodiments, the juncture data is retrieved by the server from a storage having a set of known junctures and angles (e.g., all the public roads in the United States). In some cases, the server generates juncture data from other sources (e.g., transportation agencies of states and municipalities, recent satellite photos illustrating new roads not previously stored, etc.). For route updates, some embodiments of the mapping service only generate and transmit new juncture information for the changes to the route, and reference the already-received data for junctures shared by the old and new routes. In some embodiments, as described above by reference to FIG. 45, the juncture data is encoded, in which case the application also decodes this data to arrive at the geometric juncture description.

After receiving the downloaded juncture data, the process 4500 generates (at 4540) directional indicators for all the junctures along the route. Directional indicators are graphical indicators of route maneuvers along the route. For example, a route may include a right turn at a first juncture, no turn at a second juncture, and a slight left at a third juncture. In this example, the set of route indicators may include a first graphical representation for the right turn (e.g., an arrow pointing to the right), a second graphical representation indicating no turn (e.g., a straight arrow), and a third graphical representation for the slight left maneuver (e.g., a diagonal arrow to the left). Some embodiments, however, do not generate graphical representations for junctures at which the route continues through in a straight path. In fact, some embodiments do not transmit juncture data for these junctures from the mapping service server. On the other hand, some embodiments do transmit juncture data for each juncture along the route, and in some such embodiments the mapping application generates graphical indicators for each such juncture. In some embodiments, the directional indicators are generated by the device using a process such as the process 4600 described below by reference to FIG. 46.

After generating the set of graphical directional indicators for the junctures of the route, the process 4500 returns to 4510 to again determine whether the user is navigating the new route. When the user device is still following the route, the process 4500 determines (at 4550) whether to display a new navigation sign. When navigating a route, in some embodiments, each maneuver associated with a juncture is illustrated to the user as a sign (e.g., a green sign with an arrow and textual information indicating the type of maneuver) as the juncture approaches. When a new navigation sign is not required (e.g., because the maneuver indicated by a currently displayed sign has not yet been performed), the process 4500 transitions to 4580 to determine whether the navigation has ended. When navigation has ended, the process 4500 ends. These two operations effectively function as a 'wait' state, in which the mapping application waits for an event requiring the display of a new navigation sign or for the navigation to end (e.g., because the route's ending location has been reached).

When an event occurs requiring the display of a new sign, the process 4500 identifies (at 4560) the context for displaying the sign. In some embodiments, the context depends on several factors associated with clearly displaying the route maneuvers required for navigating the user-selected path. For example, the context may be based on the amount of space available to display the sign (e.g., due to the size of the device on which the navigation instructions are displayed), the conditions under which the indicator will be displayed (e.g., whether the maneuver is a current or future route maneuver, in which particular modality of the mapping application the sign will be displayed, etc.).

After identifying the context for the navigation sign, the process 4500 displays (at 4570) the directional indicator for the maneuver based on the context. In some embodiments, the context for displaying the sign determines how the directional indicator appears when it is displayed on the sign. The directional indicators, in some embodiments, come in different illustrative styles for different contexts. A static (or simple) illustrative style for directional indicators merely describes the maneuver by general appearance (e.g., an arrow turning right to direct the user to turn right, or an arrow turning slightly left to direct the user to turn slightly left, etc.). A dynamic illustrative style, in contrast, adapts and stylizes directional indicators to clearly illustrate important aspects of each maneuver. Such stylized directional indicators can also include additional lines to illustrate other roads at the juncture, and other information associated with the maneuver.

After displaying the directional indicator, the process 4500 transitions to 4580 to determine whether the navigation has ended. In some embodiments, the navigation ends when the user stops the mapping application or when the destination is reached. If the navigation has ended, the process 4500 ends. Otherwise, the process 4500 transitions back to 4510 to determine whether the route navigation is still on route, as described above.

Figure 46:
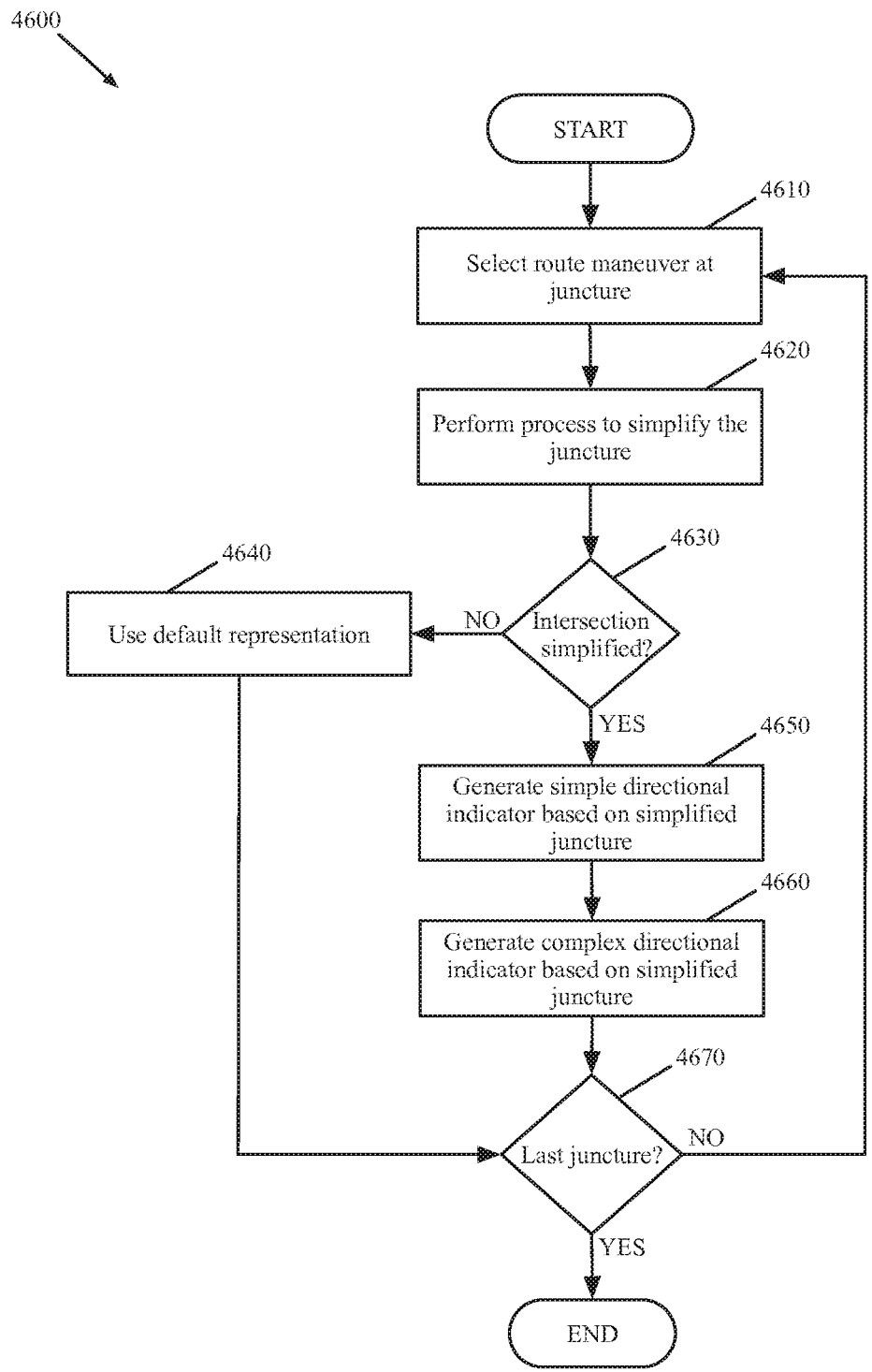
FIG. 46 conceptually illustrates a process that generates such graphical directional indicators for the maneuvers of a route.

In some embodiments, the mapping application simplifies the route navigation instructions by generating graphical directional indicators (e.g., arrows) for maneuvers (e.g., directions to turn, continue traveling straight, etc.) along a route. FIG. 46 conceptually illustrates a process 4600 that generates such graphical directional indicators for the maneuvers of a route. In some embodiments, the process 4600 is performed by a mapping application that operates on a device (e.g., a mobile device such as a smart phone or touchpad). The mapping application performs this process 4600, in some embodiments, at stage 4520 of the process 4500, after receiving juncture data for all junctures along a route. In some embodiments, this juncture data is generated and provided by a set of servers at a mapping service.

As shown, the process 4600 of some embodiments begins by selecting (at 4610) a route maneuver at a juncture. In some embodiments, the route maneuver is selected from a set of route maneuvers associated with a list of junctures along a specified route. The junctures for the route are sequentially ordered, in some embodiments, according to the specified route. The data for each juncture includes a set of branches at specific angles, with an entrance and exit branch specified for the maneuver (in some embodiments, the entrance branch is specified by a rotation of the juncture angles such that the entrance branch is at a specific angle).

After selecting the route maneuver, the process 4600 performs (at 4620) a process to simplify the juncture, if such simplification is needed and possible. In some embodiments, the simplification process uses a set of snapping rules to fit juncture branches to specific angles (e.g., snapping a branch with an angle of 101.3° to 100° or 90°). In some embodiments, the simplification process is performed according to the process 4700 of FIG. 47. Some embodiments simplify the juncture data by attempting to snap each of the branches to a multiple of a particular angle, while other embodiments only attempt to snap the exit branch to a multiple of the particular angle.

Next, the process 4600 determines (at 4630) whether the mapping application was able to simplify the juncture. If the juncture could not be simplified, the process 4600 uses (at 4640) a default representation of the route maneuver (e.g., a graphical icon of the route maneuver based on the maneuver type). On the other hand, if the application was able to simply the juncture, then the process generates (at 4650) a simple directional indicator for the maneuver based on the simplified juncture. In some embodiments, the simple directional indicator is a geometry without any styling or other features (e.g., a simple arrow indicating the direction of the maneuver). For example, the simple directional indicator may be an arrow pointing up and then directly right for a right turn maneuver at a standard juncture between two roads or may be an arrow pointing up and then diagonally up and to the right for a slight right turn. The process 4600 also generates (at 4660) a complex directional indicator based on the simplified juncture data. In some embodiments, the complex directional indicator is a stylized graphical directional indicator that includes reference features associated with the route maneuver. For example, the complex directional indicator may include an emphasized directional arrow representing the maneuver to make at the juncture, and one or more de-emphasized lines indicating other roads at the juncture. For the complex indicators, the application displays de-emphasized lines for the branches of the juncture through which the user will neither enter nor exit, and displays the emphasized arrow starting at the entrance branch and finishing along the exit branch.

After generating the simple and complex directional indicators, the process 4600 determines (at 4670) whether the juncture at which the route maneuver is made is the last juncture on the route. If the juncture is the last, the process 4600 ends. Otherwise, when additional route maneuvers at additional junctures remain, the process transitions back to 4610 to select the route maneuver at the next juncture.

Figure 47:
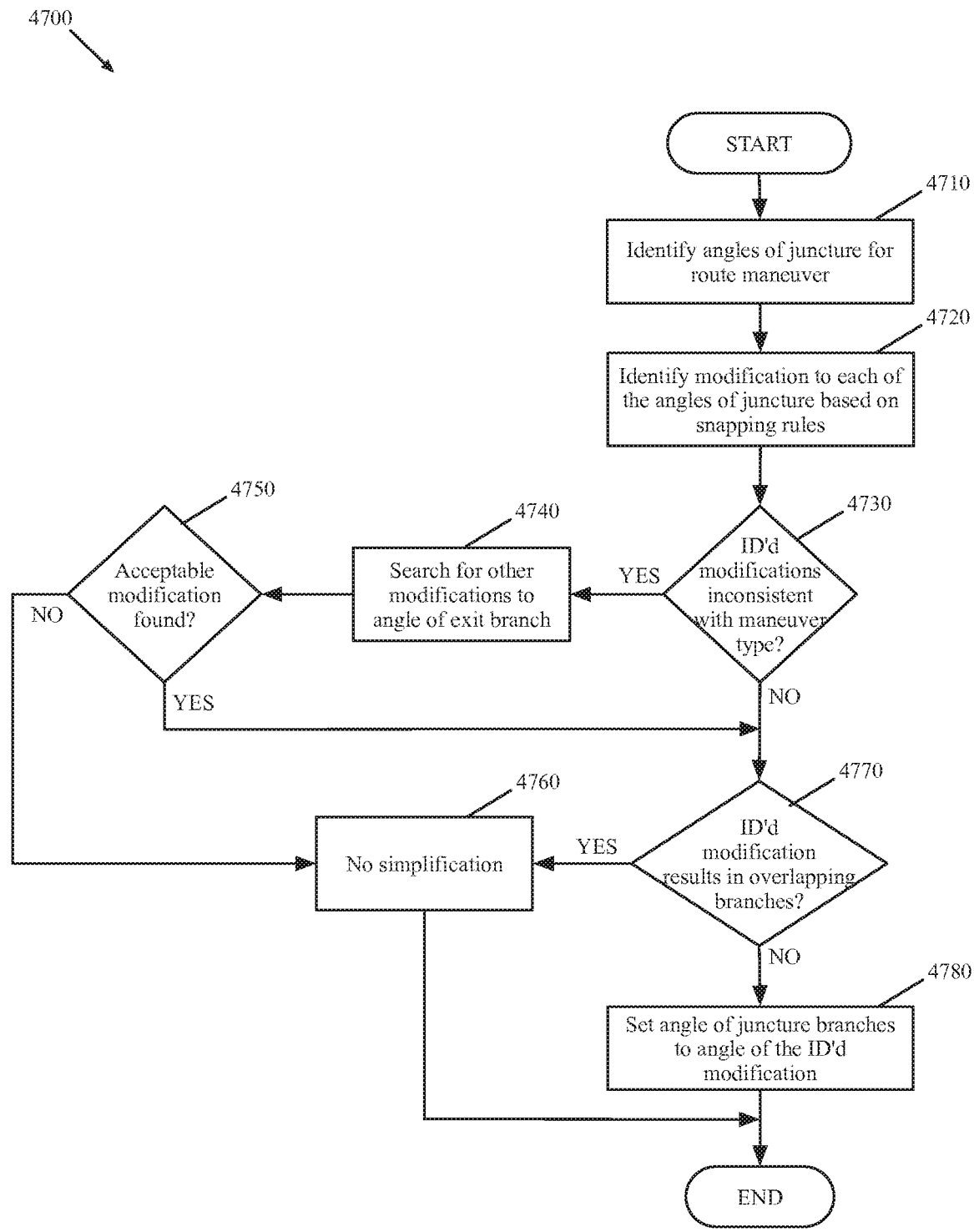
FIG. 47 conceptually illustrates a process that attempts to set the angles of branches of a juncture along a route to multiples of a pre-specified angle in some embodiments.

As mentioned above by reference to FIG. 46, the mapping application of some embodiments receives juncture data (which may have complex geometry) and simplifies the juncture geometry for use in the graphical user interface (GUI). In some embodiments, the mapping application simplifies the route navigation by fitting route juncture angles to multiples of a pre-specified simplified angle. FIG. 47 conceptually illustrates a process 4700 that attempts to set the angles of branches of a juncture along a route to multiples of a pre-specified angle (e.g., 45°). This process 4700 is performed, in some embodiments, at stage 4620 of FIG. 46. The process 4700 will be described by reference to FIGS. 48 and 49, which illustrate particular juncture situations.

As shown, the process 4700 begins by identifying (at 4710) the angles of the juncture through which a route maneuver is made. These angles, in some embodiments, are those specified by the mapping service server for the juncture, and also indicate one of the branches as the exit branch.

Figure 48:
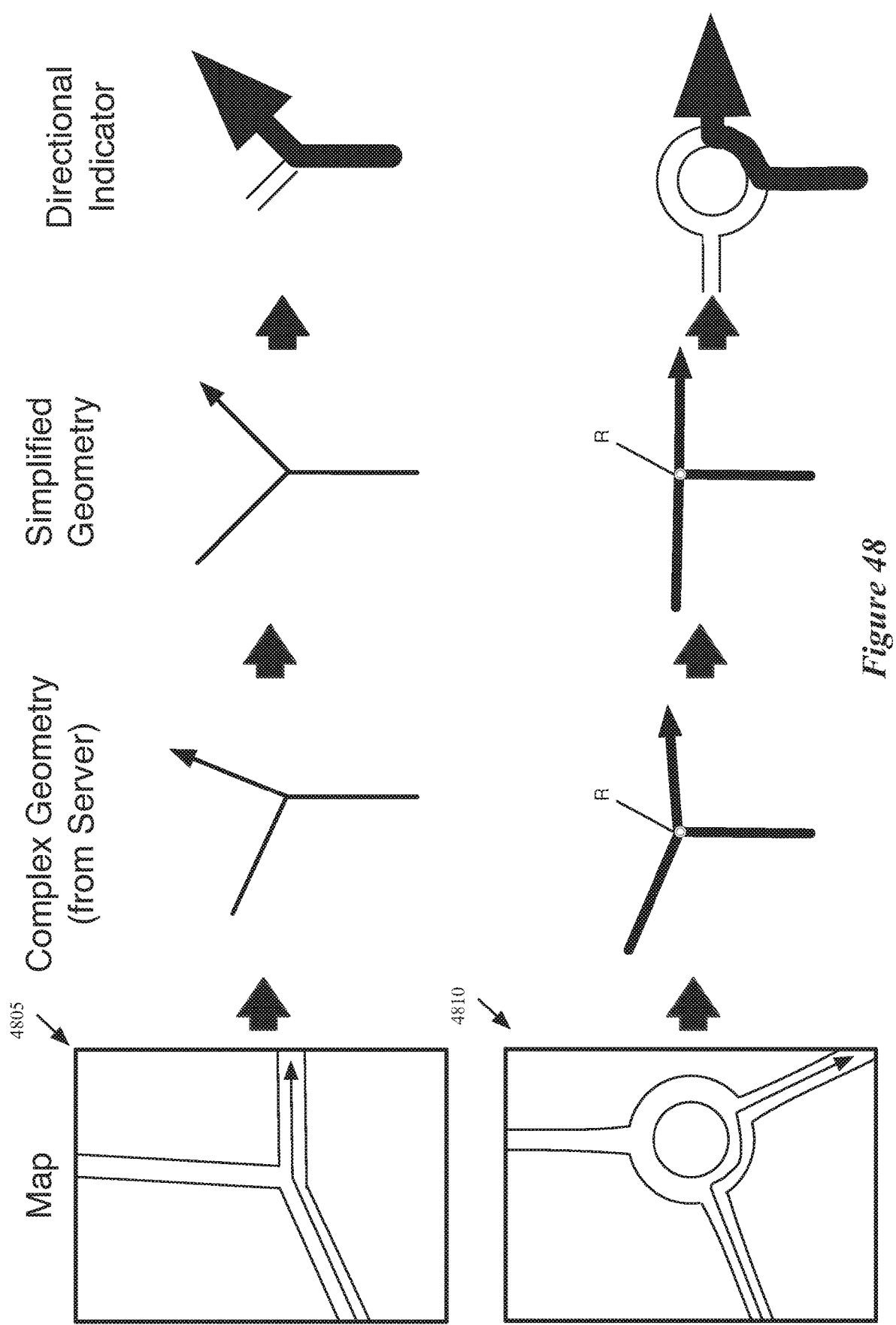
FIG. 48 illustrates a particular juncture situation in some embodiments.

The top portion of FIG. 48 illustrates a first point juncture 4805 on a map, with angles at approximately −55°, 90°, and −115° (with North as 0°). In addition, the map shows a maneuver through the juncture, resulting in a slight right turn from the −115° branch to the 90° branch. The second stage in this top portion shows the juncture and maneuver reduced to geometry by the mapping service server, with the juncture data rotated so that the maneuver entrance branch is at 180°. This shows the exit branch at 250 and the third branch at around −60°

In addition, the bottom portion of the figure illustrates a roundabout juncture 4810 on a map, in which the user enters on a first branch at around −110° and exits on a second branch at around 150°, with a third branch at 0°. Again, the second stage illustrates the juncture and maneuver reduced to geometry by the mapping service server, including rotation of the juncture so that the entrance branch is set to 180°. In addition, the juncture is marked as a roundabout.

After the angles for the juncture are identified, the process 4700 identifies (at 4720) a possible modification to each of the angles of the juncture based on a set of snapping rules. In some embodiments, the snapping rules indicate how to adapt a received angle for display during navigation. In some embodiments, the snapping rules indicate that received angles should be modified to a multiple of a pre-specified angle. For example, the snapping rules may indicate that each directional indicator should conform to one of several axes at multiples of 45 degrees (e.g., 45°, 90°, 135°, 180°). In some embodiments, the snapping rules specify that the received angle should be adapted to the 45° axis closest to the received angle. For example, the received angle is snapped to 90° for a right-turn maneuver onto a road that is at a 110° angle with respect to a reference angle (i.e., the direction of travel into the juncture) because the closest axis among the 45° multiples is the axis at 90°. On the other hand, the angle direction is snapped to 135° for the right-turn maneuver if the road is at a 115° angle with respect to the reference point because the 115° angle of the juncture branch is closer to the 135° axis than to the 90° axis.

After identifying the possible modifications to the angles of the selected juncture, the process 4700 determines (at 4730) whether the identified modification is inconsistent with the type of maneuver associated with the received angle. For instance, if a maneuver involves a slight right turn at an angle of 10°, and the snapping rules modify the 10° branch angle to a 0° angle (moving straight through the juncture), then a simplified directional indicator for the maneuver would merely illustrate a graphical representation for traveling straight. Lost in such an indicator would be any indication of turning, veering, or moving to the right. In this example, moving straight is inconsistent with turning right (even slightly turning right).

When the identified modification is inconsistent with the maneuver type, then the process searches (at 4740) for other modifications to the angle of the exit branch of the juncture. In some embodiments, the snapping rules specify alternative angles to use when a first angle is inconsistent. For example, the snapping rules may indicate that a 45° angle should be used after the 0°angle was determined to be inconsistent the right turn maneuver.

Next, the process determines (at 4750) whether an acceptable modification was found. In some embodiments, an alternative angle is acceptable if the difference between the received angle for the exit branch (e.g., 10° angle) and the identified alternative angle (e.g., 45° angle) is within a threshold. For example, the snapping rules may specify a maximum difference of 30° as the threshold for an acceptable alternative angle. In this example, the identified 45° alternative angle is 350 greater than the 10° received angle, and therefore, would be considered unacceptable. In some embodiments, the determination is made based on one or more heuristic rules that consider the context for modifying the angle. For example, a heuristic rule may specify that a right turn should always be shown when there is a fork in the road. In this example, even a slight turn to the right (e.g., at an angle of 10°) could be illustrated by an alternative directional indicator (e.g., at a 45° angle).

When no acceptable modification is found, the process determines and specifies (at 4760) that no simplification can be made to the geometry of the juncture, for at least one of the branches. As indicated above by reference to the process 4600, some embodiments use default representations for the maneuver when no simplification can be made to the juncture geometry.

The process then ends.

When an acceptable modification is found for the exit branch (either in the initial determination at 4730 or the secondary determination at 4750), the process transitions to 4770 to determine whether the modification results in the overlap of two branches of the juncture (i.e., two branches assigned to the same angle). When two (or more) of the branches of the juncture overlap after the modifications, the process determines and specifies (at 4760) that the modifications should not be made. On the other hand, when there is no overlap between branches and the resulting exit branch is not inconsistent with the maneuver, then the process sets (at 4780) the angles of the juncture branches to the angles determined for the modified juncture. The process then ends.

The third stage in each of the portions of FIG. 48 illustrates the simplified geometry for the two example intersections. In the case of the point juncture 4805, the application simplifies the geometry to align the 25° branch to 45° and the −60° branch to −45°. As these alignments do not create any issues (e.g., confusing instructions or overlapping branches), the mapping application uses the simplified geometry to generate a directional indicator for the juncture and maneuver. In the case of the roundabout juncture 4810, the application simplifies the geometry to align the 80° branch to 900 and the −70° branch to −90°. As these alignments also do not create any issues, the mapping application uses the simplified geometry to generate a roundabout directional indicator for the juncture and maneuver. In some embodiments, however, the simplification process is not applied to roundabout junctures. In many cases, the user's (i.e., the driver's) perspective changes over the course of a roundabout maneuver, and sometimes the roundabout is large enough that the user cannot initially see the exit road. Instead, the directional indicator uses angles that more closely resemble the actual exits of the roundabout.

Figure 49:
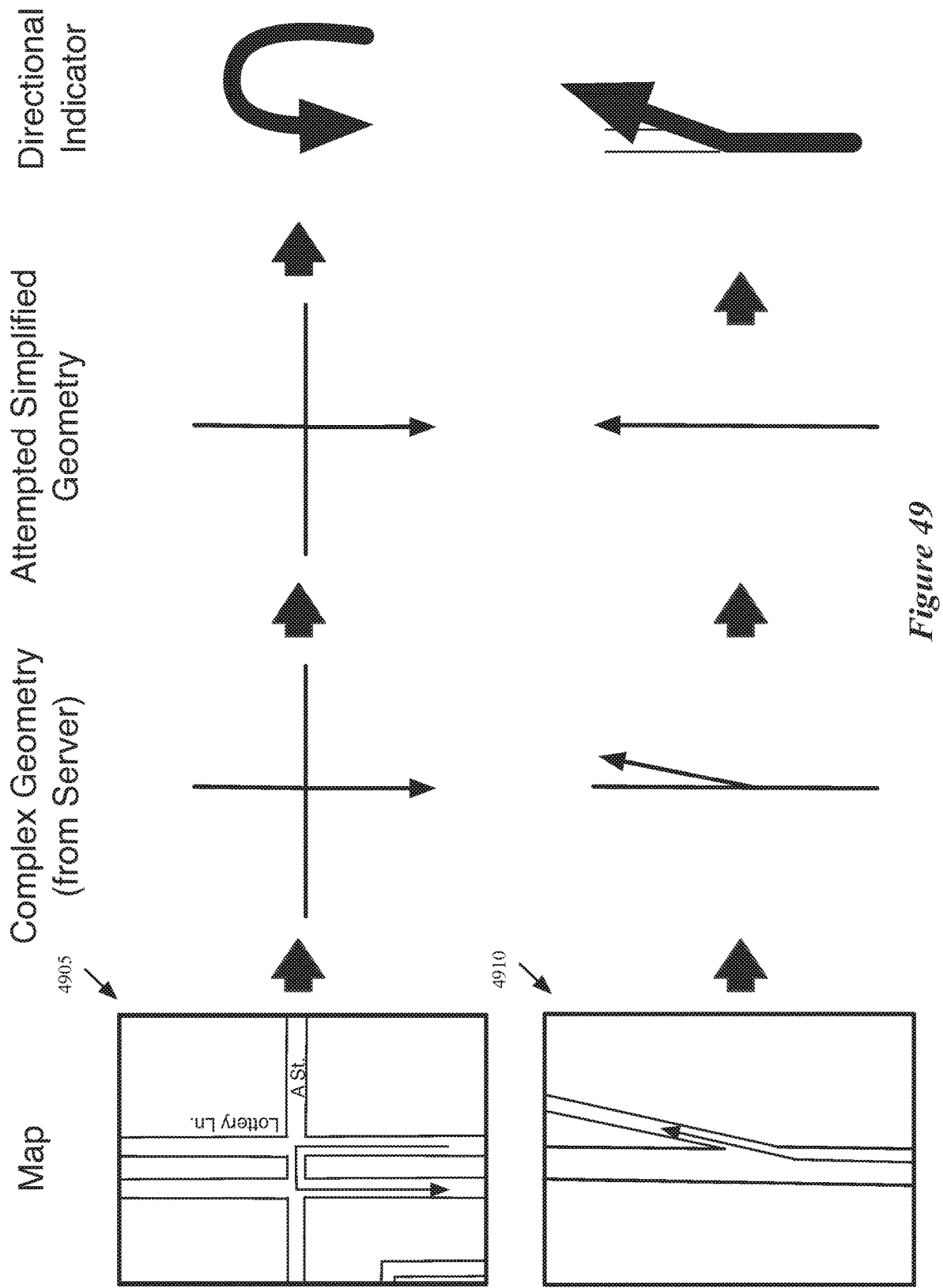
FIG. 49 illustrates two examples where default juncture/maneuver indicators are used instead of the geometry-based indicators in some embodiments.

FIG. 49 illustrates two examples where default juncture/maneuver indicators are used instead of the geometry-based indicators. The first situation is a U-turn maneuver at a juncture 4905. In this case, the juncture data stored for the juncture is a standard juncture with four branches in the cardinal directions. However, the data for the maneuver includes the exit branch at 180°, which is also the entrance branch. Thus, while no simplification is necessary of the geometry, the directional indicator that would be generated according to the standard rules would just be an arrow pointing downward, overlapping the entrance portion of the arrow. As this would not be a very useful graphical indication of the maneuver, the mapping application instead uses a stored U-turn indicator, as shown in the fourth stage of the top portion of this figure.

The second example in FIG. 49 is a freeway exit 4910. In this case, the geometry for the juncture and maneuver includes the entrance branch, a branch at 0° (for continuing straight along the freeway) and a branch at a low angle (around 10°). The attempt at simplifying the geometry, however, reduces the exit branch to 0°. This violates multiple simplification rules, in that it results in overlapping juncture branches and creates a non-intuitive description of the maneuver, because the exit branch now indicates that the route should continue in a straight line. While some embodiments will instead shift the exit branch to 450, this example instead uses a default freeway exit graphical indicator. In some embodiments, as mentioned above, each juncture also includes routing directions, such as "Freeway_Off_Ramp". In this case, the directions stating that the maneuver involves taking a freeway off ramp, combined with the knowledge that the route is in a right-sided driving area and that the exit branch is at a low angle to the right of straight through, indicates that the right-side freeway off ramp graphical indicator should be used. Other examples of maneuver types that may use default representations include, in some embodiments, "keep left" or "keep right" maneuvers.

Figure 50:
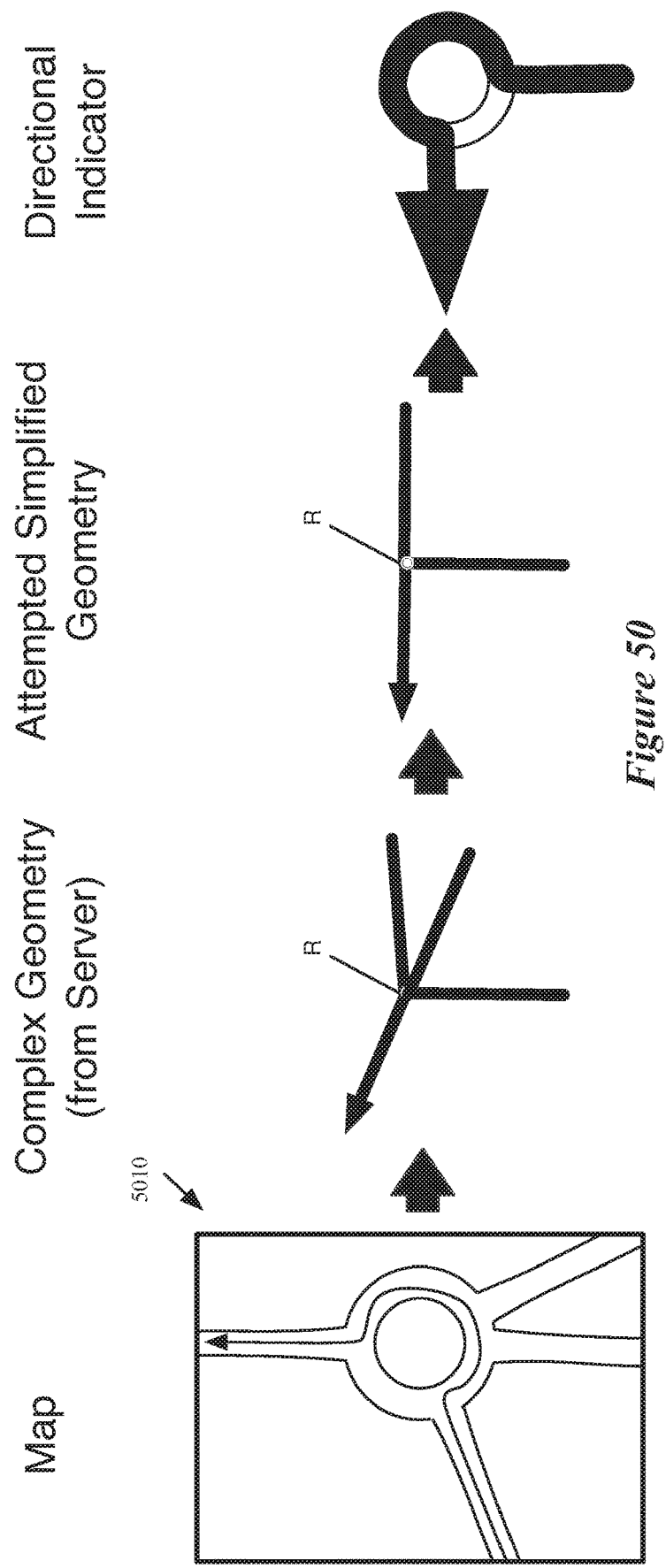
FIG. 50 illustrates an example of a roundabout in which the simplified geometry is not used by some embodiments.

FIG. 50 illustrates an example of a roundabout 5010 at which the simplified geometry is not used by some embodiments. In this case, the geometry received for the roundabout includes the entrance branch, a branch at approximately 110°, a branch at 85°, and the exit branch at approximately −70°. The attempted simplification places both of the unused (neither entrance nor exit) branches on the 90° axis. For a point intersection, some embodiments might allow this for the maneuver, as the instructions to make a left turn would be clear. However, when a driver goes around a roundabout, they will often count the number of exits, as the angles become unclear as perspective changes. Thus, reducing the number of branches could be potentially confusing for the driver. As such, the directional indicator used eliminates the exits altogether and only shows a circular roundabout with an arrow showing the maneuver. In addition, some embodiments include accompanying instructions that state "Take the third exit of the roundabout", or other instructions to that effect.

In addition, certain situations will result in the application eliminating the directional indicator from a navigation sign altogether due to the possibility of confusing the user. For instance, an intersection involving an interchange from a first freeway to a second freeway might have three lanes that go in two or three different directions. In certain cases, the information generated on the server does not specify which lane the user should take in order to get to the desired second freeway (i.e., whether to use the left lane or the right lane). While the application of some embodiments could show a generic arrow for such a maneuver, this might confuse the user. Accordingly, the navigation application of some embodiments suppresses the graphical directional indicator and centers the instruction text in the navigation sign. When a highway shield is available for the second (destination) freeway, some embodiments move the instructions to the left side of the sign and display the highway shield on the right side of the sign.

3. Direction Indicator Software Architecture

Figure 51:
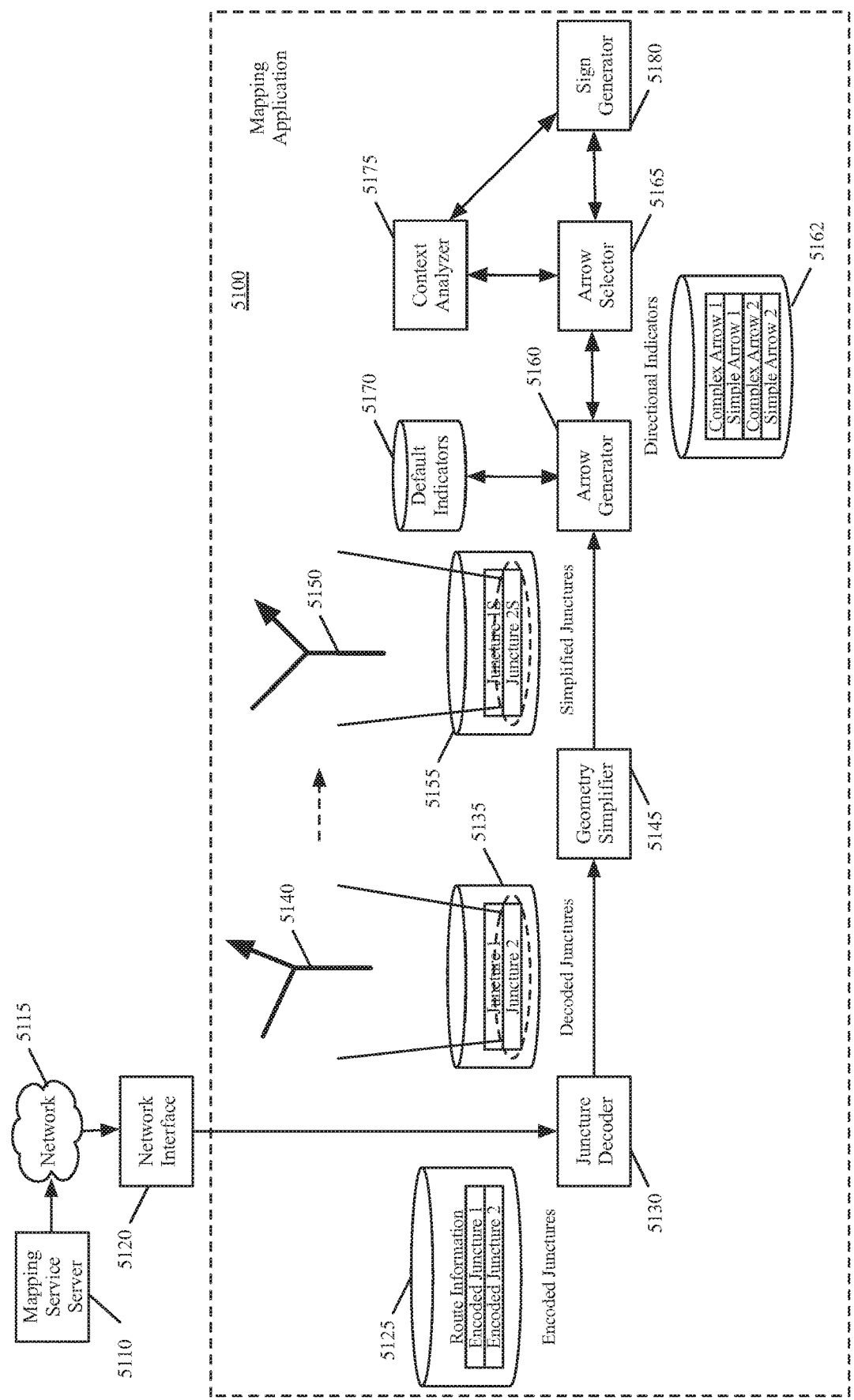
FIG. 51 conceptually illustrates a mapping application of some embodiments that generates directional indicators for different contexts.

As stated above, in some embodiments the maps, routes, and turn-by-turn navigation are presented to a user by a mapping application that operates on a device (e.g., a handheld device such as a smart phone or tablet). The mapping application may be a stand-alone application in some embodiments, or integrated with the operating system of the device. FIG. 51 conceptually illustrates a mapping application 5100 of some embodiments that generates directional indicators for different contexts. One of ordinary skill in the art will recognize that the modules shown for the application 5100 are specific to the arrow generation processes, and that the mapping application of some embodiments includes numerous additional modules (e.g., for map display, route display, additional aspects of navigation, etc.).

As shown, a mapping service server 5110 transmits route and juncture data through a network 5115 to a network interface 5120 of the device on which the mapping application 5100 operates. The mapping service server 5110 may be a server similar to that shown in FIG. 24 above, which receives a route request from devices on which the mapping application operates and generates route and juncture data for the requests.

The mapping application 5100 includes a juncture decoder 5130, a geometry simplifier 5145, an arrow generator 5160, an arrow selector 5165, a context analyzer 5175, and a sign generator 5180. The juncture decoder 5130 receives encoded juncture information 5125 for a route and decodes this information to arrive at a series of maneuvers through junctures. The juncture decoder 5130 stores the decoded juncture data 5135. This may be in random access memory or other volatile storage, for use only during the navigation of the route, or in a more permanent storage such as a hard disk or solid-state memory. As stated above, some embodiments do not encode the juncture information, in which case the application does not require a juncture decoder, and simply stores the received juncture data.

The juncture data 5135, in some embodiments, includes a geometric description of the intersection that indicates the type of the intersection (e.g., point, roundabout) as well as the different branches of the intersection at their angles, according to an analysis of the map by the mapping service. As the junctures correspond to maneuvers to make along a particular route, the juncture data also indicates an exit branch for each juncture. This figure illustrates an example geometric juncture description 5140, with three branches and the exit marked with an arrow. The branch at 180° (the bottom branch) is always assumed to be the entrance branch, in some embodiments.

The geometry simplifier 5145 reduces the juncture data to a simplified form and stores simplified juncture data 5155. As with the decoded juncture data 5135, this data may be stored in volatile or non-volatile memory in different embodiments. In some embodiments, the geometry simplifier attempts to snap each of the branches of a juncture to a multiple of 45°, according to various heuristic rules. The geometric juncture description 5150 is a simplified version of the geometric description 5140.

The arrow generator 5160 generates one or more graphical indicators for each juncture/maneuver, using the simplified juncture data. When the indicator generated according to the juncture data is not ideal (e.g., for a U-turn, a freeway exit maneuver, etc.), the arrow generator of some embodiments uses the stored default indicators 5170. For at least some of the junctures, the arrow generator creates a complex directional indicator (that also includes a de-emphasized representation of the juncture) and a simple directional indicator. The arrow generator 5160 stores these directional indicators 5162 for use in displaying route and navigation instructions, in either volatile or non-volatile memory.

The arrow selector 5165 uses a context analyzer 5175 to determine which of the directional indicators to use for a particular maneuver, depending on the context in which the indicator will be displayed. These contexts may include different situations for routing directions or different situations for turn-by-turn navigation instructions (e.g., standard mode, lock-screen mode, when a different application is open, etc.). The context analyzer 5175 identifies the context and provides this information to the arrow selector 5165.

The arrow selector chooses one of the graphical indicators 5162 and provides this selection to the sign generator 5180. The sign generator 5180 generates a navigation instruction sign for display that includes the selected graphical indicator. The sign generator 5180 also uses the context analyzer results to generate other aspects of the sign, such as the level of detail of the instructions shown within the navigation sign.

IV. Dynamic Generation of Adaptive Instructions

As shown in many of the figures in the above sections, in addition to displaying a graphical indication of a maneuver during a route, the mapping application of some embodiments displays maneuver instructions (e.g., "Turn left in 0.5 miles onto Bahrami Ct."). Much like the graphical indicators, the mapping application dynamically generates these instructions using the received route/junction data.

A. Examples of Different Instructions for Same Maneuver in Different Contexts

The mapping application of some embodiments displays textual route instructions in a large variety of cases, some of which are more space constrained than others, and some in which other guidance elements provide information about a maneuver that can take the place of the text instructions. Rather than selecting a single instruction string and then shrinking the font or truncating as dictated by the constraints, the application uses a sophisticated method to synthesize strings that are best adapted to each context from a number of details about the maneuver itself.

For a given context, the application chooses instruction text by considering factors such as the available space, the amount of information conveyed by means other than text (e.g., the graphical indicators, road signs, etc.), the localized length of each of the instruction variants, among other factors. By synthesizing and evaluating several alternatives locally on the client device (as opposed to simply receiving instruction text from the mapping service), the mapping application can pick an optimal instruction string in every scenario. In addition, this approach allows for the application to use different instruction text on a differently-sized device (e.g., using more text on a tablet computer as compared to a smaller smart phone). A similar approach can also be used for spoken instructions that need to fit within a particular amount of time, and when voice instructions are used, the application of some embodiments will reduce the length of the displayed instructions.

Figure 53:
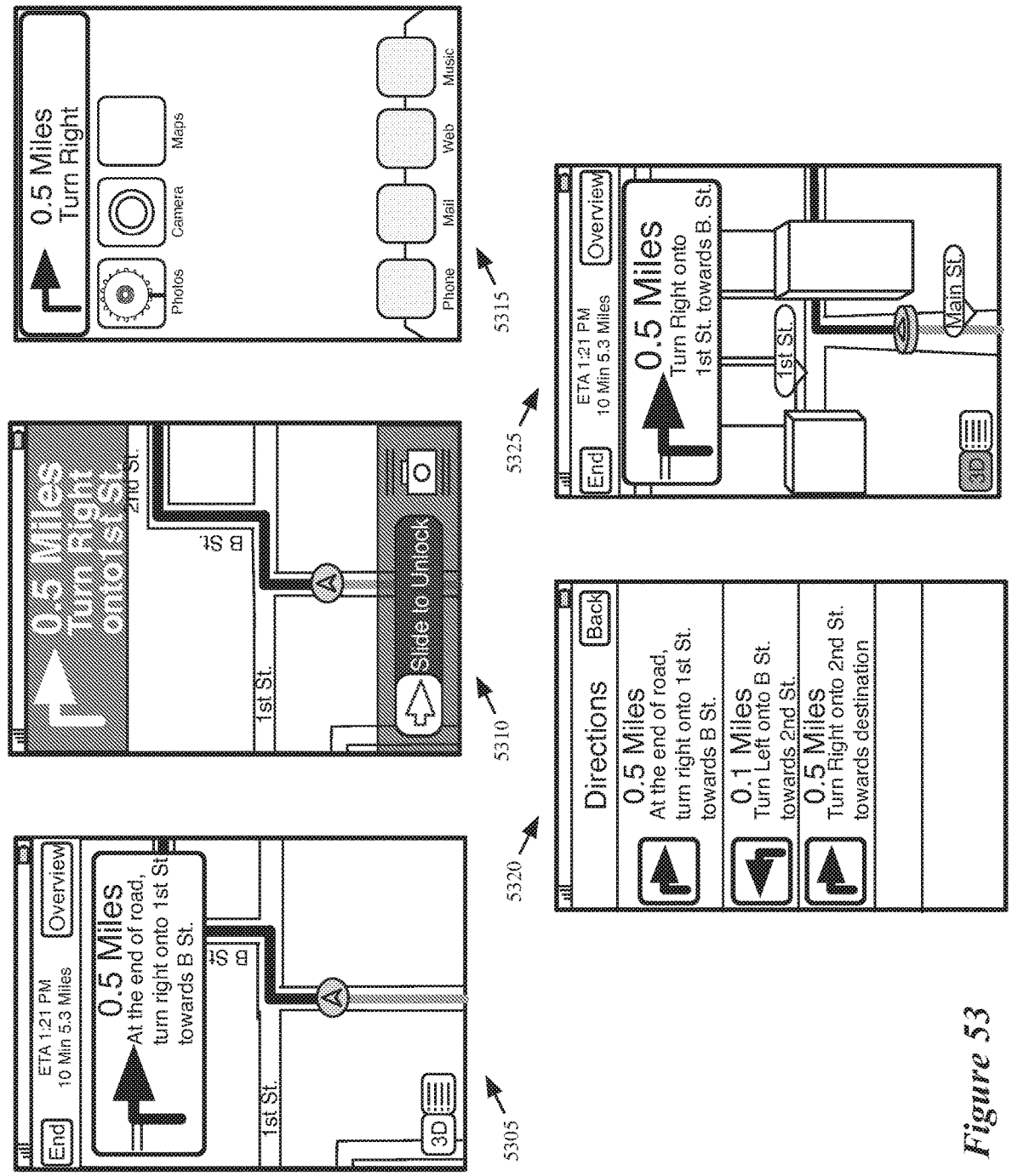
FIG. 53 illustrates several different scenarios in which the mapping application displays different examples of the adaptive instructions for the particular maneuver of the first juncture in a variety of different situations.
Figure 54:
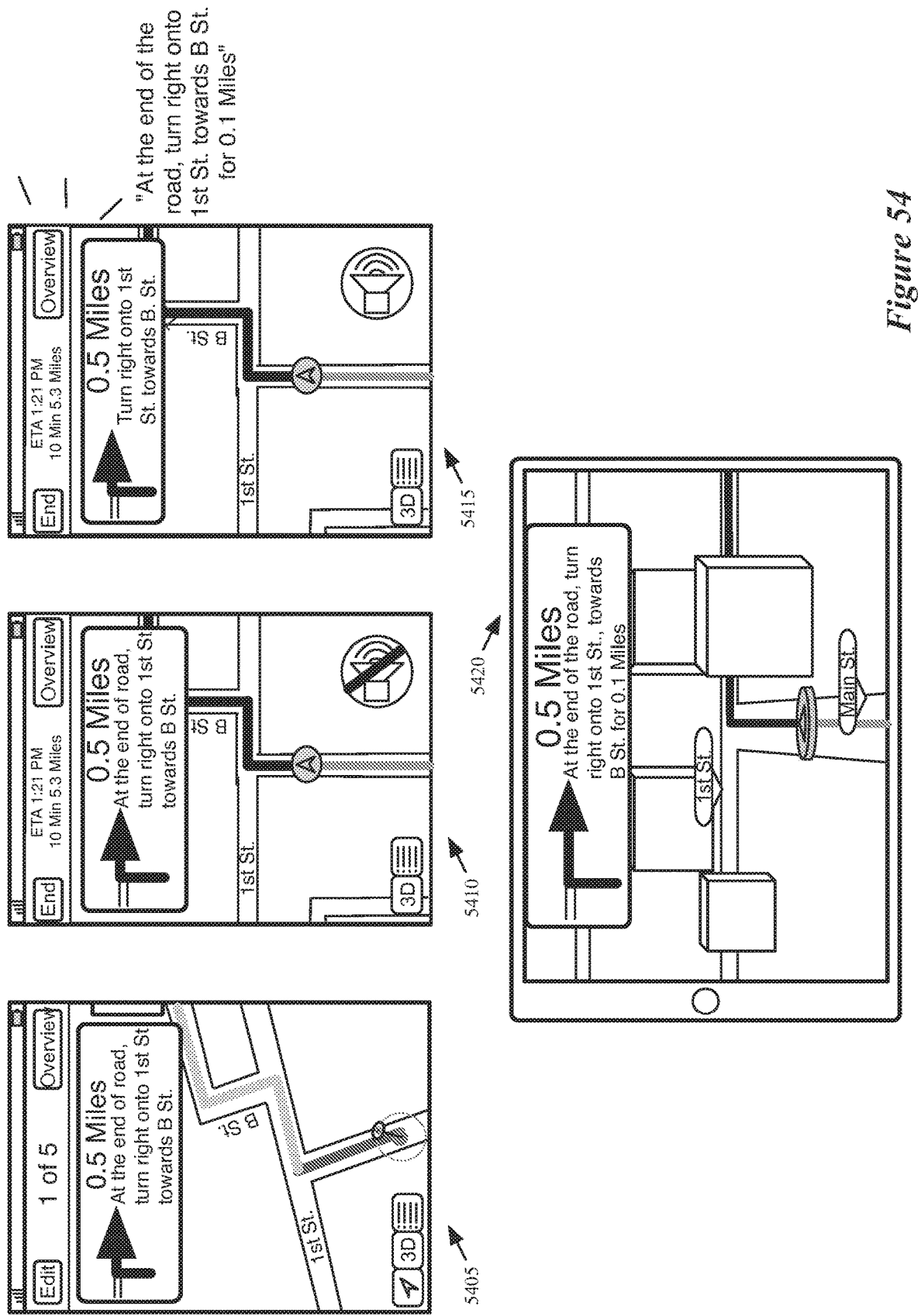
FIG. 54 illustrates additional scenarios in which the mapping application uses the synthesized instruction sets in some embodiments.

FIG. 52 illustrates an example of the synthesis of different instructions for a particular maneuver at a juncture according to some embodiments. FIGS. 53 and 54 then illustrate different scenarios in which these different instructions for the maneuver are used. As shown, the mapping application uses received route instructions and juncture data to identify specific aspects of maneuver instructions. The table 5205 conceptually illustrates how various strings might be generated for a juncture. Specifically, the maneuver instructions include an "At" field, a "Turn" field, an "Onto" field, a "Towards" field, and a "For" field. For each juncture, the application initially populates these string fields, in order to synthesize the instructions from the fields.

In some embodiments, the "At" field is based on map information that includes traffic light and stop sign information, etc. For the examples shown in FIG. 52, the first juncture takes place "at the end of the road", while the second juncture takes place "at the next light". The "Turn" field describes the maneuver to be made; examples of this field include "turn right" (the maneuver performed at the first juncture), "exit freeway", "keep left", "slight left turn", "U-turn", or other maneuvers. The route directions that include a maneuver description may be mapped to different possible strings for the "Turn" field.

The "Onto" field indicates the pathway (i.e., street, freeway, etc.) onto which the maneuver exits the juncture. In the case of the first juncture in FIG. 52, the maneuver exits the juncture "onto $1^{st}$ St.". The "Towards" field indicates a marker (taken from the map data or juncture data) towards which the exit branch points. In some embodiments, the mapping application analyzes the exit branch of the subsequent juncture, and uses the name of this road as the "towards" field. In the example, the second juncture is a left turn onto B St., so the "Towards" field for the first juncture indicates that the maneuver exits "towards B St." Other embodiments use either the next road with which the exit street of the present junction intersects, a major road (e.g., a freeway), or other easily recognizable descriptor (e.g., a city, etc.). The "For" field indicates the distance along which the route will follow the road in the "Onto" field (that is, the road onto which the juncture exits). Thus, in the example instructions, the next juncture will be in 0.1 miles, so the "For" field is "for 0.1 miles".

Next, after generating each of the component strings for a set of instructions, the mapping application of some embodiments generates different levels of instructions. The table 5200 illustrates a set of synthesized instructions for the first juncture. Specifically, the table 5200 illustrates five sets of instructions, of varying lengths, for a particular juncture. However, one of ordinary skill in the art will recognize that different embodiments might include fewer, additional, or different synthesized strings based on the set of string fields.

The first instruction set uses all five of the fields. This is the longest instruction set, reading "At the end of the road, turn right onto 1 St., towards B. St. for 0.1 miles". As it is the longest instruction set, the application assigns the instruction set a rank of 1. The second instruction set removes the "For" field, using only the "At", "Turn", "Onto", and "Towards" fields. The third instruction set removes the "At" field. These fields add context, and are therefore nice to have when additional room is available. However, they are less integral to the maneuver itself, and therefore are the first fields to remove when shortening the instruction text. Next, for the fourth instruction set, the application removes the "Towards" field, as the "Turn" and "Onto" fields are considered more important. Lastly, the fifth instruction set contains only the "Turn" field, simply stating "Turn right".

Again, some embodiments will include additional instruction sets, when different length instructions (that still make sense) are available. For instance, some embodiments will include an instruction set that removes the "At" field but keeps the "For" field, in the case that the "For" field is shorter than the "At" field. This enables the application to have another option in case the second instruction set (with the "For" field removed) is just slightly too long for the allocated space. Furthermore, some embodiments may include additional, fewer, or different fields. For instance, some embodiments might include a "In" field, that gives the distance to the upcoming juncture (i.e., "In 0.5 miles, . . . ").

FIGS. 53 and 54 illustrate several different scenarios in which the mapping application displays different examples of the adaptive instructions for the particular maneuver of the first juncture in table 5205 in a variety of different situations. In this case, the full instructions are "In 0.5 miles, at the end of the road, turn right onto $1^{st}$ St. towards B. St. for 0.1 miles." However, as the example does not include an "In" field, the highest ranked instructions are slightly shorter than this. In order to determine which instruction set to use for a particular display, the mapping application of some embodiments determines a maximum length for the instruction set, then chooses the highest ranked set that fits into the allotted space.

The first scenario 5305 illustrates instructions for the particular maneuver displayed during turn-by-turn navigation. In this case, the application allots three text lines for the instruction. The distance (0.5 miles) is already displayed in large font at the top of the navigation sign, but this is not counted as one of the text lines. With three lines available, the highest ranked instruction set can be used in the navigation sign.

The second scenario 5310 illustrates turn-by-turn navigation instructions for the particular maneuver while in lock screen mode. In this mode, only two lines of large text are allotted in some embodiments, so the highest ranked instructions that fit use only the "Turn" and "Onto" fields. This simplifies into the direction of the turn and the street onto which the user turns. The third scenario 5315 illustrates navigation instructions for the maneuver while the mapping application is not open on the device, in which case the instructions show up as an alert banner. In this case, the application only allots one line to the instructions, so the lowest ranked instructions ("Turn right") are used.

The fourth scenario 5320 illustrates the display of information in the list view for route directions. This view, as described above, lists subsequent instructions for each of the maneuvers along a route. In some embodiments, the banners in the list view for each direction are of a variable height, and therefore the full instruction set is always used. Thus, the highest ranked set of instructions, "At the end of the road, turn right onto $1^{st}$ St. towards B. St." is used for the first maneuver in the list. As shown, this maneuver takes an extra line of text as compared to the next two maneuvers.

The fifth scenario 5325 illustrates turn-by-turn navigation in 3D mode. As compared to the first scenario 5305, some embodiments allot less room in the navigation sign for the instruction set when in 3D mode, in order for more of the 3D display to be viewable. As such, the application uses the third ranked instruction set, because this is the largest instruction that fits in the two lines using the given text size.

FIG. 54 illustrates additional scenarios in which the mapping application uses the synthesized instruction sets. The sixth scenario 5405 illustrates the display of route overview instructions that the user can step through (e.g., with sweep gestures). In some embodiments, the application allots the same amount of space for step-through instructions as for turn-by-turn navigation, and therefore the application again uses the highest ranked instruction set that includes all of the fields.

The seventh scenario 5410 is the same as the first scenario 5305, but explicitly indicates that the spoken navigation is turned off. This is provided here to contrast with the eighth scenario 5415, in which voice instructions are enabled during turn-by-turn navigation. For voice navigation, the application determines a maximum amount of time allowed for speaking the instructions, then determines the highest ranked set of instructions that can be spoken within this allotted time. In this case, the time allows the entirety of the highest ranked instruction set to be selected. In addition, when voice navigation is activated, the application reduces the size of the displayed navigation sign. As such, the application displays the third ranked instruction set within the display.

Finally, the mapping application of some embodiments may operate on different types of devices with different size display screens. For example, the application might operate on both smart phones and larger tablet computers. When operating on a larger device, some embodiments allow more room for the navigation sign. The ninth scenario 5420 illustrates turn-by-turn 3D navigation on a larger device (a tablet computer). Unlike in the fifth scenario 5325, the navigation sign provides enough room for the highest ranked instruction set to be used.

The above description describes some embodiments that generate several different instruction sets for a maneuver, rank the instruction sets, and then adaptively determine which of these instruction sets best fits into a particular space. In some embodiments, the application identifies a maximum number of characters available to use for the instruction display. The application then starts with the highest ranked instruction set and determines whether the instruction set fits into the identified number of characters. When the instruction set fits, the application selects and displays the instruction set. When the instruction set does not fit, the application moves to the next ranked instruction set and performs the same test. If none of the instruction sets fit, then the application uses the one that comes closest to fitting. Some embodiments then truncate the instruction set with an ellipsis to indicate that the instruction set does not completely fit within the space. This may result in elements being removed from the string.

In addition to text, some embodiments use text substitutes within the instruction sets. Specifically, for roads represented by shield signs (e.g., interstate freeways, state routes), the application uses the shield representation of the road rather than the road name (e.g., a blue and red shield with "I-5" inside of it instead of "Golden State Freeway" or "Interstate 5". Some embodiments treat these signs as a fixed number of characters when assessing the different instruction sets.

The above description describes some embodiments of the mapping application in which the decision regarding which elements to use is performed primarily based on trying to use the maximum length instruction set. Some other embodiments factor in whether certain elements of an instruction set are presented to the user in a different visual manner, and may potentially remove these elements.

For instance, when displaying a detailed instructional arrow that makes clear a turn is a slight right turn, some embodiments shorten the instruction to remove the "slight" or even remove the entire reference to the turn, instead using instructions along the line of "CA-17 S towards Santa Cruz". Similarly, if displaying a large road shield sign, then the "CA-17 S" portion of the instruction might be omitted.

B. Client Side Generation of Instructions that are Adapted to the Context

The above section illustrated several examples of the mapping application synthesizing navigation instructions based on route and juncture data, and then displaying different variants of these instructions according to different contexts. A user might request the mapping application to search for a route from a first location to a second location (e.g., from the user's house to a particular restaurant). In some embodiments, the application sends the request to a centralized mapping service (e.g., a set of servers running back-end map and route generation processes, such as those described above in Section III.A) and receives a set of one or more possible routes from the first location to the second location. The user then selects one of the routes to follow.

Figure 55:
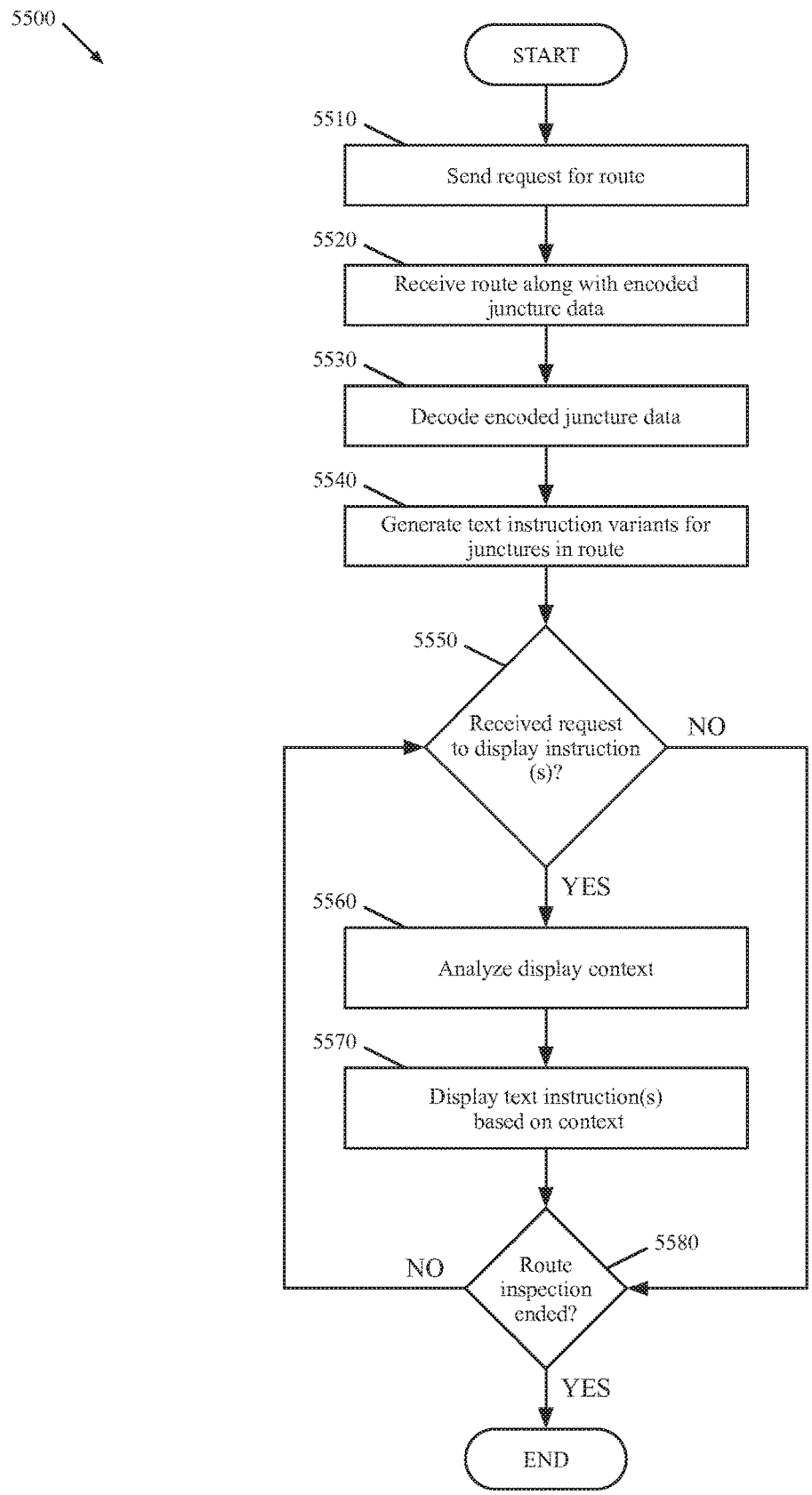
FIG. 55 conceptually illustrates a process of some embodiments for displaying text instructions during route inspection.

FIG. 55 conceptually illustrates a process 5500 of some embodiments for displaying text instructions during route inspection. In some embodiments, a user can view a list of directions for a route (e.g., by selecting a list view GUI button) or can step through the directions one at a time (e.g., via swipe gestures) while also viewing the route on the map. In some embodiments, the process 5500 is performed by a mapping application that operates on a device (e.g., a mobile device such as a smart phone or touchpad).

As shown, the process 5500 of some embodiments begins by sending (at 5510) a request for a route to a mapping service server. In some embodiments, the request comprises a starting location and an ending location, potentially with one or more intermediate locations. The user enters these locations into the mapping application GUI of some embodiments, and the application transmits a route request through a device interface to the mapping service server. The operations of the server to generate a route and navigation (juncture) instructions are described above in Section III.A.

The process 5500 then receives (at 5520) the route along with encoded juncture data. In some embodiments, the mapping service transmits the juncture data in an encoded format. This encoding may simply involve identifying similar junctures and referencing these rather than repeating the same juncture information twice, or may involve additional encoding. Other embodiments do not provide any encoding. Assuming the data is encoded, the process decodes (at 5530) the encoded juncture data to arrive at juncture information for each maneuver along a route. This juncture data, in some embodiments, consists of geometry information that identifies the branches of the juncture and the angles at which those branches enter/exit the juncture. Along with the juncture information, some embodiments also include maneuver information that describes the maneuver being made (e.g., as a right turn, U-turn, freeway off ramp, etc.).

Next, the process generates (at 5540) text instruction variants for all the junctures along the route. Text instruction variants are combinations of text strings derived from the decoded juncture and maneuver information. As discussed above in conjunction with FIGS. 52-54, examples of such text strings include "at the second intersection", "turn left", "onto 1 St.", "towards Wolfe Rd.", and "for 0.3 miles". In some embodiments, the process 5500 combines the text strings into text instruction variants. As a first example of such a combination, process 5500 may combine "at the second intersection" and "turn left" to produce a short text instruction variant that reads, "At the second intersection, turn left." As a second example of such a combination, process 5500 may combine all of the previous text strings to produce a long text instruction variant that reads "At the second intersection, turn left onto $1^{st}$ St., towards Wolfe Rd. for 0.3 Miles." In some embodiments, process 5500 ranks the text instruction variants for each juncture based on the amount of information conveyed in each variant. In some embodiments, the text instruction variants are generated by the device using a process such as the process 5800 described below by reference to FIG. 58.

The process then determines (at 5550) whether a request to display route instruction(s) has been received. As shown in the previous subsection, a user might step through the instructions one at a time, or request to view a list of such route instructions. When no request is received, the process transitions to 5580, to determine whether the route inspection has ended (e.g., because the user has cancelled a route, begun navigation of the route, closed the mapping application, etc.). These two operations effectively function as a 'wait' state, where the process waits until an event causing the display of route instructions is received.

When the application has received such a request, the process 5500 analyzes (at 5560) the context for displaying the one or more text instruction(s). In some embodiments, the context depends on several factors associated with clearly displaying the instructions required for navigating the route. For example, the context may be based on the amount of space available to display the text instruction (e.g., due to the size of the device on which the route directions are displayed) or the conditions under which the indicator will be displayed (e.g., whether the maneuver is a current or future route maneuver, in which particular modality of the mapping application the sign will be displayed, etc.).

After identifying the context for the route instructions, the process 5500 displays (at 5570) the text instruction(s) for the maneuver(s) based on the context. In some embodiments, the context for displaying a particular text instruction determines which text instruction variant is displayed. The text instruction variants, in some embodiments, come in different lengths for different contexts. In some embodiments, longer text instruction variants convey more information than shorter instruction variants. However, longer instruction variants may not fit into small banners or may cause wrapping effects across text lines. Some embodiments, for example, use longer text instruction variants for displaying the route instructions one maneuver at a time in the standard turn-by-turn navigation view, but use shorter text instruction variants for displaying the same maneuver when less space is allocated, such as when navigation is on but the device is in a different application. The process then determines (at 5580) whether route inspection has ended, as described above. Once route inspection has ended, the process ends.

Figure 56:
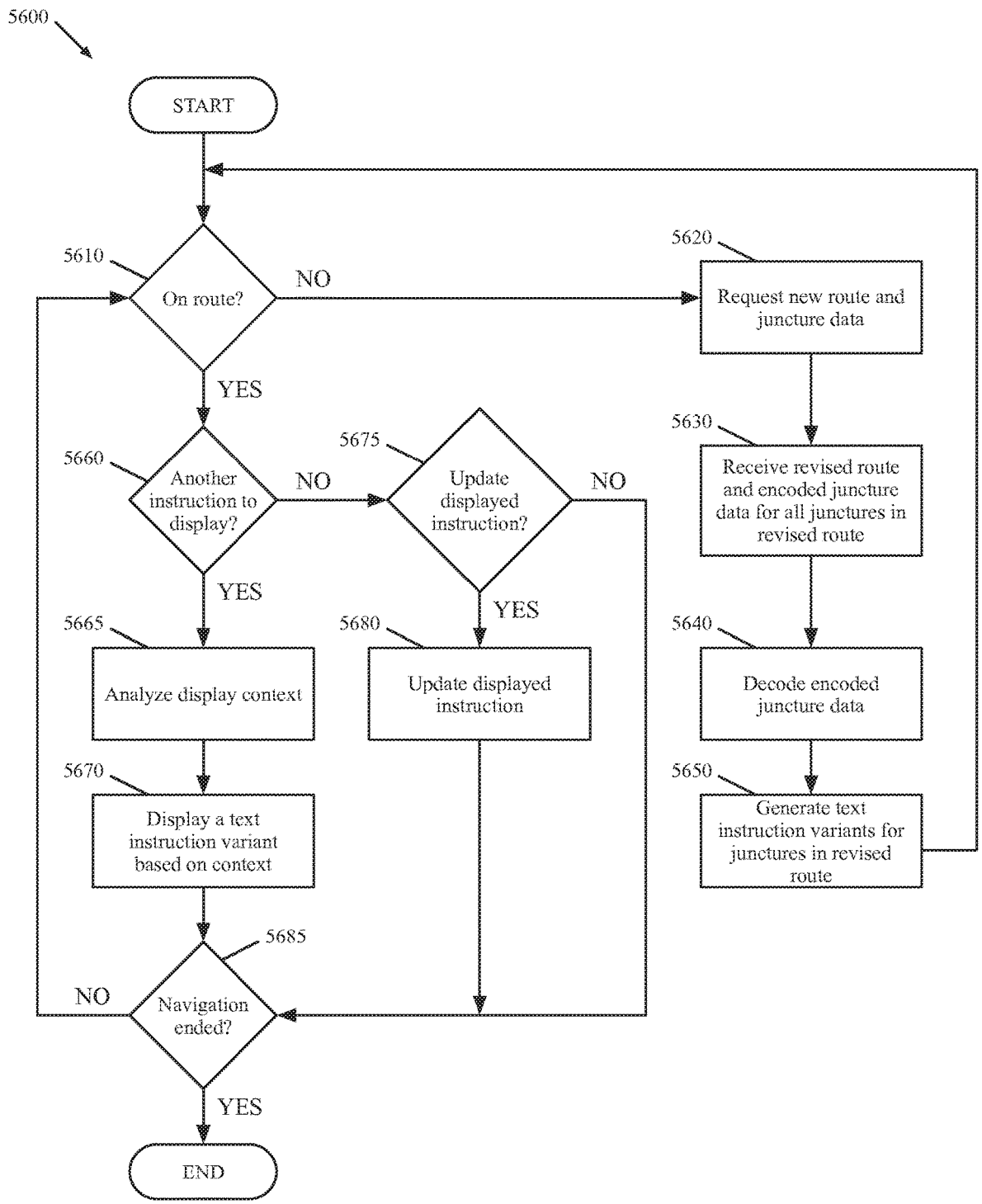
FIG. 56 conceptually illustrates a process of some embodiments that performs navigation over such a route.

In addition to the display of route instructions before actually following along a route, the text instructions are used in various contexts during turn-by-turn navigation. FIG. 56 conceptually illustrates a process 5600 of some embodiments that performs navigation over such a route. In some embodiments, the process 5600 is performed by a mapping application that operates on a device (e.g., a mobile device such as a smart phone or touchpad).

As shown, the process 5600 begins by determining (at 5610) whether the user is navigating the route. That is, the application determines whether the location of the user device (e.g., provided by the device's GPS capability or other location tracking mechanism) is along the path of the route, or has moved off of the route. When the user moves off of the route (e.g., because the user makes a different maneuver than those specified by the route, taking the location of the device off the route), the mapping application requires an update to the route and juncture data. Accordingly, if the device running the mapping application is no longer on route, the process requests (at 5620) new route and junction data from the mapping service server. The process then receives (at 5630) revised route and juncture data for all junctures along the route. In some embodiments, the juncture data is determined by the mapping service server for each juncture along the route. As described above, the juncture data may include the angles of the different branches of the juncture, normalized to the entry direction, along with an indication of the exit branch of the juncture. In some embodiments, the juncture data is retrieved by the server from a storage having a set of known junctures and angles (e.g., all the public roads in the United States). In some cases, the server generates juncture data from other sources (e.g., transportation agencies of states and municipalities, recent satellite photos illustrating new roads not previously stored, etc.). For route updates, some embodiments of the mapping service only generate and transmit new juncture information for the changes to the route, and reference the already-received data for junctures shared by the old and new routes.

Next, process 5600 decodes (at 5640) the encoded juncture data to arrive at juncture information for each maneuver along the revised route. This juncture data, in some embodiments, consists of geometry information that identifies the branches of the juncture and the angles at which those branches enter/exit the juncture. Along with the juncture information, some embodiments also include maneuver information that describes the maneuver being made (e.g., as a right turn, U-turn, freeway off ramp, etc.).

The process then generates (at 5650) text instruction variants for the junctures in the revised route. Text instruction variants are combinations of text strings derived from the decoded juncture and maneuver information. As discussed above in conjunction with FIGS. 52-54, examples of such text strings include "at the second intersection", "turn left", "onto $1^{st}$ St.", "towards Wolfe Rd.", and "for 0.3 miles". In some embodiments, the process 5500 combines the text strings into text instruction variants. As a first example of such a combination, process 5500 may combine "at the second intersection" and "turn left" to produce a short text instruction variant that reads, "At the second intersection, turn left." As a second example of such a combination, process 5500 may combine all of the previous text strings to produce a long text instruction variant that reads "At the second intersection, turn left onto $1^{st}$ St., towards Wolfe Rd. for 0.3 Miles." In some embodiments, process 5500 ranks the text instruction variants for each juncture based on the amount of information conveyed in each variant. In some embodiments, the text instruction variants are generated by the device using a process such as the process 5800 described below by reference to FIG. 58.

After generating the set of text instruction variants for the junctures in the revised route, the process returns to 5610 to again determine whether the user is navigating the new route. When the user device is still following the route, the process 5600 determines (at 5660) whether to display a new navigation instruction. When navigating a route, in some embodiments, each maneuver associated with a juncture is illustrated to the user as a sign (e.g., a green sign with an arrow and a textual instruction describing the maneuver at some level of detail) as the juncture approaches.

When a new navigation instruction is not required (e.g., because the maneuver indicated by the currently displayed instruction has not yet been performed), the process determines (at 5675) whether to update the currently displayed instruction. As shown in the previous subsection, in some embodiments the navigation sign includes an indicator of the distance remaining until the maneuver. In some embodiments, the mapping application regularly updates this distance indicator as the maneuver approaches (e.g., every mile, then every tenth of a mile, then every fifty feet, etc.). When a distance threshold has been reached such that the displayed instruction must be updated, the process 5600 updates (at 5680) the displayed instruction. In some embodiments, this entails updating the number and/or distance unit (e.g., switching from miles to feet for the last tenth of a mile). Some embodiments also provide an update to the distance remaining via the voice output feature of the device on which the process operates.

The process then proceeds to 5685 to determine whether navigation has ended. When navigation has ended, the process 5600 ends. The operations 5660, 5675, and 5685 effectively function together as a 'wait' state, in which the mapping application waits for an event requiring either the display of a new navigation instruction or an update to the displayed navigation instruction, or for the navigation to end (e.g., because the route's ending location is reached).

When an event occurs requiring the display of a new navigation instruction, the process analyzes (at 5665) the context for displaying the text instruction. In some embodiments, the context depends on several factors associated with clearly displaying the route maneuvers required for navigating the route. For example, the context may be based on the amount of space available to display the text instruction (e.g., due to the size of the device on which the route directions are displayed) or the conditions under which the indicator will be displayed (e.g., whether the maneuver is a current or future route maneuver, in which particular modality of the mapping application the sign will be displayed, etc.). Additional contextual factors may include whether the instruction is also being provided to the user via the voice guidance feature, the orientation of the device, and other factors in some embodiments.

After identifying the context for displaying the text instructions, the process 5600 displays (at 5670) a text instruction variant for the upcoming juncture based on the context. In some embodiments, the context for displaying a particular text instruction determines which text instruction variant is displayed. The text instruction variants, in some embodiments, come in different lengths for different contexts. In some embodiments, longer text instruction variants convey more information than shorter instruction variants. However, longer instruction variants may not fit into small banners or may cause wrapping effects across text lines. Some embodiments, for example, use longer text instruction variants for displaying the route instructions one maneuver at a time, and use shorter text instruction variants for displaying a list view of all of the instructions at once. Some embodiments set a character or size limit based on context, and select the text instruction variant that conveys the most information while still fitting into the display area allotted for the navigation instruction and maintaining the appropriate text size.

After displaying the new instructions, the process 5600 transitions to 5685 to determine whether the navigation has ended. In some embodiments, the navigation ends when the user stops the mapping application or when the destination is reached. If the navigation has ended, the process 5600 ends. Otherwise, the process 5600 transitions back to 5610 to determine whether the route navigation is still on the path, as described above.

Figure 57:
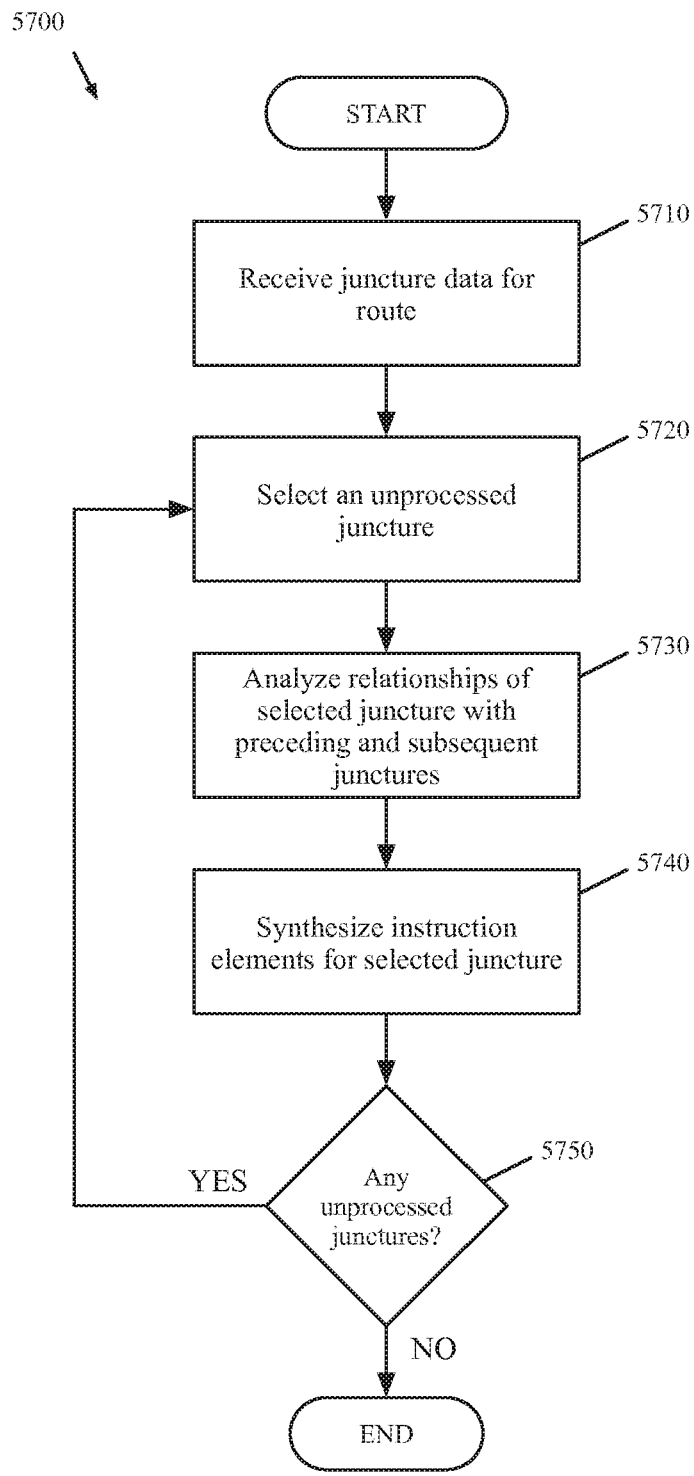
FIG. 57 conceptually illustrates a process of some embodiments for decoding encoded juncture data and synthesizing instruction elements from the route and juncture data received from a mapping service.

As discussed above, the mapping application of some embodiments decodes and synthesizes the received juncture data in order to arrive at the string data with which to generate the navigation instructions. FIG. 57 conceptually illustrates a process 5700 of some embodiments for decoding encoded juncture data and synthesizing instruction elements from the route and juncture data received from a mapping service. In some embodiments, the process 5700 is performed by a mapping application. The mapping application performs this process 5700, in some embodiments, at stage 5530 of the process 5500, after receiving juncture data for all junctures along a route.

As shown, the process 5700 begins by receiving (at 5710) encoded juncture data for all junctures in the route. In some embodiments, the process downloads the encoded juncture data from a mapping service server. In some embodiments, this encoding may simply involve identifying similar junctures and referencing these within the set of junctures rather than repeating the same juncture information twice, or may involve additional encoding. In addition, some embodiments receive route instruction information that indicates a type of maneuver to perform (e.g., "turn right". "keep left", etc.).

Next the process selects (at 5720) an unprocessed juncture. In some embodiments, the process selects the junctures in order from the start of the route to the end of the route, at each maneuver indicated by the route instructions. Once a juncture is selected, the process analyzes (at 5730) any relationships the selected juncture has with preceding or subsequent junctures, as well as specific aspects of the selected juncture. In some embodiments, such analysis can include determining distances between the preceding and subsequent junctures in the route, determining turn degree, identifying the primary maneuver to perform at the selected juncture, identifying the names of the roads at each branch of the juncture, identifying roads or other identifiers on the map that the route travels towards after the maneuver is performed at the selected juncture.

After analyzing the juncture relationships, the process synthesizes (at 5740) instruction elements for the selected juncture using the analyzed juncture data. The synthesized instruction elements are associated with the selected juncture. In some embodiments, synthesized instruction elements include a set of text strings. As discussed above by reference to FIG. 52, examples of such text strings include "at the end of the road", "turn right", "onto 1 St.", "towards B St.", and "for 0.1 miles".

In some embodiments, each text string is associated with an element category. Examples of element categories include: "at" elements that define the location at which the main maneuver will occur, "turn" elements that summarize the primary maneuver to make at the selected juncture. "onto" elements that identify the object (i.e., road) onto which the main maneuver will turn, "towards" elements that identify the next object towards which the main maneuver will lead, and "for" elements that identify the distance between the selected juncture and the next juncture. However, other embodiments might use additional, fewer, or different element categories than those listed here.

Next, the process determines (at 5750) whether any junctures remain to be processed. When additional junctures remain for processing (i.e., for which elements have not yet been synthesized), the process 5700 returns to operation 5720 to select the next juncture. Once all of the junctures have been processed, the process 5700 ends.

The output of the process 5700 is a set of instruction elements for each juncture of a route received from the mapping service server. In some embodiments, the mapping application on the client device then uses these synthesized instruction elements to generate several text navigation instruction variants for each juncture.

Figure 58:
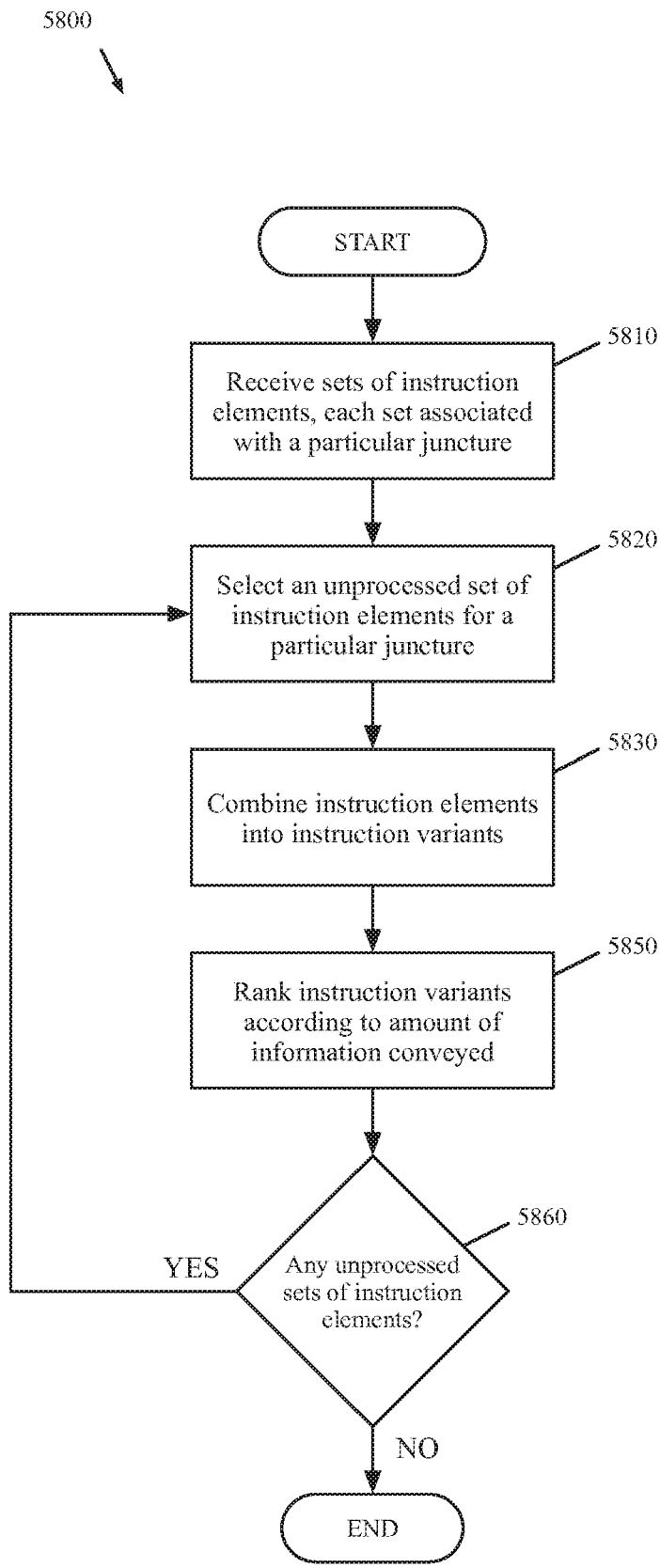
FIG. 58 conceptually illustrates a process of some embodiments for generating navigation instruction variants for display in different contexts.

FIG. 58 conceptually illustrates a process 5800 of some embodiments for generating navigation instruction variants for display in different contexts. In some embodiments, the process 5800 is performed by a mapping application that operates on a device (e.g., a mobile device such as a smart phone or touchpad). In some embodiments, the mapping application performs the processes 5700 and 5800 in succession (i.e., synthesizing the elements for each juncture and then using the elements to generate instruction text).

As shown, the process 5800 begins by receiving (at 5810) sets of instruction elements that are each associated with a particular juncture. As discussed above by reference to FIG.

57, in some embodiments the sets of instruction elements include text strings associated with element categories (i.e., "at", "turn", "onto", "towards", and "for" categories).

Next, the process 5800 selects (at 5820) an unprocessed set of instruction elements for a particular juncture of the route. While the processes 5700 and 5800 illustrate the mapping application first synthesizing the elements for each juncture and then subsequently generating the instruction text, in some embodiments the mapping application performs all of the operations in a single loop over each juncture. That is, the mapping application of some embodiments selects a juncture, synthesizes its elements, then generates the instruction text variants before moving on to the next juncture.

For the selected set of instruction elements, the process 5800 combines (at 5830) the instruction elements of the set into instruction variants. As a first example of such a combination, the process 5800 may combine "at the end of the road" and "turn right" to produce a shorter text instruction variant that reads, "At the end of the road, turn right." As a second example of such a combination, process 5800 may combine all of the previous text strings to produce a longer text instruction variant that reads "At the end of the road, turn right onto $1^{st}$ St., towards B St. for 0.1 Miles." Some embodiments generate the same combinations of elements for each juncture. For example, in some embodiments the application generates a first instruction text variant for each juncture from all of the elements, a second instruction text variant from only the "turn" and "onto" elements, a third instruction text variant from the "turn", "onto", and "towards" elements, etc. Other embodiments take into account other factors to generate different instruction text variants from the synthesized elements.

After generating the instruction text variants for a selected juncture, the process 5800 ranks (at 5850) the instruction variants according to the amount of information conveyed in each variant. In some embodiments, the application uses length (e.g., number of characters) as a proxy for information conveyed. Other embodiments prefer specific combinations of elements over other combinations of elements, even if this methodology results in ranking a slightly shorter variant ahead of a longer variant. Some embodiments, for example, use specific combinations of elements for each juncture, with each specific combination having the same ranking for each juncture.

The process 5800 then determines (5860) whether any unprocessed sets of instruction elements remain (i.e., whether instructions have been generated for all of the junctures of the route). When additional unprocessed sets of instruction elements remain, the process 5800 returns to operation 5820 to select the next set of instruction elements. Otherwise, once all of the junctures have had their instructions generated, the process 5800 ends.

C. Navigation Instruction Software Architecture

Figure 59:
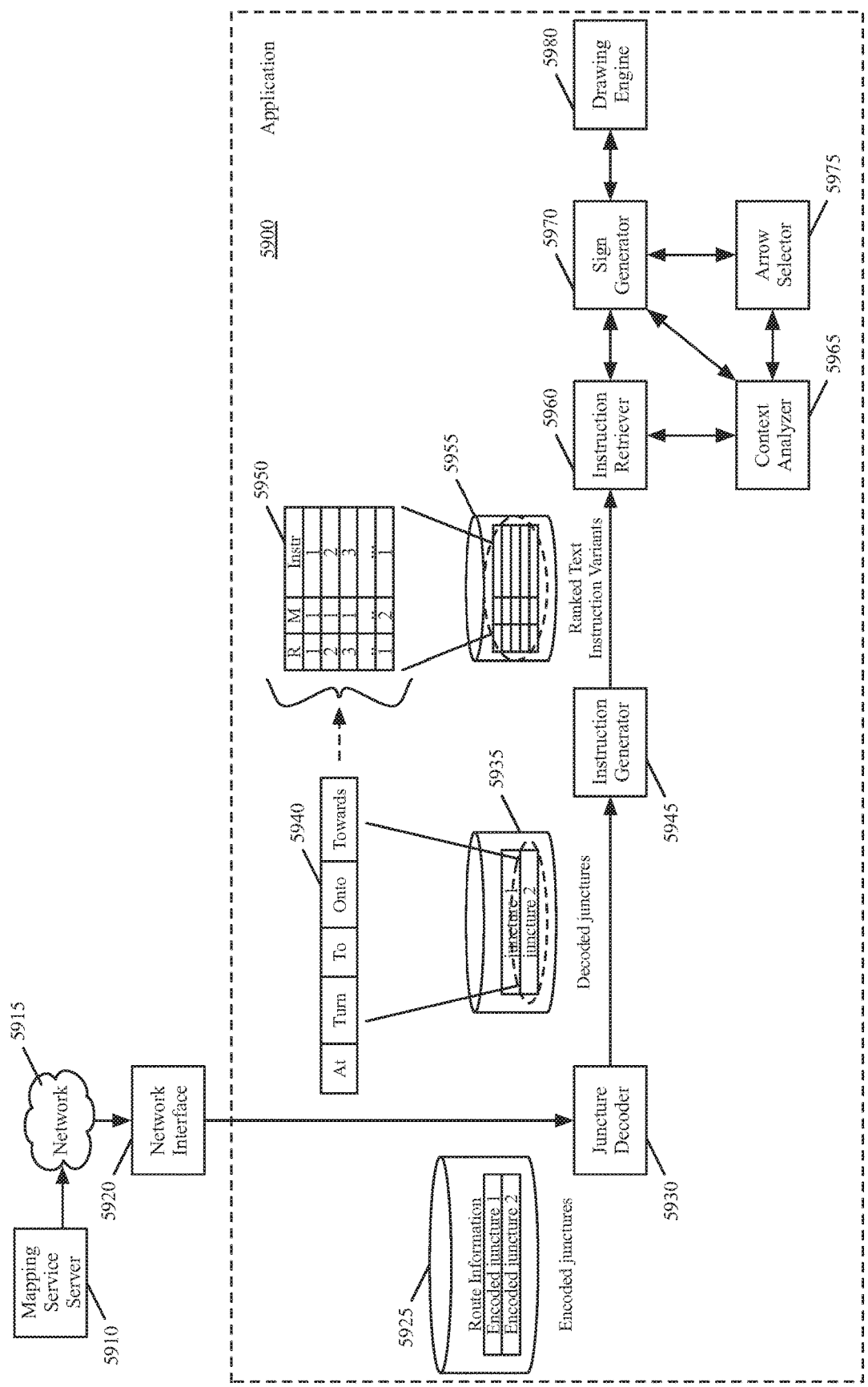
FIG. 59 conceptually illustrates a system architecture that includes mapping and navigation application of some embodiments that generates text instructions for different contexts.

As stated above, in some embodiments the maps, routes, and turn-by-turn navigation are presented to a user by a navigation application that operates on a device (e.g., a handheld device such as a smart phone or tablet). The navigation application may be a stand-alone application in some embodiments, or integrated with the operating system of the device. FIG. 59 conceptually illustrates a system architecture that includes a mapping and navigation application 5900 of some embodiments that generates text instructions for different contexts. One of ordinary skill in the art will recognize that the modules shown for the application 5900 are specific to the text instruction generation processes, and that the mapping and navigation application of some embodiments will include numerous additional modules (e.g., for map display, route display, additional aspects of navigation, etc.).

As shown, a mapping service server 5910 transmits route and juncture data through a network 5915 to a network interface 5920 of the device on which the mapping and navigation application 5900 operates. In some embodiments, the mapping service server 5910 receives a route request from devices on which the navigation application 5900 operates and generates route and juncture data for the requests.

The navigation application 5900 includes a juncture decoder 5930, an instruction generator 5945, an instruction retriever 5960, a context analyzer 5965, a sign generator 5970, an arrow selector 5975, and a drawing engine 5980. The juncture decoder 5930 receives encoded juncture information 5925 for a route, decodes this information to arrive at information describing each juncture and the maneuvers performed at the junctures, and synthesizes a set of instruction elements for each juncture in the route. In some embodiments, the juncture decoder 5930 executes the process 5700 of FIG. 57, described above. The juncture decoder 5930 decodes encoded junctures 5925 to generate decoded juncture data 5935.

In some embodiments, encoded junctures 5925 and decoded junctures 5935 may be stored on the device in random access memory or other volatile storage, for use only during the navigation of the route, or in a more permanent storage such as a hard disk or solid-state memory. As shown by example table 5940, some embodiments store a set of text string elements for each juncture, e.g., in a table, array, or similar data structure. FIG. 52, described above, illustrates an example of such a table stored for a particular set of junctures.

The instruction generator 5945 generates ranked text instruction variants 5955 for display on a device based on the synthesized instruction elements 5935 received from the juncture decoder 5930. In some embodiments, the instruction generator 5945 executes the process 5800 of FIG. 58, described above. In some embodiments, the ranked text instruction variants 5955 may be stored on the device in random access memory or other volatile storage, for use only during the navigation of the route, or in a more permanent storage such as a hard disk or solid-state memory. FIG. 52, described above, also illustrates an example of ranked instruction variants 5955 generated by the instruction generator 5945. The example table 5950 illustrates the results of synthesizing the elements 5940 into several text instruction variants for use in different contexts of the navigation displays.

The instruction retriever 5960 uses a context analyzer 5965 to determine which of the instruction variants to select for a particular display of a maneuver, depending on the context in which the text instruction will be displayed. These contexts may include different situations for routing directions or different situations for turn-by-turn navigation instructions (e.g., standard mode, lock-screen mode, when a different application is open, when voice navigation is activated, etc.). In some embodiments, the context depends on several factors associated with clearly displaying the route maneuvers required for navigating the route. For example, the context may be based on the amount of space available to display the text instruction (e.g., due to the size of the device on which the route directions are displayed), the conditions under which the indicator will be displayed (e.g., whether the maneuver is a current or future route maneuver, in which particular modality of the navigation application the sign will be displayed, etc.), or other factors. Many such contexts are shown above in subsection A of this Section. The instruction retriever 5960 selects an instruction variant to use for a particular maneuver display and provides this information to the sign generator 5970.

The arrow selector 5975 also uses the context analyzer 5965 to determine which of the directional indicators to use for a particular maneuver, depending on the context in which the indicator will be displayed. The arrow selector chooses one of the graphical indicators described in the previous section (e.g., either a complex or simple representation of a maneuver) and provides this selection to the sign generator 5970. The sign generator 5970 generates a navigation instruction sign for display that includes the selected graphical indicator and instruction text variant. The sign generator 5970 also uses the context analyzer results to generate other aspects of the sign, such as how often to update the distance information and whether to use road sign shields in place of road names.

The drawing engine 5980 receives the generated signs from the sign generator 5970 and incorporates the sign into a display to output to a display device (or to a frame buffer that feeds into the display device). In some embodiments, the drawing engine 5980 incorporates the sign along with a 2D map, 3D map, or other GUI elements shown by the mapping and navigation application.

V. Navigation Instructions when not in Navigation Application

A. Instructions when Device is Unlocked and Navigation is Operating in Background Some embodiments allow the navigation application to run in the background while other applications are running in the foreground. These embodiments provide unobtrusive navigation instructions in the foreground even while the main navigation application is running in the background and another application or an application launcher is running in the foreground. Examples of applications running in the foreground include voice-activated personal assistant, mail, browser, phone, calendar, or any other application available on the device.

Figure 60:
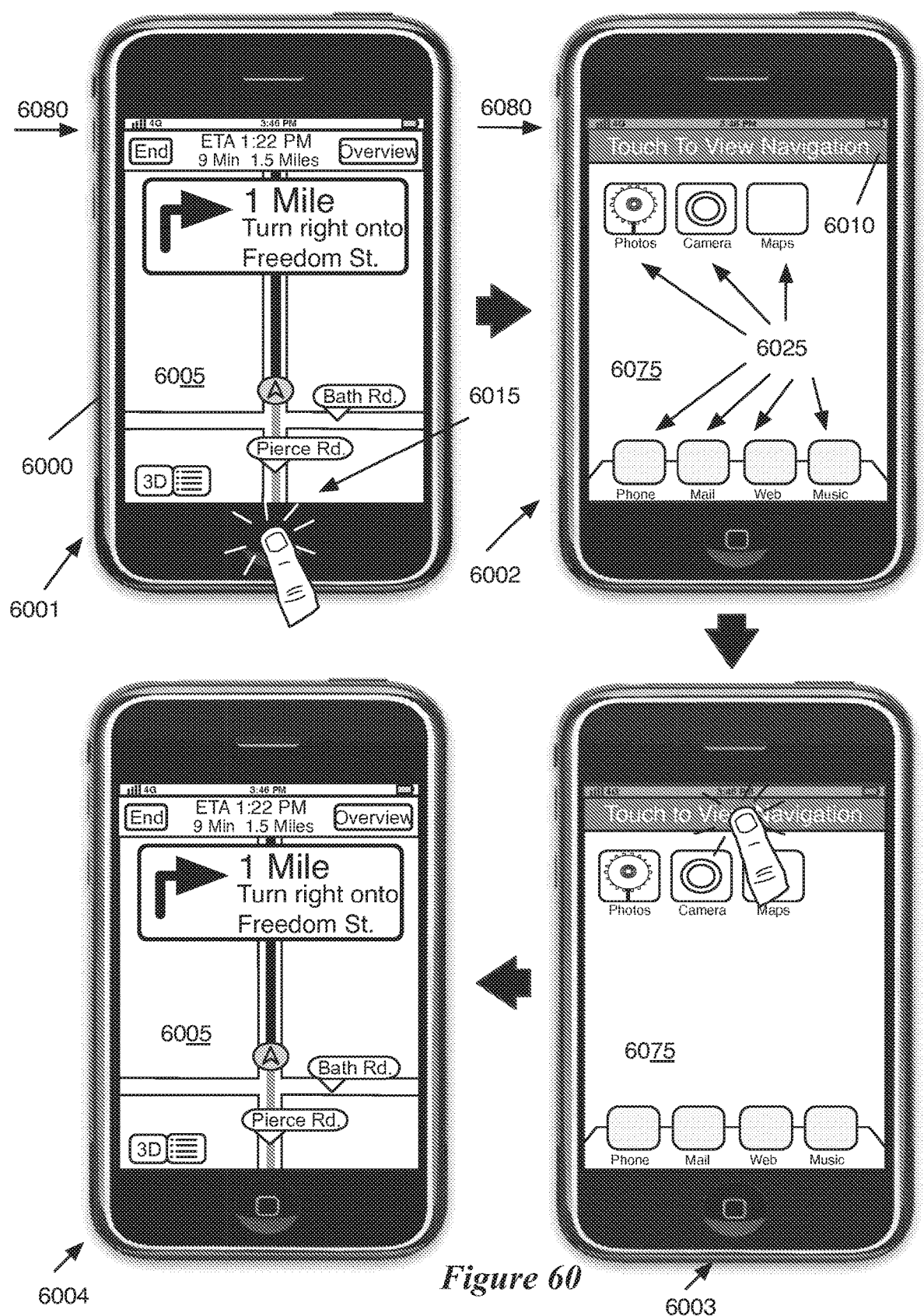
FIG. 60 illustrates a user device display when navigation is in process in background in some embodiments of the invention.

The navigation application of some embodiments provides a navigation bar (sometimes called a "banner" or "navigation banner") as well as a regular status bar on the screen. Some embodiments provide a navigation status bar when no navigation instructions are being provided and provide a navigation instruction bar when navigation instructions are being given. FIG. 60 illustrates a user device display 6000 when navigation is in operating in background in some embodiments of the invention. The user device display 6000 is shown in four stages 6001-6004.

In stage 6001, the display 6000 shows navigation application 6005, a status bar 6080, and a button 6015. The status bar 6080 shows different information such as battery level, time, reception bars, etc. In some embodiments, the status bar displays an indicator such as an arrow, which indicates that the navigation application or a map application is running. In this stage 6001, the navigation application 6005 is running in the foreground until the device receives a selection (e.g., a click) on button 6015 that switches from the navigation application to the application launch view, which can itself be characterized as an application launching application. In some embodiments, there are other controls instead of or in addition to the button that switch the navigation application to another application (e.g., the application launch view or other applications). The stage 6001 also shows that the road names are displayed on road signs and not in banners. As mentioned above, the mapping application of some embodiments may display the road names on the road and/or in the banners regardless of the mode in which the mapping application operates.

In stage 6002 application launcher 6075 is displayed in the foreground. The foreground application launcher 6075 has icons 6025 that have their normal functions (e.g., launching other applications) while the navigation application runs in the background. In stage 6002 a background navigation status bar 6010 is shown below the status bar 6080. Some embodiments display the status bar 6080 and/or the navigation status bar 6010 in a different color (e.g., green) when navigation is running in background (as shown in stage 6002) than the status bar color (e.g., gray) when navigation is not running in background (as shown in stage 6001). In other embodiments, the status bar 6080 is the same color when the navigation application is running in the background, the navigation application is off, or the navigation application is running in the foreground. In some embodiments, the thickness of the navigation status bar is the same or approximately the same (e.g., 75% to 125% of the thickness) as the thickness of the status bar when the navigation application is not currently displaying a direction in a navigation instruction bar.

The navigation status bar 6010 in some embodiments is both an indicator that the navigation application is running in the background and a control for bringing the navigation application to the foreground. The navigation status bar 6010 in some embodiments is not limited to being displayed only with the application launching screen 6075, but rather is displayed below the status bar 6080 at the top of any application that is running in the foreground.

In stage 6003, the navigation status bar 6010 is selected by touching the navigation status bar 6010 on the screen. Some embodiments also allow the selection of the navigation bar by other touch-based or motion-based input devices as well as non-touch based or motion-based input devices. Some devices used for selection in some embodiments include keyboards, mice, joysticks, touch-pads, and the like (e.g., selection can be by a click from a mouse). The selection of the navigation status bar 6010 (as shown in stage 6003) causes the navigation application 6005 to return to the foreground in stage 6004. In addition to utilizing navigation status bar 6010 to return to the navigation application (i.e., to bring the navigation application to foreground), in some embodiments the navigation bar has other functions. For instance, the navigation status bar 6010 is used in some embodiments to provide navigation instructions (e.g., turn-by-turn directions) while the navigation application itself is still in the background. In other embodiments, the navigation status bar is replaced at various times by a navigation instruction bar that provides instructions.

Figure 61:
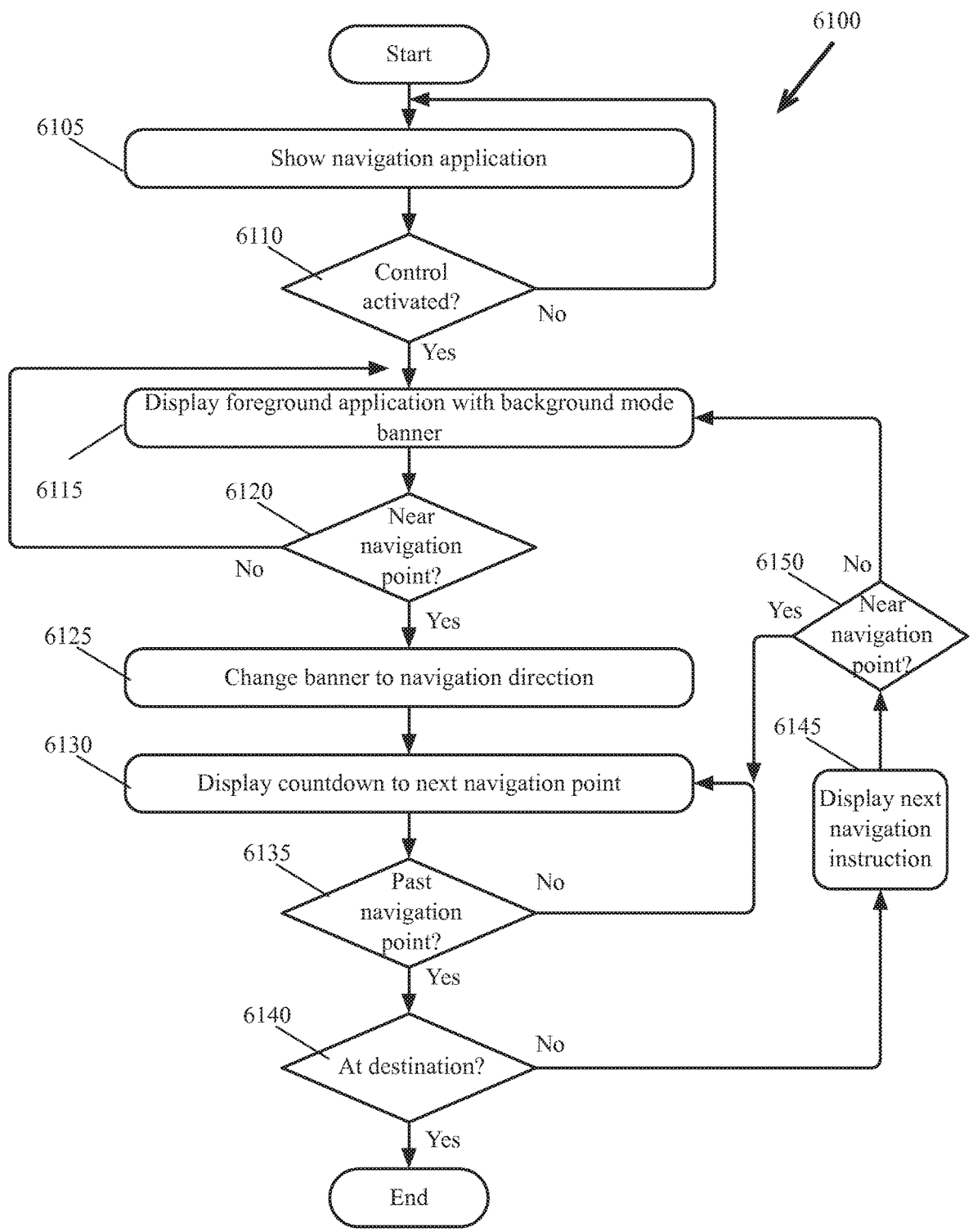
FIG. 61 conceptually illustrates a process of some embodiments for providing directions while a navigation application is running in the background.
Figure 62:
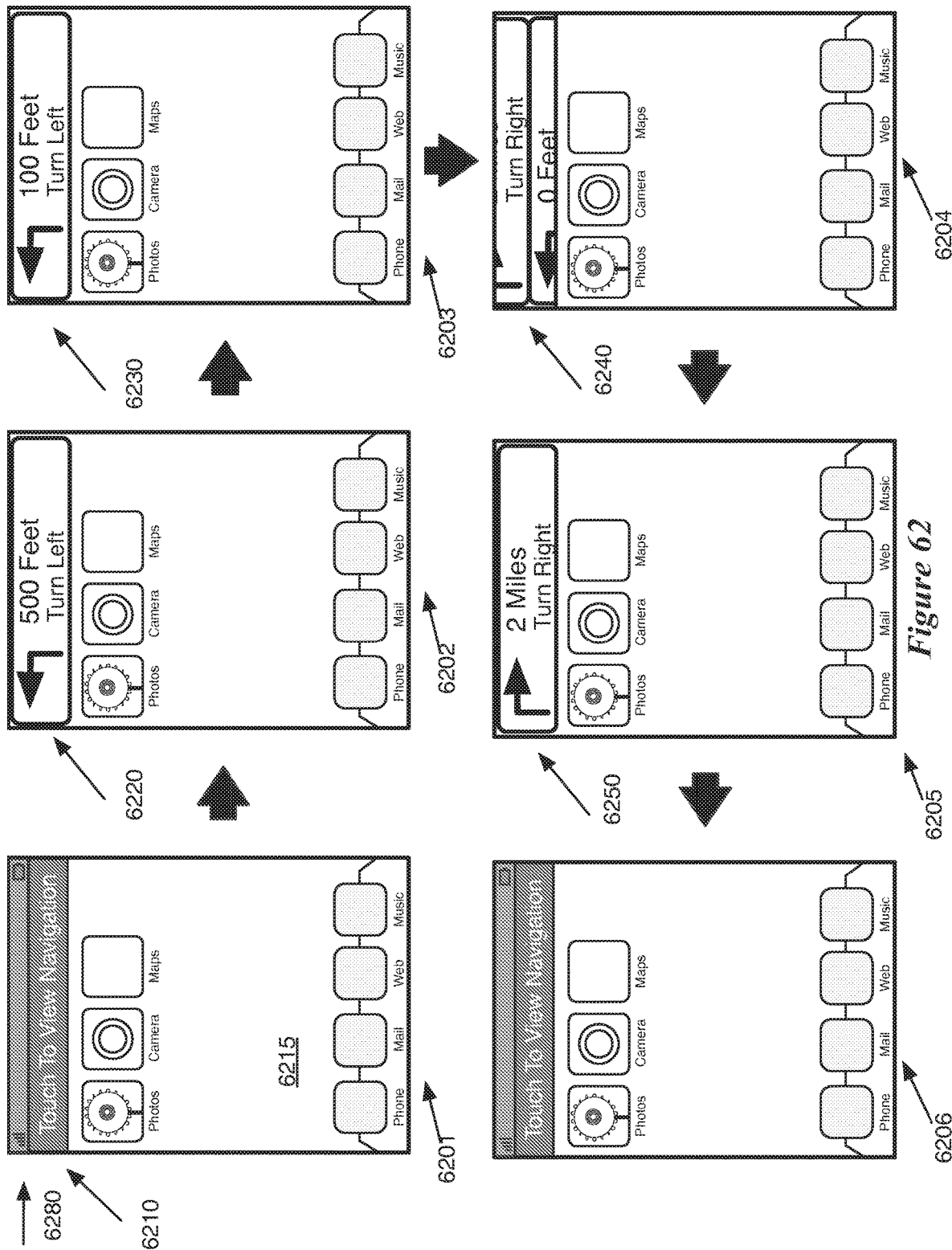
FIG. 62 illustrates a user interface of some embodiments in which navigation instructions are given while the navigation application is running in the background of another application.

FIG. 61 conceptually illustrates a process 6100 of some embodiments for providing directions while a navigation application is running in the background. FIG. 61 will be described with respect to FIG. 62, which is briefly described first. FIG. 62 illustrates a user interface of some embodiments in which navigation instructions are given while the navigation application is running in the background and another application is running in the foreground. The figure shows six stages 6201-6206. The first stage includes status bar 6280, navigation status bar 6210, and foreground application 6215. The remaining stages 6202-6206 show the changes to the navigation status bar 6210 (e.g., its replacement by navigation instruction bars 6220-6250) as the device is moved toward, and then passes a navigation point (sometimes referred to herein as a maneuver, some navigation points represent junctions in the road).

As shown in FIG. 61, process 6100 displays (at 6105) the navigation application in the foreground. The process then determines (at 6110) whether the control (e.g., button 6015 of FIG. 60) has been activated. If not, the process keeps displaying the navigation application in the foreground until the control is activated (or in some embodiments, until some other control is activated or the device goes into a sleep mode). When the control is activated, the process displays (at 6115) the application launching mode in the foreground and displays (also at 6115) the navigation status bar 6210 to indicate that navigation is running in the background. This is illustrated in stage 6201 in FIG. 62.

Figure 63:
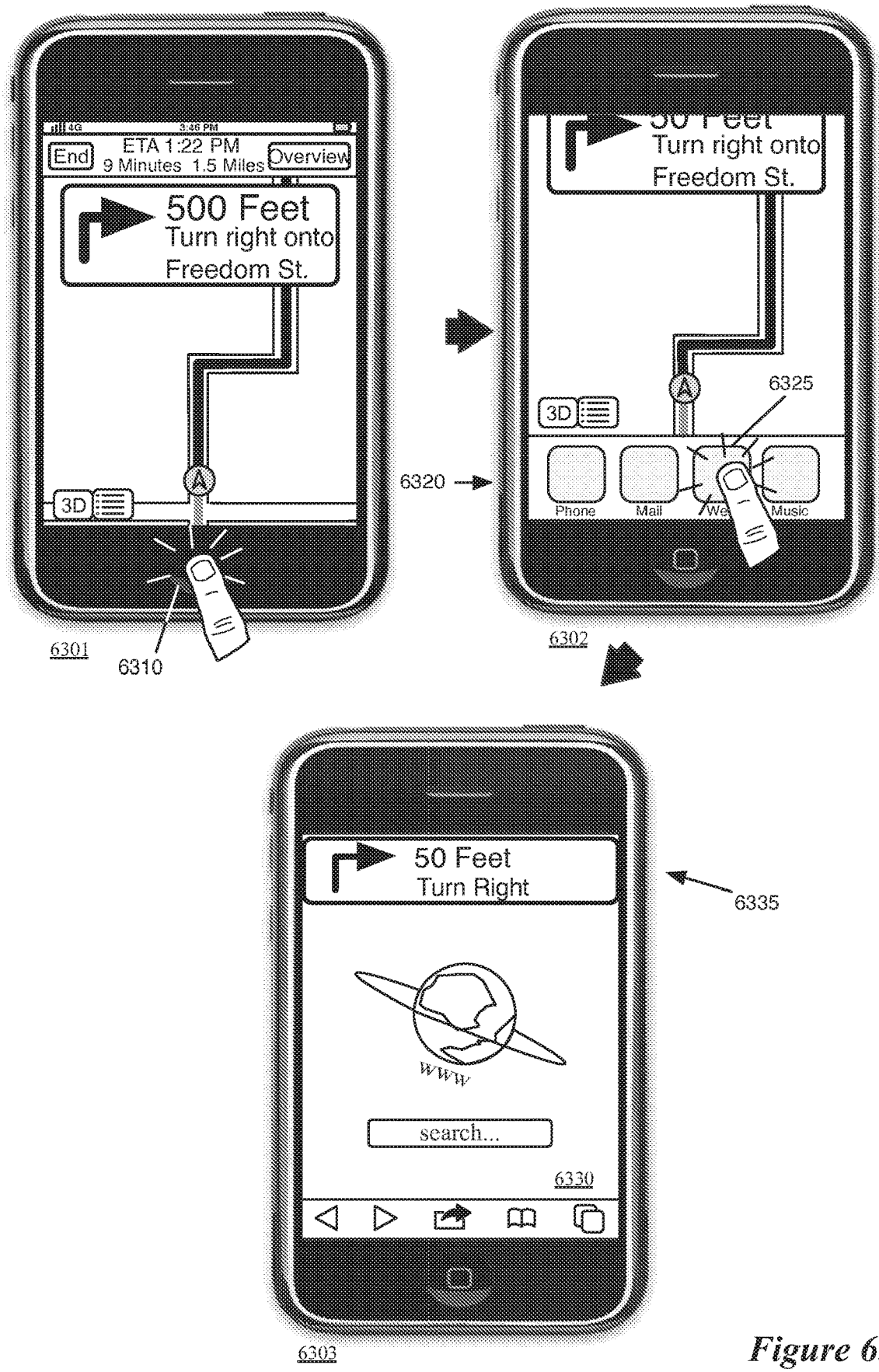
FIG. 63 illustrates a navigation bar displayed at the top of an application in some embodiments.

One of ordinary skill in the art will understand that in some embodiments, a navigation bar (a navigation instruction bar and/or a navigation status bar) appears at the top of some or all foreground applications, not just the application launching application. The activation of one or more controls in some embodiments causes applications other than the launching application to move to the foreground. Furthermore, in some embodiments the navigation bar continues to appear above foreground applications after switching between one foreground application and another, and not just when switching directly from the navigation application to a particular foreground application. An example of a navigation bar being displayed above another application is shown in FIG. 63, described below.

Process 6100 then determines (at 6120) whether the user device is near a navigation point (e.g., at a waypoint turn). While the application determines (at 6120) that the device is not near a navigation point the display remains as shown in stage 6201 of FIG. 62.

Stage 6201 shows the state of a device when the navigation application is active as a background application and the foreground application 6215 is the application launching screen.

The navigation application has not been turned off, but instead has been left on in the background. The visible indication in stage 6201 of the navigation application being on in the background is the navigation status bar 6210. Also, some embodiments display the status bar 6280 in a different color from its usual color when navigation is running in the background. In some embodiments the status bar 6280 and the navigation status bar 6210 are shown in various shades of green. In some embodiments, the colors or shades of one or both of the status bar and the navigation bar change over time to draw attention to the fact that the navigation application is executing in the background.

At this stage 6201, the device (and the person or vehicle carrying the device) is far from the next navigation point. The application of some embodiments, including the one illustrated in FIG. 62 do not display turning information for the entire span of time that the application is running in the background. In some such embodiments, when the device is not near a navigation point (e.g., when no turn is imminent) the device displays, in the navigation status bar 6210, "touch to view navigation", or "touch to return to navigation" or some other message indicating that selecting the navigation bar will bring the navigation application to the foreground. In other embodiments, the navigation instructions are displayed whether or not the device is near a navigation point.

Referring back to FIG. 61, when process 6100 determines (at 6120) that the device is approaching the next navigation point, the process changes (at 6125) the navigation status bar 6210 to a navigation instruction bar 6220 to display the new navigation instruction. This is shown in stage 6202 of FIG. 62. In stage 6202, the device is approaching a navigation point (a left turn in 500 feet). In this stage 6202, the navigation instruction bar 6220 displays navigation instructions, which include an arrow indicating a left turn and a distance (500 feet) to the left turn. Process 6100 then displays (at 6130) a countdown (in feet) until it determines (at 6135) that the navigation point has been passed.

In some embodiments, the navigation bars in stage 6201 and 6202 are treated as separate entities that happen to occupy a similar place on the screen. In such embodiments the navigation bar of stage 6201 can be characterized as a "navigation status bar", while the navigation bar with navigation instructions in stage 6202 can be characterized as a "navigation instruction bar" or a "navigation direction bar". In some embodiments, the navigation instruction bar 6220 is thicker than the navigation status bar 6210 (e.g., twice the thickness or more) and covers up the status bar. In other embodiments, the navigation bar is treated as a single entity that expands (e.g., to twice its previous thickness or more) to cover or replace the status bar when the navigation bar displays navigation directions.

In stages 6203 and 6204, as the device moves closer to the navigation point, the distance to the navigation point is counted down in the navigation instructions in navigation instruction bars 6230 (100 feet) and 6240 (0 feet). In stage 6204, the instructions have begun to switch to the next instruction.

In stage 6204, the actual turn is taking place. The navigation instructions in navigation instruction bar 6250 (shown in stage 6205) are replacing the previous navigation point instructions in navigation instruction bar 6240 with the instructions for the next navigation point. In some embodiments, including the illustrated embodiment, the navigation instructions are switched in a simulation of a flipping sign with multiple faces. Accordingly, instruction 6240 shows the instruction "0 feet turn left" as it begins to flip. In some embodiments, the sign flips up, in some embodiments the sign flips down. In other embodiments, the device uses other transition methods to remove the old navigation instruction in navigation instruction bar 6240 and replace it with the new navigation instruction in navigation instruction bar 6250 (in stage 6205). For instance, some embodiments simulate a new instruction sliding up, down, or sideways while the old instruction slides in the same direction. Other embodiments simulate sliding the new instruction over the old instruction. Still other embodiments simply have the old instruction disappear to be replaced by the new instruction.

Figure 64:
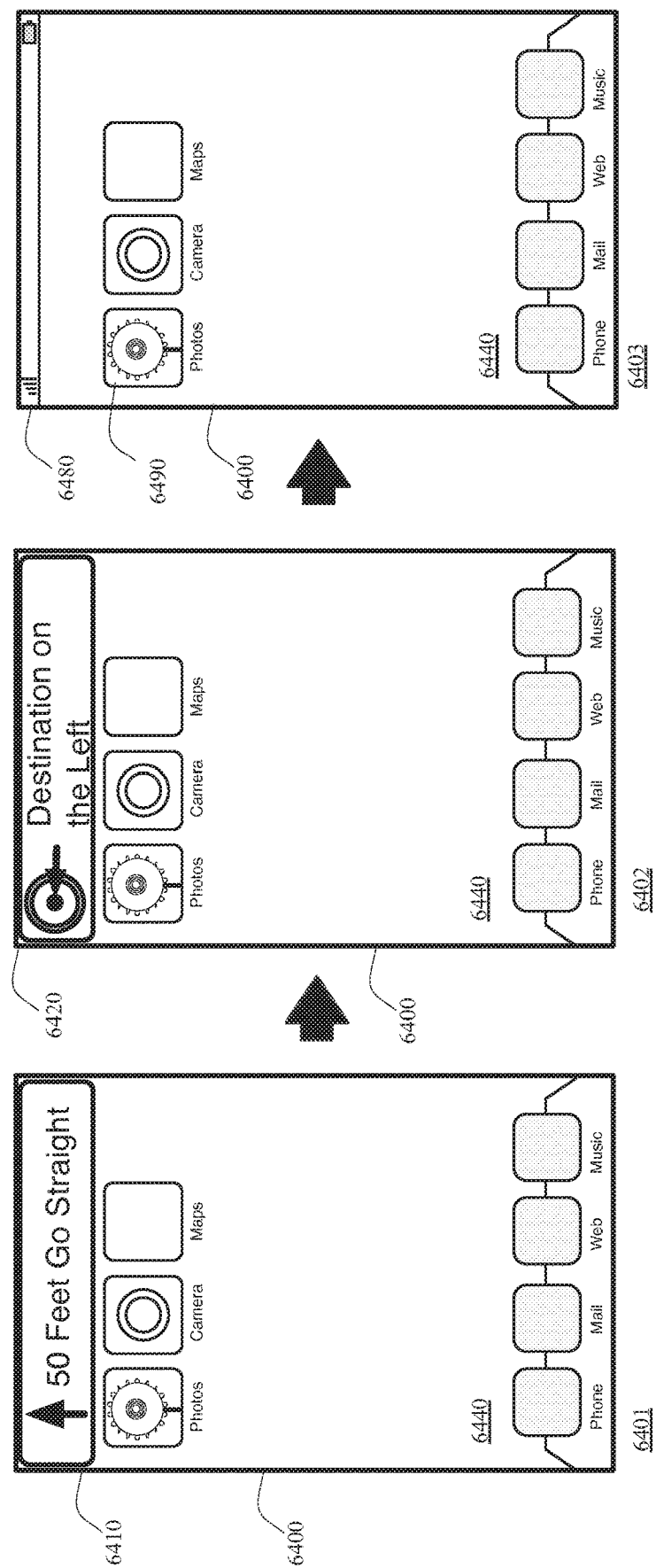
FIG. 64 illustrates the user interface of a device in some embodiments where the device reaches its destination while the navigation application is running in the background of another application.

When a navigation point is reached, process 6100 determines (at 6140) whether the final destination has been reached. If the final destination has been reached, the navigation ends (this is illustrated in FIG. 64, described below). If the final destination has not been reached then there is a new navigation point to display (at 6145). This is shown in stage 6205 of FIG. 62.

Stage 6205 occurs just after the left turn has been completed. The navigation instruction in navigation instruction bar 6250 has fully replaced the navigation instruction in navigation instruction bar 6240. The new navigation instruction in navigation instruction bar 6250 indicates a significant distance to the next navigation point. As mentioned above, the applications of some devices are programmed to display navigation instructions primarily when the device is near a navigation point, not at all times. Accordingly, after displaying the next navigation instruction in navigation instruction bar 6250 for a pre-set period (or in some embodiments after a preset distance traveled), the application in some embodiments returns to showing navigation status bar 6210 in stage 6206 (and process 6100 returns to operation 6115). However, when the new navigation point is determined (at 6150 of FIG. 61) to be near, the process 6100 immediately begins counting (at 6130) down the distance to the next navigation point. Different applications of different embodiments use various different distances to determine whether to show the navigation status bar 6210 or navigation instructions (e.g., instructions in navigation instruction bar 6220). In some embodiments, the applications switch on the instructions at 1 mile, or half a mile, or a quarter mile, or 1000 feet, or 750 feet, or 500 feet, or 250 feet, or some other distance.

FIG. 63 illustrates a navigation bar displayed at the top of an application. The figure demonstrates that the navigation bar is displayed in applications other than the application launching application. The figure is shown in stages 6301-6303. In stage 6301, the navigation application is in the foreground and the user has entered a command (e.g., double pushing a button 6310) to bring up a list of applications currently running in the background. In stage 6302, the device is displaying a set of icons 6320 representing applications currently in the background. In some embodiments, the set of icons 6320 pushes up the UI of the application in the foreground as shown. In other embodiments, the UI of the application in the foreground gets overlaid with the set of icons 6320 instead of being pushed up.

The second stage 6302 also shows that the user selects icon 6325 commanding that the application represented by icon 6325 (e.g., a web browser) be moved to the foreground and the navigation application be moved to the background. One of ordinary skill in the art will understand that this is just one of many ways that some embodiments switch the navigation application into the background and another application into the foreground. For example the user could switch to the application launching view and launch an application, which would then replace the application launching view as the foreground application.

The web browser 6330 that the device switches to the foreground is shown in stage 6303. At the top of the screen is a navigation instruction bar 6335 indicating that the navigation application is running in the background and directing the user to turn right in 50 feet. In some embodiments, the status bar and a navigation status bar (e.g., as shown in FIG. 60) will appear when the navigation application is not currently providing a direction.

After following the navigation instructions shown by the device, the user will reach his intended destination. FIG. 64 illustrates the user interface of a device 6400 in some embodiments where the device reaches its destination while the navigation application is running in the background of another application. The figure shows three stages 6401-6403. The first stage 6401 shows navigation instruction bar 6410, and foreground application 6440. As shown, the instructions in navigation instruction bar 6410 indicate "50 Feet Go Straight".

Stage 6402 illustrates the user device 6400 when the destination is approached. As shown in this stage, the navigation instruction bar 6410 indicates "Destination on the Left". Stage 6403 illustrates the user device 6400 after the destination is reached. As shown, navigation instruction bar 6410 of stages 6401 and 6402 is removed from the screen to indicate that the navigation instructions are finished and status bar 6480 returns to the screen. In some embodiments, the navigation application remains on in the background, but not visibly displayed at this stage 6403. In other embodiments the navigation application switches itself off at this stage 6403. In still other embodiments, the device continues to display the navigation bar after the destination is reached. Furthermore, the navigation application of some embodiments identifies a location as the end of vehicular navigation and indicates that the rest of the journey must be completed on foot, which the navigation application directs (e.g., in the navigation instruction bar).

The stage 6403 also shows that the icons 6490 have not moved. However, in other embodiments, the icons 6490 may move up to occupy at least a portion of the space that used to be occupied by the navigation instruction bar 6410 at the previous stages in some embodiments, when the navigation instruction bar is removed from the screen.

As described above, the navigation status bar and the navigation instruction bar are treated as distinct components in some embodiments. The above described figures show the navigation status bar below a status bar. However, when the navigation application is running in the background, the status bar itself is replaced with a navigation banner in some embodiments. This navigation banner is twice the height of the regular status bar in some embodiments. The navigation banner of some embodiments displays some or all of the same information as the status bar it replaces. In some embodiments, the navigation banner displays that information when the device is not nearing a navigation point and does not display it when the device is nearing a navigation point. When the device is nearing a navigation point, some or all of the status information is removed so that a direction relevant to the upcoming navigation point can be seen more clearly.

Devices that execute navigation applications of some embodiments include telephonic devices. In some embodiments, when a telephone call is being processed by the device, and the navigation application is running in the background, data about the telephone call (e.g., call time) replaces a navigation status bar or the instruction bar with a telephone call status bar.

Figure 65:
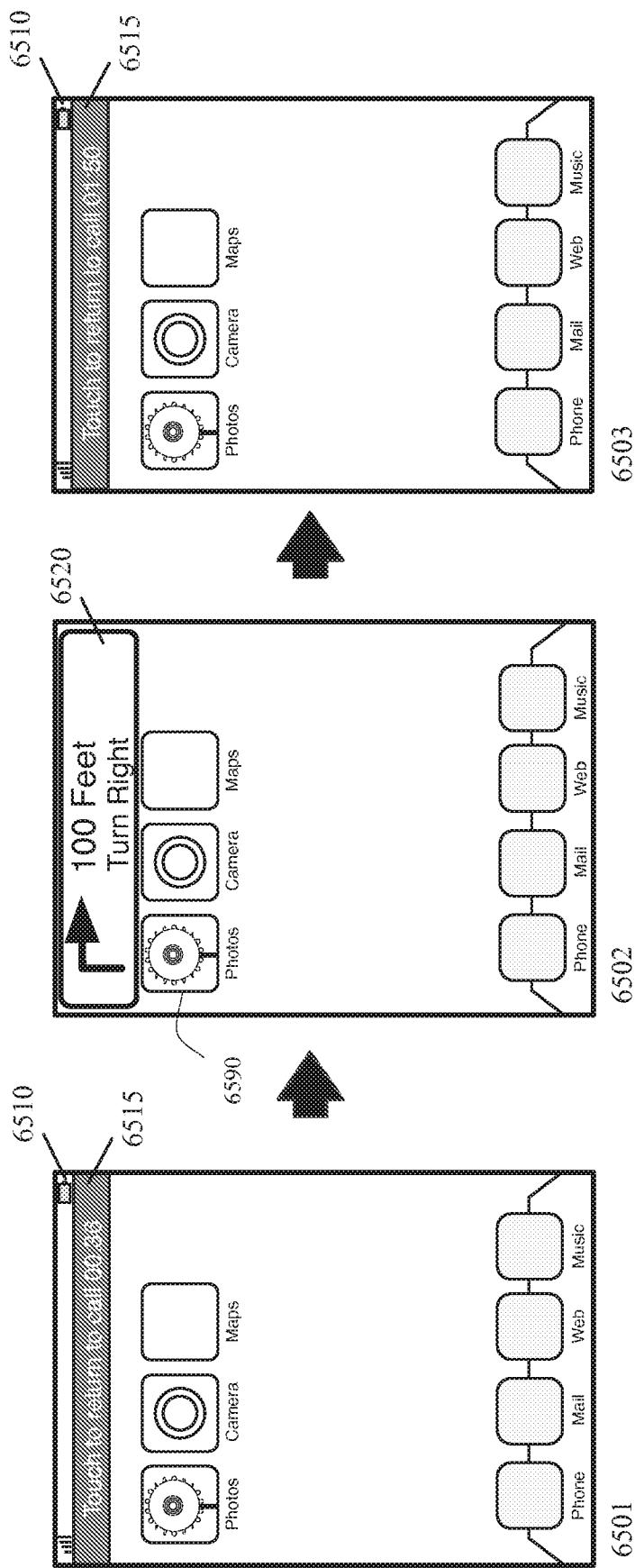
FIG. 65 illustrates interaction between a call status bar and a navigation instruction bar.

FIG. 65 illustrates interaction between a call status bar and a navigation instruction bar. The figure is shown in three stages 6501-6503. In stage 6501, a call is going on while the device is displaying an application launching view. The call is indicated by a call status bar 6515 under the status bar 6510. The call status bar in some embodiments indicates that a call is ongoing, contains an indicator of the duration of the call, and allows the user to select the call status bar to return to a screen view normally used for handling calls. In some embodiments, the original status bar 6510 (showing battery life etc.) turns to a color that indicates that a call is ongoing (e.g., red or green). In some embodiments, the telephone call status bar 6515 is a similar color to a color that the original status bar displays during the call (e.g., both are shades of red or both are shades of green).

In some embodiments, the navigation instruction bar 6520 re-emerges and replaces the phone data under some circumstances. In stage 6502, the device is near a navigation point. Therefore, the navigation instruction bar 6520 replaces the call status bar 6515 and the status bar 6510. After the navigation point is passed, the call status bar 6515 and the status bar 6510 are redisplayed as shown in stage 6503. In the illustrated embodiment of FIG. 65, the call status bar is redisplayed as soon as the navigation point is passed. However, in some embodiments, the phone call status bar is not redisplayed until after the next navigation instruction is displayed in the navigation instruction bar 6520.

The stages 6402 and 6403 show that the icons 6490 have not moved. However, in other embodiments, the icons may move up or down to occupy different spaces depending on the presence of the call status bar 6515 and the navigation instruction bar 6520.

B. Instructions when Device is Locked

1. Layout

In some embodiments, devices with multiple functions (e.g., mobile phones that run multiple applications) can be placed into locked mode from various applications. In some embodiments, there are multiple ways to place a device into locked mode. The locked mode of some embodiments is a mode with most of the controls disabled and with limited functionality until the device is unlocked. This has the benefit in some embodiments of preventing the user from accidentally ending navigation mode prematurely. In some embodiments, unlocking the device requires a particular gestural command on a specific part of the screen.

Some devices have a button that switches the screen off and/or puts the device into locked mode. Some devices have a timeout function that switches the screen off and/or puts the device into locked mode after a certain time has elapsed between user commands. Regardless of the way that the applications get into locked mode, most such devices come out of locked mode with the same application running in the foreground as the application running in the foreground when locked mode was entered. However, in the devices of some embodiments, regardless of what application (or application launcher) is running in the foreground when the device is locked, if the navigation application is running in the background, then the application returns from locked mode directly into the navigation application.

Figure 66:
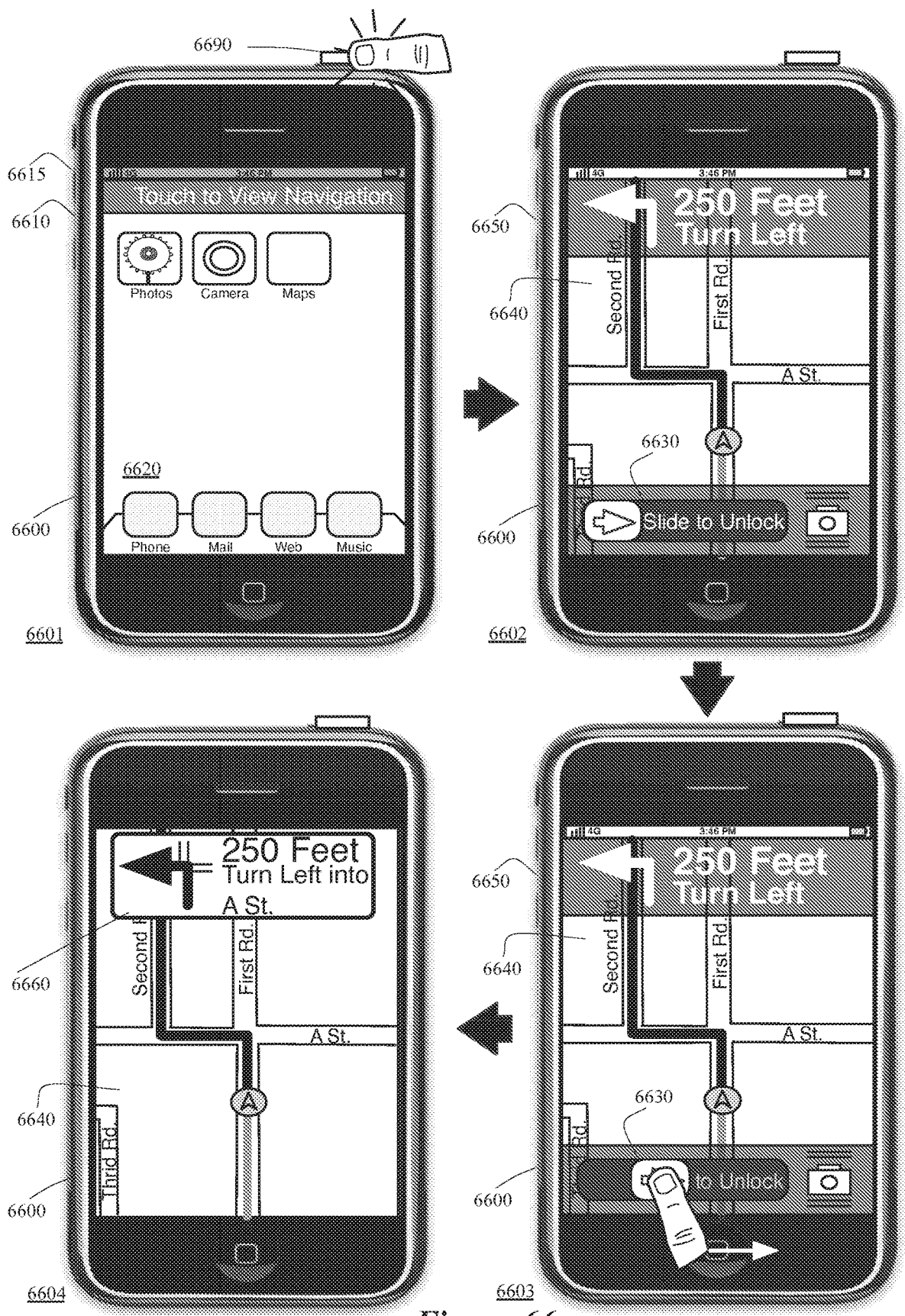
FIG. 66 illustrates a device of some embodiments that enters locked mode with the navigation application running in the background and exits locked mode with the navigation application running in the foreground.

FIG. 66 illustrates a device 6600 of some embodiments that enters locked mode with the navigation application running in the background and exits locked mode with the navigation application running in the foreground. The figure shows the device 6600 in four stages 6601-6604. In stage 6601, the application launcher 6620 in the foreground and the navigation application is running in the background. The navigation application running in the background is indicated by the navigation bar 6610 at the top of the screen, just below the status bar 6615 and above the foreground application launcher 6620. As shown, in stage 6601 the user pushes a control 6690 to lock the screen.

In stage 6602, the device is in a locked mode (as indicated by the unlocking slider 6630 on the screen). In this stage, the map 6640 is shown on the locked screen and turn-by-turn directions are shown on the information bar 6650.

In stage 6603, the user has started to slide the unlocking slider 6630 to the right in order to unlock the device. In this stage, the map 6640 is displayed on the screen and turn-by-turn navigation directions are shown on the information bar 6650. In some embodiments (not shown), when the slider moves all the way to the right, the user is asked to enter a pass code to unlock the screen. After the user successfully enters the passcode, the screen is unlocked. In some embodiments, the directions and/or the map are not shown under some circumstances in locked mode. For example, an interface for answering an incoming call may be displayed when a call comes in to the device and an interface for dealing with a call may be displayed when a call is in progress. Such an interface may override the display of the directions in the information bar, the display of the map, or both. Similarly, in some embodiments, other display views may replace the information bar, the map, or both even though the navigation application is still running on the device.

However, after the screen is unlocked, the navigation map 6640 stays in the foreground (instead of displaying application 6620 that was running in the foreground prior to the locking of the screen). As shown in stage 6604, the navigation application appears in full screen in the foreground. In this stage the screen is unlocked and navigation instructions 6660 and the map 6640 are displayed on the screen. In some embodiments, the navigation application includes the map 6640 in the same position as the map 6640 in the locked-screen view. Accordingly, in some embodiments, even for devices that ordinarily use a transition (e.g., a wipe or expansion of the new screen view from the center of the screen) between locked-screen views and other views when returning from locked mode, the device in the transition from stage 6603 to stage 6604 leaves the map in place and switches the other elements in the screen. That is, the map is constantly displayed during the transition from stage 6603 to stage 6604, while the navigation bar 6610 and the unlocking slider 6630 disappear and the navigation instructions 6660 appear instead. As stage 6604 shows, the device has returned from locked mode directly into the navigation application, even though the navigation application was running in the background, not the foreground in stage 6601 before the device was locked.

Figure 67:
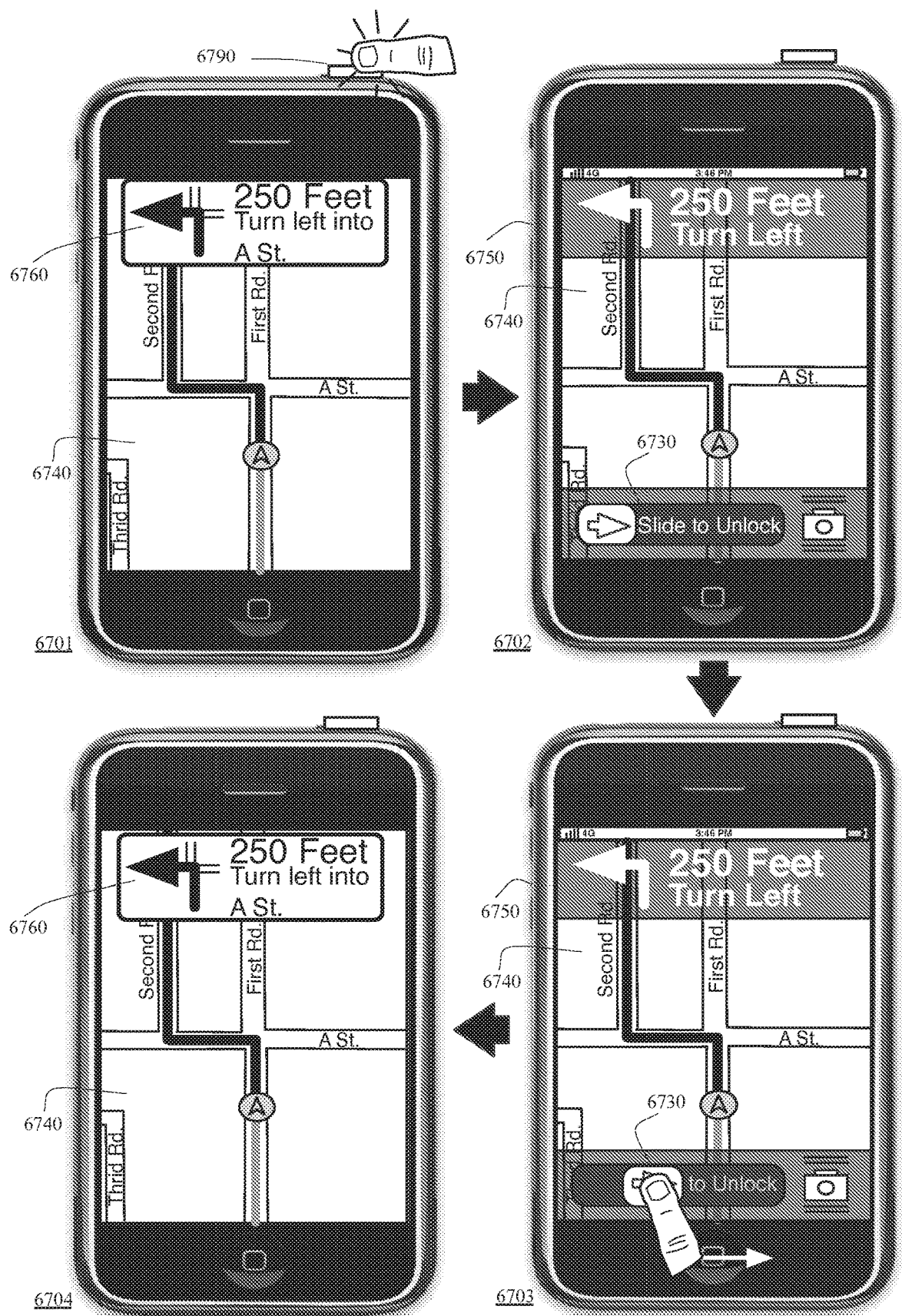
FIG. 67 illustrates a device in some embodiments that enters locked mode with the navigation application running in the foreground and exits the locked mode with the navigation application still running in the foreground.

FIG. 67 illustrates a device 6700 in some embodiments that enters locked mode with the navigation application running in the foreground and exits the locked mode with the navigation application still running in the foreground. The figure shows the device in four stages 6701-6704. In stage 6701, the navigation application is running in the foreground and a map 6740 and navigation instructions 6760 are displayed on the screen. As shown, the user pushes a control 6790 to lock the screen.

In stage 6702, the device is placed into locked mode (as indicated by the unlocking slider 6730 on the screen). In this stage, the map 6740 is shown on the locked screen and turn-by-turn directions are shown on the information bar 6750.

In stage 6703, the user has started to slide the unlocking slider 6730 to the right in order to unlock the device. In this stage, the map 6740 is displayed on the screen and turn-by-turn navigation directions are shown on the information bar 6750. When the slider moves all the way to the right, the user is prompted (not shown) to enter the passcode to unlock the screen. After the user successfully enters the passcode, the screen is unlocked. As mentioned above with respect to FIG. 66, in some embodiments, the directions and/or the map are not shown under some circumstances in locked mode. For example, an interface for answering an incoming call is displayed in some embodiments when a call comes in to the device and an interface for dealing with a call is displayed when a call is in progress. Such an interface overrides the display of the directions in the information bar, the display of the map, or both. Similarly, in some embodiments, other display views may replace the information bar, the map, or both even though the navigation application is still running on the device.

As shown in stage 6704, the navigation application appears in the foreground. In this stage the screen is unlocked and the map 6740 and the navigation instructions 6760 are displayed on the screen. In some embodiments, the navigation application includes the same map 6740 in the same position as in the lock-screen view. Accordingly, in some embodiments, even for devices that would have a transition screen (e.g., a wipe or expansion from the center) when returning from locked mode, the device in the transition from stage 6703 to stage 6704 leaves the map in place and, in some embodiments, switches the other elements in the screen. That is, the map is constantly displayed during the transition from stage 6703 to stage 6704, while the information bar 6750 and the unlocking slider 6730 disappear and the navigation instructions 6760 appear on the display. As stage 6704 shows, the device has returned from locked mode back into the navigation application.

In the preceding two figures, the user pushes a control to enter a locked mode. In some embodiments, the user pushes such a control to turn the display off. Later, when the display is turned back on, either by pressing the same control again, or by pressing another control, then the device shows the locked mode when the display turns on again. Similarly, in some embodiments, the device has a timeout function that turns the display off after some particular amount of time has passed without the device receiving a command. In some embodiments, the device is in locked mode when the display turns on after such a lockout.

Figure 68:
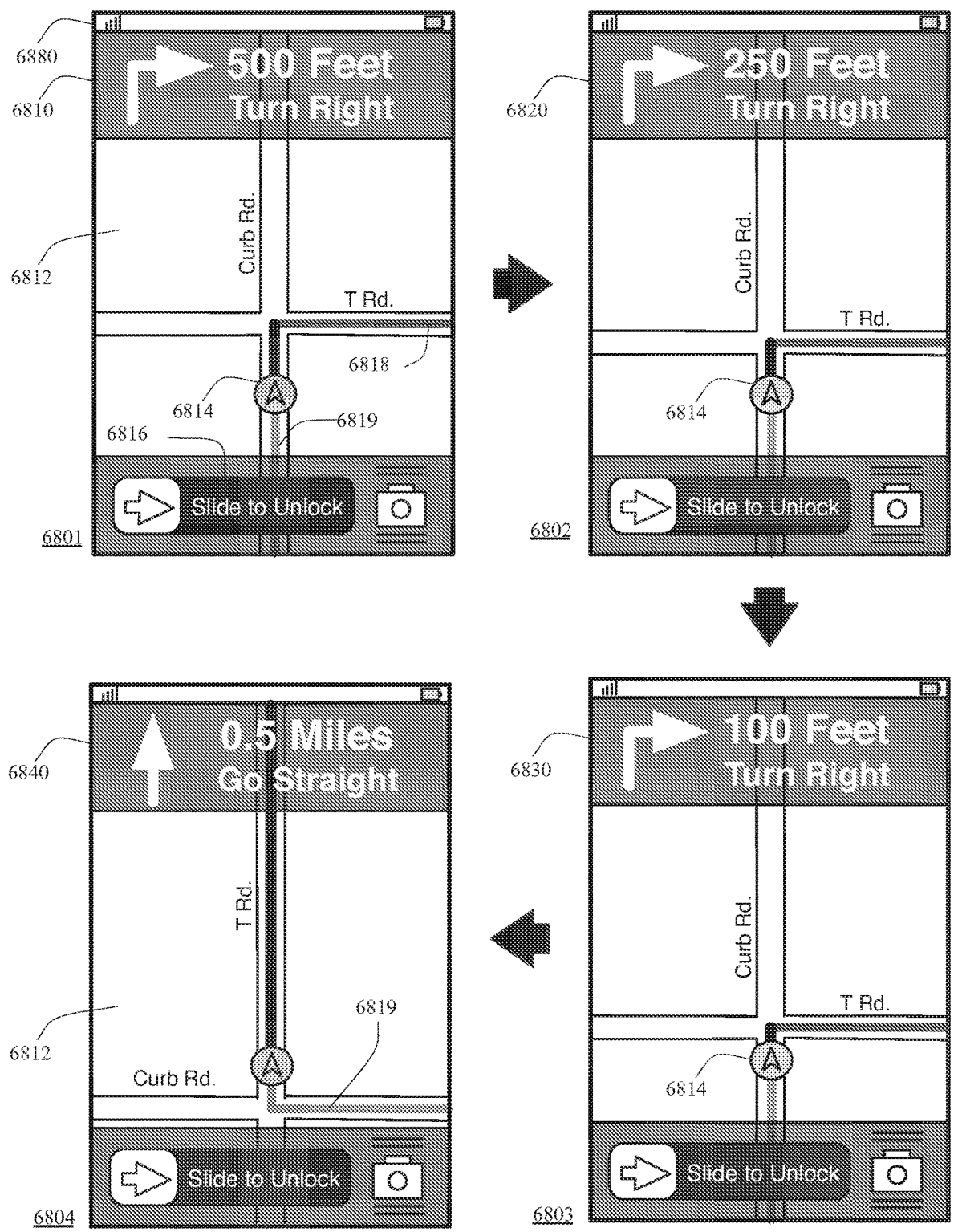
FIG. 68 illustrates a navigation application giving directions on a locked device in some embodiments of the invention.

In addition to (or in some embodiments instead of) giving navigation instructions on a navigation bar when other applications are in the foreground, the navigation applications of some embodiments also provide navigation instructions while the device is in a locked mode. FIG. 68 illustrates a navigation application giving directions on a locked device in some embodiments of the invention. The figure is shown in four stages 6801-6804. In stage 6801, the device screen is displaying status bar 6880, navigation bar 6810, map 6812, location indicator 6814, and unlocking slider 6816. One of ordinary skill in the art will understand that other configurations and controls are possible within the scope of some embodiments.

In stage 6801, the device is close to the next navigation point, therefore navigation bar 6810 displays instructions to turn right in 500 feet. In some embodiments (including the illustrated embodiment) the navigation bar 6810 is translucent, allowing feature of the map 6812 to be seen through the navigation bar 6810. The location indicator 6814 indicates the location of the device, relative to the features of map 6812. The map itself includes the road the device is on (Curb Road), and the road that the navigation application is directing the user towards (T Road). Also displayed is a dark line 6818 showing the directed travel of the device and a lighter line 6819 showing the previous locations of the device along the navigation application's selected route. The unlocking slider 6816, unlocks the device when activated. The unlocking slider 6816 is, however, unused in this figure.

As the device reaches a point 250 feet from the navigation point, the navigation bar changes instructions as displayed in navigation bar 6820 in stage 6802. The location indicator 6814 is at the same location, but the map 6812 has moved down relative to the location indicator 6814. The new location of the map relative to the location indicator 6814 is another way that the navigation application shows that the device has moved closer to the navigation point.

Similarly, in stage 6803, the navigation bar 6830 indicates that the navigation point is only 100 feet away and the location indicator 6814 is closer to the turn on the map. Finally, in stage 6804, the device has gone around the corner and navigation bar 6840 is displaying the next navigation instruction. Although the transition between navigation instructions is not shown in this figure, in some embodiments the transition is similar to the described transition in background mode (with one instruction seemingly flipping up as if on a one side of a sign and being replaced by another that seems to be on another side of the sign). In other embodiments, other transition methods are used to remove the old navigation instruction 6830 and replace it with the new navigation instruction 6840 (in stage 6804). For instance, some embodiments simulate a new instruction sliding up or sideways while the old instruction slides in the same direction. Other embodiments simulate sliding the new instruction over the old instruction. Still other embodiments simply have the old instruction disappear and be replaced by the new instruction.

The new instructions are not the only indication that the turn has been made. The map 6812 has rotated so that the direction that the device is traveling in (along T Road) is shown on the map 6812 as being up. The lighter line 6819 on the map 6812 now includes the corner that the device has just turned.

Although the location indicator 6814 is shown in FIG. 68 as always being the same size, in some embodiments, in one or both of the locked mode and the regular navigation mode, the location indicator is a different size depending on the zoom level. For example, in some embodiments, the more the map is zoomed in the larger the location indicator becomes. Similarly, the location indicator 6814 is always shown as having an arrow. However, in some embodiments, the arrow is not shown under some circumstances. For example, in some embodiments, when the device is in a building (or otherwise off all the roads) rather than on a road, the arrow is not shown. The location indicator 6814 is shown as opaque in FIG. 68, however, in some embodiments, the location indicator is translucent, semi-transparent, or transparent so as to show roads "underneath" it.

Figure 69:
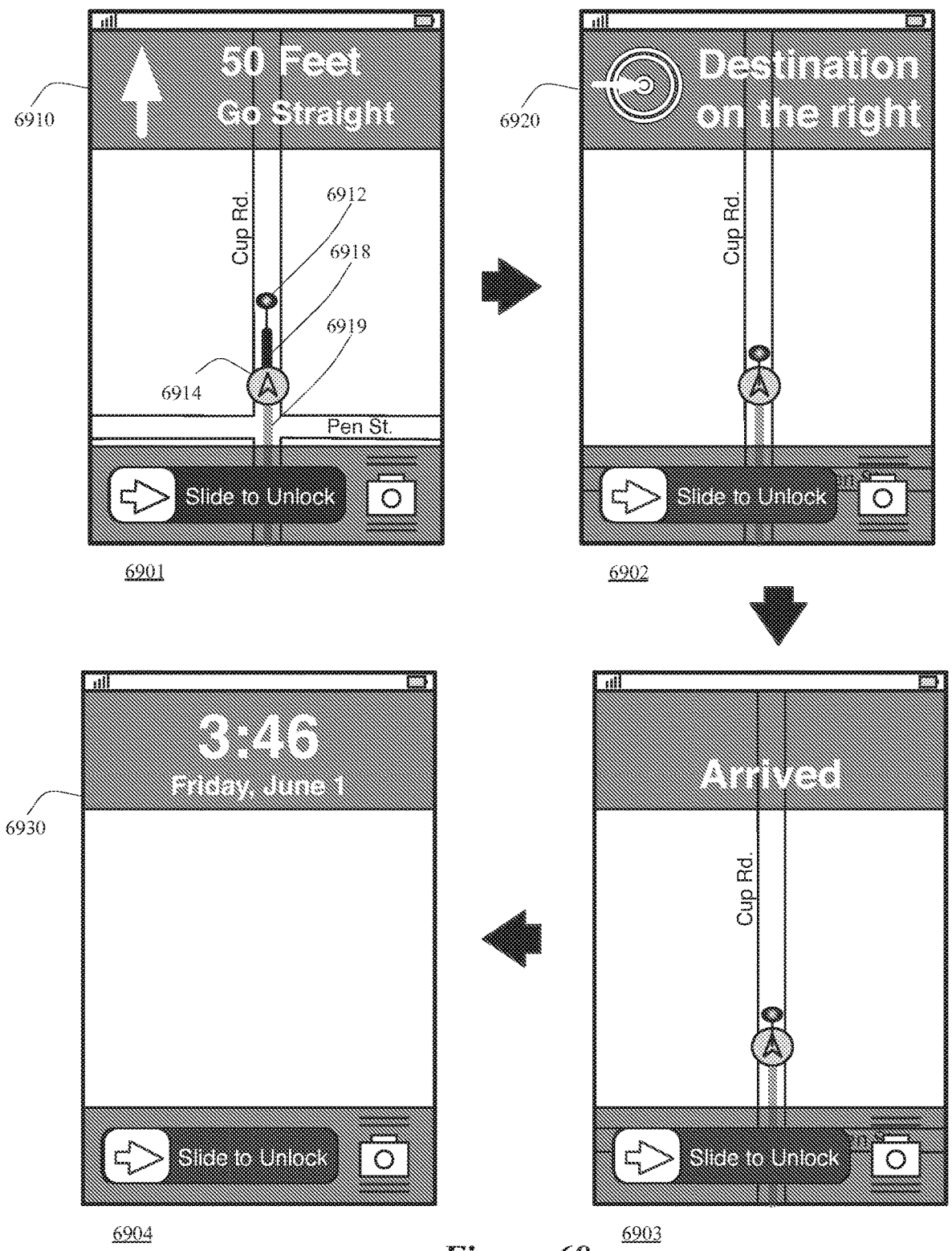
FIG. 69 illustrates the locked mode view of some embodiments when the device reaches its destination.

While operating in locked mode, the navigation application of some embodiments provides directions until the device reaches its destination. FIG. 69 illustrates the locked mode view of some embodiments when the device reaches its destination. The figure is shown in four stages 6901-6904. In stage 6901, the map 6940 shows lighter line 6919 behind the current location indicator 6914. In front of location indicator 6914, darker line 6918 ends at a circle 6912 that indicates the destination. According to navigation bar 6910, the destination is 50 feet ahead.

Once the device reaches its destination in stage 6902, the navigation bar 6920 shows that the destination is on the right, darker line 6918 is no longer shown on the map 6940. In some embodiments, the device then displays a message that the device has "arrived" as shown in stage 6903. The navigation application then, in stage 6904, releases the locked screen to whatever its default configuration is when the navigation application is not providing navigation instructions. In the illustrated embodiment, the default configuration includes a time and date indicator 6930.

This figure illustrates the locked mode view in a 2D map. However, the mapping application of some embodiments may operate in the locked mode while showing the map in 3D.

2. Notification Management

Figure 70:
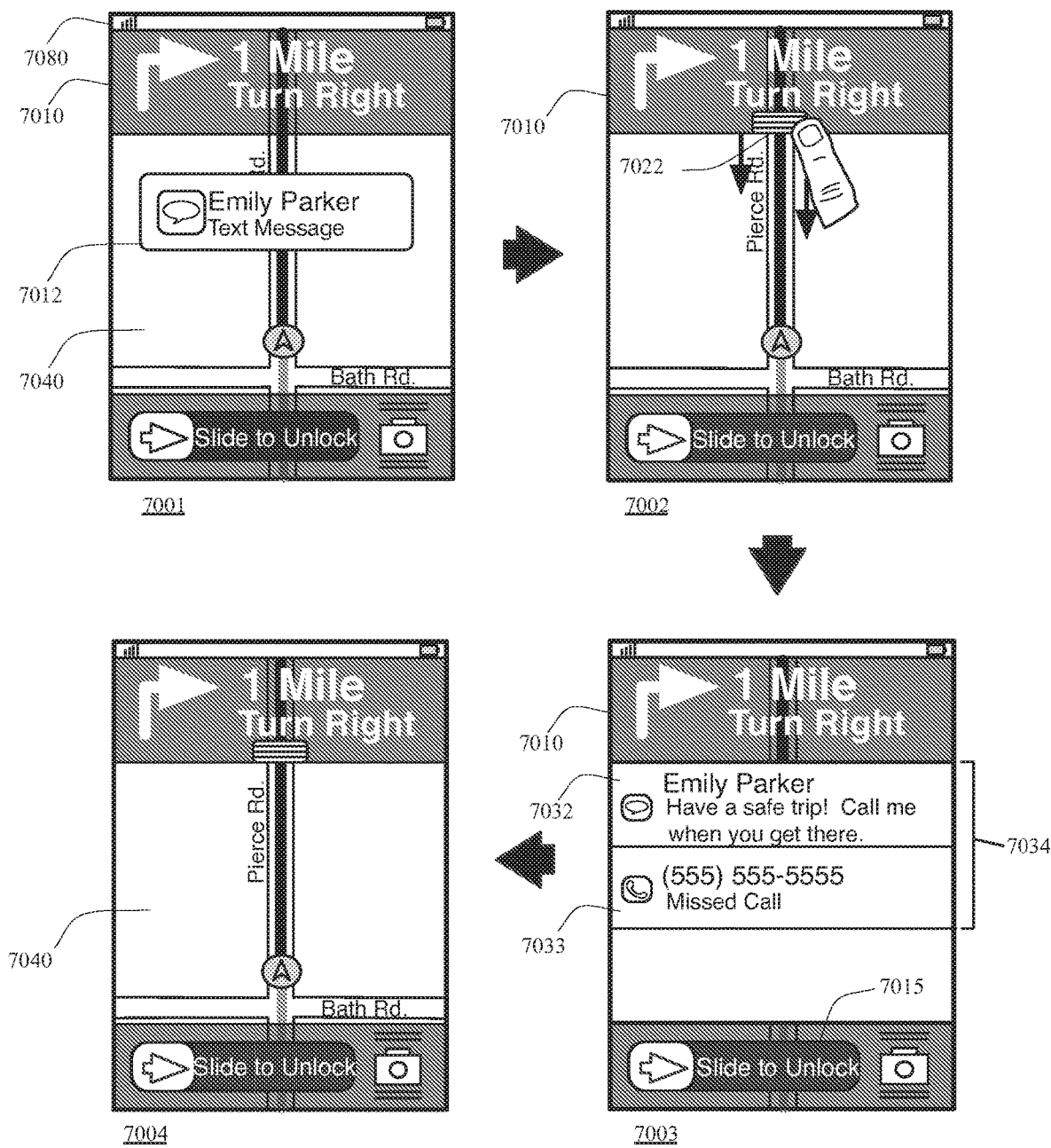
FIG. 70 illustrates a locked view notification system of some embodiments.

In some embodiments, devices notify their users of incoming text messages and other noteworthy events. Even when such devices are in a locked mode, some such devices can still display notifications. However, leaving a notification on the screen for an extended period of time may distract from navigation instructions also being displayed on the screen. Accordingly, some embodiments briefly display a notification on the screen and then make the notification accessible, but not visible. In some embodiments, there is a visible but unobtrusive sign indicating that there is a notification item waiting to be read. FIG. 70 illustrates a locked view notification system of some embodiments. The system is shown in four stages 7001-7004.

In stage 7001, the navigation bar 7010 is below the status bar 7080 at the top of the screen displaying a navigation instruction. A notification message 7012 is displayed on the screen over the map 7040 to indicate that a text message has been received. The actual text message is not displayed in the illustrated embodiment, but embodiments that display the actual text message are within the scope of the invention. Some embodiments display a name (if known) of the text message sender or a phone number from which the text message originated in notification message 7012.

The application of some embodiments displays the notification for a preset length of time before the notification disappears, leaving the full map 7040 visible again. Some applications display the notification for less than 5 seconds, some for 5 seconds, and some for more than 5 seconds. Once the notification disappears, a drawer control 7022 appears in stage 7002 in the navigation bar 7010. The application of some embodiments, including the illustrated application, allows the drawer control 7022 to be expanded (e.g., by a touch gesture that drags down on the drawer control) in order to open a list of received notification items. Applications of other embodiments allow the drawer control to be tapped to open the list, or double tapped to open the list. Similarly, other applications allow the drawer control to be selected by other means, (e.g., a selection such as a click on an associated cursor control device).

In the illustrated embodiment, the drawer 7034 is shown as open in stage 7003. In this stage 7003 the drawer, in this case including only one text message 7032 and one missed call 7033, is shown in a list which covers the map from the bottom of the navigation bar 7010 to the top of the unlocking slider 7015. However, in some embodiments the drawer is translucent, semi-transparent, or transparent, allowing the map to be seen through the list. In some embodiments, the drawer only partially covers the map 7040 (e.g., covers half the map, or only that portion of the map needed to show all the text messages and other notification items in the drawer). In some embodiments, if a new message or notification that would normally be sent to the drawer arrives while the drawer is open, the message will be added to the drawer right away (with or without displaying a pop up notification in various embodiments).

When the list of messages is too long to fit on the screen the list can be scrolled up and down if necessary in some embodiments. When the user is finished looking at the list of messages, the user can close the drawer by activating a control (e.g., a hardware or on screen control such as a control that turns off the display) in some embodiments. In some embodiments, the drawer will remain open until the user turns the display off, and then back on again. The control could also include any number of controls activated by a gestural command such as a tap on the list or elsewhere on the screen, a double-tap, or a sliding gesture (e.g., a sliding gesture up with part or all of the drawer as the control) in some embodiments. The control could also include a button or other component of a mouse or other cursor control device, etc., in some embodiments.

Also, in addition to or instead of having a control to close the drawer, some embodiments display the opened drawer for varying lengths of time before it disappears, leaving the full map 7040 visible again as shown in stage 7004. Stage 7004 includes drawer control 7022. However, in some embodiments, after the drawer 7034 is closed, the drawer control 7022 is not shown until a new message arrives.

After the drawer is closed, if and when another text message or notification arrives, the stages 7001-7004 repeat with that new message, assuming that the navigation is still active. In some embodiments stage 7004 happens only if the user closes the drawer. If the drawer remains open, then the display remains in stage 7003 in some embodiments. Furthermore, the drawer open stage 7003 may not immediately follow stages 7001 and 7002. In some embodiments, if the user does not open the drawer, stages 7001-7002 are repeated with each of multiple messages coming in and the drawer remaining closed with the drawer control 7022 displayed as the new message notifications appear.

Figure 71:
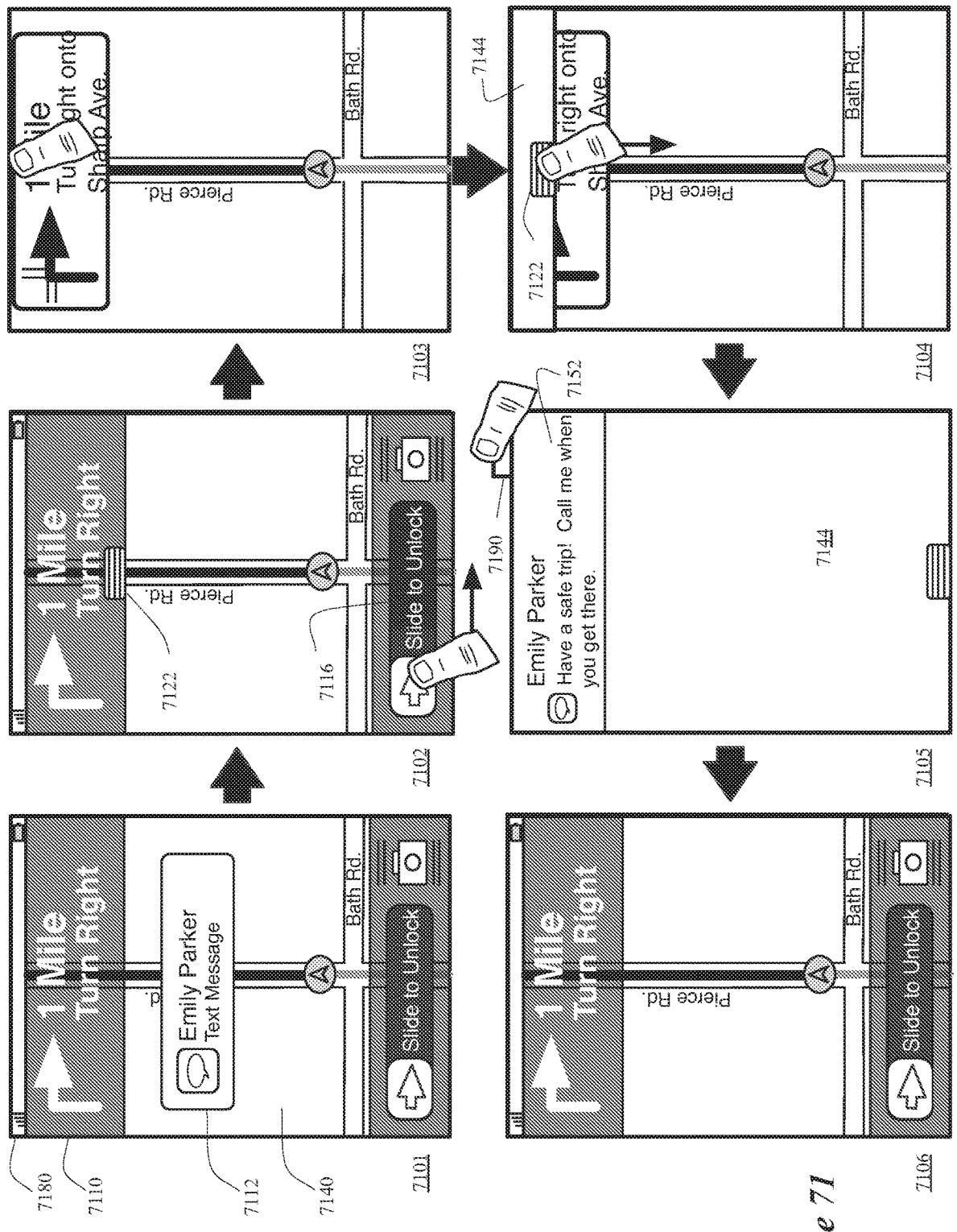
FIG. 71 illustrates the viewing of notification messages after unlocking a device in some embodiments of the invention.

In some cases, a user may decide to unlock the device before opening the drawer 7034. In some embodiments, the normal behavior of the device when coming out of locked mode with notifications is to list the notifications on the screen. However, in some embodiments, when the navigation application is running, opening into the navigation application takes priority over displaying the notification messages. Therefore the device of those embodiments unlocks and opens into the navigation application rather than opening into a list of notification messages. In some such embodiments, a user can choose to open the list of notification messages after the navigation application is opened. FIG. 71 illustrates the viewing of notification messages after unlocking a device in some embodiments of the invention. The figure is shown in six stages 7101-7106.

In stage 7101, the navigation bar 7110 is below the status bar 7180 at the top of the screen displaying a navigation instruction. A notification message 7112 is displayed on the screen over the map 7140 to indicate that a text message has been received. The actual text message is not displayed in the illustrated embodiment, but embodiments that display the actual text message are within the scope of the invention. Some embodiments display the name of the sender, the phone number of the sender, or both in notification message 7112. The application of different embodiments displays the notification for varying lengths of time before it disappears, leaving the full map 7140 visible again. Some applications display the notification for less than 5 seconds, some for 5 seconds, and some for more than 5 seconds.

Once the notification disappears, a drawer control 7122 appears in stage 7102 in the navigation bar 7110. Stage 7101 is identical to stage 7001 of FIG. 70. However, in stage 7102, rather than opening the drawer 7122, the user instead unlocks the device with the unlocking slider 7116. The user has unlocked the device with the navigation application running in the background, therefore, the navigation application appears in the foreground in stage 7103. As shown, the navigation application takes priority over displaying the notification messages.

The navigation application in some embodiments does not show a drawer control. However, by dragging the top center of the screen down (as shown in stage 7104) the user can cause the drawer 7144 to come down (as shown in stage 7105). In some embodiments, the drawer control 7122 appears under the dragging finger as the finger drags the drawer 7144 down. In other embodiments, when the navigation application is in the foreground, multiple drags must be employed. For example, one drag gesture at the top of the screen is used to expose the drawer control 7122 and a separate drag gesture on the drawer control 7122 is used to open the drawer in some embodiments. Stage 7105 shows the drawer 7144 fully extended and covering the entire screen. Text message 7152 appears at the top of the screen.

In some embodiments, the drawer stays open until the user either closes the drawer (at which point the navigation application appears again) or locks the device. In some embodiments, the drawer can be closed by pulling up the drawer control 7122. In other embodiments, the drawer cannot be closed by pulling up the drawer control up 7122, but can be closed by some other control (e.g., a button or a gestural command). For example the device can be locked, e.g., by activating a control 7190 which also closes the drawer in some embodiments. Some embodiments also automatically close the drawer after a pre-determined amount of time. In some embodiments, after the drawer is opened, either in locked mode or unlocked mode, once the drawer is closed the drawer is emptied and is no longer accessible from the locked mode view, as shown in stage 7106, in which the drawer control 7122 is no longer present. That is, the drawer control 7122 will only be displayed again when a new notification is received. However, in other embodiments, the drawer control 7122 is not removed, is only removed when certain methods of closing it are employed, or is removed if the drawer is opened in the unlocked mode, but not if the drawer is opened in the locked mode.

In some embodiments, the drawer displays messages of different types in separate areas. For example, some embodiments display text messages in a separate area from "missed call" messages. In some embodiments the drawer displays different types of messages in separate areas when it is opened in the unlocked mode, but the drawer in the locked mode does not display different types of messages in separate areas. In other embodiments the drawer displays different types of messages in separate areas when it is opened in the unlocked mode and the drawer in the locked mode also displays different types of messages in separate areas. In other embodiments the drawer in locked mode uses separate areas for different message types and the drawer in unlocked mode does not. In other embodiments neither drawer separates message types.

3. Dynamically Turn on

Figure 72:
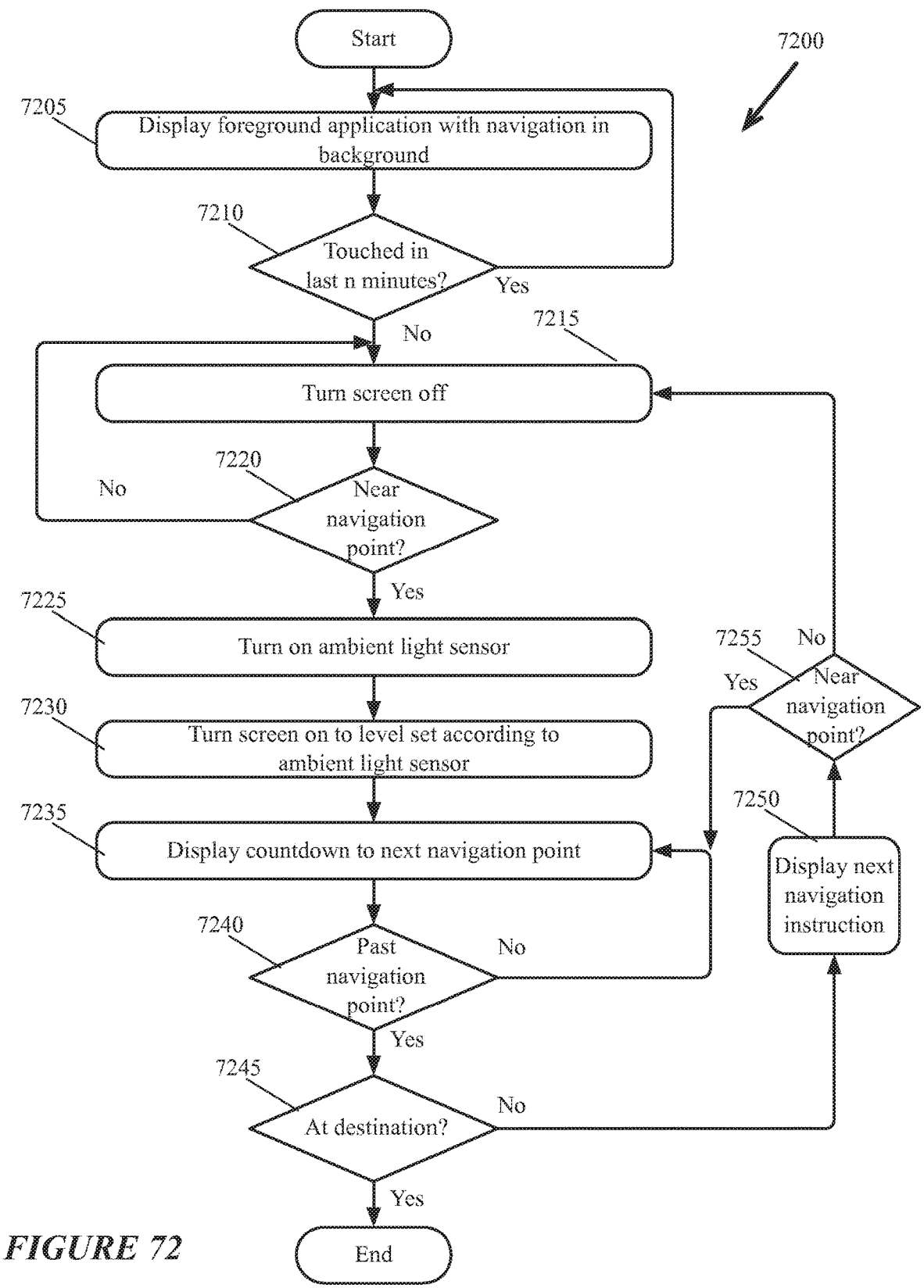
FIG. 72 illustrates a process for switching the device screen on when approaching a navigation point in some embodiments of the invention.
Figure 73:
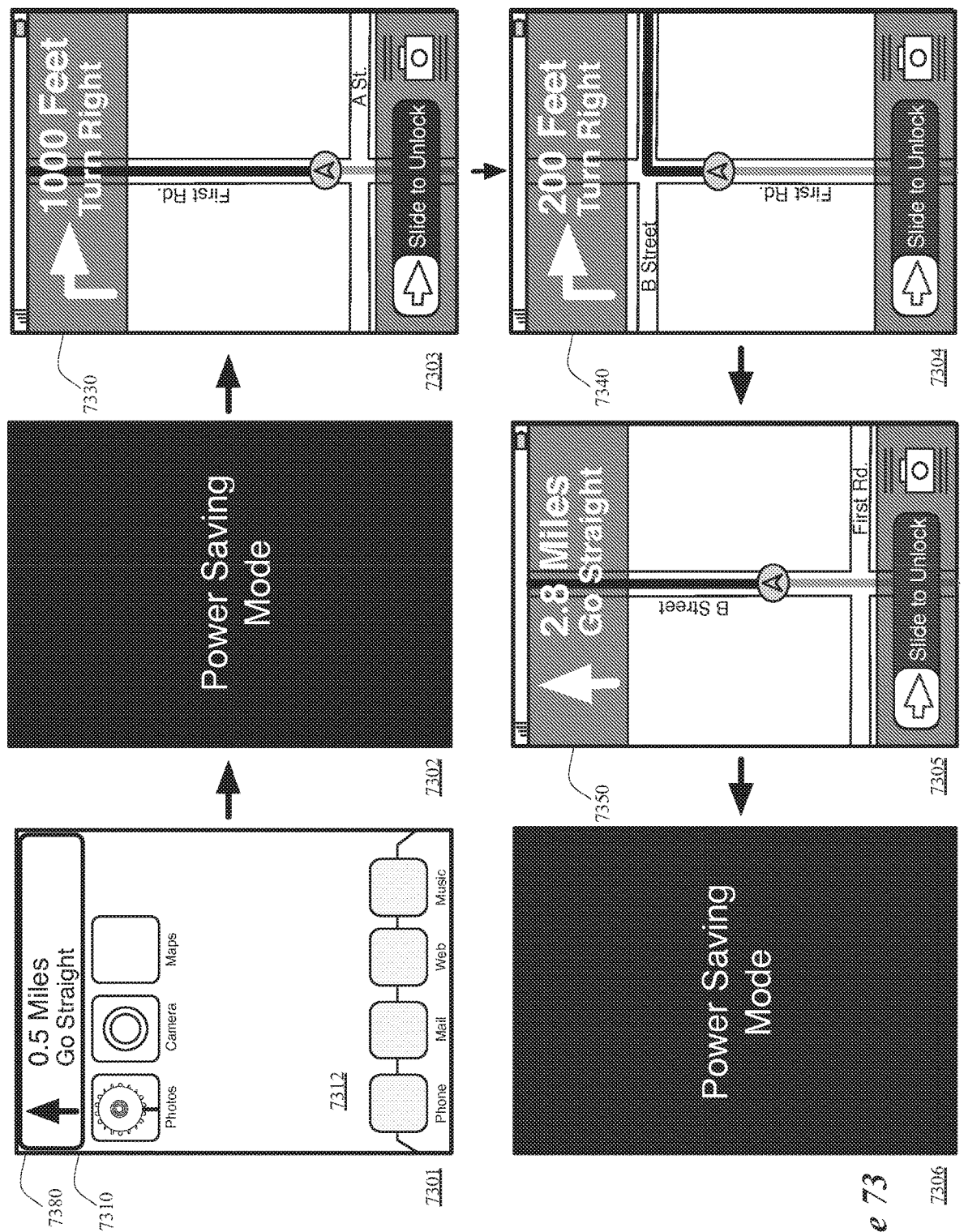
FIG. 73 illustrates multiple stages that a device goes through when no commands are given to it while a navigation application runs in the background in some embodiments of the invention.

Power saving is a feature of some embodiments of the application. In some embodiments, the navigation application operating in locked mode switches the screen on only when the device is approaching a navigation point or receives a notification. FIG. 72 illustrates a process 7200 for switching the device screen on when approaching a navigation point in some embodiments of the invention. FIG. 72 will be described with respect to FIG. 73, which will be briefly described first. FIG. 73 illustrates multiple stages that a device goes through when no commands are given to it while a navigation application runs in the background in some embodiments of the invention. FIG. 73 is illustrated in six stages from 7301-7306. The various stages will be described at the appropriate places during the description of FIG. 72.

Process 7200 of FIG. 72 begins before the screen shuts off by displaying (at 7205) an application with the navigation application running in the background. Stage 7301 of FIG. 73 illustrates the pre-locked state of the device. This stage 7301 includes a foreground application 7312 (the application launching view) with the navigation bar 7310 below the status bar 7380 at the top of the screen, indicating that the navigation application is running in the background.

In some embodiments a device turns the screen off and enters locked mode when it has received no commands in a pre-specified amount of time (e.g., 5 minutes, 15 minutes, etc.). The process determines (at 7210) whether any controls have been activated in the amount of time pre-specified for locking the device and turning of the screen. If any controls have been activated (other than one that shuts down the display and/or locks the device right away) then the device resets its countdown to going into display off and locked mode.

When the process determines that enough time has passed, the process turns off (at 7215) the screen. In some embodiments, instead of or in addition to the timeout screen deactivation, there is a control that the user can select (e.g., a button) that puts the device into locked mode. In some embodiments, the timeout screen deactivation occurs when some applications are running, but not when other applications are running. For example, in some embodiments, when the navigation application is running in the foreground the device does not shut down the screen after a preset time. Furthermore, in some embodiments, the device doesn't timeout when the navigation application is running in the background either.

Operation 7215 is illustrated in stage 7302 of FIG. 73. Stage 7302 shows the screen in black because it has been turned off either by a timeout, a control, or in some other way. While the screen is off and the device travels toward the next navigation point the process 7200 repeatedly determines (at 7220) whether the device is near the next navigation point. If the device is not near the next navigation point, the device will keep checking whether it is near the navigation point. "Near" means different distances in the application of different embodiments. In different embodiments, the device determines that it is near a navigation point when the device is 1000 feet from the navigation point, or 500 feet, or 250 feet, or any other particular distance. Once process 7200 determines (at 7220) that the device is near the navigation point, the process turns on (at 7225) an ambient light sensor. In some embodiments the ambient light sensor is part of a camera of the device. In other embodiments, the ambient light sensor is not part of a camera of the device. In some embodiments, the ambient light sensor is on at all times. In some embodiments, the ambient light sensor is a passive element that doesn't need to be powered on to function. The ambient light sensor determines how much light is present around the device. If there is a large amount of light, then the screen would have to be turned on at a high level of brightness to be seen against the existing light. However, if there if a low amount of ambient light, then the screen could be turned on at a dimmer level and still be bright enough to be seen in the lower ambient light.

Once the light level is determined, the process 7200 turns on (at 7230) the screen at a brightness level in accord with the ambient light levels detected by the ambient light sensor. The screen then displays (at 7235) a countdown to the next navigation point. This is illustrated in stage 7303 of FIG. 73. The figure shows navigation bar 7330 with an arrow indicating a right turn and instructions to turn right in 1000 feet. The process then determines (at 7240) whether the navigation point has been passed. If the navigation point has not been passed, then the process 7200 returns to operation 7235. The process then continues to display the countdown to the next navigation point. Part of the countdown is shown in stage 7304 in FIG. 73. In stage 7304, navigation bar 7340 indicates that there are 200 feet left to the right turn. Once the device passes the navigation point (in this case making the right turn), process 7200 determines (at 7245) whether the device is at its destination. If the device is at its destination, then the navigation process ends. If the device is not at its destination then the process displays (at 7250) the next navigation instruction. This is illustrated in stage 7305 in FIG. 73. In this stage navigation bar 7350 displays 2.8 miles, go straight.

If the process 7200 determines (at 7255) that the next navigation point is near, then the process returns to operation 7235 and counts down to the next navigation point. However, that is not the case in FIG. 73. If the process determines (at 7255) that the device is not near the next navigation point, then the process 7200 turns the screen off (at 7215). This is shown in stage 7306 which shows the dark screen. One of ordinary skill in the art will understand that the words "Power saving mode" in FIG. 73, stages 7302 and 7306 are meant to conceptually illustrate that the display is turned off and that they are not physically displayed on the screen during power saving mode in some embodiments.

The above described figure shows the device switching the display on as it nears predetermined navigation points, and switching the display off when it is not nearing the preset navigation points. However, in some embodiments, the device also turns the display on if the user deviates from the prescribed route (e.g., the user takes a wrong turn). In some such embodiments, the device displays a "rerouting" message until the device has calculated a new route. In some embodiments, the device then displays the next navigation instruction and then turns off the display unless the next navigation point is within the threshold distance.

Figure 74:
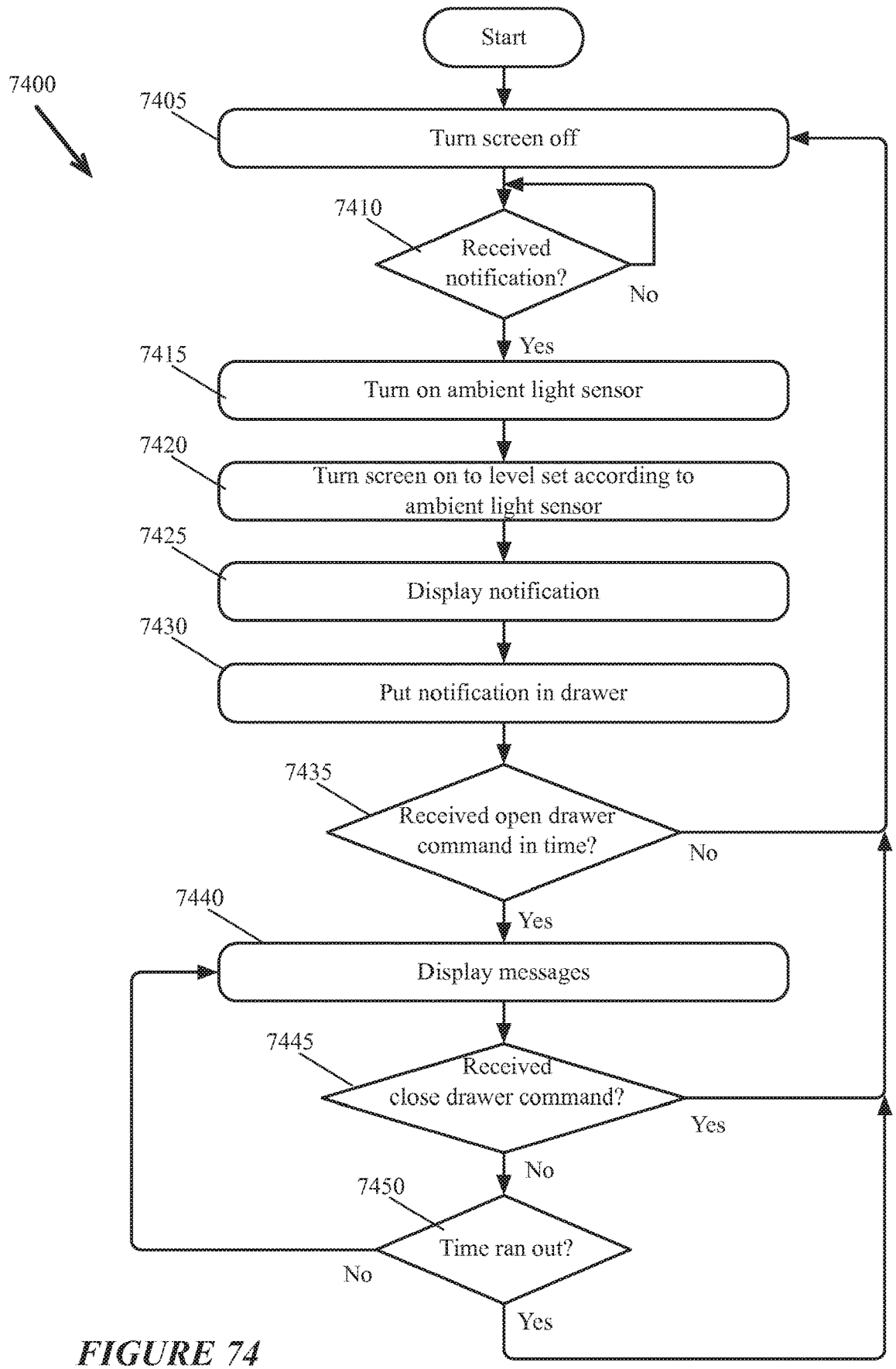
FIG. 74 conceptually illustrates a process of some embodiments for turning on the screen when a notification message is received.

In a similar manner to the way the navigation application of some embodiments turns on the screen in locked mode when the device approaches a navigation point, the device of some embodiments turns on the screen when a notification is received while the navigation program is running. FIG. 74 conceptually illustrates a process 7400 of some embodiments for turning on the screen when a notification message is received. Process 7400 will be described with reference to previously described FIG. 70. Process 7400 begins by turning the screen off (at 7405). The screen can be turned off for any of the reasons discussed with respect to FIG. 72. The process then waits (at 7410) until it receives a notification. When the process 7400 receives a notification, it turns on (at 7415) the ambient light sensor (as described above in operation 7225 of FIG. 72). The process then turns on (at 7420) the screen at a brightness set according to the ambient light level as detected by the ambient light sensor. The process then displays (at 7425) the notification. This is shown in FIG. 70 in stage 7001 as popup message 7012. The process then puts (at 7430) the notification in a drawer as described with respect to stage 7002 of FIG. 70.

The process then determines (at 7435) whether the drawer has been opened (e.g., by the user sliding a drawer control 7022) before a time limit. If the drawer has not been opened within the time limit then the process turns the screen off (at 7405) again. If the drawer has been opened before the time limit, then the messages are displayed (at 7440), e.g., as shown in FIG. 70 (as stage 7003, with message 7032 displayed). The process then determines (at 7445) whether the drawer has been closed. If the drawer has been closed then the process returns to operation 7405 and turns off the screen after a timeout period. That is, in the applications of some embodiments, the application waits for some amount of time after the drawer is closed before turning off the screen.

In some embodiments, if the process 7400 determines (at 7445) that the drawer remains open, then the process determines (at 7450) whether a timeout period has been reached. If the timeout period has not been reached, then the process continues to display (at 7440) the messages. If the time limit runs out before the drawer is closed by the user, then the process turns the screen off (at 7405). In some embodiments, if the user is sending commands to the device (e.g., scrolling through the messages) then the countdown to the time limit will not begin until the device stops receiving commands from the user.

One of ordinary skill in the art will understand that although the flowcharts for process 7400 of FIG. 74 and the process 7200 of FIG. 72 are being described separately, in some embodiments, they proceed simultaneously and the screen will be on when either one of the processes requires it. In some cases it will already be on for notification reasons when a navigation point becomes near. In these cases, rather than switching on (at 7230) as process 7200 dictates, the screen would simply remain on, even if process 7400 required that it turn off (at 7405). Similarly, processes 7200 and 7400 will continue in some embodiments until either the device is unlocked, or the destination is reached (as shown in operation 7245 of process 7200 in FIG. 72).

As described above, the device in locked mode has a limited number of active controls. However, in some embodiments, while the locked mode is operative, the map on the lock screen can be moved to one side or up and down, to a greater or lesser degree, by a gestural command in the direction that the user wishes to move the map. In some embodiments, when the device is released, the map returns to its default position.

VI. Hands-Free Navigation

A. Voice Guidances

In addition to presenting information in visual form and receiving inputs and commands through various touch-based or motion-based input devices (e.g., keyboard, mouse, joystick, touch-pad, touch-sensitive screen, and the like), the navigation application of some embodiments supports alternative modes of user interactions that do not require a user's visual attention and/or physical movements of the user's body or hands. For instance, in some embodiments, the navigation application includes an interactive map application (or interactive navigation application) that provides information to the user in an audible form (e.g., as natural language speech), and receives user inputs and commands in a verbal form (e.g., as natural language speech). By freeing the user's visual attention and physical movements from the interactive map, the interactive map allows the user to engage in other activities (e.g., driving, walking, surveying the surrounding environment, or packing for a trip) while obtaining information from the interactive map. In addition, through an audio/verbal user interface of the interactive map, the user is able to invoke and solicit information or assistance from the interactive map more readily (e.g., as soon as the need for the information or assistance arises) without disengaging from the user's current activities.

1. Accessing Interactive Map and Navigating when Lock-Screen is Active

In some embodiments, a mobile device implements a lock-screen that prevents access to various applications installed on the mobile device until a password or other input is received from the user. The mobile device optionally allows the user to verbally invoke and access the interactive map installed on the mobile device without unlocking the lock-screen. In some embodiments, a voice-activated service is initiated by activating a button or control. In other embodiments, when the voice level received at the device audio input is louder than a certain threshold (and/or natural language words are recognized by the device) the voice-activated service is automatically activated.

In some embodiments, while the device lock-screen is active, the device receives a speech input requesting access to the interactive map. The speech input may be a verbal request for directions, a verbal request to perform a local search (e.g., a search for restaurants, gas stations, lodging, etc.), or simply a verbal command to activate the interactive map. In response to the speech input, the device makes at least a subset of functionalities (e.g., providing directions and performing searches) of the interactive map available to the user through an audio-output-and-speech-input user interface without deactivating the device lock-screen. In some embodiments, the interactive map provides an audio-only output through the lock-screen in response to the user's speech input.

In some embodiments, in an audio-only mode of operation, touch-based and keyboard-based interactions with the interactive map are disabled. By allowing the user to access the interactive map directly from the lock-screen through an audio-only user interface, the interactive map is made more accessible to the user without significantly compromising the security of the user device. In some embodiments, in response to the speech input, visual information (e.g., a list of search results) is provided to the user on the lock-screen along with an audio output (e.g., a reading of the information to the user). In some embodiments, the device processes the user's speech input to determine the identity of the user and whether access to the interactive map should be allowed.

In some embodiments when voice-activated navigation is not used, navigation requires at least three steps: finding several results (search), showing directions to the results or showing several routes to a single destination address (showing overview), and then starting navigation using a selected route (showing turn-by-turn directions). However, with voice-activated navigation, some embodiments anticipate hands-free interaction and initiate navigation with a single search result. In order to facilitate voice-activated (or hands-free) navigation, these embodiments only display one route (instead of the usual several routes).

For instance, interactive navigation finds a short route using freeways, a longer route using alternative freeways, and a route that does not use freeways to get from the current location to a particular destination. Some embodiments select one of several routes found (e.g., based on a default set up, user preferences set ups, past user preferences, etc.) during voice-activated navigation and optionally display an overview of the route and wait for the route to be loaded. Anticipating a hands-free interaction, the single route is displayed, and the display transitions into full-screen turn-by-turn navigation display. As described below, when several destinations (e.g., several gas stations along the route) are found during a search, the voice-activated service in some embodiments uses a list reading mechanism to cycle through the results in a sequential fashion.

Figure 75:
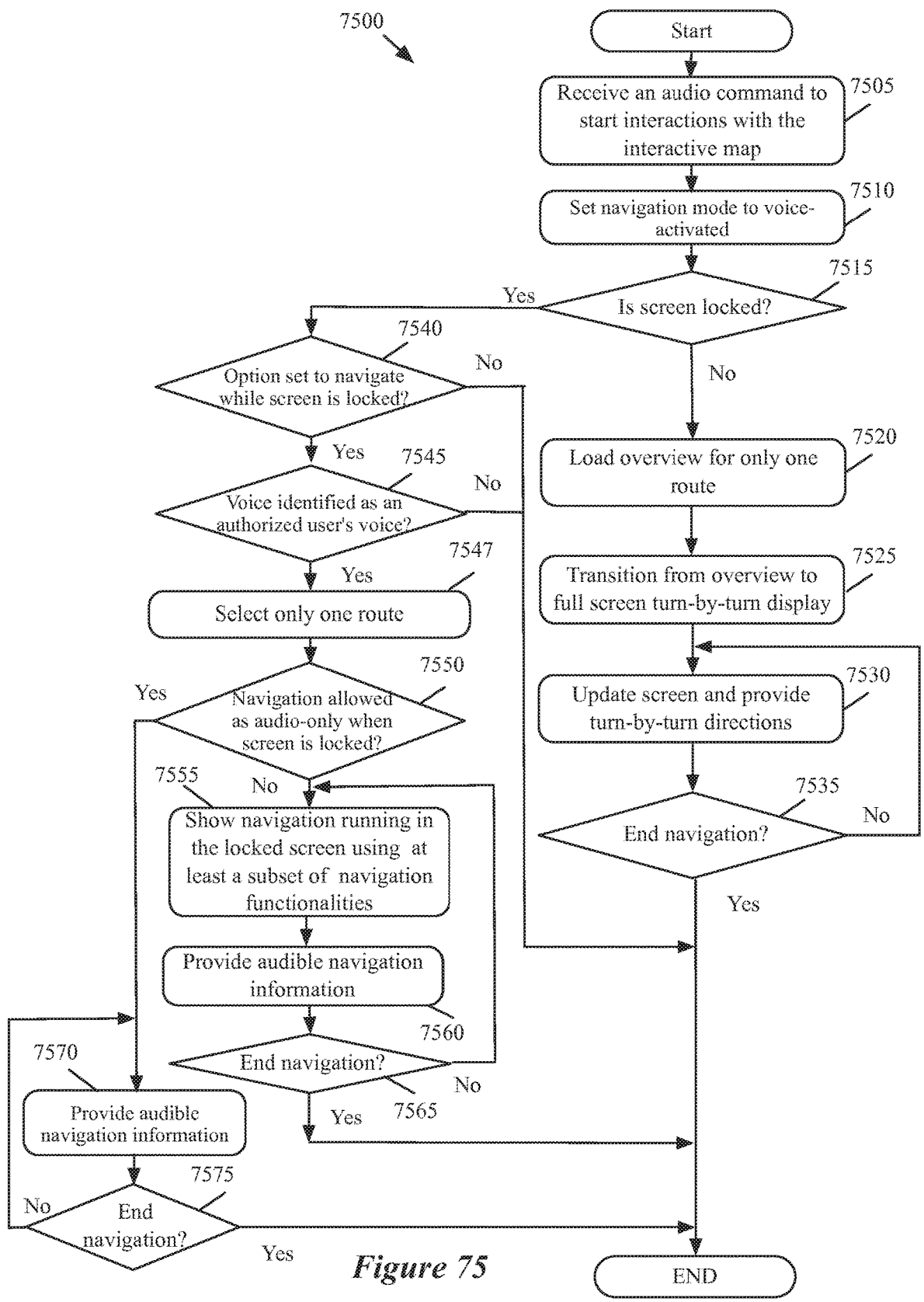
FIG. 75 conceptually illustrates a process for performing voice-activated interactions with an interactive map in some embodiments of the invention.

FIG. 75 conceptually illustrates a process 7500 for performing voice-activated interactions with the interactive map in some embodiments of the invention. As shown, the process receives (at 7505) a voice command to start interactions with the interactive map. The voice command may be commands such as "go to Dodgers Stadium" to go to a destination, "find Mediterranean restaurants" to start a search, or "start navigation" to start the interactive map.

The process then sets (at 7510) navigation mode to voice-activated mode. The process then determines (at 7515) whether the device lock-screen is active. If yes, the process proceeds to 7540, which is described below. Otherwise, the process loads (at 7520) an overview of the route. In some embodiments, the process only displays one route (instead of the usual several routes) in order to facilitate voice-activated (or hands-free) navigation. In some embodiments when voice-activated navigation is not used, navigation requires at least three steps: finding several results (search), showing directions to the results or showing several routes to a single destination address (showing overview), and then starting navigation using a selected route (showing turn-by-turn directions). However, with voice-activated navigation, some embodiments anticipate hands-free interaction and initiate navigation with a single search result. As described further below by reference to FIGS. 84 and 86, some embodiments cycle through several search results in batch fashion in order to allow the user to select a search result. In these embodiments, after the user selects a particular destination, a single route from several possible routes is set to the selected destination. These embodiments display only one route even though several routes are found and all of the found routes would have been displayed if voice-activated navigation were not in use.

The process then transitions (at 7525) from overview screen to full screen turn-by-turn display. The process then updates (at 7530) the screen and provides turn-by-turn audio and visual directions. The process then determines (at 7535) whether navigation has ended (e.g., the destination is reached). If yes, the process exits. Otherwise, the process proceeds to 7530, which was described above.

Figure 76:
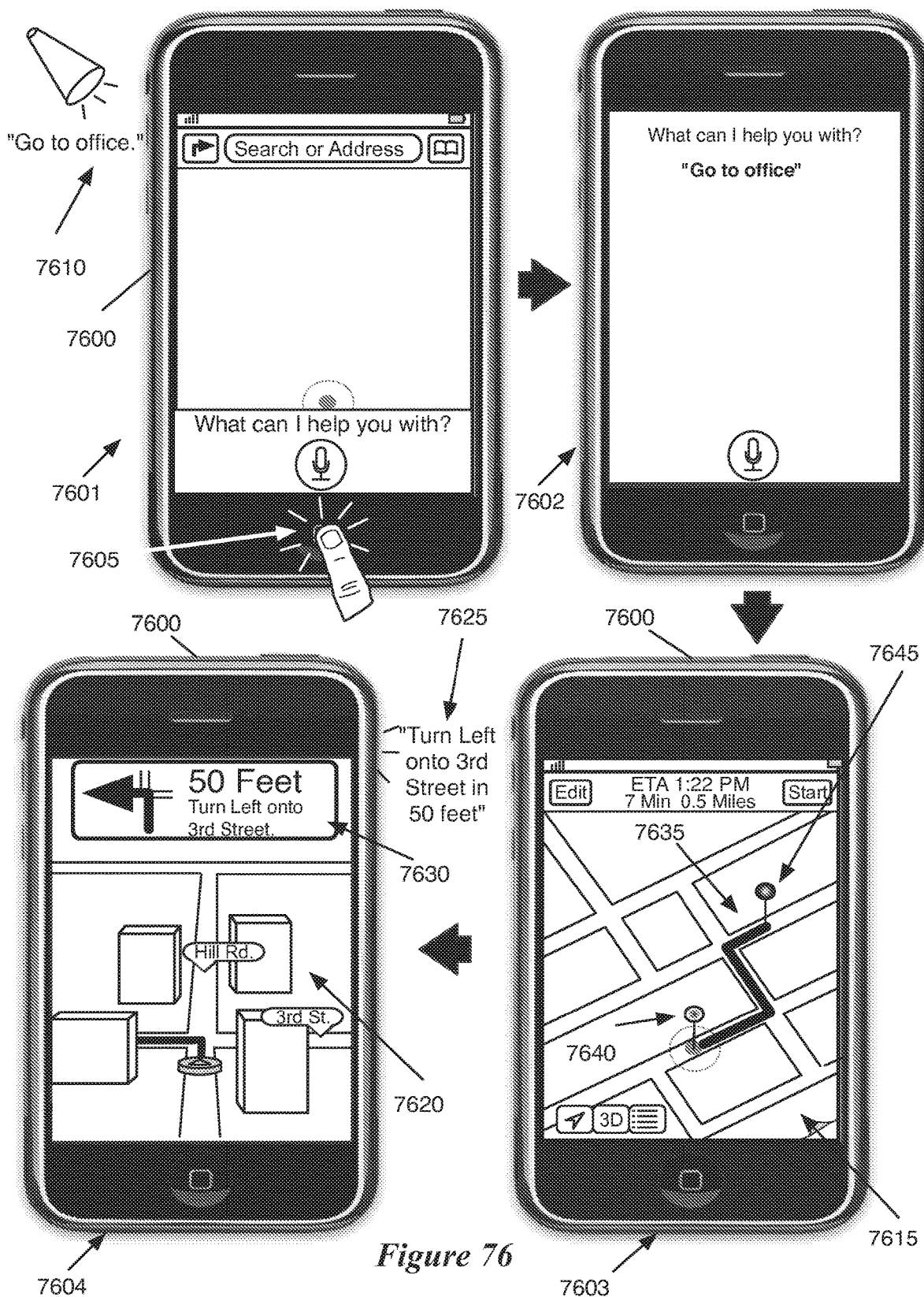
FIG. 76 illustrates a user device when lock-screen is not active in some embodiments of the invention.

FIG. 76 illustrates a user device 7600 when lock-screen is not active in some embodiments of the invention. The figure shows four stages 7601-7604. As shown in stage 7601, the user activates voice-activated navigation (e.g., by touching the button 7605) and makes a verbal request (as shown by arrow 7610) to navigate to office. In stage 7602, the screen displays the audible interaction between the user and the voice-activated service. In some embodiments, the voice-activated service prompt (in this case, "What can I help you with?") and the user's verbal request are converted to text and are displayed on the screen in order to show to the user how the verbal command is interpreted by the voice-activated service. Display of the audio interactions between the user and the voice-activated service facilitates communication, e.g., in noisy places. In order to simplify the figures, the screen that shows the transcript of the communication (such as the screen in stage 7602) is not shown for every communication between the user and the voice-activated service in some of the figures described in this Specification.

Also, some embodiments do not display the transcript of the communication between the user and voice-activated service on the screen during navigation so that the display of the map or navigation directions is not disrupted. Yet other embodiments display the transcript of the communication on the same screen (e.g., when navigation screen is displayed) instead of using a separate screen such as the screen shown in stage 7602.

The receipt of the verbal navigation command results in an overview screen 7615 being displayed, as shown in stage 7603. Some embodiments display only one route 7635 when navigation is activated by a verbal command to facilitate hands-free navigation. As shown, the route is identified by two markers or pins. One marker 7640 identifies the start of the route and the other marker 7645 identifies the end of the route. After a short delay, the display transitions to a full screen turn-by-turn display 7620 as shown in stage 7604. The voice-activated navigation service continues to provide audible directions (as shown by arrow 7625) as well as visual turn-by-turn directions (as shown by arrow 7630).

Referring back to FIG. 75, when the process determines that lock-screen is active, the process determines (at 7540) whether an option is set to navigate while the screen is locked. Some embodiments provide a user-selectable option for allowing navigation while the screen is locked. Other embodiments always allow at least limited navigation functionalities when lock-screen is active. When the option does not allow navigation while lock-screen is active, the process exits.

Otherwise, the process determines (at 7545) whether the audio command to start navigation is recognized as an authorized user. Some embodiments use voice recognition to compare the voice received (at 7505) for the audio command with voice samples from authorized users of the device in order to prevent an unauthorized user who has gained access to the device with locked screen to use the device. The embodiments that do not check for authorized users' voice bypass operation 7545. If the voice is not recognized, the process ends. Otherwise, the process selects one route to the destination. As described above, some embodiments only display one route (instead of the usual several routes) to a particular destination in order to facilitate voice-activated (or hands-free) navigation. In these embodiments only one route is displayed even though several routes are found and all of the found routes would have been displayed if voice-activated navigation were not in use. When there is more than one destination (e.g., several Italian restaurants are found along the route), some embodiments (as described further below by reference to FIGS. 84 and 86) cycle through several search results in batch fashion to allow the user to select one of the search results. After the user selects a particular destination, a single route from several possible routes is set to the selected destination.

The process then determines (at 7550) whether navigation through the lock-screen is allowed only by audio. If yes, the process proceeds to 7570, which is described below. Otherwise, the process shows (at 7555) navigation running in lock-screen using at least a subset of navigation functionalities such as providing directions and showing a list of search results. The process also provides (at 7560) audible information such as turn-by-turn directions, reading of search information to the user, etc.

Figure 77:
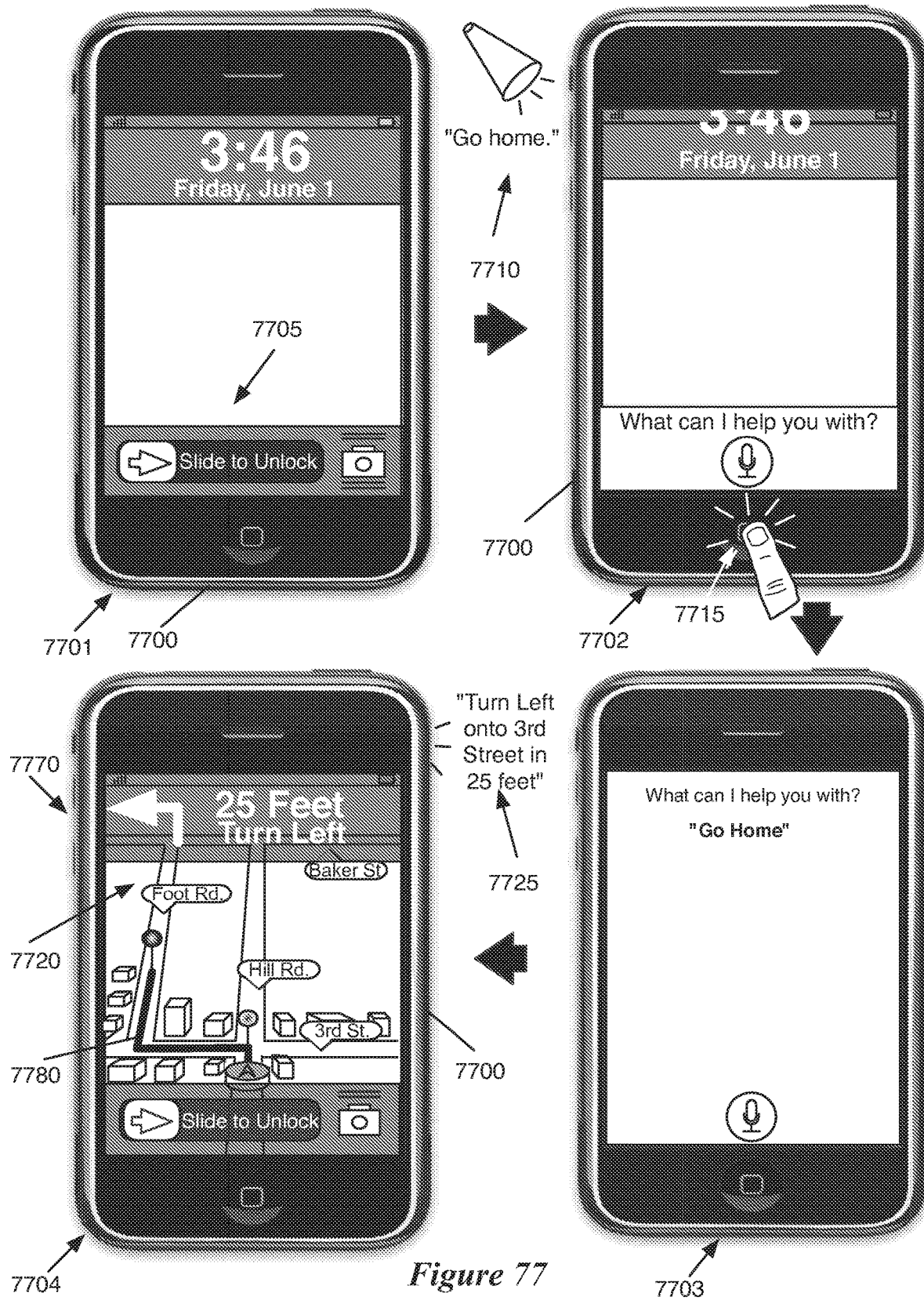
FIG. 77 illustrates a user device with lock-screen active in some embodiments of the invention.

FIG. 77 illustrates a user device 7700 with lock-screen active in some embodiments of the invention. The figure is shown in four stages 7701-7704. In stage 7701 the screen is locked. Lock-screen requires (as shown by the unlocking slider 7705) unlocking the screen and entering a passcode to unlock the screen in order to access different applications. However, the user device allows the user to verbally invoke and access the interactive map installed on the mobile device without unlocking the lock-screen.

As shown in stage 7702, the user activates voice-activated navigation (e.g., by touching the button 7715) and makes a verbal request (as shown by arrow 7710) to navigate to home. In stage 7703, the interactions between the user and the voice-activated service are transcribed on the screen. In stage 7704, the voice-activated service utilizes the interactive map application to display the map 7720 with a single route 7780 displayed and to start providing turn-by-turn navigation directions. Visual directions (as shown in information banner 7770) as well as audible instructions (as shown by arrow 7725) are provided in some embodiments. Some embodiments display an overview of the route (similar to screen 7615 described above) and after a short delay transition to a screen to show turn-by-turn directions in lock-screen. Other embodiments do not show the route overview when lock-screen is active and directly transition to the turn-by-turn navigation screen. Also, since the user request (i.e., go home) results in one destination only, the route is displayed without any further interactions with the user. On the other hand, when there is more than one destination found (e.g., in response to a request to find a hotel) the user is allowed to select one of the search results as described below by reference to FIGS. 84, 85A-85D, and 86.

Referring back to FIG. 75, the process then determines (at 7565) whether the navigation has ended (e.g., when a destination is reached or the navigation is stopped by the user). If so, the process ends. Otherwise, the process proceeds to 7555, which was described above.

When the process is allowed in audio-only, the process provides (at 7570) audible information such as turn-by-turn directions, reading of search information to the user, etc. The process then determines (at 7575) whether the navigation has ended (e.g., when a destination is reached or the navigation is stopped by the user). If so, the process ends. Otherwise, the process proceeds to 7570, which was described above.

Figure 78:
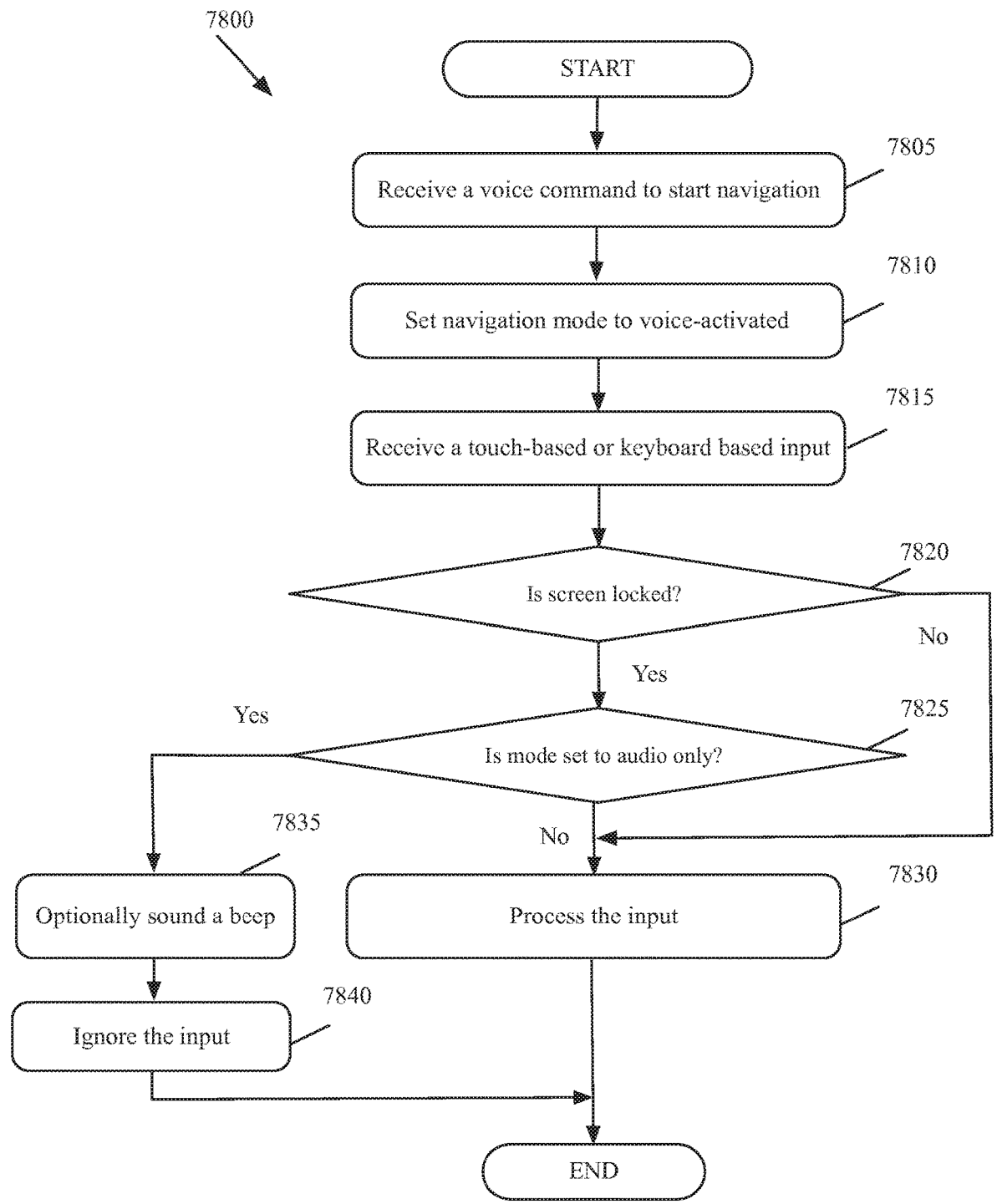
FIG. 78 conceptually illustrates a process for providing voice-activated navigation while lock-screen is activated in some embodiments of the invention.

In some embodiments, when lock-screen is active and navigation is allowed only through audio, all other user inputs such as through touch-based or motion-based input devices are not allowed. FIG. 78 conceptually illustrates a process 7800 for providing voice-activated navigation while lock-screen is activated in some embodiments of the invention. This process is utilized in some embodiments in conjunction with other processes used by voice-activated service in order to determine whether only voice-activated commands should be allowed. As shown, the process receives (at 7805) a verbal command to start navigation. The process then sets (at 7810) navigation mode to voice-activated.

The process then receives (at 7815) a user command through a touch-based or motion-based input device. The process determines (at 7820) whether the lock-screen is active. If not, the process responds to the user command (at 7830). The process then exits. In the embodiments where process 7800 is used together with other voice-activated processes, the process returns control (at 7830) to other voice-activated processes in order to respond to the user request. When lock-screen is active, the process determines (at 7825) whether navigation is allowed only though audio. If not, the process proceeds to 7830, which was described above. Otherwise, the process optionally makes (at 7835) a short warning sound (e.g., a beep). The process then ignores (at 7840) the user input. The process then exits.

2. Navigation Using Natural Language Utterances

In some embodiments, the user is allowed to request point to point directions from the interactive map via a natural language speech query, such as "How do I get from Time Square to the Empire State building?" The interactive map responds to the user's inquiry by providing point to point directions to the user, for example, either visually and/or audibly. As the user travels from one location to the next location, the interactive map optionally (e.g., upon user's verbal request) provides information to the user in an audible form, such as time to destination, distance to destination, and current location. In some embodiments, the audible response from the interactive map is provided to the user without deactivating the lock-screen of the user's device.

In some embodiments, the interactive map provides sub-directions as the user navigates from location to location. The sub-directions are provided based on the user's current location, a planned route, a destination, and/or the user's request for information. For example, while driving along a route to a predetermined destination, the user may ask the interactive map "What's the building to the right of me?" "Which way should I go next?" "Where can I get gas?" or "Where can I find an Italian restaurant?" For each of these questions, the interactive map considers the user's current location, the route that the user is currently taking, and/or the destination, and provides a contextually relevant response, such as "That was the Ferry building," "Turn left at the next corner," "Here is a list of gas stations near the next five exits: . . . ," or "Here is a list of Italian restaurants near your destination: . . . "

In some embodiments, the interactive map processes various natural language utterances from the user and in response to the utterances, retrieves and presents the user's current navigation status while the user is traveling along a route. Example navigation status information includes information regarding the distance between the user's current location and the user's destination, the estimated time of arrival to the user's destination, the distance between the user's current location and the next waypoint (e.g., the next turn, the next exit, or the next landmark) along a current or planned route, the estimated time to reach the next waypoint along a current or planned route, a description of the next waypoint along the route, a description of the destination, and the like.

Figure 79:
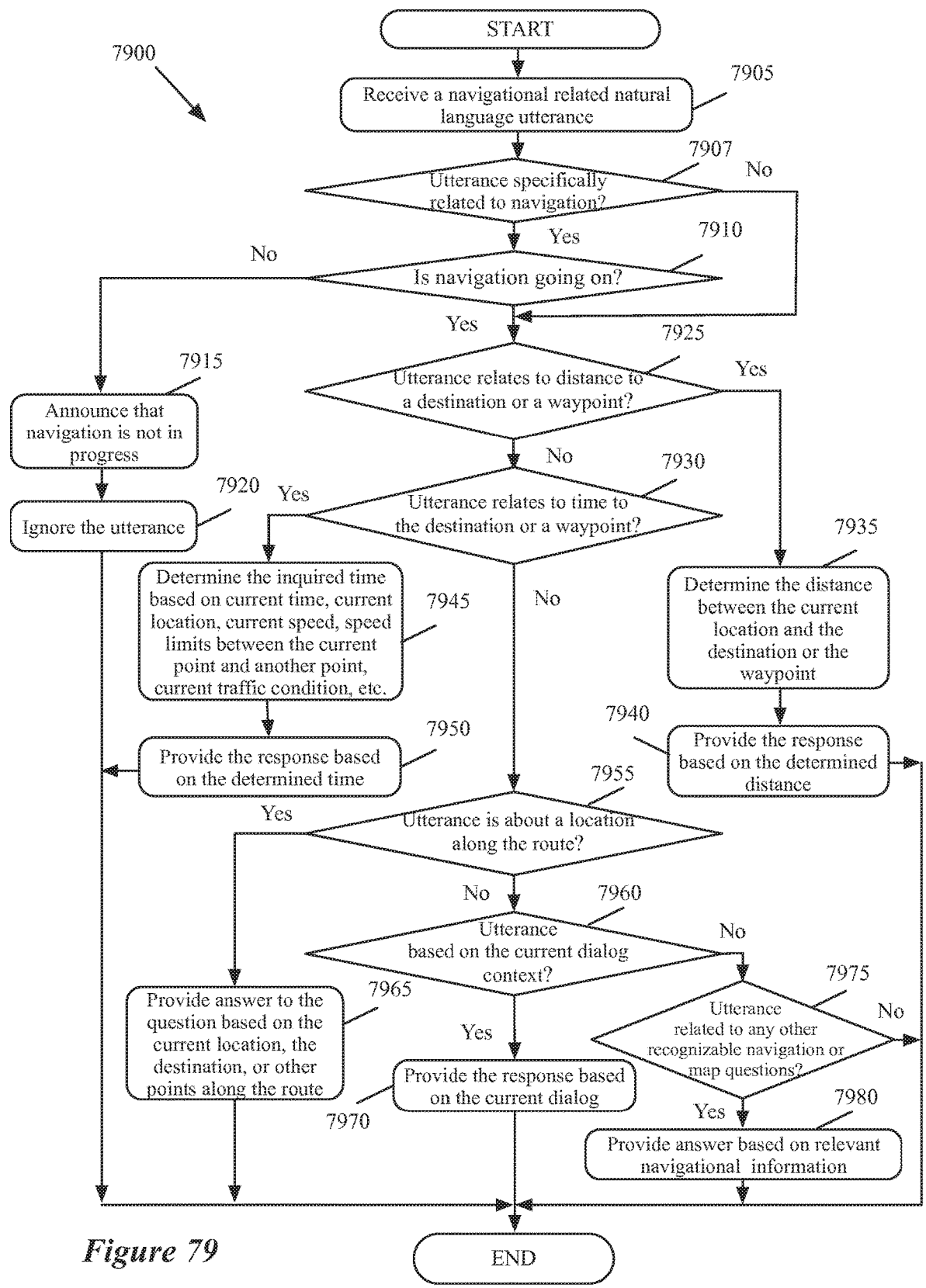
FIG. 79 conceptually illustrates a process for receiving a natural language utterance and retrieving and presenting the user's current navigation status while the user is traveling along a route in some embodiments of the invention.

FIG. 79 conceptually illustrates a process 7900 for receiving a natural language utterance and retrieving and presenting the user's current navigation status while the user is traveling along a route in some embodiments of the invention. The responses are provided audibly and/or visually based on the current settings of the user device. As shown, the process receives (at 7905) a navigation or map related natural language utterance. The process then determines (7907) whether the utterance is specifically related to navigation (e.g., what is my next turn). If not, the process proceeds to 7925, which is described below. Otherwise, when the utterance is specifically related to navigation, the process determines (at 7910) whether the navigation is going on. Some embodiments set an indicator or flag when navigation starts (e.g., when a destination is selected, search results are found, or navigation is explicitly started with a commend). Process 7900 utilizes this navigation indicator to determine whether navigation is going on. This indicator biases voice recognition in some embodiments to compare a verbal command with a list of natural languages phrases used for navigation. Some embodiments support a number of hands-free question-answering tasks during navigating in terms of primitives such as e.g., time remaining, distance remaining, identification of buildings or objects along the route, location of different services such as gas stations along the route, upcoming navigation directions, how to get somewhere, questions based on a current dialog context, etc.

When the utterance is related to navigation and navigation is not going on, the process announces (at 7915) that navigation is not in progress. For instance, in response to "what is my next turn", the process might respond, "no route has been set yet" or "no destination is selected yet". The process then ignores (at 7920) the utterance. The process then ends.

When the utterance is just related to the map (e.g., how far is the next gas station) or when the utterance is related to navigation and navigation is going on, the process determines (at 7925) whether the utterance relates to distance to the destination, to a waypoint, or any other distance-based questions relating to navigation or the map. If not, the process proceeds to 7930, which is described below. Otherwise, the process determines (at 7935) the distance between the current location and the destination or waypoint. For instance, a user utterance "How far away am I" and its natural language variations (e.g., "How far away are we", "How far do I have to go", etc.) will cause the interactive map to retrieve and present the distance-to-destination information based on the user's current location and the location of the destination.

Similarly, a user utterance "How close is my next turn" and its natural language variations (e.g., "How far away is my next turn") will cause retrieval and presentation of the distance-to-next-waypoint information based on the user's current location and the location of the next waypoint on a current or planned route. The process then provides (at 7940) the response based on the determined distance. The process then ends.

The process determines (at 7930) whether the utterance relates to time to the destination, time to a waypoint, or any other time based questions related to navigation. If not, the process proceeds to 7955, which is described below. Otherwise, the process determines the inquired time based on current time, current location, current speed, speed limits between the current location and another location, current traffic conditions, etc.

For instance, a user utterance "How long do I have to go" and its natural language variations (e.g., "When can I get there," "How close am I," "How long until I get there," "How long until we get there," "When will I get there," "When do I get there," "When should I get there," "When should we be getting there," "How much longer is it going to be," "When will I get to [destination name]," etc.) will cause retrieval and presentation of the time-to-destination information to the user. In some embodiments, the time-to-destination information is determined based on one or more of the current time, the current location, the current speed, the speed limits imposed between the current location and the destination, and the current traffic conditions between the current location and the destination, etc. The process then provides (at 7950) the response based on the determined time. The process then exits.

The process determines (at 7955) whether the utterance is about a location along the route. If not, the process proceeds to 7960, which is described below. Otherwise, the process provides (at 7965) an answer to the utterance based on the current location, the destination, or other points along the route. For instance, a user can ask about the destination or the next waypoint by saying "What's my destination," "What's next," "Tell me my next turn," "Where is my destination," "Tell me what I have to do," "Tell me what I have to do next," and the like. In response, the interactive map provides the information on the destination or next waypoint (e.g., a description of the destination or waypoint) based on the user's current location and the destination or next waypoint on a current or planned route. The process then exits.

The process determines (at 7960) whether the utterance is based on the current dialog between the user and the interactive map. If not, the process proceeds to 7975, which is described below. Otherwise, the process presents (at 7970) the response based on the current dialog. The process then exits. In some embodiments, the user's utterance is interpreted based on the current dialogue context. For instance, if the user has just asked about an earlier waypoint, the user utterance "When will I get there" is interpreted as a request for navigation status information on the next waypoint (e.g., the estimated time-to-next-waypoint). In contrast, if the user has just asked about the destination, then the same utterance is interpreted as a request for navigation status information on the destination (e.g., the estimated time-to-destination).

The process determines (at 7975) whether the utterance is based on any other recognizable navigation or map questions. If yes, the process provides (at 7980) an answer based on navigational or map information relevant to the question. Otherwise, the process exits.

Figure 80:
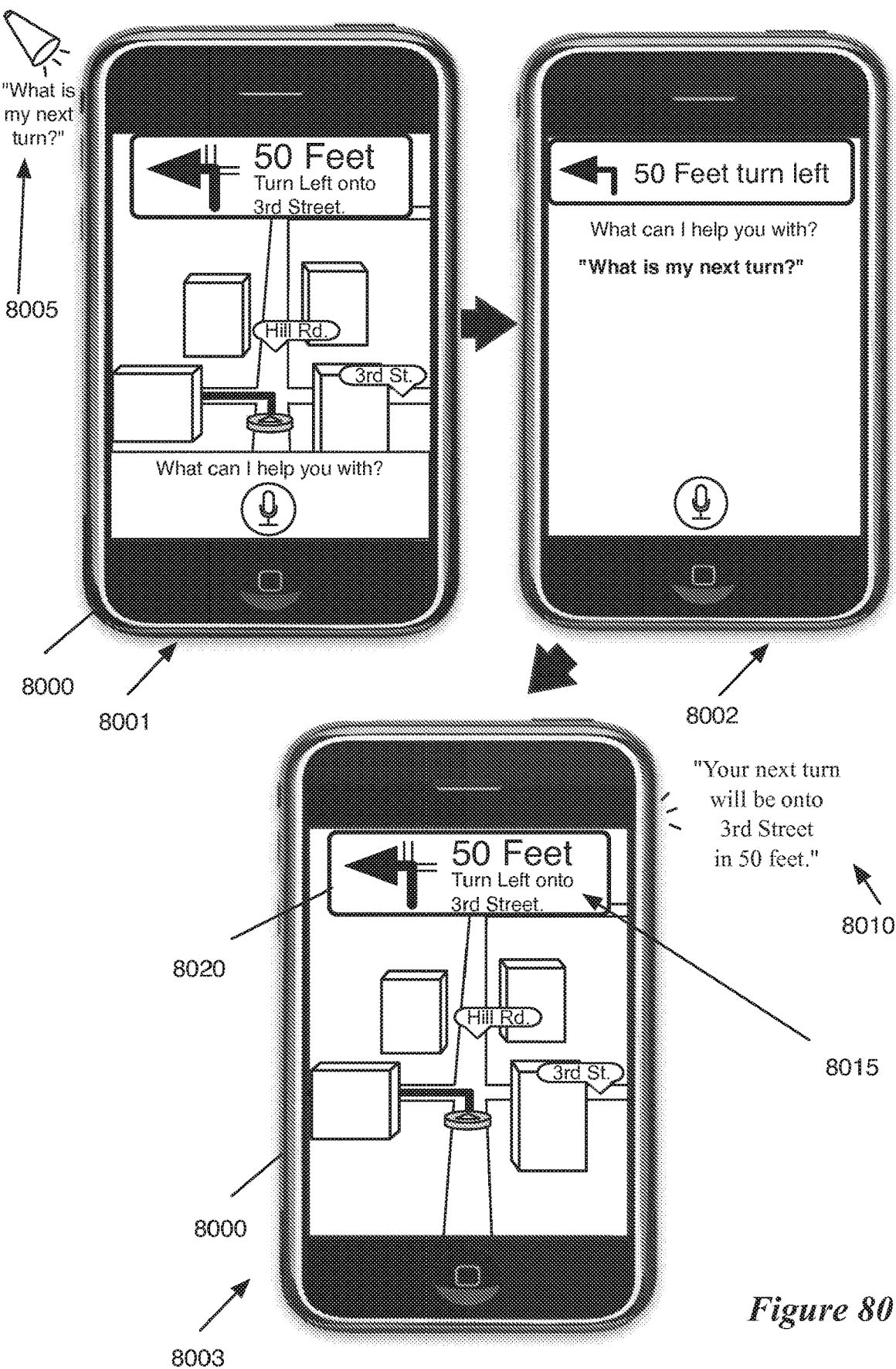
FIG. 80 illustrates a user device when natural language utterances are used during voice-activated navigation in some embodiments of the invention.

FIG. 80 illustrates a user device 8000 when natural language utterances are used during voice-activated navigation in some embodiments of the invention. The figure is shown in three stages 8001-8003. In stage 8001, the user uses the natural language utterance "what is my next turn"

(as shown by arrow 8005), to get directions. In stage 8002, the screen optionally displays the audible interaction between the user and the voice-activated service. In stage 8003, the voice-activated navigation responds by providing the audible response (as shown by arrow 8010) "your next turn will be onto 3$^{rd}$ street in 50 feet". A similar visual direction 8015 is also displayed on a banner 8020 on the screen.

Figure 81:
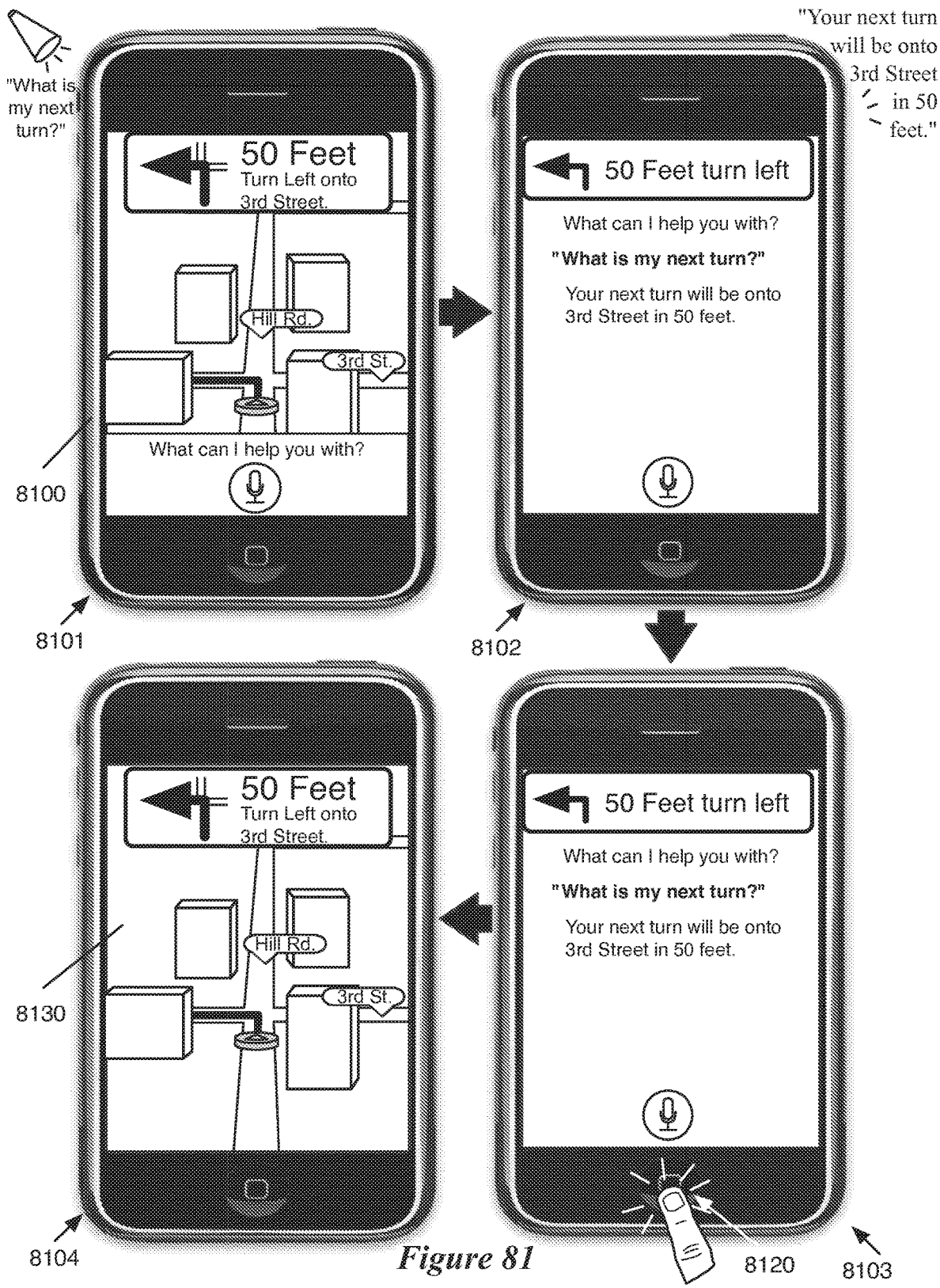
FIG. 81 illustrates a user device when natural language utterances are used during voice-activated navigation in some embodiments of the invention.

FIG. 81 illustrates a user device 8100 when natural language utterances are used during voice-activated navigation in some alternative embodiments of the invention. The figure is shown in four stages 8101-8104. Stage 8101 is similar to stage 8001 of FIG. 80. However, as shown in stages 8102 and 8103, the display is not automatically switched to show the map again until the user activates a control (such as the button 8120). As shown in stage 8104, the map 8130 is displayed once the user indicates (by activating the control) that the user currently has no more questions to ask.

Figure 82:
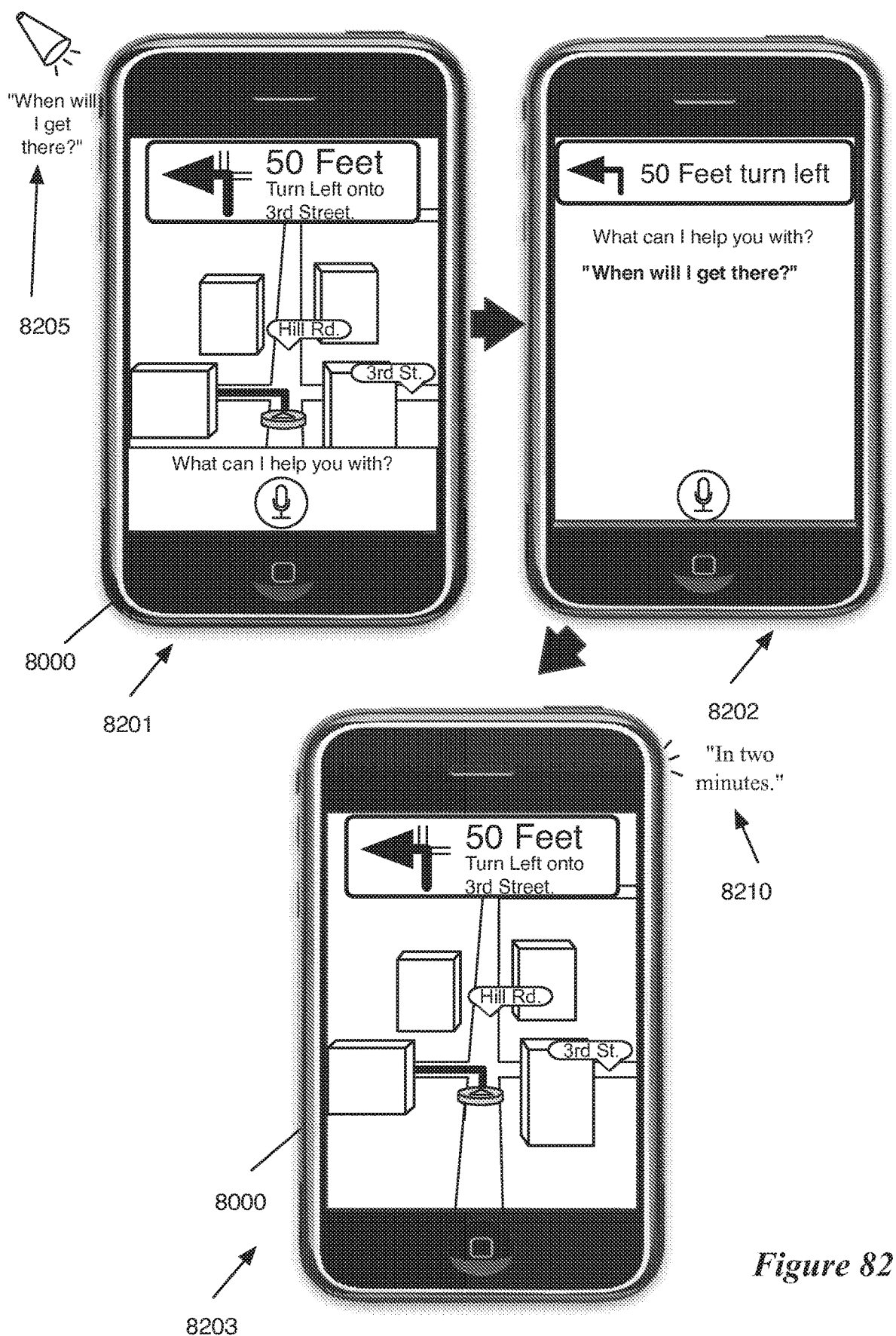
FIG. 82 illustrates user device of FIG. 80 after the user makes an inquiry based on the current dialog.

FIG. 82 illustrates user device 8000 of FIG. 80 after the user makes an inquiry based on the current dialog. The figure is shown in three stages 8201-8203. In stage 8201, the user asks (as shown by arrow 8205) "when will I get there". In stage 8202, the screen optionally displays the audible interaction between the user and the voice-activated service. In stage 8203, since the current dialog was about the next turn in the route, the voice-activated navigation responds (as shown by arrow 8210) "in two minutes". The voice-activated navigation makes the response based on the current position, the distance to the next waypoint, the current speed, the traffic condition between the current position and the next waypoint, etc.

Figure 83:
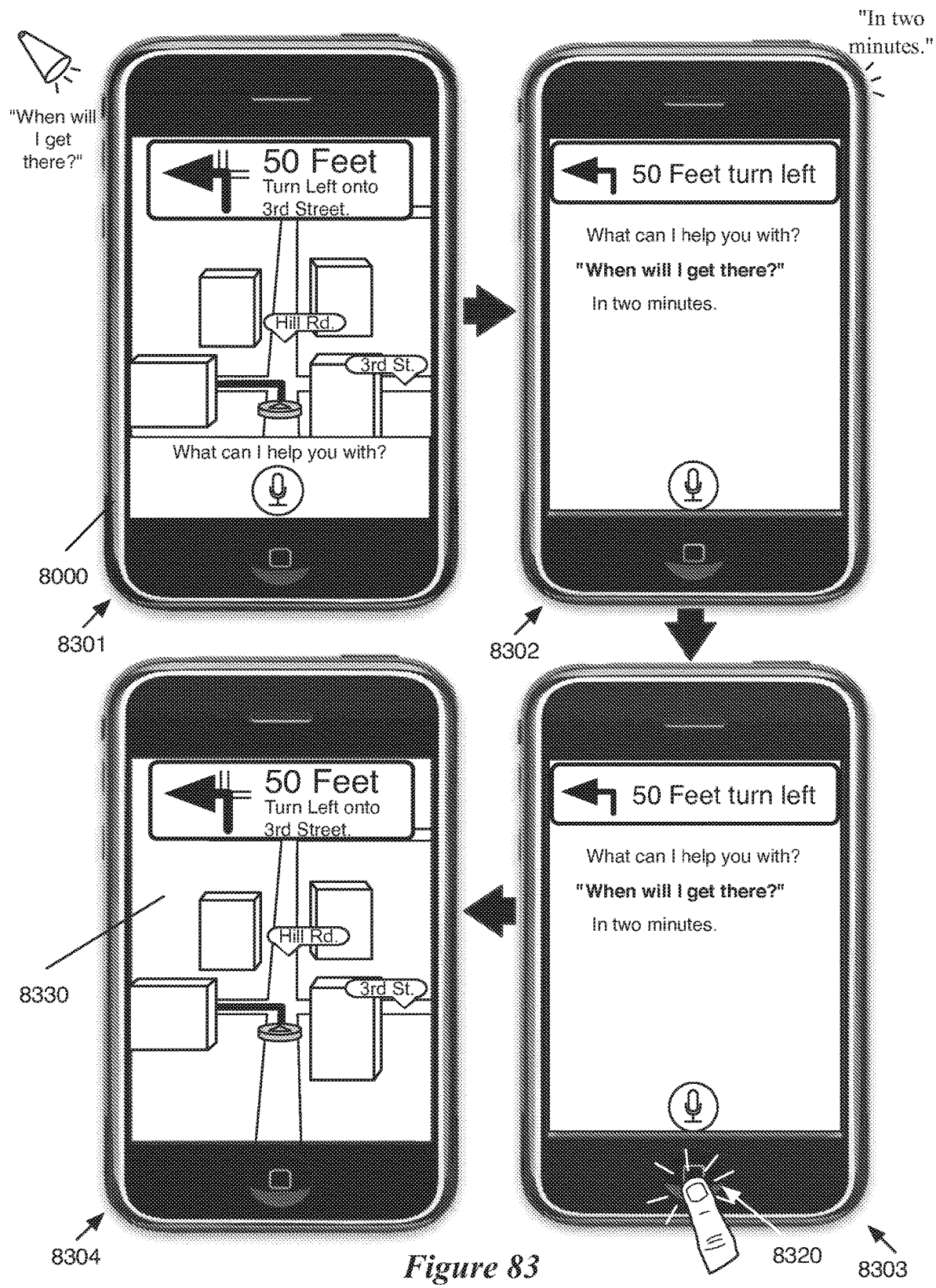
FIG. 83 illustrates user device of FIG. 80 after the user makes an inquiry based on the current dialog.

FIG. 83 illustrates user device 8000 when natural language utterances are used during voice-activated navigation in some alternative embodiments of the invention. The figure is shown in four stages 8301-8304. Stage 8301 is similar to stage 8201 of FIG. 82. However, as shown in stages 8302 and 8303, the display is not automatically switched to show the map again until the user activates a control (such as the button 8320). As shown in stage 8304, the map 8330 is displayed once the user indicates (by activating the control) that the user currently has no more questions to ask.

The followings are examples of natural language utterances recognized in some embodiments. One of ordinary skill in the art will realize that many other natural language utterances similar to these examples could be used to ask navigation related questions.

"How far away am I?"
"How far away are we?"
"How long do I have to go?"
"When is my next turn?"
"How close is my next turn?"
"How long until I get there?"
"How long until we get there?"
"Where is my next turn?"
"When will I get there?"
"When will we get there?"
"When will I get to my destination?"
"When will we get to our destination?"
"When do I get there?"
"When should I get there?"
"When should I be getting there?"
"When should we be getting there?"
"When do I get home?"
"How much longer?"
"How much longer is it going to be?"
"What's next?"
"Tell me my next turn"
"Tell me what I have to do"
"Tell me what I have to do next"
"Tell me when I'm going to get there"
"Tell me when we'll get there"
"Where is my destination?"
"What's the building to the left of me?"
"Which way should I go next?"
"Where can I get gas?"
"Where can I find a hotel?"

3. Voice-Activated Searching and Navigation

In order to facilitate hands-free navigation, some embodiments utilize a voice-activated service to perform user-initiated searches. In some embodiments, this voice-activated service is a part of the interactive navigation application. In other embodiments, this voice-activated service is provided by a voice-activated personal assistant service that makes available a wide range of services for the users of the device. Examples of these services are sending messages, placing phone calls, schedule meetings, finding businesses, getting directions, searching the web, etc., based on user verbal commands and inquiries. An example of such a voice-activated personal assistant is Siri® provided in iPhone®. Some of these embodiments identify one of the items in the search result and set a route from the current location of the device to the identified item. The identified search result and the route are then presented to the user. The user is provided with an option to navigate to the presented item or to skip to the next item in the search results.

Figure 84:
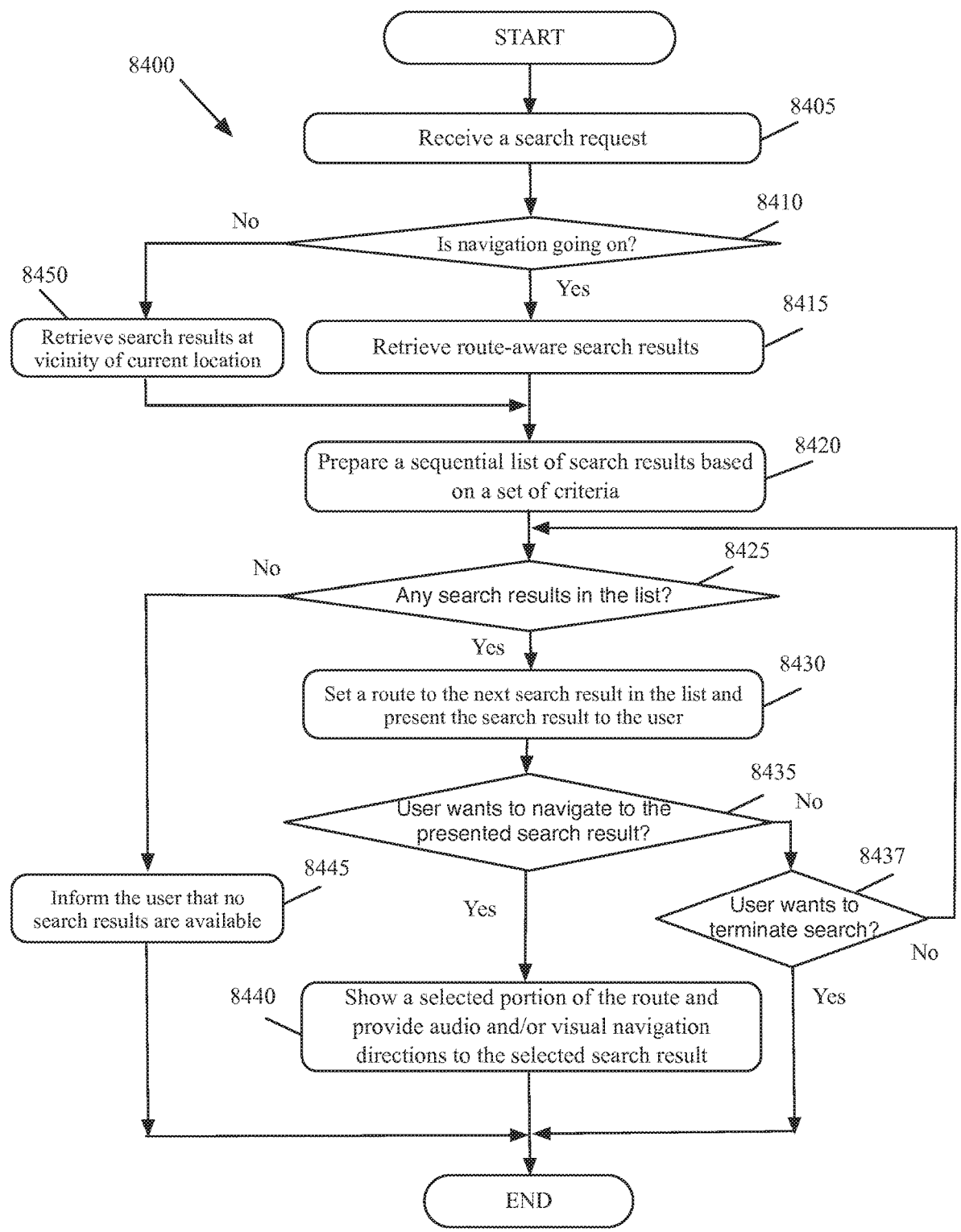
FIG. 84 conceptually illustrates a process for providing voice-activated search and navigation in some embodiments of the invention.

FIG. 84 conceptually illustrates a process 8400 for providing voice-activated search and navigation in some embodiments of the invention. FIG. 84 is described with respect to FIGS. 85A-85D. FIGS. 85A-85D illustrate 12 stages 8501-8512 of a user interface of some embodiments in which a user is using the voice-activated service to search for points of interest and destinations.

As shown in FIG. 84, process 8400 receives (at 8405) a search request. The search request can be made by a verbal command. As shown in stage 8501 in FIG. 85A, the user initiates a verbal search request (as shown by arrow 8515). In some embodiments, the voice-activated service is initiated by activating a button (such as button 8520). In other embodiments, when the voice level received at the device audio input is louder than a certain threshold (and/or natural language words are recognized by the device) the voice-activated service is automatically activated.

Figure 85A:
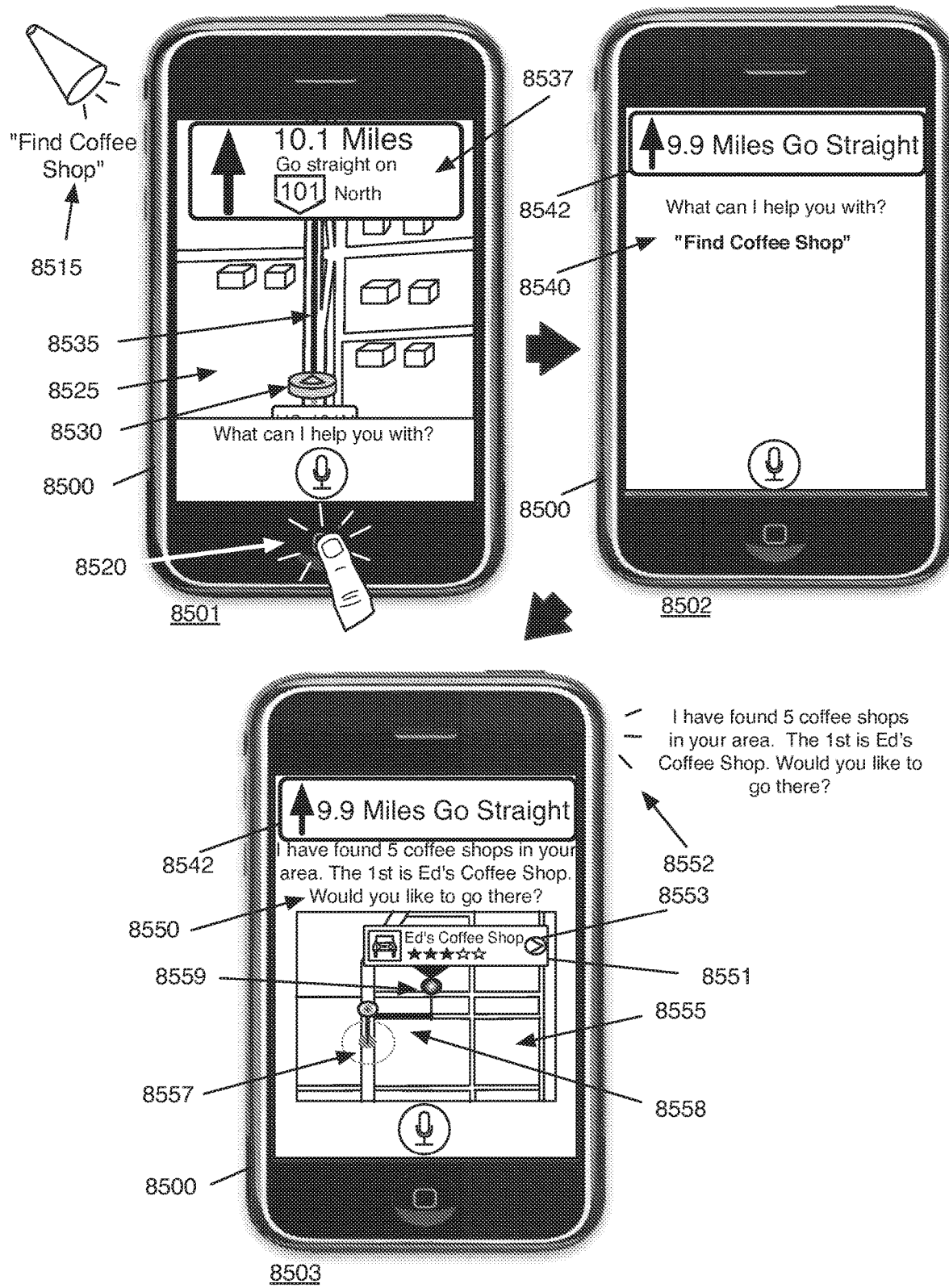

The process then determines (at 8410) whether navigation is going on. For instance, the process determines whether a destination is already set. If yes, the process retrieves (at 8415) route-aware search results. In some embodiments, the interactive map application maintains route information and shares the remaining route information with process 8400 to perform a route-aware search. For instance, in response to "find coffee shops", instead of finding coffee shops that are closest to the current location, the process finds coffee shops that are close to the current route even when some of the search results are farther along the route. The process then proceeds to 8420, which is described below. In the example of FIG. 85A, a map 8525 and navigational directions 8537 are shown on the screen. The map identifies the current location 8530 of the user device and a route 8535 that is currently set for navigation. For instance, if a route is set from Los Angeles to Cupertino in California and the user device has moved along the route, stage 8501 shows a portion of the route from Los Angeles to Cupertino in the vicinity of where the device is currently located.

As shown in stage 8502, some embodiments display a transcript 8540 of the verbal interactions between the user and the voice-activated service to facilitate better communication. Some embodiments (such as the illustrated embodiment) show the transcript as a separate display as shown in stage 8502. Other embodiments (not shown) write the transcript on the same page that was displayed on the foreground when the user started the search request (such as the display shown in stage 8501). Also as shown in stage 8502, a navigation banner 8542 is shown on the screen in order to facilitate navigation along the original route 8535 while the voice-activated search is in progress. Although route-aware search is described in context of voice-activated search, some embodiments perform route-aware searching when navigation is going on and the user uses touch-based or motion-based input devices.

When the search request is received while navigation is not going on (not shown in FIGS. 85A-85C), process 8400 retrieves (at 8450) the search results at the vicinity of the current location of the user device (instead of the vicinity of the route as described in operation 8415 above). The process then prepares (at 8420) a sequential list of search results. Different embodiments use different criteria for sorting the list in order to determine which search result is presented to the user first. For instance, some embodiments use the closest location first. Other embodiments utilize different rankings of each item in the search result to sort the list. For instance, a restaurant that has a higher ranking is shown first. Other embodiments utilize user preferences either explicitly set or by using the past preferences of the user. For instance, a restaurant with lower cost may be presented first.

The process then determines (at 8425) whether any search results are left in the list. As shown, the process iterates through operations 8425-8437 to process each item in the search result list. Therefore, for the first item in the search result list, the process determines (at 8425) whether the search has returned any results. For subsequent items in the list, the process determines (at 8425) whether all items in the list have already been presented to the user. If yes, the process informs (at 8445) the user that the search has returned no results (for the first iteration) or that there are no more search results left (for the subsequent iterations). The process then ends.

Otherwise, when there are more items in the search results list, the process sets (at 8430) a route to the next item in the list and presents the search result to the user. In order to facilitate hands-free navigation, the process automatically selects a single route from multiple routes found and sets the route to the presented search result. As shown in stage 8503 in FIG. 85A, the voice-activated service presents the search results to the user in visual (8550) and audible (8552) forms. For instance, the voice-activated service indicates: "I have found 5 coffee shops in your area. The 1$^{st}$ is Ed's Coffee Shop. Would you like to go there?" In some embodiments, the voice-activated service utilizes commonly used abbreviations in the verbal and written presentation to facilitate easy communication.

As shown, the voice-activated service shows a map 8555 that identifies the current location of the device 8557, location of the presented search result 8559, and a single route 8558 between the two locations. The screen also shows other useful information 8551 (e.g., the name of the presented search result and ratings when available). The user can also see (or hear) more information about the search result (e.g., by tapping on the banner 8551 or selecting the control 8553 on the banner 8551 that shows the search result name or by verbally asking for more details about the present search result).

Some embodiments do not show some of the information shown in stage 8503 (e.g., the ratings may be displayed only when the user taps on the banner 8551 or verbally asks for more information). In some embodiments, selecting control 8553 launches a third-party application or opens up the third-party's website in a browser application that is concurrently running on the device on which the navigation application is running. For instance, the navigation application of some embodiments launches the third-party application (e.g., a Yelp® application) to show the full text information, reviews, photos, etc., for the presented search result.

Since the user has not decided to navigate to the presented search result 8559, the original route 8535 (in this example from Los Angeles to Cupertino as shown in stage 8501) is still being used for actual navigation and the turn-by-turn navigational direction along route 8535 (and not the displayed route 8558) are shown in the navigation banner 8542 in stage 8503. Accordingly, the user can continue navigating along the original route 8535 while the search results are being presented to the user by the voice-activated service.

Also, as shown, the map displayed in stage 8503 is different than the map displayed in stage 8501. The map in stage 8501 is a full screen turn-by-turn navigation display (e.g., an optionally 3D map) that shows a portion of the currently navigated route while the map displayed in stage 8503 is an overview map that shows the route from the current location of the device to the proposed search result. For instance, the overview map is a 2D map with the presented search result located close to the center of the map. In addition, some embodiments display the map in stage 8503, for example, with different borders, different size, etc., to distinguish between a map displayed by voice-activated service to a proposed destination and a map displayed by the interactive navigation application to a selected destination. In other embodiments, the map displayed in stage 8503 is similar to an overview map (e.g., map 7615 shown in FIG. 76). Yet as described further below, in some embodiments, the map is displayed by the interactive navigation application (e.g., when requested by the voice-activated service).

Referring back to FIG. 84, the process then determines (at 8435) whether the user wants to navigate to the presented search result. Is yes, the process proceeds to 8440, which is described below. Otherwise, the process determines (at 8437) whether the user wants to terminate search. If yes, the process terminates presenting the search results. In some embodiments, after terminating the voice-activated search, the screen displays the application that was running in the foreground prior to the beginning of the search. In some embodiments, the voice-activated service returns control to the application that was running in the foreground prior to the start of the search. For example, if the interactive navigation application was running before the search started, the screen displays navigation information again.

As shown in stage 8504 in FIG. 85B, the user asks the voice-activated service to terminate the search (as shown by arrow 8560). In stage 8505, the display optionally shows the transcript 8565 of the verbal communication. In stage 8506, the map 8525 that was displayed in stage 8501 is displayed back on the screen. The navigational directions 8537, the route 8535, and the current position 8530 of the device are also restored. Although the current position 8530 of the device has changed due to the movement of the device during the search process. Accordingly, the original route

8535 is restored on the screen and navigation continues to the Cupertino destination since the user did not select any of the presented search results.

When process 8400 determines that the user does not want to navigate to the presented search result or to terminate the search, the process proceeds back to 8425 to present the next search result. The process continues until (i) the user decides to navigate to a search result, (ii) the user decides to terminate the search, or (iii) there are no more items to present. For instance, if there are more items in the list, the process sets a route (at 8430) to the next search result and repeats operations 8430-8435.

Figure 85C:
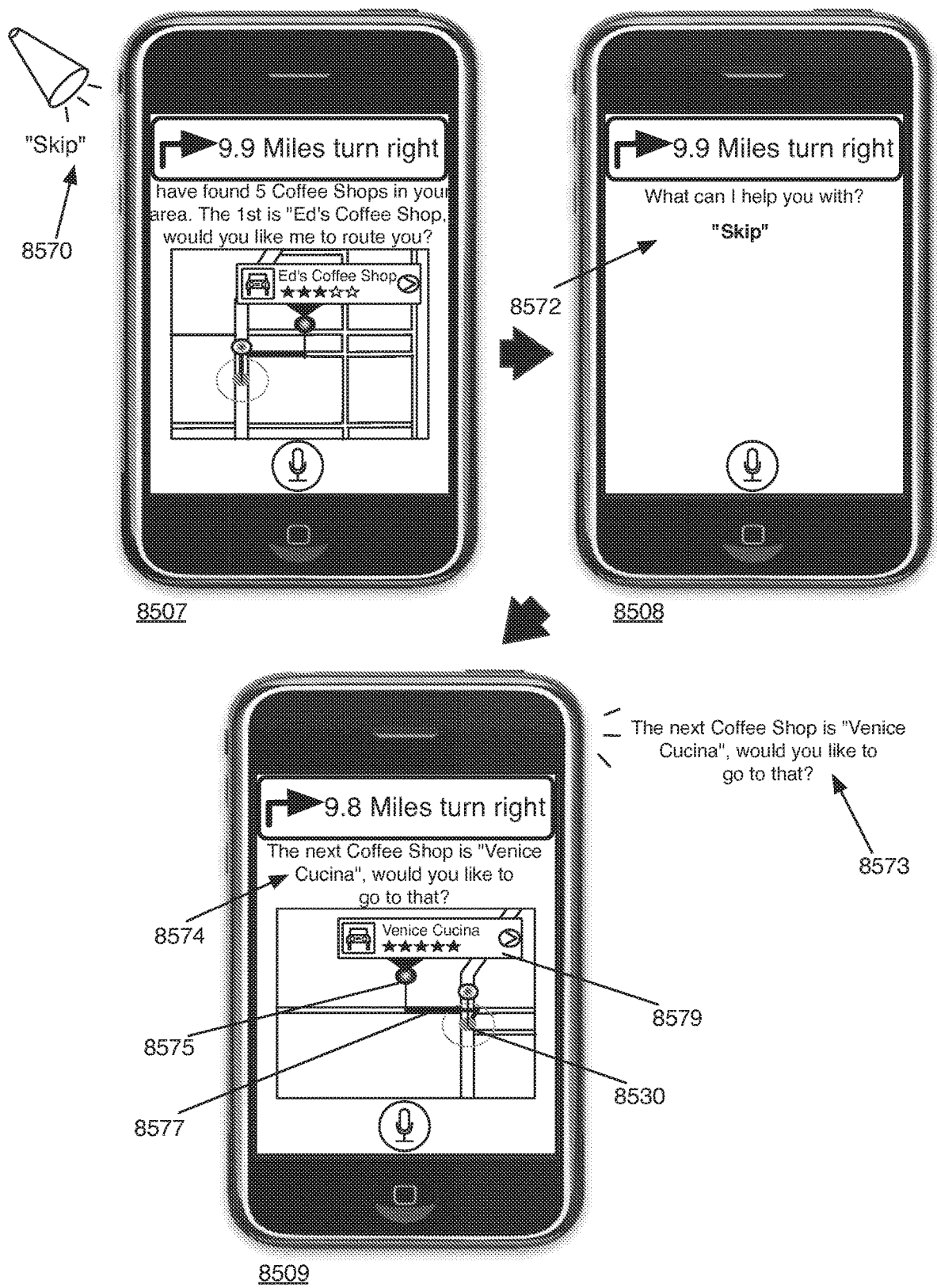

As shown in stage 8507 in FIG. 85C, the user wants to skip "Ed's Coffee Shop" (as shown by arrow 8570). In stage 8508, the transcript 8572 of the audible communication is optionally displayed on the screen. In stage 8509, the next item in the search list (in this example "Venice Cucina") is presented (as shown by arrows 8573 and 8574) to the user. The current location 8530 (which has slightly changed since stage 8501 because the device is moving during the search), the location 8575 of the new search result, a route 8577 from the current location to the presented search result, and additional information 8579 about the search result are displayed on the screen.

If the user decides to proceed to the presented search result, process 8400 of FIG. 84 shows (at 8440) a selected portion of the route and provides audio and/or visual navigation directions to the selected search result. Although operation 8440 is conceptually shown as a part of process 8400, in some embodiments process 8400 transfers control to the interactive navigation application in order to provide navigation map and directions as described throughout this Specification. The process then ends.

Figure 85D:
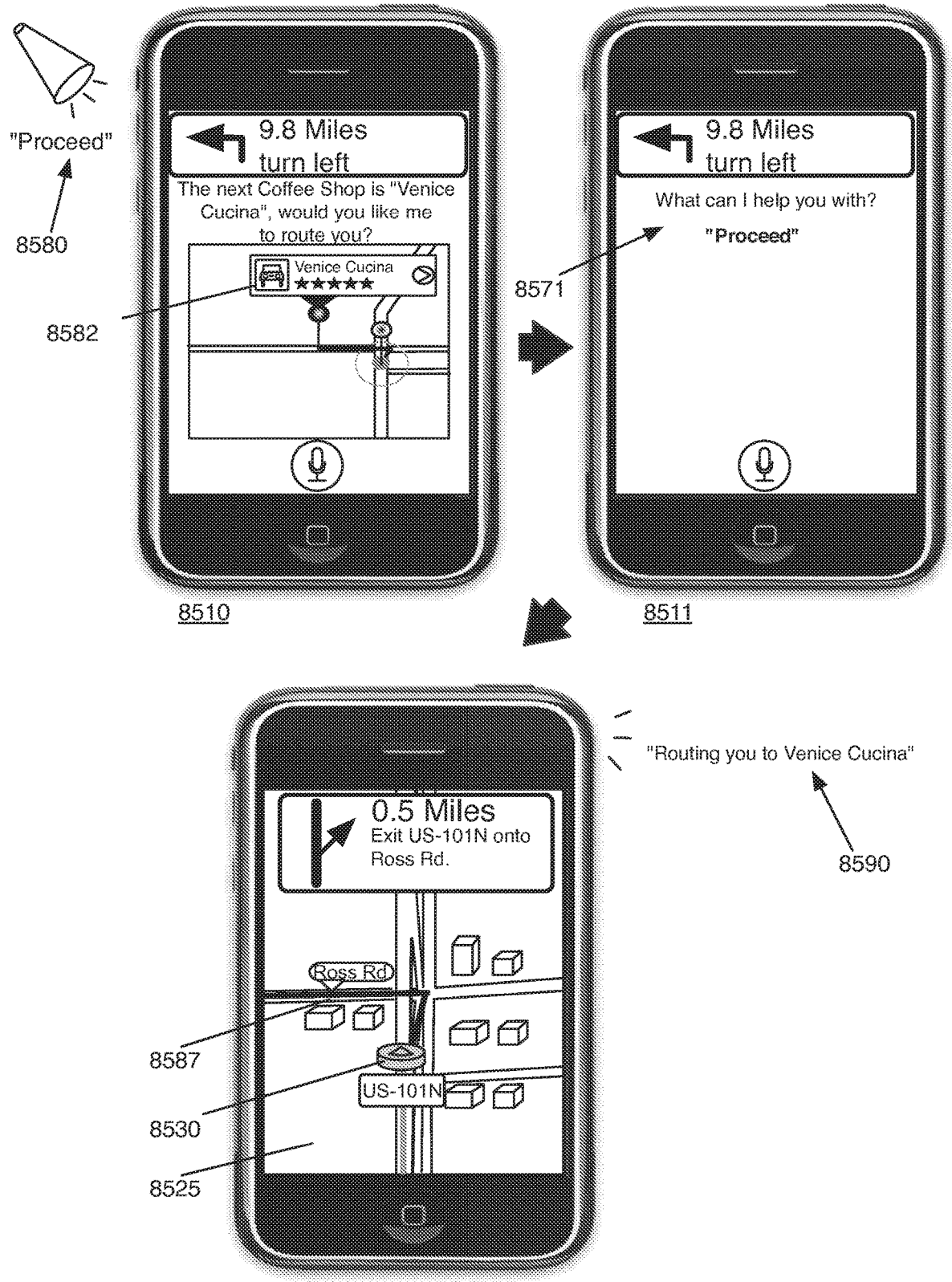

As shown in stage 8510 in FIG. 85D, the user decides (as shown by arrow 8580) to proceed to the presented search result. As shown, some embodiments also provide a control 8582 that can be selected (e.g., by tapping) in order to select the currently presented search result and proceed to it. In stage 8511, the transcript 8571 of the audible communication is optionally shown on the screen. In stage 8512, the voice-activated service acknowledges (as shown by arrow 8590) the user's selection. The full screen turn-by-turn navigation map 8525 and a portion of the route 8587 from the current location 8530 to the selected search result are displayed on the screen. As shown, the map 8525 in stage 8512 is similar to the map 8525 in stage 8501 however the route 8587 is the route to the selected search result. In some embodiments, control returns to the interactive navigation application to provide navigational directions. In some embodiments, the original route 8535 is also saved in case the user wants to resume navigating along the original route after visiting the search result (in this example to resume travelling from Los Angeles to Cupertino after visiting Venice Cucina).

Figure 86:
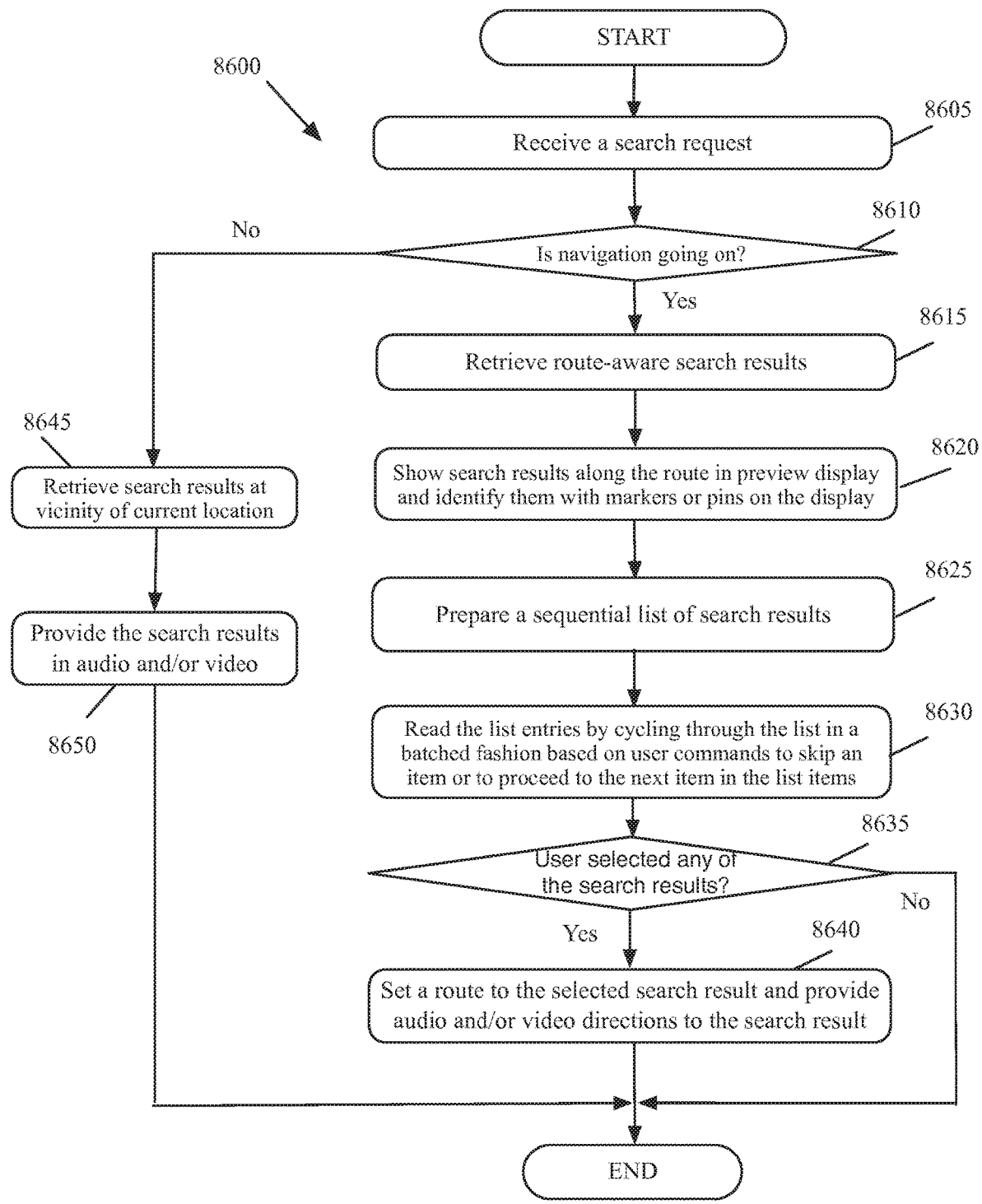
FIG. 86 conceptually illustrates an alternative process for providing voice-activated search and navigation in some embodiments of the invention.

FIG. 86 conceptually illustrates an alternative process 8600 for providing voice-activated search and navigation in some embodiments of the invention. In these embodiments, the voice-activated service displays all search results on the display and then identifies them one at a time in a batch fashion and asks whether the user wants to navigate to the identified search result. As shown, the process receives (at 8605) a search request. The search request can be made by a verbal command. The process then determines (at 8610) whether navigation is going on. For instance, the process determines whether a destination is already set. If not, the process proceeds to 8645, which is described below.

When navigation is going on, the process retrieves (at 8615) route-aware search results. In some embodiments, the interactive map application maintains route information and shares the remaining route information with process 8600 to perform a route-aware search. For instance, in response to "find coffee shops", instead of finding coffee shops that are closest to the current location, the process finds coffee shops that are close to the current route even when some of the search results are farther along the route.

In some embodiments when the search is audio-visual (as opposed to e.g., lock-screen audio-only) the process shows (at 8620) the search results on a preview display and drops pins at locations of the search results. In some embodiments, the search results are shown either in 3D or 2D depending on factors such as the number results found in the search, the length of the route, etc. Other embodiments switch to a 2D overview display to show the search results and then switch to 3D display when navigation starts or continues.

The process also prepares (at 8625) a sequential list of search results based on certain criteria such as proximity to the current location. The process then reads (at 8630) the entries in the list in a batch fashion by cycling through the entries. The process skips or proceeds through the list based on verbal commands received from the user. In some embodiments, the interactive map reads a list of information to the user. For example, when providing the list of gas stations near the next five exits, the interactive map reads the names of the gas stations to the user one by one. The user may skip between items in the list by saying "Skip" or other trigger words to advance through the list. When the interactive map receives the user's speech input for skipping to the next item on the list (e.g., a gas station name and related information such as, brand, gas price, distance from the nearest exit, etc.), the interactive map reads the next item of information in the list or reports that the end of the list has been reached.

Figure 87:
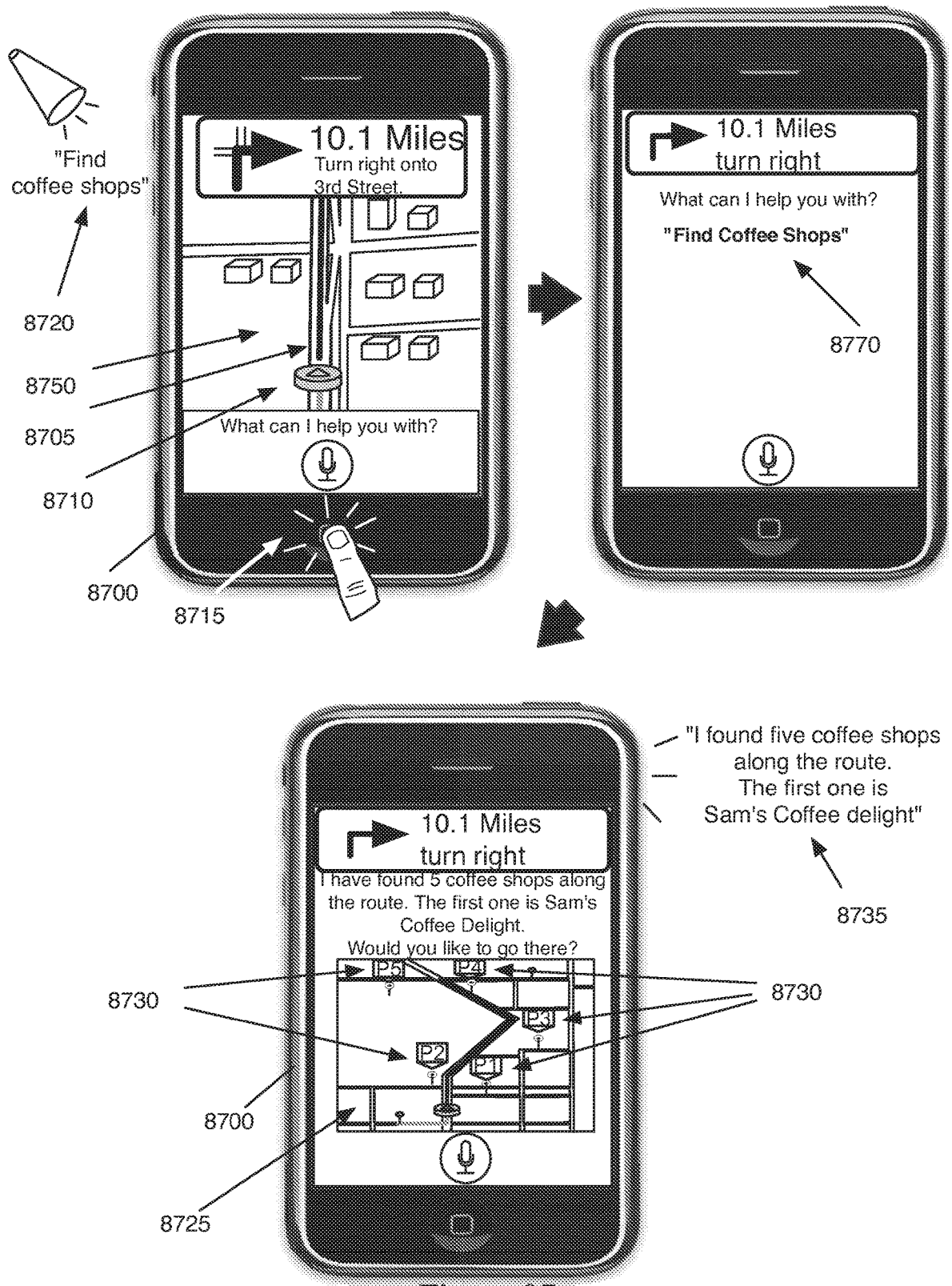
FIG. 87 illustrates a user device during navigation in some embodiments of the invention.

FIG. 87 illustrates a user device 8700 during navigation in some embodiments of the invention. As shown, a route 8705 is already determined on the map 8750 and the current location 8710 of the user device is identified on the route 8705. The user starts voice-activated service, for example, by pressing a button 8715.

The user then makes a verbal search request (as shown by arrow 8720). The display then optionally shows the transcript 8770 of the verbal communication. The search is then performed along the route (as opposed to just in the vicinity of the current location of the user device). The display transitions to overview 8725 and shows the route with search results identified by markers or pins 8730. As shown, the overview 8725 shows the search results 8730 and a suggested route to the first selection (in this example Sam's Coffee Delight). This overview map 8725 is different than the navigation map 8750 or an overview for the navigated route 8705. The overview map 8725 is displayed by the voice-activated service and shows the search results found based on the user's verbal search request. The voice-activated service also announces (as shown by arrow 8735) the search results and starts by identifying the first search result. In the illustrated embodiment, all search results are shown on the map.

Figure 88:
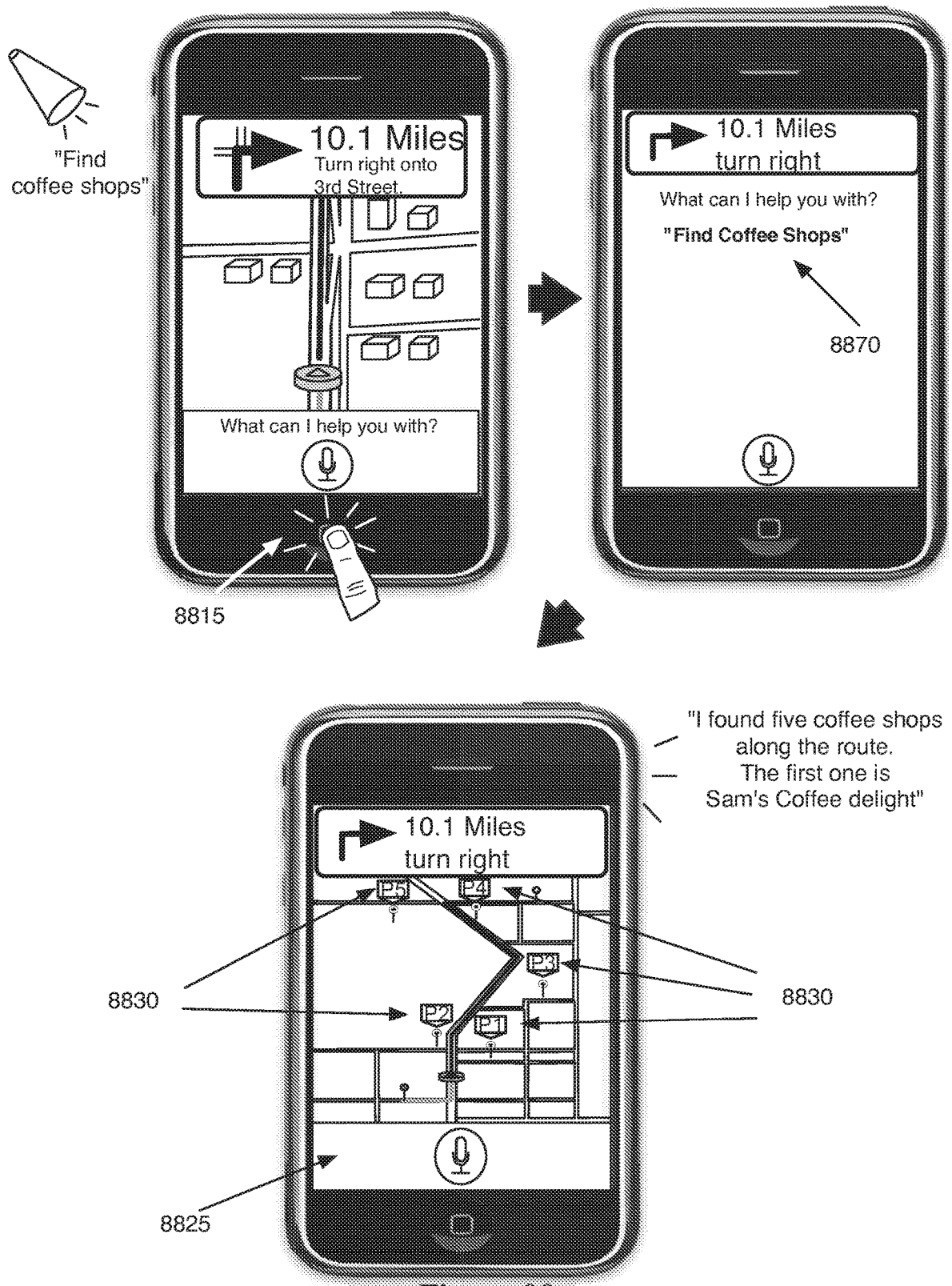
FIG. 88 illustrates a user device during navigation in some embodiments of the invention.

FIG. 88 illustrates a user device 8800 during navigation in some embodiments of the invention. FIG. 88 illustrates another embodiment where the voice-activated service has received the same search criteria as in FIG. 87. In the embodiments shown in FIG. 88, however, the overview map 8825 that shows the markers or pins 8830 is displayed by the navigation application instead of the voice-activated service.

In other embodiments, the voice-activated service facilitates hands-free navigation by selecting the first search result and set a route to the search result. In these embodiments, a route is displayed to the first search result (e.g., by placing the first search result on the center of the map and showing a route from the current location to the first search result). The voice-activated service then gives the name and/or the description of the first search result and asks whether the user wishes to set the destination to the first search result. If the user wishes to go to the first search result, turn-by-turn navigation to the first search result starts. Otherwise, the voice-activated service cycles through the search results in a batch fashion by selecting the next search result, setting a route to the next search result, providing the description of the result to the user, and inquiring whether the user wishes to go to the provided search result. This process continues until either the user selects a search result or all search results are presented to the user.

Figure 89:
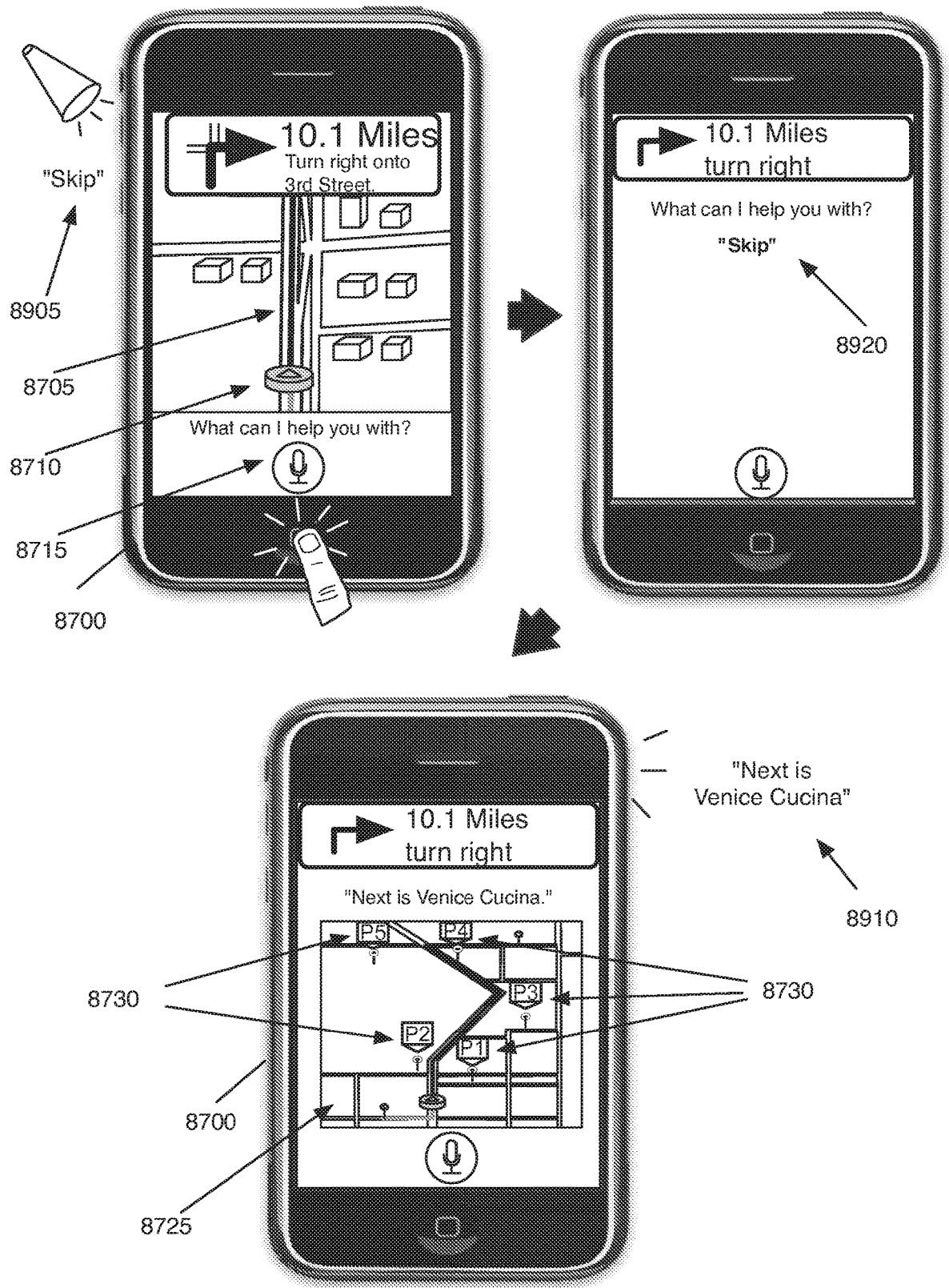
FIG. 89 illustrates the user device of FIG. 87 when the user does not like to select the first coffee shop.

FIG. 89 illustrates the user device 8700 of FIG. 87 when the user does not want to select the first coffee shop. As shown, the user makes a verbal request to skip the current search item (as shown by arrow 8905). The display then optionally shows the transcript 8920 of the verbal communication. The voice-activated navigation then makes an audible presentation of the item in the search result (as shown by arrow 8910). This interaction continues until the user selects an item or terminates the search. As described above, some embodiments automatically set a route to the next search result, provide the description of the result to the user, and inquire whether the user wishes to go to the provided search result. In these embodiments, only the next search result (in this example, Venice Cucina) is displayed on the screen with a route displayed from the current location to the search result. If the user selects the search result (e.g., by a verbal command such as "go" or "proceed"), turn-by-turn navigation to the search result starts. Otherwise, the next search result is displayed and the process continues in a batch fashion.

Referring back to FIG. 86, the process determines (at 8635) whether user has selected a particular search result. If not, the process ends (or in some embodiments, the process proceeds back to 8630 and continues to cycle through the list until terminated by a user command). Otherwise, the process sets (at 8640) a route to the selected search result. Based on the user decision, the original route is either saved or is replaced by the route to the selected search result. The process then ends.

When the search request is received while navigation is not going on, the process retrieves (at 8645) the search results at the vicinity of the current location of the user device (instead of the vicinity of the route as described in operation 8615 above). The process then provides (at 8650) the search results in audio and/or visual depending on the current set up. The process then ends. In some embodiments, the process after retrieving the search results (at 8645) proceeds to 8620, which was described above. In these embodiments, search results are presented to the user as described above by reference to operations 8620-8640 instead of operation 8650.

FIGS. 90A-90E conceptually illustrate portions of the voice-activated service of some embodiments of the invention that are used during a search operation. Operations of processes 8400 and 8600 as well as different operations shown in user interfaces in the current "Voice Guidances" Section are performed by one or more modules in FIGS. 90A-90E. One of ordinary skill in the art will recognize that the modules shown in FIGS. 90A-90E are specific to the voice-activated search process of some embodiments and that the voice-activated service, interactive navigation application, and the map service of some embodiments include numerous additional modules (e.g., for map display, route display, additional aspects of navigation, text instruction generation, arrow generation, etc.) which are not shown in these figures.

The figures show interactions between different modules of the voice-activated service 9005, map service 9010, and interactive navigation application 9015 of some embodiments in five stages 9001-9005. In some embodiments, the voice-activated service and interactive navigation application reside on a user device while the map service resides outside of the user device. More details of the map service of some embodiments are described in the "Map Service Environment" section, below.

As shown, voice-activated service 9005 includes the following modules: voice input 9020, voice recognition 9025, natural language interpreter 9030, display interface 9090, voice to text converter 9035, search list presenter 9040, search list generator 9045, voice synthesizer 9050, and voice output 9055. In addition, voice-activated service 9005 includes storage 9060 for storing a set of navigation and map related natural language utterances. Map service 9010 includes the following modules: map generator 9085, route generator 9065, and search engine 9070. In addition, Map service 9010 includes map data storage 9075 and point of interest storage 9080. These storages in some embodiments are distributed and/or include data from several different sources (e.g., from different vendors, different databases, etc.) Different modules of the interactive navigation application 9015 are described throughout this Specification and are not shown here for simplicity.

Figure 90A:
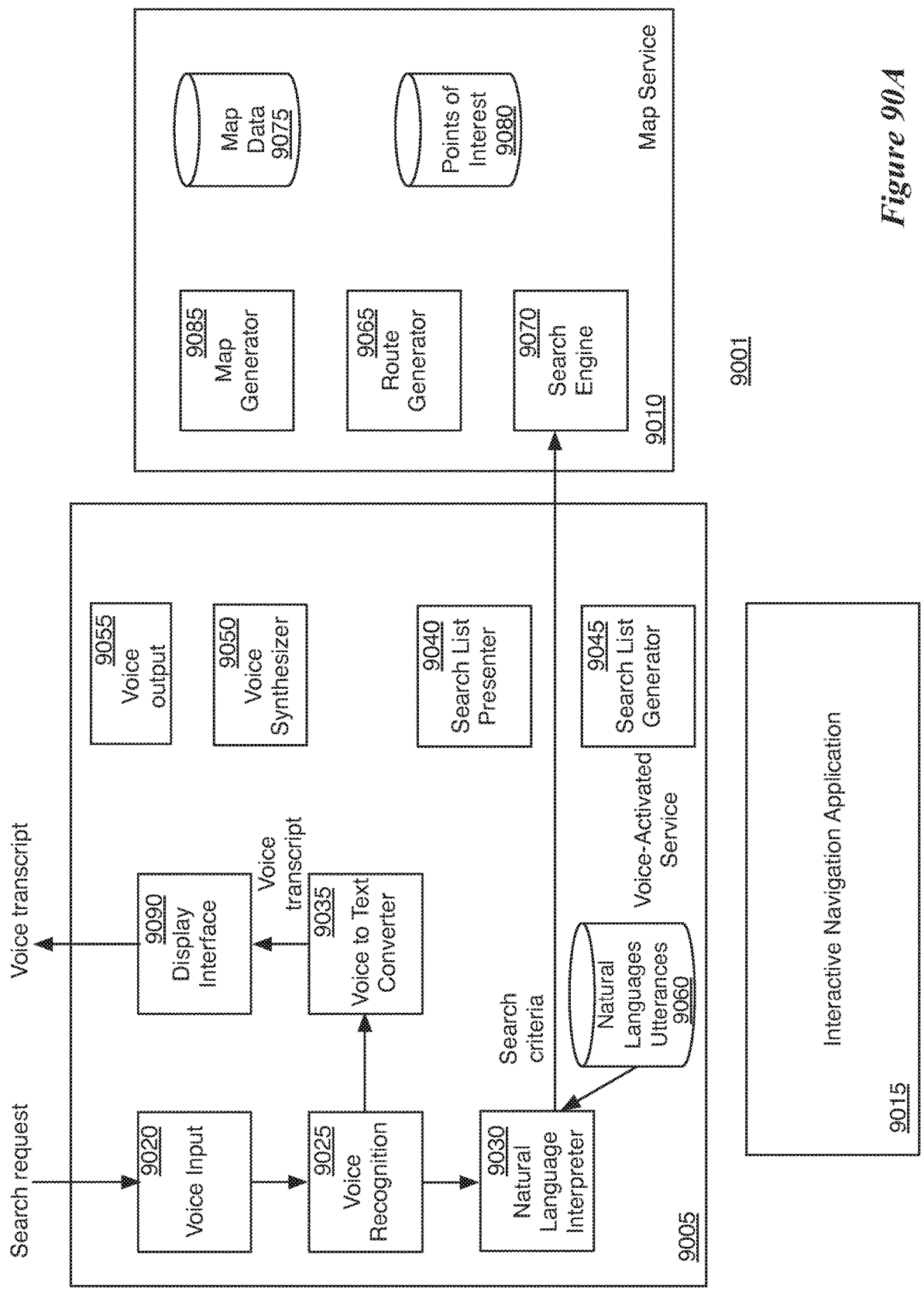
FIGS. 90A-90E conceptually illustrate portions of the voice-activated service of some embodiments of the invention that are used during a search operation.

As shown in stage 9001 in FIG. 90A, voice input module 9020 receives search requests from the user. For instance, the user starts the voice-activated service by activating a button or talking louder than a threshold into the device microphone (or an external microphone physically or wirelessly connected to the device). The voice input module 9020 passes the user's voice request to voice recognition module 9025, which converts the voice to words.

Voice recognition module 9025 sends the recognized voice request to voice to text converter module 9035, which generates a transcript of the audible communication between the user and the voice-activated service. Display interface 9090 receives the transcript of the communication and displays it on the user device.

Natural language interpreter 9030 receives the output of voice recognition module 9025 and compares the received words with a list of natural language phrases (such as the phrases described in "Navigation Using Natural Language Utterances" section, above) stored in natural language utterances storage 9060. Natural language interpreter 9030 module in some embodiments uses heuristics to recognize partial words or partial phrases that are similar to the recognized natural language utterances.

In addition, in some embodiments, natural language utterances storage 9060 stores navigation related utterances for several different languages. One or more of these sets are used depending on the user setting of the user device. Natural language interpreter 9030 builds search criteria based on recognized navigation related natural language utterances and sends the criteria to search engine module 9070 of map service 9010. The search criteria includes point of interest or other destination that the user is looking for as well as one or more of the current device location, the current route, a search radius, price, ratings, reviews, or other criteria related to the search.

Figure 90B:
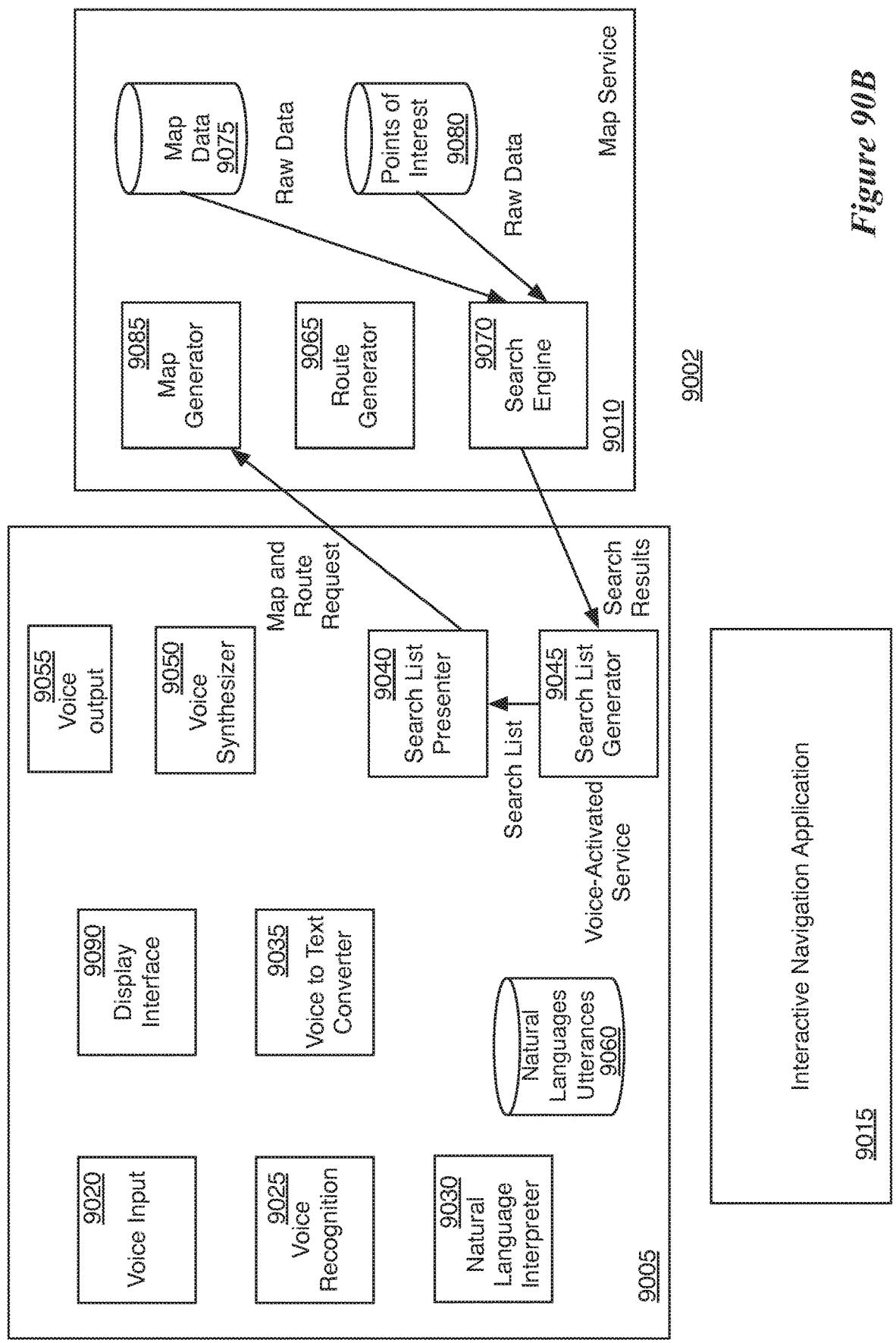

As shown in stage 9002 in FIG. 90B, search engine module 9070 uses map data stored in map data storage 9075 and point of interest data stored in point of interest storage 9080 to find results for the given search criteria. Search engine module 9070 of map service 9010 sends the search result to search list generator module 9045 of voice-activated service 9005.

Search list generator module prepares a list (e.g., as described in operations 8420 or 8625 described above) of the search result. Search list presenter module 9040 receives the search list, selects a search item, and sends a request to map generator module 9085 of map service 9010 for a map and a route from the current device location to the location of the search result.

Figure 90C:
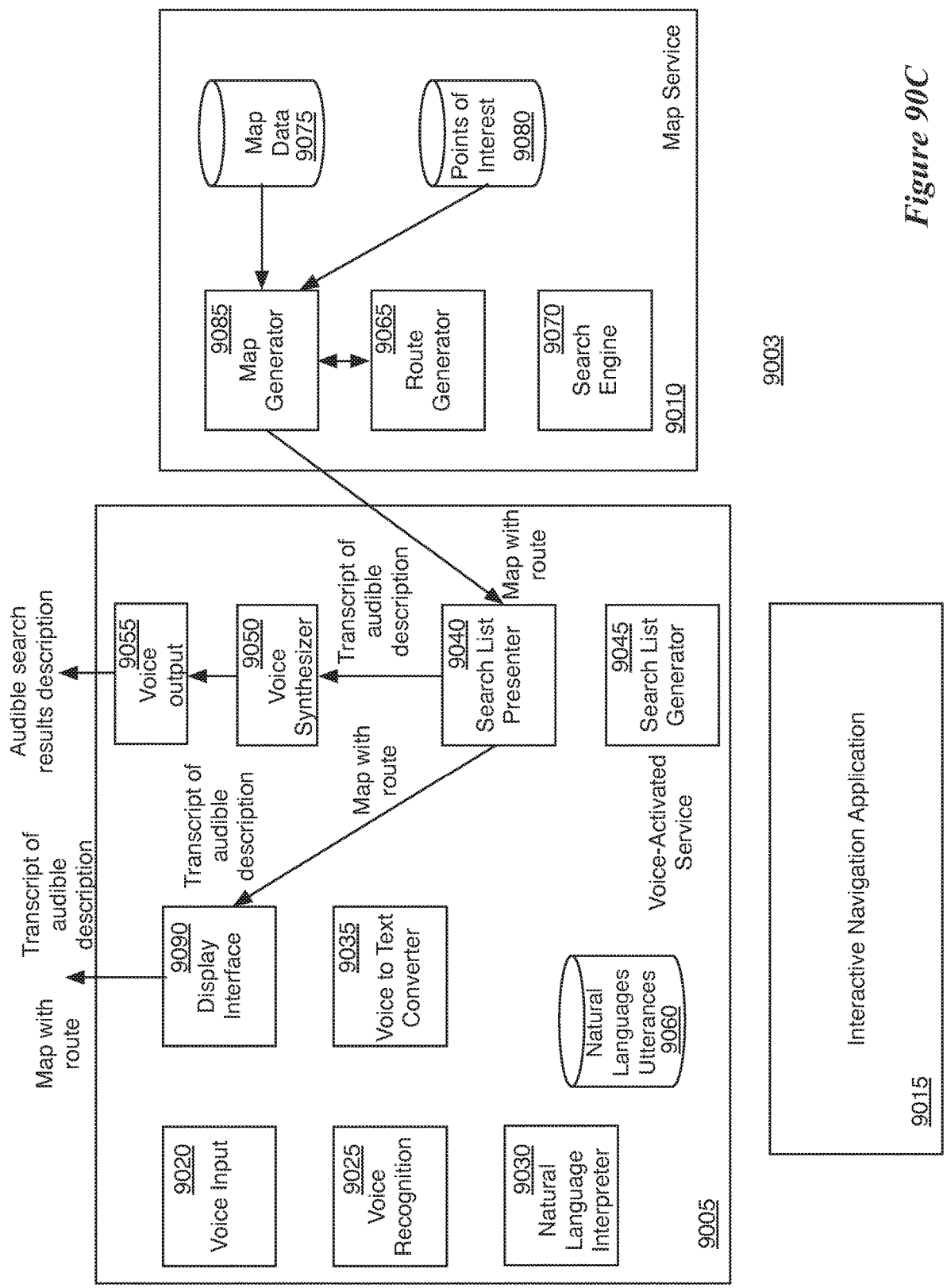

As shown in stage 9003 in FIG. 90C, map generator module 9085 communicates with route generator module 9065 and utilizes data from map data storage 9075 and point of interest storage 9080 to generate a map (e.g., a map like 8555 in FIG. 85A or 8825 in FIG. 88) and a route to an identified search result. Search list presenter module 9040 receives the information for map and the route and sends the information to display interface module 9090 to display on the user device.

Search list presenter module 9040 also prepare a transcript of the audible presentation for the user and sends a copy to voice synthesizer module 9050 to generate audible voice and a copy to display interface module 9090 to display on the user device screen. Voice synthesizer module 9050 synthesizes the voice and sends to voice output module 9055 to play on the device speaker(s) or headphones.

Figure 90D:
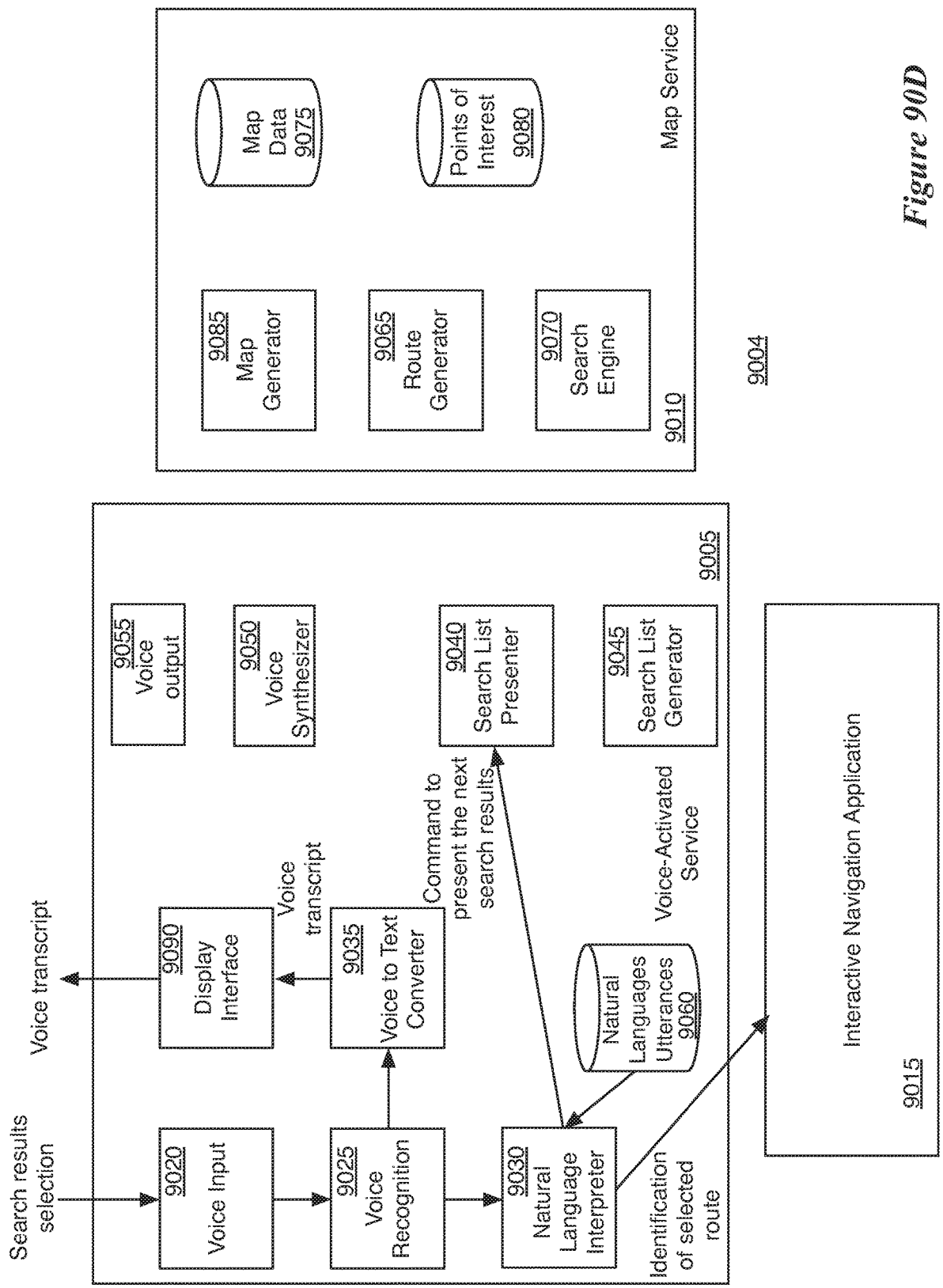

As shown in stage 9004 in FIG. 90D, voice input module 9020 receives user's (i) selection of a search result, (ii) request to skip the currently presented search result, or (iii) request to terminate the search. The voice recognition module 9025 receives the user's request and sends copies of the recognized words to voice to text converter module 9035 and natural language interpreter module 9030. Voice to text converter module sends a transcript of the audible communication to display interface module 9090 to display. Natural language interpreter module 9030 determines the user's request by using the phrases stored in natural language utterance storage 9060 and depending on the type of the request (i) sends a command to search list presenter 9040 to set a route to and display the next search result as described above, (ii) sends the identification of the selected route to interactive navigation application 9015, or (iii) terminates the search.

Figure 90E:
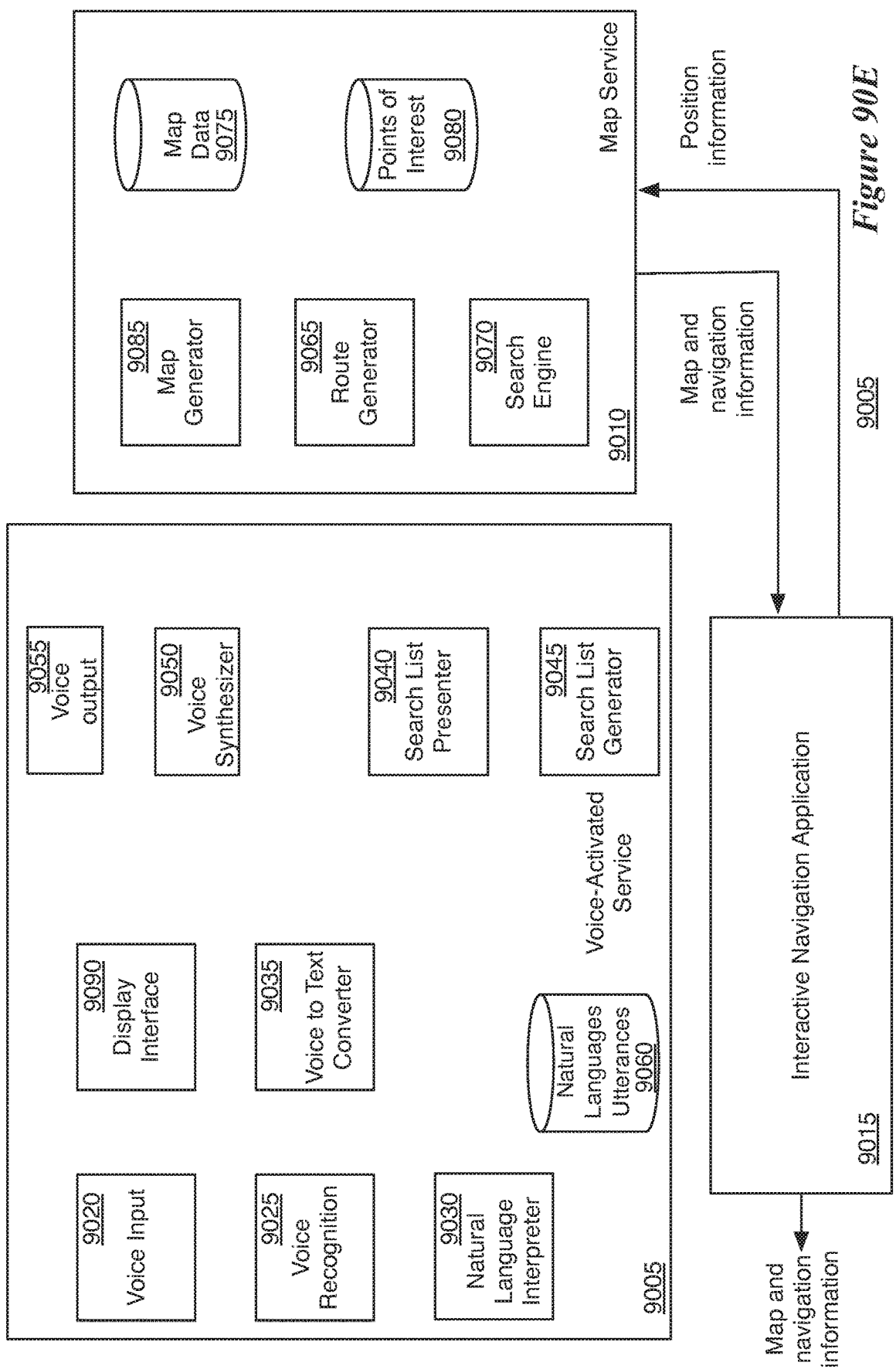

Once the search result selected by the user is identified, interactive navigation application presents the navigational map and turn-by-turn directions as shown in stage 9005 in FIG. 90E. Interactive navigation application as described in this Specification, sends device position information to map service 9010, receives map and navigation information, and presents the map and navigation information on the user device.

4. Incorporating Navigation into Voice-Activated Service Output

Some embodiments incorporate navigation into voice-activated service output in order to provide a better user experience. For instance, when the user utilizes voice-activated service during navigation, the voice-activated service incorporates the verbal turn-by-turn navigational directions into voice-activated service interactions with the user.

Figure 91:
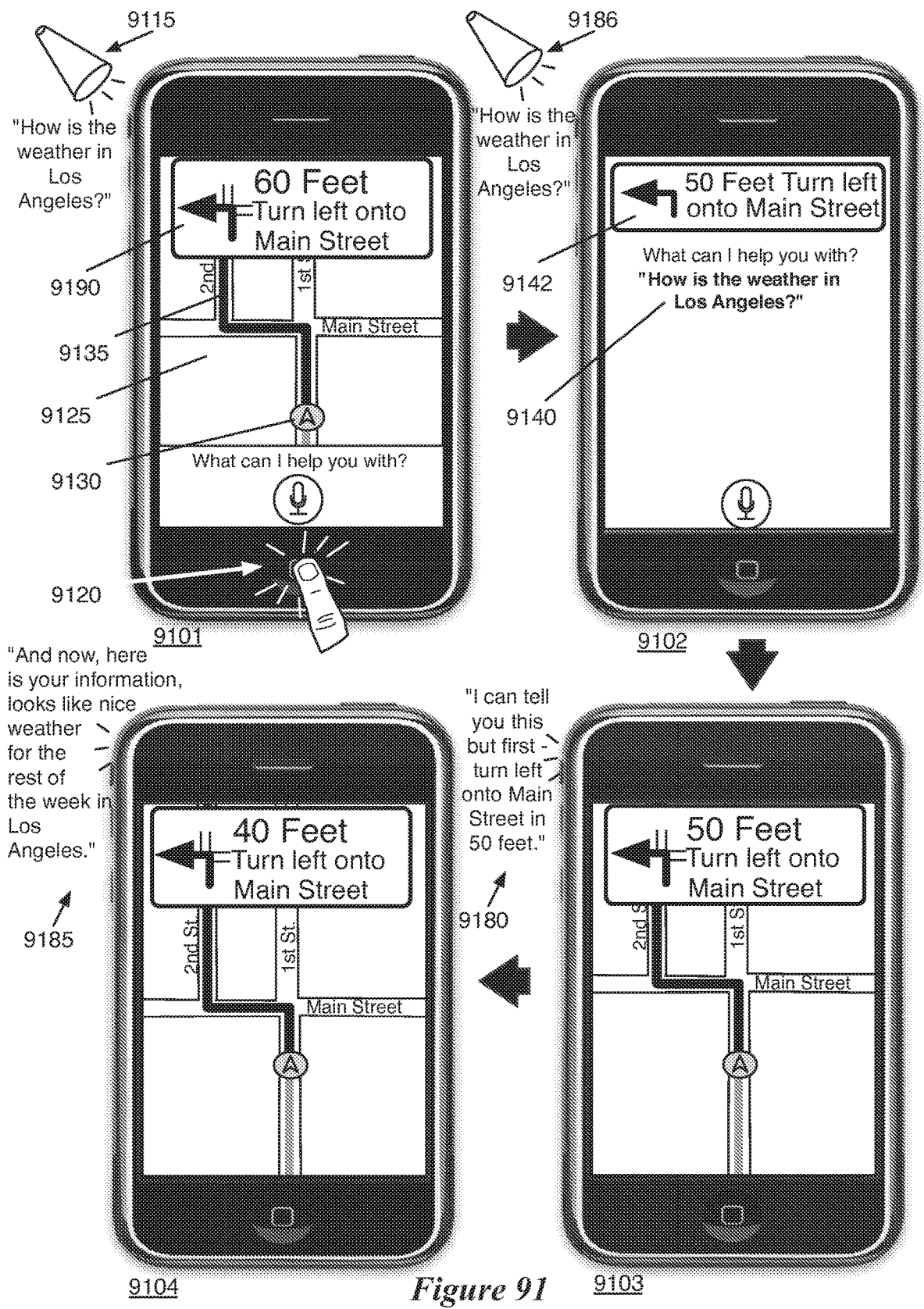
FIG. 91 illustrates 4 stages of a user interface of some embodiments where navigation is incorporated into voice-activated service output in some embodiments of the invention.

FIG. 91 illustrates 4 stages 9101-9104 of a user interface of some embodiments where navigation is incorporated into voice-activated service output. As shown, a map 9125 and navigational directions 9190 are shown on the screen. The map identifies the current location 9130 of the user device and a route 9135 that is currently set for navigation. In this example, the navigation application provides a verbal guidance when the device reaches within 50 feet of the next turn. As shown in stage 9101, the user device is still 60 feet from the next turn (as shown by 9190). Therefore, the navigation application is not providing verbal direction guidance.

As shown in stage 9101, the user initiates the voice-activated service (as shown by arrow 9115). In some embodiments, the voice-activated service is initiated by activating a button (such as button 9120). In other embodiments, when the voice level received at the device audio input is louder than a certain threshold (and/or natural language words are recognized by the device) the voice-activated service is automatically activated. The user in stage 9101 is inquiring about the weather conditions (as shown by 9115), which is not related to navigation.

As shown in stage 9102, some embodiments display a transcript 9140 of the verbal interactions between the user and the voice-activated service to facilitate better communication. Some embodiments (such as the illustrated embodiment) show the transcript as a separate display as shown in stage 9102. Other embodiments (not shown) write the transcript on the same page that was displayed on the foreground when the user started the search request (such as the display shown in stage 9101).

Also as shown in stage 9102, a navigation banner 9142 is shown on the screen in order to facilitate navigation along the route 9135. This navigation banner 9142 is narrower than navigation banner 9190. The narrower navigation banner is used in some embodiments to show navigational directions while navigation application is running in the background and another application (in this example the voice-activated service) is running in the foreground. The navigation banner 9142 shows that the device has reached within 50 feet of the next turn. Once the device is within 50 feet of the next turn, the navigation application prepares a verbal voice guidance announcement such as "turn left onto Main Street in 50 feet". However, in order not to interfere with the voice-activated service interactions with the user, the navigation application provides the audible output (e.g., in the form of an audio file or a pointer to an audio file) to the voice-activated service to allow the voice-activated service to make the navigation guidance announcement at an appropriate time (e.g., by outputting the received audio file).

As shown in stage 9102, voice-activated service is receiving and transcribing the verbal user input (user input is shown as phrase 9186 to conceptually show that the user is still providing the input or the voice-activated service is waiting to make sure the user is done making the verbal request). The voice-activated service is utilizing voice recognition to interpret the user's request. If the navigation guidance is played through the speakers while the user is speaking to the voice-activated service, the navigation guidance output comes back through the microphone and makes it difficult for the voice-activated service to recognize what the user actually says. In addition, playing the navigation guidance might confuse the user (e.g., since the user is expecting an answer from the voice-activated service).

Once the voice-activated service receives the user input, the voice-activated service determines whether a navigation guidance announcement has to be made. In this example, there is a navigation guidance announcement. As shown in stage 9103, voice-activated service informs the user (as shown by 9180) that there is a navigation direction to announce and proceeds to make the announcement (e.g., by outputting an audio file received from the navigation application). As shown in stage 9104, the voice-activated service provides the response (as shown by 9185) to the user request. Integrating the navigation output into the voice-activated service output provides a uniform experience for the user. In some embodiments, the voice-activated service and the navigation use the same voice synthesizer to make a uniform audio interface for the user.

Figure 92:
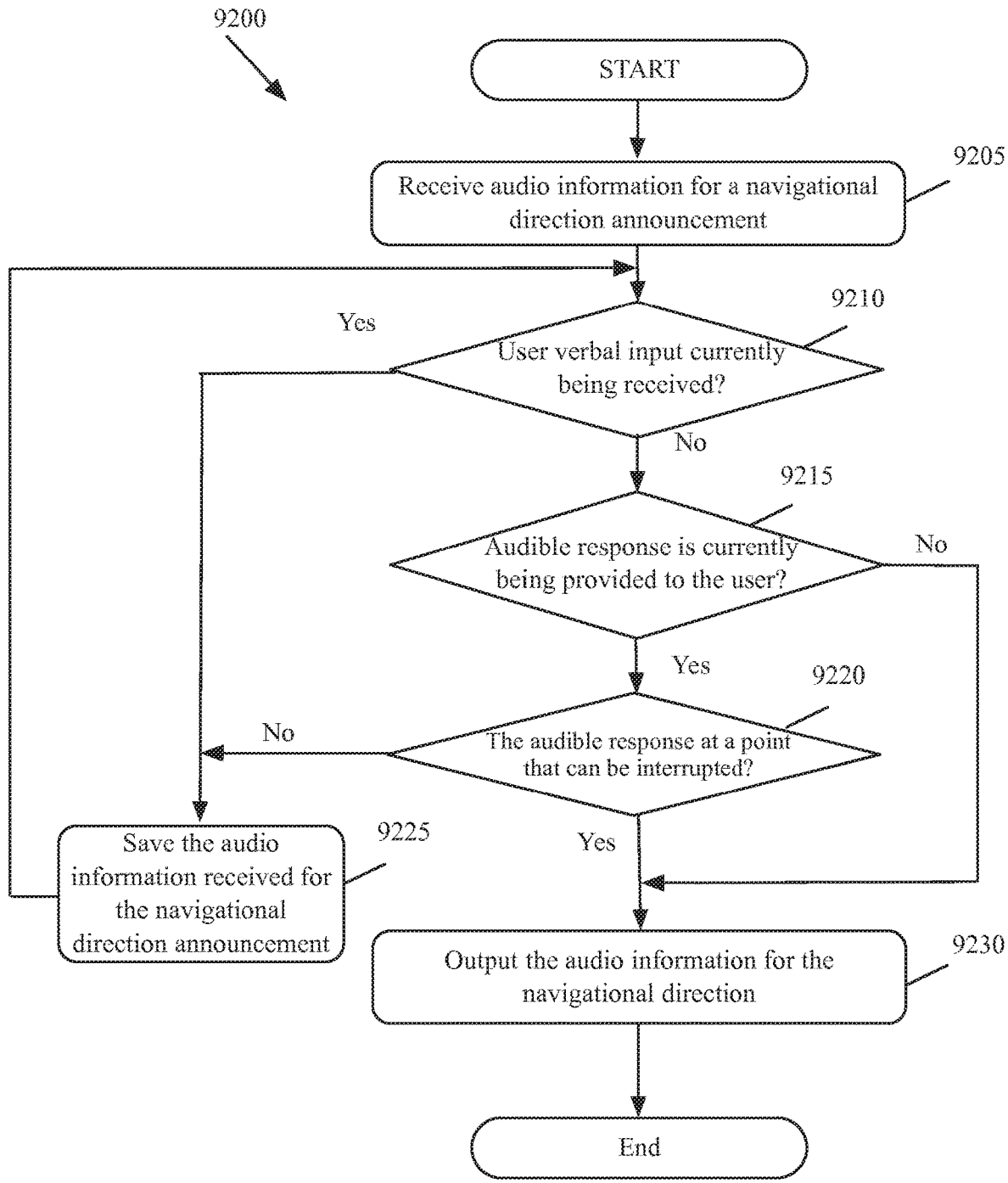
FIG. 92 conceptually illustrates a process used by the voice-activated service to incorporate navigation output in some embodiments of the application.

FIG. 92 conceptually illustrates a process 9200 used by the voice-activated service to incorporate navigation output in some embodiments of the application. As shown, the process receives (at 9205) audio information from the navigation application for a navigational direction announcement. For instance, as described by reference to FIG. 91 above, in stage 9102 the device reaches a point on the route that the navigation application has to provide a verbal alert to the user.

Process 9200 then determines (at 9210) whether the user is currently providing verbal input to the voice-activated service (e.g., as shown in stages 9101 and 9102 of FIG. 91). If so, the process proceeds to 9225, which is described below. Otherwise, the process determines (at 9215) whether the voice-activated service is currently providing an audible response to the user (e.g., as shown in stage 9104 of FIG. 91). If not, the process proceeds to 9230, which is described below. Otherwise, the process determines (at 9220) whether the audible response is at a point that can be interrupted (e.g., in between sentences). If not, the process proceeds to 9225, which is described below.

Otherwise, the process outputs the audio information received from the navigation application for the navigational direction. The process then ends. In some embodiments, the information received from the navigation application is in the form of an audio file that can be played on the device audio system. In other embodiments, the information received from the navigation application is in the form of text, which is converted to voice by a voice synthesizer.

When the audible navigation information cannot be played immediately, the process saves (at 9225) the audio information received from the navigation application (e.g., in memory or storage). The process then proceeds back to 9210, which was described above. In some embodiments, the process performs operations 9210-9220 after a predetermined delay. In other embodiments, the process automatically checks (e.g., after the user input is received, after the response to the user is complete, after response to the user reaches a point that can be interrupted, etc.) for any announcements from the navigation application to play.

Although process 9200 was described by reference to announcement received by the voice-activated service from the navigation application, some embodiments utilize a similar process to incorporate audible announcement from other applications (e.g., when an announcement for an incoming text message has to be made) into the voice-activated service output to make a better overall experience for the user.

B. Context Aware Voice Guidances

Some embodiments provide context-aware voice guidance. The voice guidance interacts with other voice services of the user device. For instance, the voice guidance does not provide audible guidance while the user is making a verbal request to any of the voice-activated services. Instead, the voice guidance transcribes its output on the screen while the verbal requests from the user are received through the microphone. In some embodiments, when the microphone is turned on (e.g., when the volume of the input voice is larger than a certain threshold) the voice guidance determines that the audible guidance has to be suppressed.

In some embodiments, the voice guidance only provides a short warning sound such as a subtle beep as an unobtrusive indicator to get the user's attention (e.g., at a turn on the route) while the user is speaking (e.g., on a phone call) or another voice-activated service is providing audible response to the user's inquires. A navigation banner is displayed on the screen in some embodiments to display the guidance information.

The voice guidance in some embodiments truncates voice guidance the same way that instructional text is truncated for displaying. The voice guidance in some embodiments automatically ducks (i.e., reduces the volume of) music but automatically pauses spoken words of an audio book in order to provide voice guidance to the user. The voice guidance in some embodiments distinguishes between music that can be ducked and spoken words (e.g., from an audiobook) that the user wants to pause instead of being skipped.

The navigation voice volume is adjustable with hardware buttons or touch buttons while navigating. The standard behavior for audio is to adjust playback volume only when that audio is playing back. Since voice guidance is sporadic, short, and somewhat unpredictable, it is very difficult to adjust the voice guidance volume using the standard mechanism. Furthermore, if the volume is lowered to the point that is inaudible, there would be no way to return the volume to an audible level. So instead of using the standard mechanism, the hardware volume keys always adjust the voice prompt volume while navigation is in progress, even when audible navigation directions are not provided.

Figure 93:
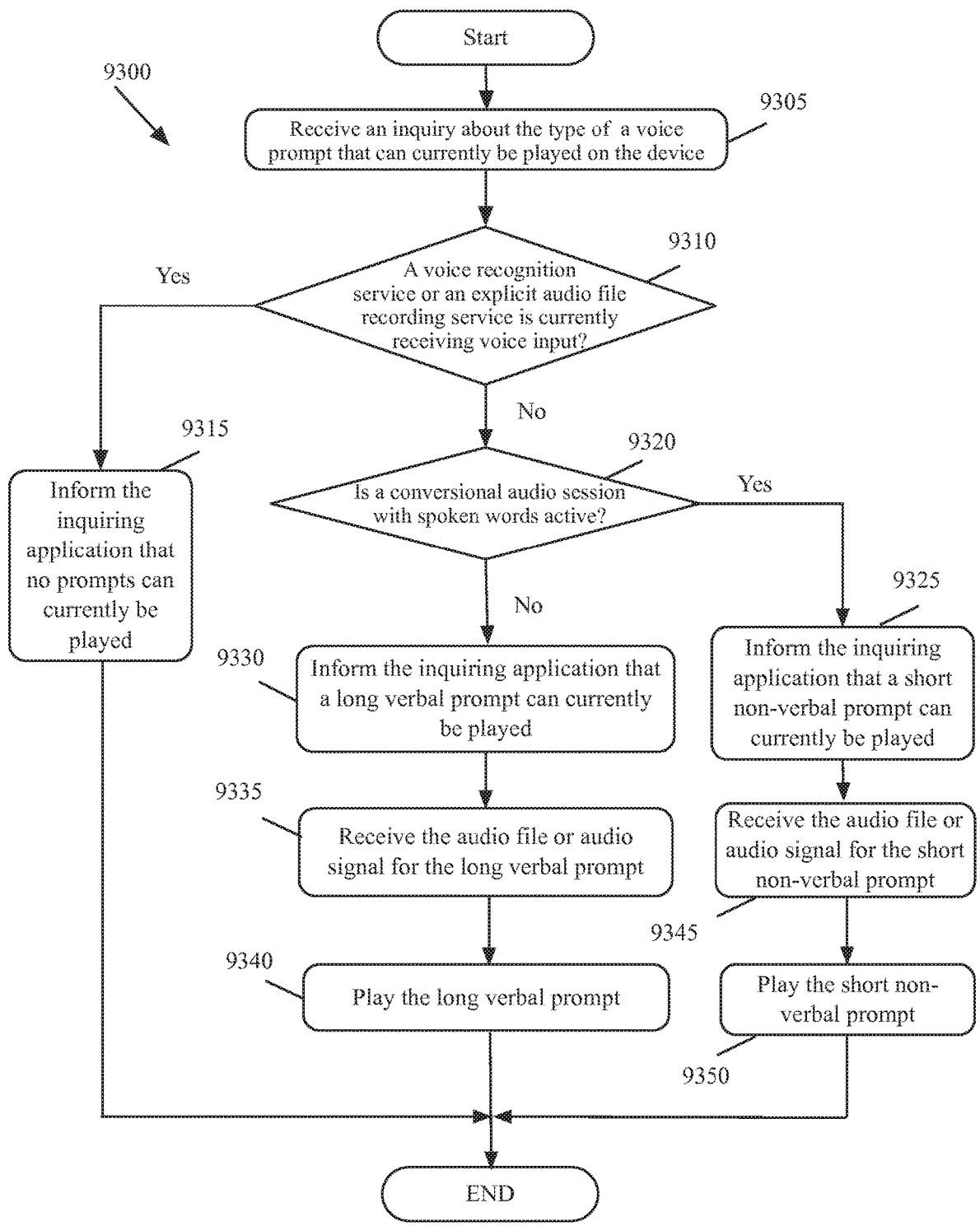
FIG. 93 conceptually illustrates a process that provides different types of audible prompts on an electronic device based on the audio sessions currently active on the device in some embodiments of the invention.

Some embodiments provide different types of voice prompts depending on what other audio sessions are currently active on the device. Although several examples are described by reference to the navigation system, the same techniques are utilized by some embodiments of the invention for providing voice prompts for other services (e.g., announcements for incoming text messages, emails, accessibility assistant prompts, etc.) while other audio services are active on the device. FIG. 93 conceptually illustrates a process 9300 that provides different types of audible prompts on an electronic device based on the audio sessions currently active on the device in some embodiments of the invention. Examples of the audible prompt include a navigation alert provided to a user during navigation, an alert indicating that a text message is received, an alert indicating that an email is received, etc. Examples of active audio sessions are ongoing phone calls, interactions of personal assistants (such as Siri®) with a user, video calls (such as FaceTime®), voice over IP (VoIP) sessions, playing music, podcasts or other spoken words, etc.

In some embodiments, the device at system level (e.g., the device audio system or the device operating system) is aware of different types of audio sessions that are active on the device at each time and whether audio is being played or received by different device services. Some embodiments categorize and define the type of audio being played or received. The audio categories and the information about the categories of active audio sessions are maintained by the audio system.

Examples of different active audio sessions include a phone call or a video call in progress using the device phone service, a VoIP service provided by the device, audio recording in progress by the device, the device voice-activated personal assistance service being active, music being output by the device, a podcast in progress, an audio book being read to the user, etc. Any application (such as navigation, text messaging, email, etc.) that requires providing audio alerts inquires the system about the type of the prompt that can be played at a particular time. The audio system utilizes information regarding the type of the audio sessions that are currently active on the device and informs the application about the type of voice prompt that can currently be played. The application then provides an appropriate audio file to the audio system to play.

As shown, process 9300 receives (at 9305) an inquiry about the type of the voice prompt that can currently be played on the device. For instance, the process receives the inquiry from an application such as the navigation application that needs to play an alert to the user to turn left onto Main Street in 50 feet. The process then determines (at 9310) whether an audio session is active where an audio service is cognitively listening to the user voice. For instance the process determines whether a voice recognition service or an explicit audio file recording is currently receiving voice input from the user. If not, the process proceeds to 9320, which is described below.

Otherwise, when a voice recognition service or an explicit audio file recording is currently receiving voice input from the user, the process informs (at 9315) the inquiring application that no voice prompts are allowed at this time. The process then exits. In some embodiments, process 9300 not only informs an inquiring application that no prompts should be played but also enforces across the system that if an application attempt to play a prompt during this time (e.g., from navigation application or any other application), the prompt is suppressed at the system level to ensure that no incidental audio interferes with user audio input where quality is paramount (e.g., when the personal assistant is receiving the user's verbal input or a voice memo is being recorded). In some embodiments, when audio prompts are not allowed, the inquiring device provides other types of alerts (e.g., provides a transcript of the audio prompt on the display of the device).

The audio sessions that are not interrupted by voice prompts include the sessions where a device service is cognitively receiving input from the user and the quality of the audio input is important. An example of a voice recognition service that is currently receiving voice input is when a personal assistant service listening to the user. For instance, the user is asking for the weather conditions in a particular city. If a voice prompt (e.g., a navigation prompt to alert the user to turn left in 50 feet) is played while the user is speaking to the voice recognition service, the prompt might confuse the user. In addition, when the prompt is played through the speakers, the output comes back through the microphone and makes it difficult for the voice recognition service to recognize what the user actually says.

An example of an explicit audio file recording is when the user is creating a voice memo and the user's voice is actively being recorded. Whenever the quality of the voice input is important (e.g., when a voice recognition service is listening to the user or a voice memo is being recorded), it is desirable to suppress voice prompts not to include a navigation voice prompt in the middle of a recorded voice memo.

The process determines (at 9320) whether a conversational audio session with spoken words (other than the services described in operation 9310 above) is currently active. The conversational audio sessions include a phone call in progress, a video call in progress, an active VoIP session, interactions of the user with the voice-activated personal assistant where the personal assistant has already received the user's request and is either providing the answer or is in the process of finding the answer, etc. This type of conversational audio session includes sessions where the user is involved in a two-way interaction (e.g., on the phone or with the voice-activated personal assistant) where a short non-verbal interrupt can be tolerated (as opposed to a voice memo or a user command to a voice recognition service where no interruptions are desirable).

When a conversational audio session with spoken words is currently active, the process proceeds to 9325, which is described below. Otherwise, the process informs (at 9330) the inquiring application that a long verbal prompt can be played. The process then optionally receives (at 9335) the audio file or audio signal for the verbal voice prompt to play. The process then plays (at 9340) the verbal voice prompt. The process then exits. An example of long verbal prompt is a navigation prompt alerting the user to turn right onto Wilshire Boulevard in 100 feet. This long verbal prompt is used when audio session that is currently active does not require user's verbal input (e.g., when no audio is played, when non-spoken words audio such as music is being played, when a spoken word podcast is being played, etc.).

When a conversational audio with spoken words is active, the process informs (at 9325) the inquiring application that a short non-verbal prompt can currently be played. The process then optionally receives (at 9345) the audio file or audio signal for the short non-verbal voice prompt to play. The process then plays (at 9350) the non-verbal voice prompt. The process then exits. Examples of spoken words in this category are phone conversation using the device or when a voice-activated personal assistant has received the user input and is finding the results. For instance, while the personal assistant is checking the weather condition in a particular city based on the user input, a short non-verbal navigation prompt is played to alert the user of an upcoming turn. As described further below, some embodiments utilize panning, tone loudness, and/or different sequences of tones to provide directional information in a non-verbal prompt.

Some embodiments provide another context aware interaction between a voice prompt and the audio that is played by an active audio session. In these embodiments, the active audio is played based on the current volume settings of the device sound system (e.g., the device speakers) or the sound system to which the device is connected (e.g., the car stereo system). The application that is providing the audio prompt in these embodiments has a separate relative volume setting. For instance the device navigation application has the relative volume settings of loud volume, normal volume, low volume, or no voice in some embodiments. The voice prompt and/or the concurrent audio are played at certain relative volume levels such that the user perceives the navigation prompt and the concurrent audio levels to be at the same level. The relative volume levels are determined either based on the measurements made on the audio being played or based on the type of the audio being played.

Figure 94:
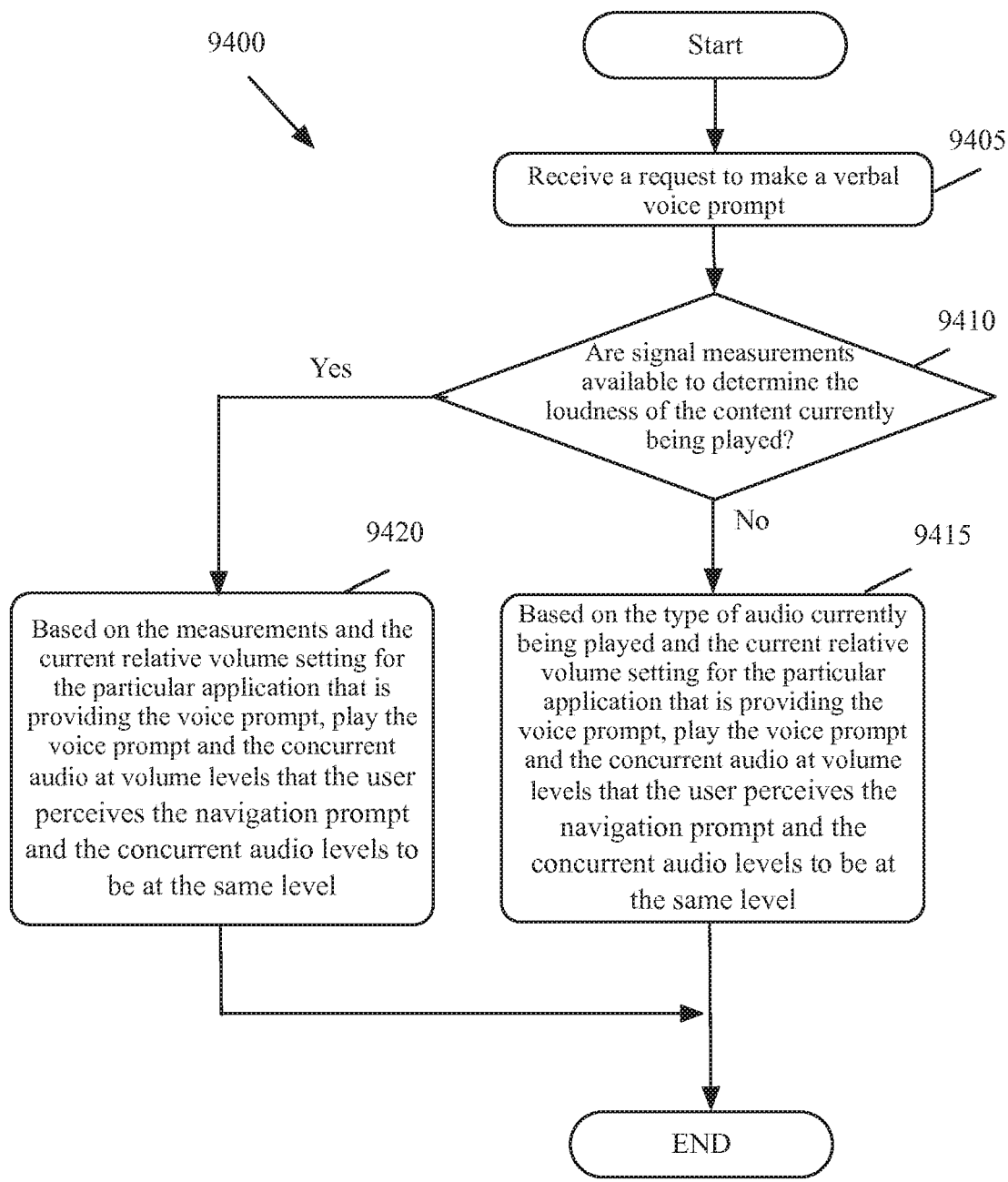
FIG. 94 conceptually illustrates a process for providing audible prompts while another audio session is active in some embodiments of the invention.

FIG. 94 conceptually illustrates a process 9400 for providing audible prompts while another audio session is active in some embodiments of the invention. As shown, the process receives (at 9405) a request to make an audible voice prompt. For instance, the process receives the request when process 9300 determines that either a long or a short audible prompt can be played at the current time. The process then determines (at 9410) whether signal measurements are available to determine the loudness of the content currently being played. If not, the process proceeds to 9415, which is described below.

When signal measurements are available, the process dynamically assesses how the user perceives the volume of the content being played. For instance, some embodiments provide measurements for the power and other properties of the audio signals. Based on the measurements as well as the relative volume settings for the particular application that is providing the prompt, the process plays (at 9420) the voice prompt and the concurrent audio at volume levels such that the user perceives the navigation prompt and the concurrent audio levels to be at the same level. The process then exits.

When signal measurements are not available, the process plays (at 9415) the voice prompt and the concurrent audio based on the type of the audio being played as well as the relative volume settings for the particular application that is providing the prompt. The voice prompt and the concurrent audio content are played at volume levels such that the user perceives the navigation prompt and the concurrent audio levels to be at the same level. The process then exits. Details of the operations of process 9400 are described further below by reference to FIG. 101 and process 10100. Some embodiments utilize a combination of processes 9300 and 9400 to provide (or to suppress) voice prompts.

Figure 95:
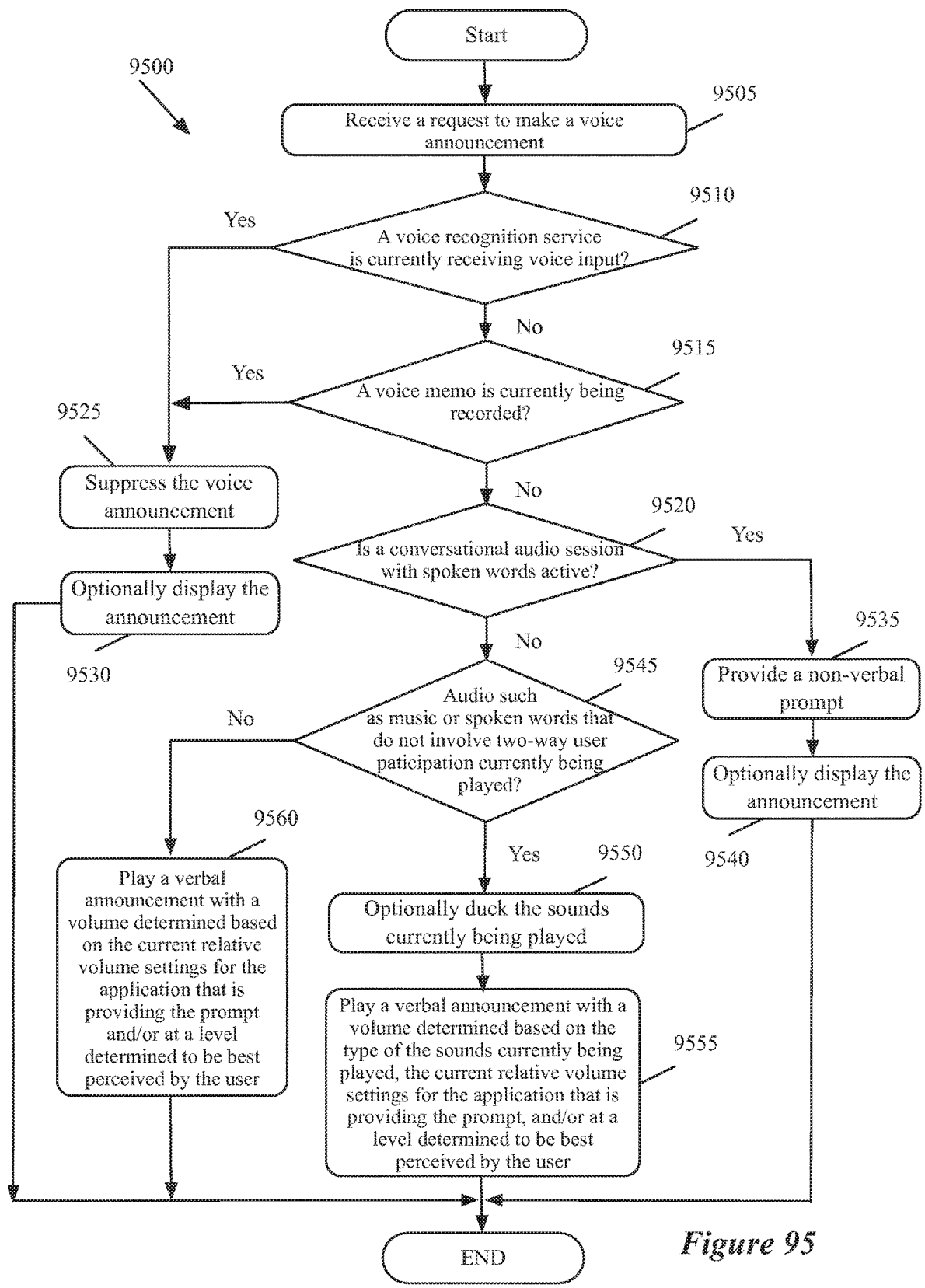
FIG. 95 conceptually illustrates a more detailed process for providing different type of audible prompts on an electronic device in some embodiments of the invention.

1. Providing Different Types of Audible Prompts Based on the Type of the Active Audio Session FIG. 95 conceptually illustrates a more detailed process 9500 for providing different types of audible prompts on an electronic device in some embodiments of the invention. As shown, the process receives (at 9505) a request to make a voice announcement. Examples of such voice announcement were described by reference to operation 9305, above. The process then determines (at 9510) whether a voice recognition service is currently receiving voice input. If yes, the process proceeds to 9525, which is described below. Otherwise, the process determines (at 9515) whether a voice memo is currently being recorded. Examples of a voice recognition service that is currently receiving voice input and a voice memo currently being recorded are provided by reference to operation 9315, above. If yes, the process proceeds to 9525, which is described below.

Otherwise, the process determines (at 9520) whether an audio session with spoken words is currently active. This type of audio session includes on-going phone conversions, video calls, and VoIP sessions. This type of audio session also includes a voice-activated personal assistant session where the voice-activated personal assistance has already received the user input and is now either talking back to the user or is in the process of searching to find the answer to the user request. If not, the process proceeds to 9545, which is described below.

a) Providing Directional Information Using Non-Verbal Audible Prompts

Figure 96:
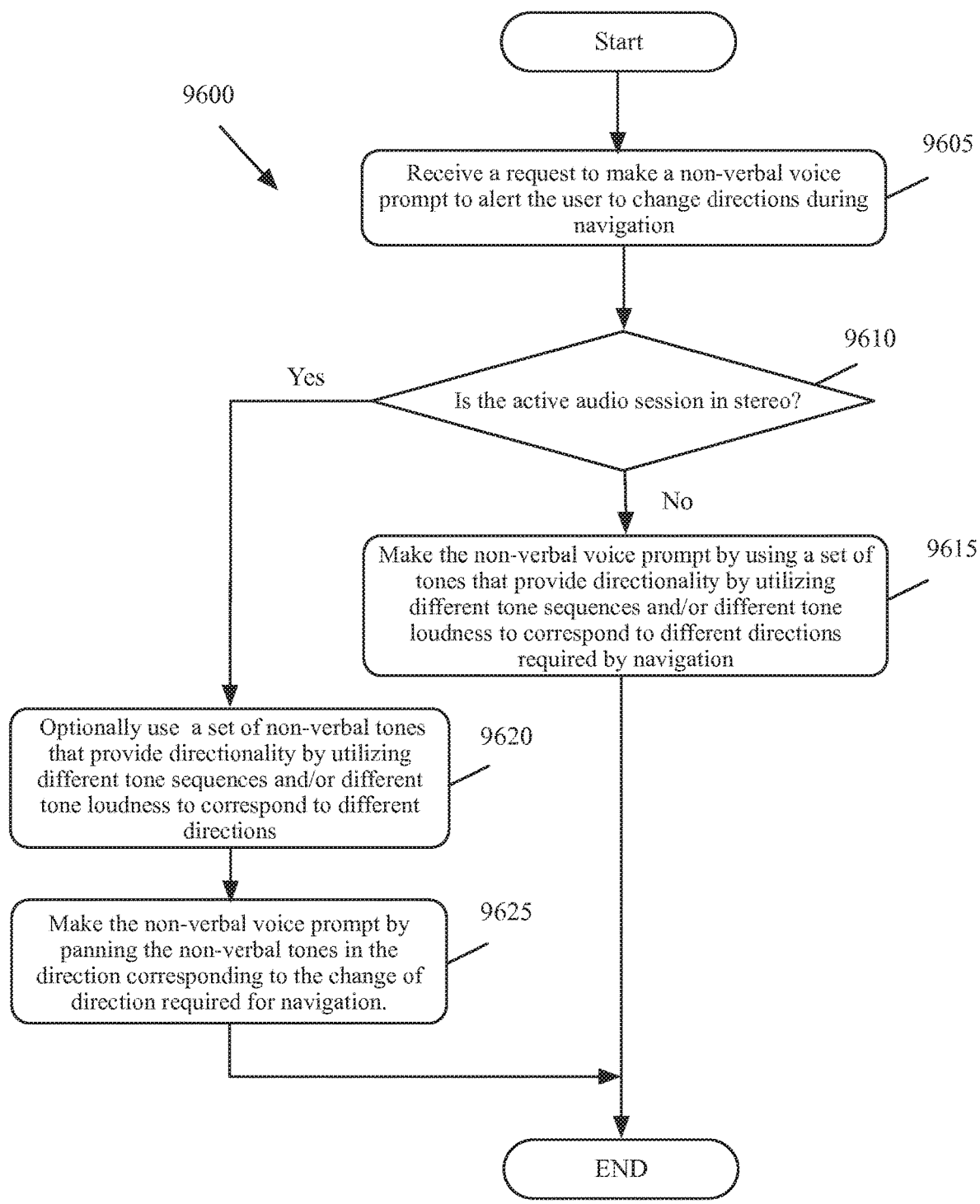
FIG. 96 conceptually illustrates a process for providing non-verbal prompts with directionality information in some embodiments of the invention.

When an audio session with spoken words is currently active, process 9500 provides (at 9535) a non-verbal prompt. The process also optionally displays (at 9540) the announcement. The process then exits. The non-verbal prompt in some embodiments (such as the non-verbal prompts during navigation) provide directionality information. FIG. 96 conceptually illustrates a process 9600 for providing non-verbal prompts with directionality information (e.g., during navigation) in some embodiments of the invention. Process 9600 is activated, e.g., during operation 9535 of process 9500 when an active audio session is in progress and a determination is made to make a non-verbal audible prompt to provide directionality information. As shown, process 9600 receives (at 9605) a request to make a non-verbal voice prompt that includes directionality information (e.g., to alert the user to change directions during navigation).

Process 9600 then determines (at 9610) whether it is possible to provide the prompt in stereo. For instance, if the currently active audio session is stereo (e.g., a voice-activated personal assistance session) then it is possible to provide the non-verbal prompt in stereo. On the other hand if a mono audio session (e.g., a mono phone call) is active, it is not possible to provide the prompt in stereo. When the active audio session is in stereo, the process proceeds to 9620, which is described below.

Figure 97:
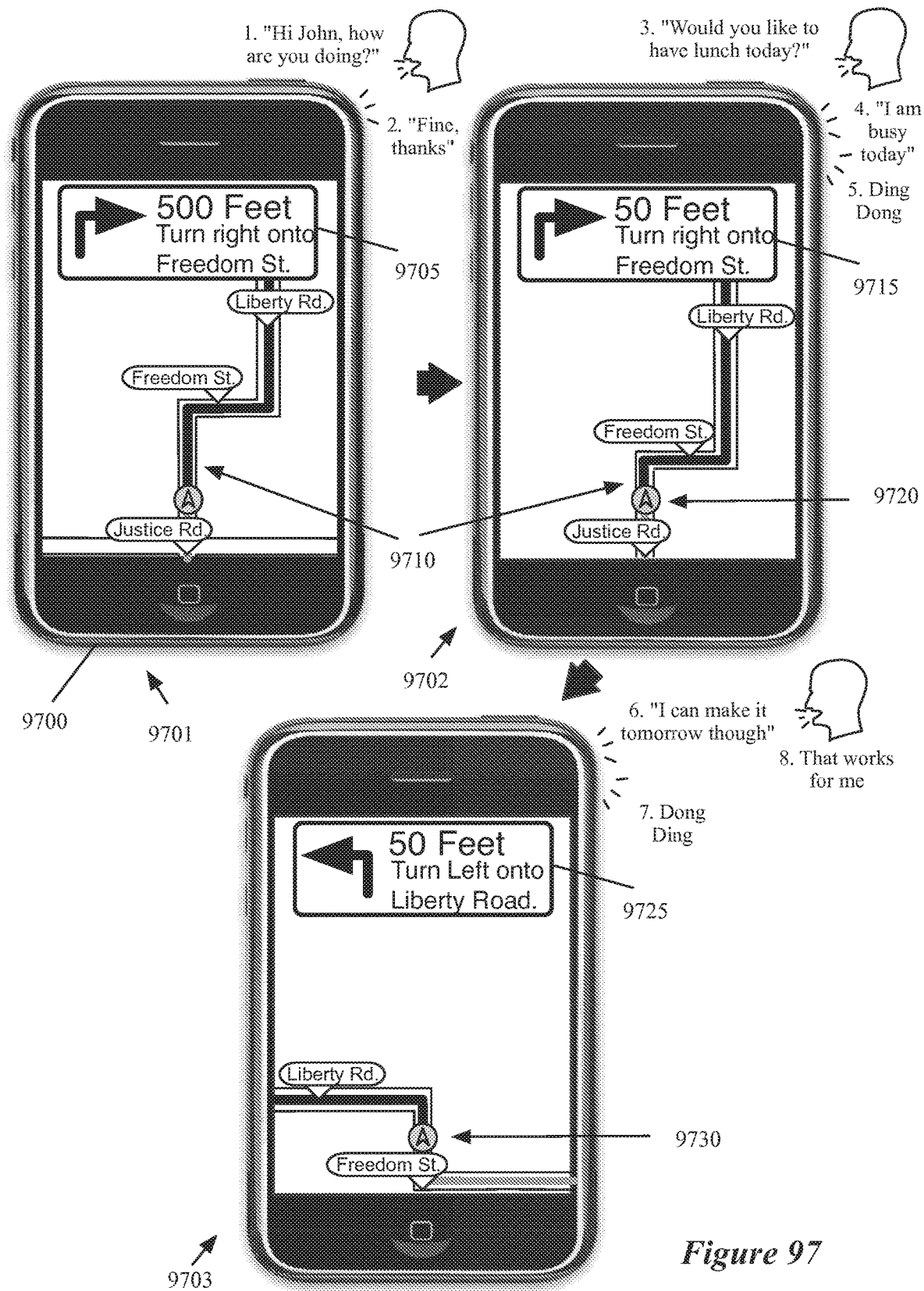
FIG. 97 illustrates a user device when a navigation session and a phone call are in progress in some embodiments of the invention.

Otherwise, the process makes (at 9615) the non-verbal voice prompt by using a set of tones that provide directionality by utilizing different tone sequences and/or different tone loudness to correspond to different directions required by navigation. FIG. 97 illustrates a user device 9700 when a navigation session and a phone call are in progress in some embodiments of the invention. The figure is shown in three stages 9701-9703. In stage 9701 a phone conversation (as shown by the phrases labeled 1 and 2) is in progress between the device user, who has used the device to make a phone call, and another person whose voice is being played through a single speaker of the device. In addition, a navigation session is in progress (as shown by the route 9710) and the user device is still 500 feet from the next turn (as shown by navigational direction 9705).

In stage 9702, the phone conversation is still in progress (as shown by the phrases labeled 3 and 4). The device in this stage has reached to a point (as shown by navigational direction 9715 and the location 9720 of the device on the route 9710) where the navigation application has to provide a voice prompt to alert the user to make a right turn in 50 feet. However, since the phone call is in progress, instead of a verbal announcement such as "turn right onto Freedom Street in 50 feet", the navigation application provides a non-verbal prompt. As shown by the phrase labeled 5, a voice prompt (ding dong in this example) is played.

Figure 98:
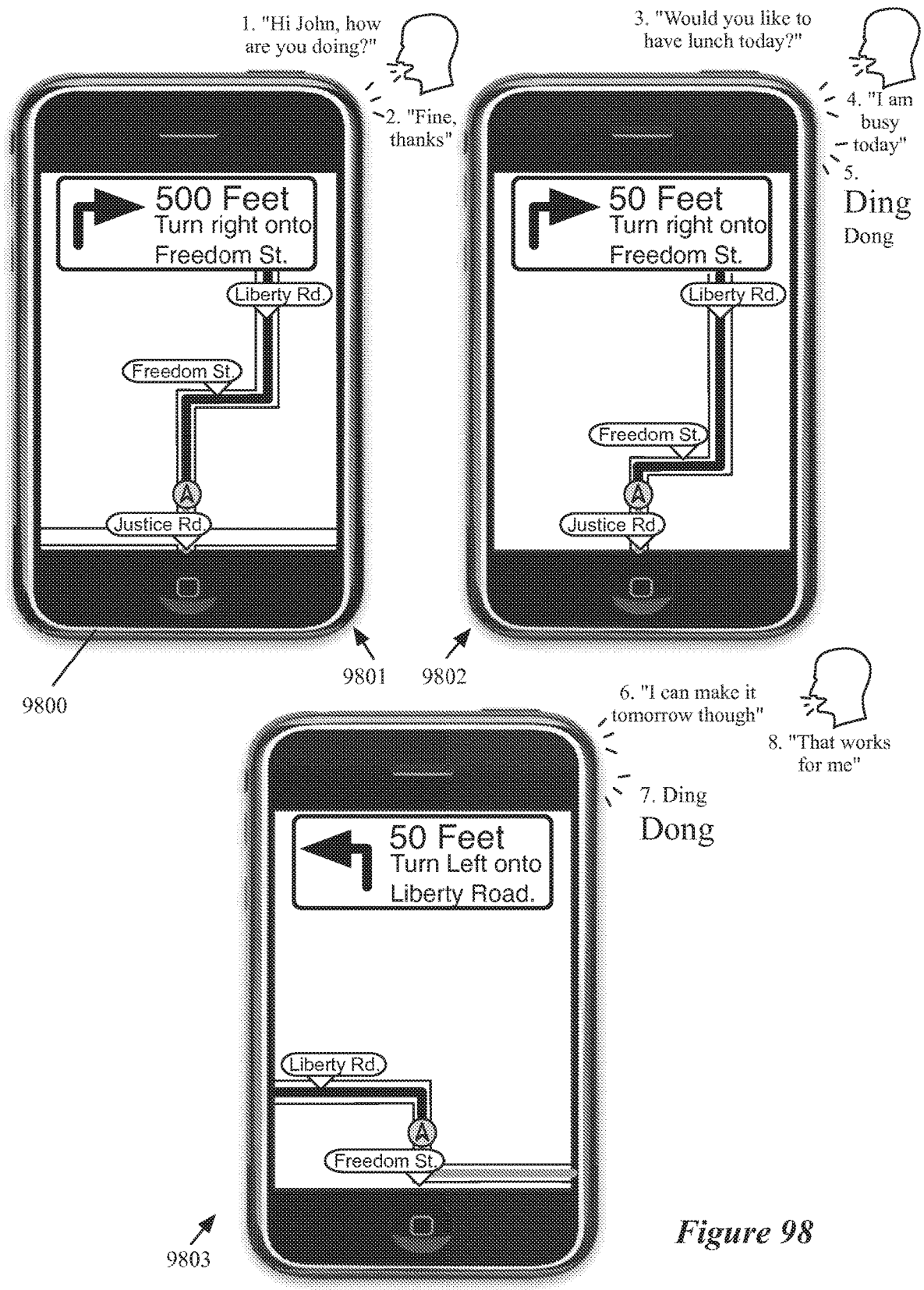
FIG. 98 illustrates another example of providing directional information by non-verbal prompts in some embodiments of the invention.

In stage 9703, the phone conversation is still in progress (as shown by the phrases labeled 6 and 8). The device in this stage has reached the next turning point (as shown by navigational direction 9725 and the location 9730 of the device along the route) where the navigation application has to provide a voice prompt to alert the user to make a left turn in 50 feet. Since the turning is to the left, this time a different sequence of tones (dong ding in this example) are played. By using different sequences of tones (ding dong versus dong ding), the user is provided with directional information required for proper navigation. In other embodiments, instead of changing the sequence of tones, different tones are used for different directions. For instance, ding (or ding ding) for turning right and dong (or dong dong) for turning left or vice versa. FIG. 98 illustrates another example of providing directional information by non-verbal prompts in some embodiments of the invention. The figure illustrates a user device 9800 when a navigation session and a phone call are in progress in some embodiments of the invention. For simplicity, the same scenario for the phone conversation and navigational directions as FIG. 97 is shown in FIG. 98. As shown in stage 9802, the navigation application provides the non-verbal prompt to alert the user to make a right turn. The prompt includes a loud tone (ding, as conceptually shown by the larger characters in the phrase labeled 5) and a soft tone (dong, as conceptually shown by the smaller characters in the phrase labeled 5).

In stage 9803, since the next turning point is a left turn, the prompt includes the same tones as for the right turn. The first tone, however, is a soft tone (ding, as conceptually shown by the smaller characters in the phrase labeled 5) and a loud tone (dong, as conceptually shown by the larger characters in the phrase labeled 5). By using the same set of tones with different loudness, the user is provided with directional information required for proper navigation. In other embodiments the same tone or the same sequence of tones are used with different loudness to show directions (e.g., a loud ding for turning left and a soft ding for turning right or vice versa).

Referring back to FIG. 96, when the active audio session is in stereo, the process pans the voice prompt to show directions. In some embodiments, in addition to panning, the process optionally uses (at 9620) a set of non-verbal tones that provide directionality by utilizing different tone sequences and/or different tone loudness to correspond to different directions. Examples of non-verbal tones to use direction were described above by reference to FIGS. 97 and 98. The process then makes (at 9625) the non-verbal voice prompt by panning the non-verbal tone or tones in the direction that corresponds to the change of direction required for navigation. The process then exits.

Figure 99:
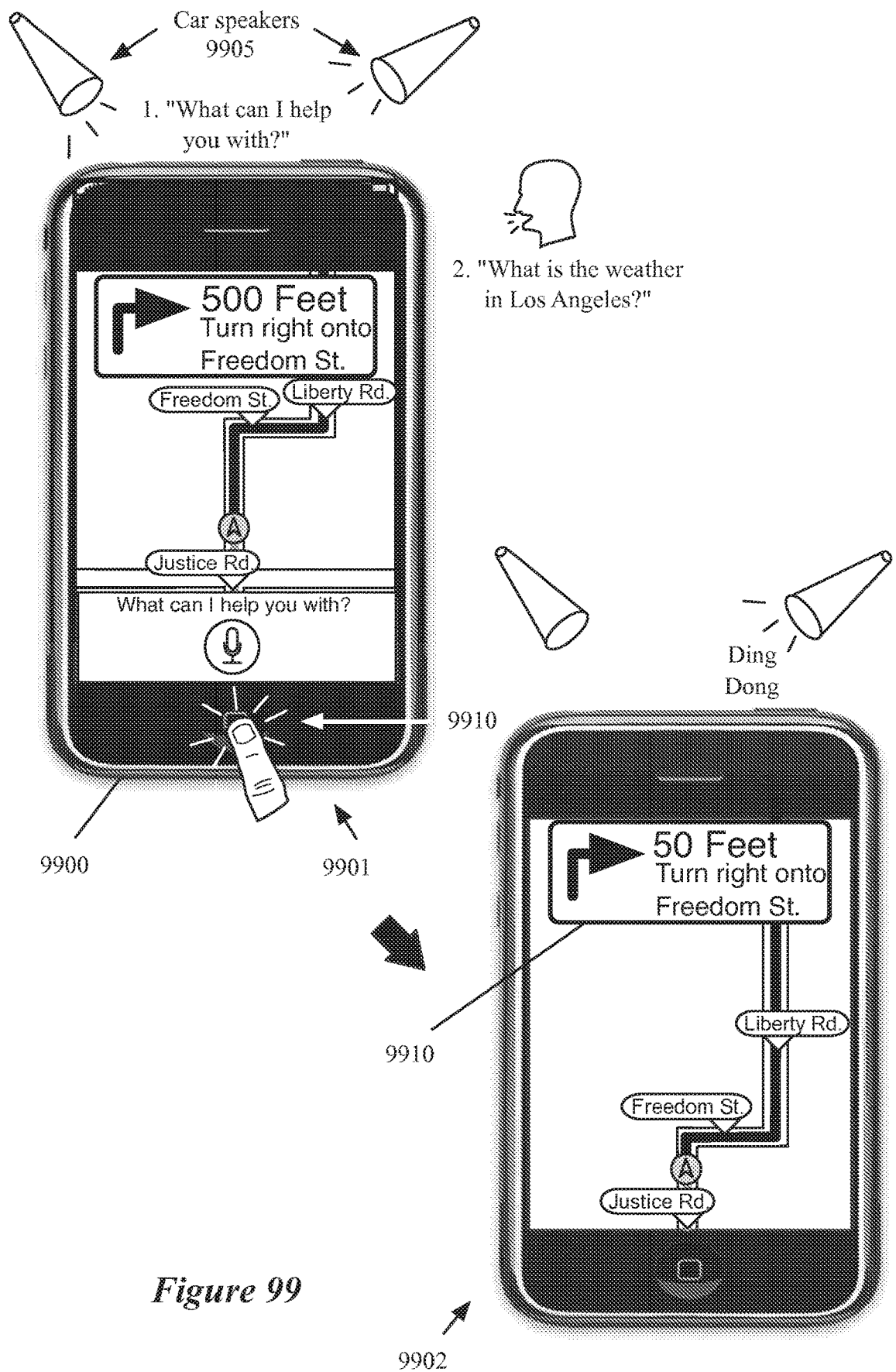
FIG. 99 illustrates an example of providing directional information by panning non-verbal prompts in some embodiments of the invention.

FIG. 99 illustrates an example of providing directional information by panning non-verbal prompts in some embodiments of the invention. The figure illustrates a user device 9900 in two stages 9901 and 9902. In this example, the user device 9900 is connected to car speakers 9905 (e.g., through an auxiliary line-in of the car audio system or by using Bluetooth®). The same example applies when the user device has stereo speaker.

As shown in stage 9901, the user has activated the voice-activated personal assistant (e.g., by activating control 9910) or speaking with loudness higher than a pre-determined threshold. The voice-activated personal assistant is asking (as shown by the phrase labeled 1) the user "what can I help you with?" The user is inquiring (as shown by the phrase labeled 2) about the weather conditions in Los Angeles.

In stage 9902, while the voice-activated personal assistant is searching for the weather conditions, the device approaches the next turn for navigation (as shown by 9910). As shown, the non-verbal voice prompt is panned to the right speaker to alert the user to next navigation turn and provide directional information for turning right. Similarly, the voice prompt is panned to the left speaker when the next navigation action is a left turn. As described above, some embodiments combine panning to particular sequence or loudness of tones to provide additional directional information.

b) Providing Verbal Prompts at a Volume Level to be Perceived at the Level of Media Content Currently Being Played Referring back to FIG. 95, process 9500 determines (at 9545) whether audio such as music or spoken words that do not involve two-way user participation is currently being played by the device. An example of spoken words that do not involve user participation is playing a podcast that includes spoken words. If yes, the process proceeds to 9550, which is described below. Otherwise, when no sounds are played (i.e., when there is silence) the process plays (at 9560) a verbal announcement with a volume that is determined based on the current relative volume settings for the application that is providing the prompt and/or at a level that is determined to be best perceived by the user. The process then exits.

When audio such as music or spoken words that do not involve two-way user participation is currently being played, the process optionally ducks (at 9550) the audio sounds that are currently being played. The process then plays (at 9555) a verbal announcement with a volume that is determined based on the type of the sounds currently being played, the current relative volume setting for the application that is providing the prompt, and/or at a level that is determined to be best perceived by the user. The process then exits. Details of operations 9550 and 9555 are described by reference to process 10100 described in FIG. 101, below.

Figure 100:
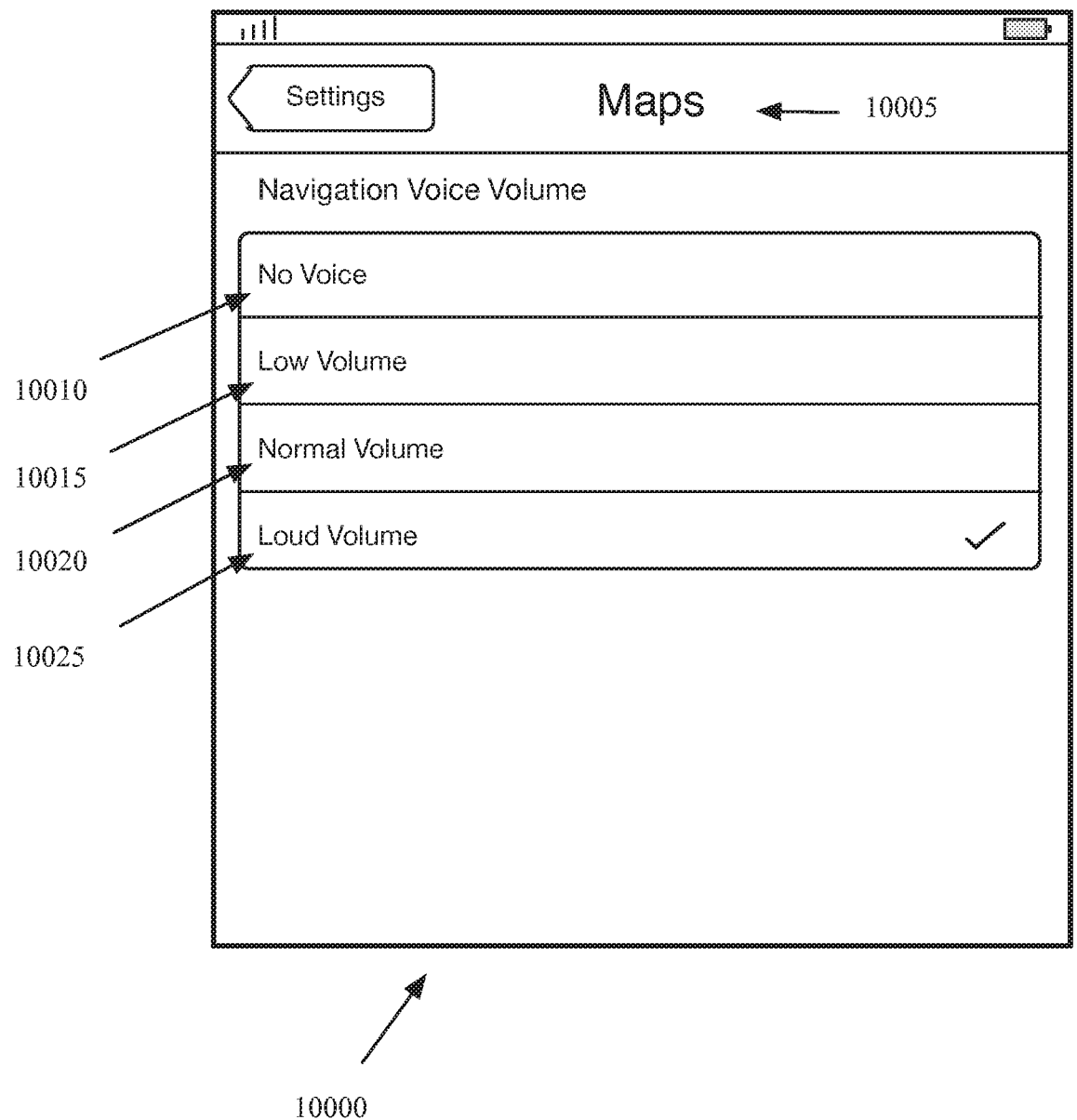
FIG. 100 illustrates a user interface for setting relative prompt levels of the navigation application in some embodiments of the invention.

Some embodiments provide user selectable relative volume level settings for some applications such as the navigation application. FIG. 100 illustrates a user interface 10000 for setting relative prompt levels of the navigation application in some embodiments of the invention. The application, referred to as Maps 10005 in this example has four user-selectable relative volume settings. The settings are no voice 10010, low volume 10015, normal volume 10020, and loud volume 10025.

These volume settings 10010-10025 are used to play the navigation prompts when there is no other audio concurrently played on the device. The no voice 10010 setting suppresses the navigation audio prompts. In some embodiments, the other volume settings 10015-10025 are used as guidelines to adjust the navigation prompt voice level while another audio is concurrently played on the device in order for the user to perceive the navigation prompt and the concurrently played prompt at the same relative volume level.

Figure 101:
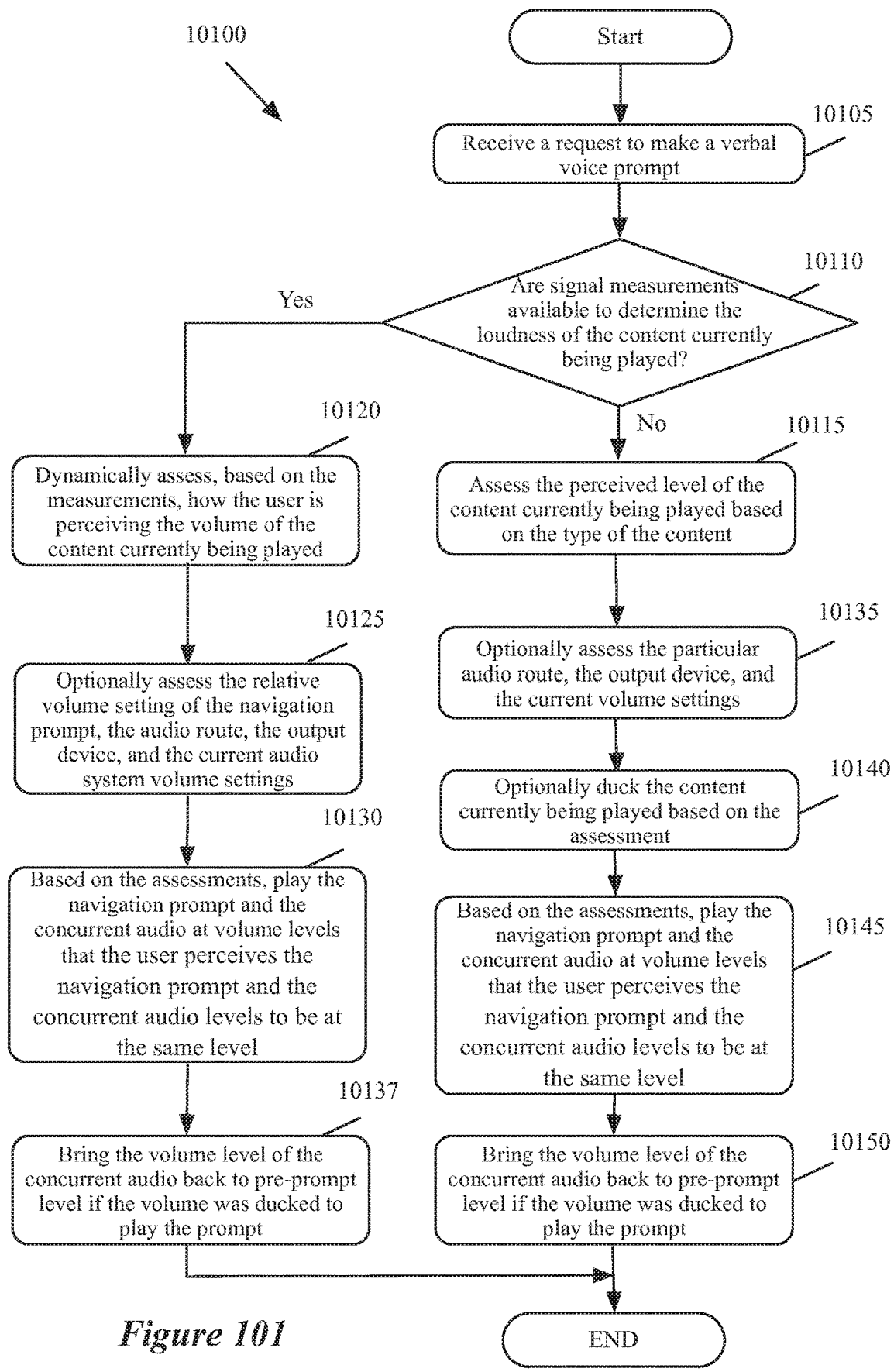
FIG. 101 conceptually illustrates a process for providing verbal navigation prompts while another audio session is active in some embodiments of the invention.

FIG. 101 conceptually illustrates a process 10100 for providing verbal navigation prompts while another audio session is active in some embodiments of the invention. Process 10100 is also utilized for providing other type of prompts (e.g., incoming text message alerts) in some embodiments. As shown, the process receives (at 10105) a request to make a verbal voice prompt. For instance, the process receives the request when process 9300 determines that either a long or a short audible prompt can be played at the current time. Process 10100 then determines (at 10110) whether signal measurements are available to determine the loudness of the content currently being played. If not, the process proceeds to 10115, which is described below.

When signal measurements are available, the process dynamically assesses (at 10120) how the user perceives the volume of the content being played. For instance, some embodiments provide measurements for the power and other properties of the audio signals. These measurements are utilized to determine how loud the user perceives the signal that is being played by the active audio session. The process also optionally assesses (at 10125) other properties of the audio system such as the relative volume settings of the navigation application (e.g., as described above by reference to FIG. 100), the audio route, the output device (e.g., device speaker, headphone, car speakers, etc.) and the current audio system volume settings.

Based on all of these assessments, the process plays (at 10130) the voice prompt and the concurrent audio at volume levels such that the user perceives the navigation prompt and the concurrent audio levels to be at the same level. The process then brings (at 10137) the volume level of the concurrent audio back to the pre-prompt level if the volume was ducked to play the prompt. The process then exits.

When signal measurements are not available, the process assesses (at 10115) the perceived level of the currently played content based on the type of the content. Examples of this assessment are described below. The process also optionally assesses (at 10135) other properties of the audio system such as the relative volume settings of the navigation application, the audio route, the output device (e.g., device speaker, headphone, car speakers, etc.) and the current audio system volume settings. The process then optionally ducks (at 10140) the content currently being played based on the assessments. The process then, based on the assessments, plays (at 10145) the voice prompt at a volume level such that the user perceives the navigation prompt volume at the same level as the volume level of the content currently being played. The process then brings (at 10150) the volume level of the content back to pre-prompt level if the volume was ducked to play the prompt. The process then exits.

Figure 102:
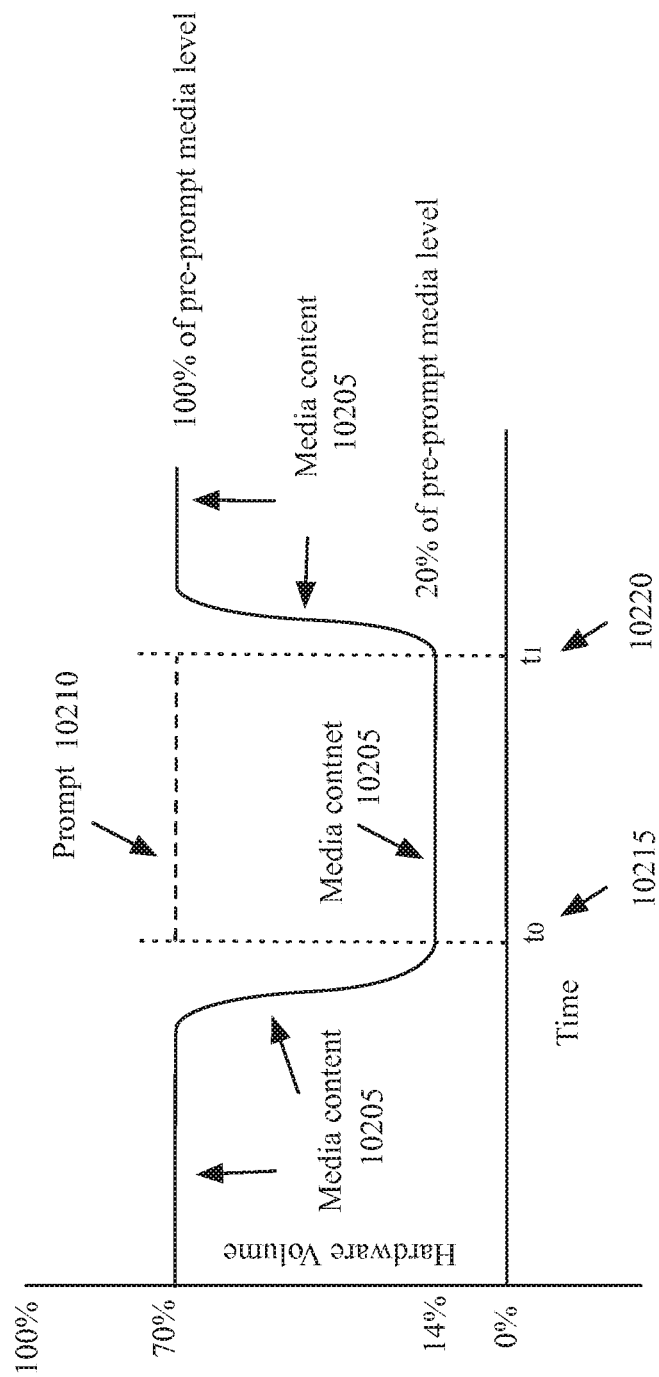
FIG. 102 conceptually illustrates the volume level of audio played on a user device versus time in some embodiments of the invention.

FIG. 102 conceptually illustrates the volume level of audio played on a user device versus time in some embodiments of the invention. In this example, the navigation prompt relative volume level is set at high (i.e., at loud volume 10025 as shown in FIG. 100) and the media being played is of a type (such as music) that is inherently loud. The voice prompt, on the other hand is not as loud as the recorded music. In order for the user to perceive the prompt at the level of the media content, the voice prompt is played at a higher volume level to create a high contrast between the prompt and the media content.

As shown in FIG. 102, the media content 10205 is ducked. The voice prompt 10210 is then played between times $t_0$ 10215 and $t_1$ 10220. The media level is then brought back to the pre-prompt volume level. In this example, the content was played at 70% of the maximum hardware volume setting prior to the prompt. The media content is ducked to 20% of its volume (i.e. 14% of the hardware volume level). The prompt is then played at the level that the media content was played prior to the prompt. An inherently loud audio type (such as music) is therefore ducked and the relatively soft prompt is played at a higher relative volume level to make the user perceive the media content and the prompt at the same volume level.

Although specific volume levels and specific type of media being played (inherently loud) are used in the example of FIG. 102, one of ordinary skill in the art will realize that ducking the media content volume level to a lower level and playing the voice prompt at the level that the media content was played prior to being ducked can be used with other volume level settings and other type of media being played (other than media inherently being loud) when the navigation prompt relative volume level is set at high.

Figure 103:
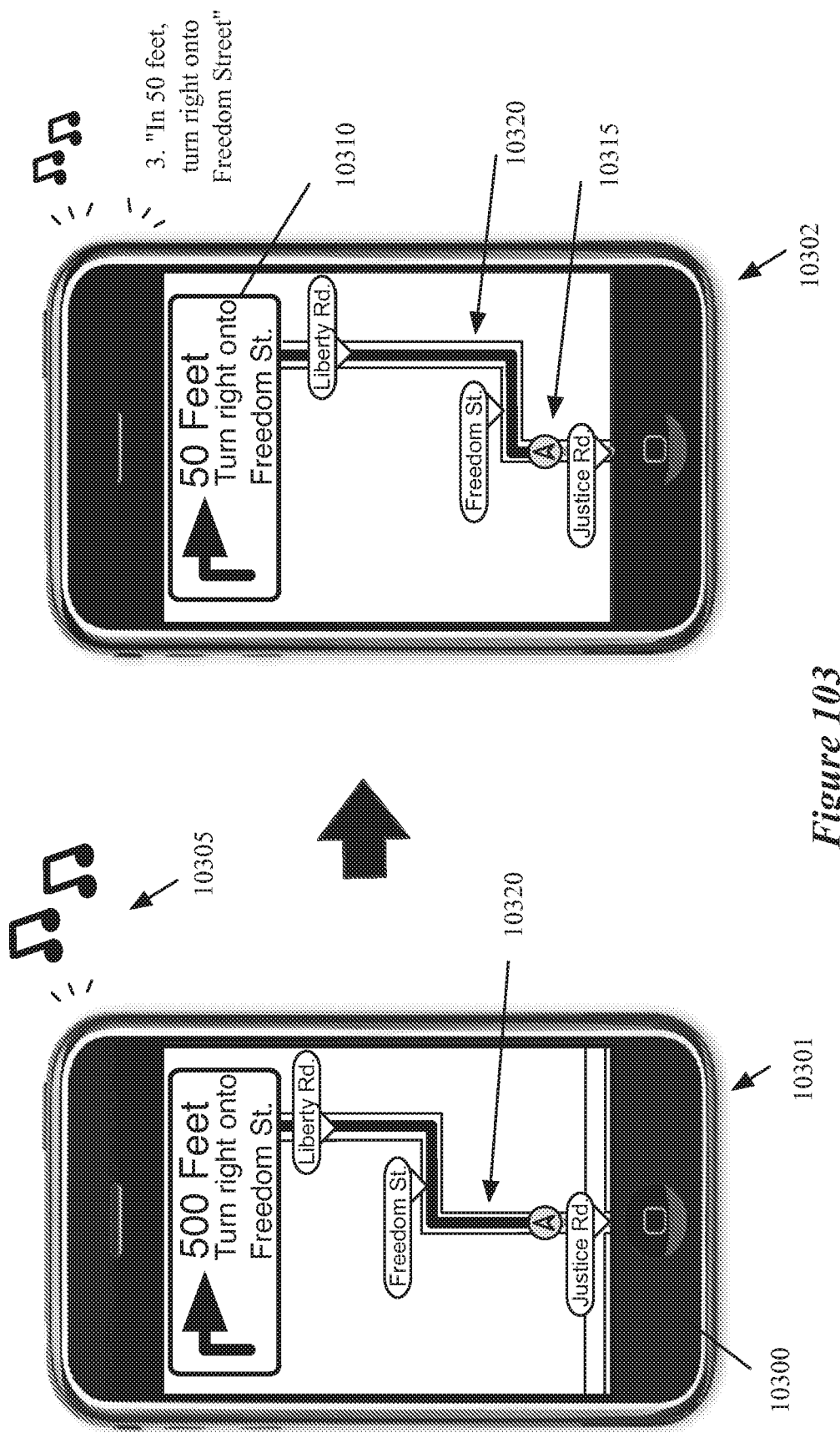
FIG. 103 illustrates providing a voice prompt on a device while the relative volume level of the voice prompt is set high and the content that is inherently loud is being played in some embodiments of the invention.

FIG. 103 illustrates providing a voice prompt on a device while the relative volume level of the voice prompt is set at loud volume 10025 (as shown in FIG. 100) and the content that is inherently loud is being played in some embodiments of the invention. The device 10300 is shown in two stages 10301 and 10302. In stage 10301, music is played (as shown by 10305) on the device while navigation is in progress (as shown by the route 10320).

In stage 10302 the device has approached the next turn (as shown by navigational direction 10310 and the location 10315 of the device along the route 10320). As described by reference to FIG. 102 above, the volume level of the media content is ducked (as conceptually illustrated by smaller tones) while the voice prompt is played at the same level that the media content was being played prior to the prompt. Since the prompt is softer than the music, the user perceives the two volumes at the same level.

Figure 104:
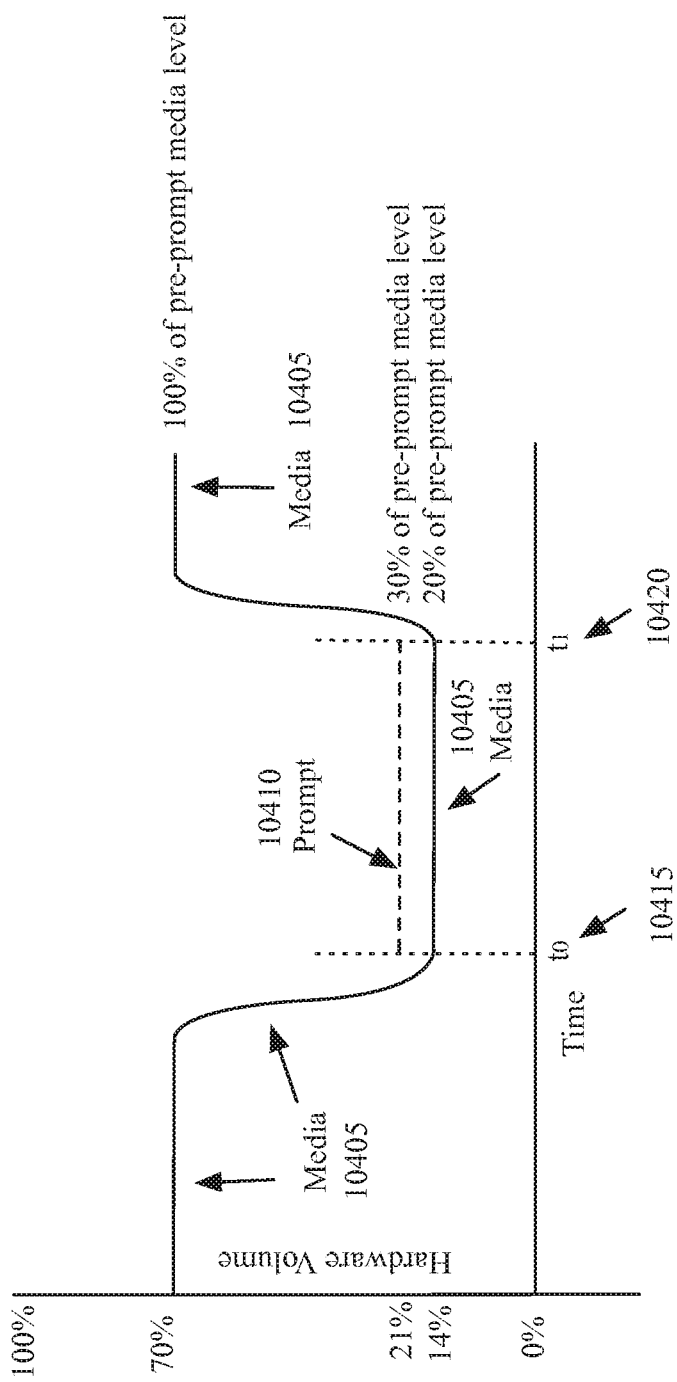
FIG. 104 conceptually illustrates the volume level of audio played on a user device versus time in some embodiments of the invention.

FIG. 104 conceptually illustrates the volume level of audio played on a user device versus time in some embodiments of the invention. In this example, the relative prompt volume level is set to low (i.e., to low volume 10015 as shown in FIG. 100) and the media being played is of a type (such as a podcast) that is inherently soft. The voice prompt, on the other hand is not as soft as the spoken words of the podcast. In order for the user to perceive the prompt at the level of the media content, the voice prompt is played at a volume level comparable or slightly higher than the media content.

As shown in FIG. 104, the media content 10405 is ducked. The voice prompt 10410 is then played between times to 10415 and $t_1$ 10420. The media level is then brought back to the pre-prompt volume level. In this example, the content was played at 70% of the maximum hardware volume setting. The media content is ducked to 20% of its volume (i.e., 14% of the hardware volume level). The prompt is then played at 30% of the level that the media content was played prior to the prompt (i.e., at 21% of hardware volume level). An inherently soft audio type (such as podcast) is therefore ducked and the prompt is played at a same or slightly higher level. Since the podcast is softer than the voice prompt, playing the podcast at 20% and the voice prompt at 30% of the pre-prompt podcast volume level makes the user to perceive the two volumes at the same level and also creates enough contrast for the user to hear the voice prompt while still being able to cognitively listen to the podcast.

Although specific volume levels and specific types of media being played (inherently soft) are used in the example of FIG. 104, one of ordinary skill in the art will realize that ducking the media content volume level to a lower level and playing the voice prompt at the same or slightly higher level that the media content is played after being ducked can be used with other volume level settings and other types of media being played (other than media that is inherently being soft) when the navigation prompt relative volume level is set to low.

Figure 105:
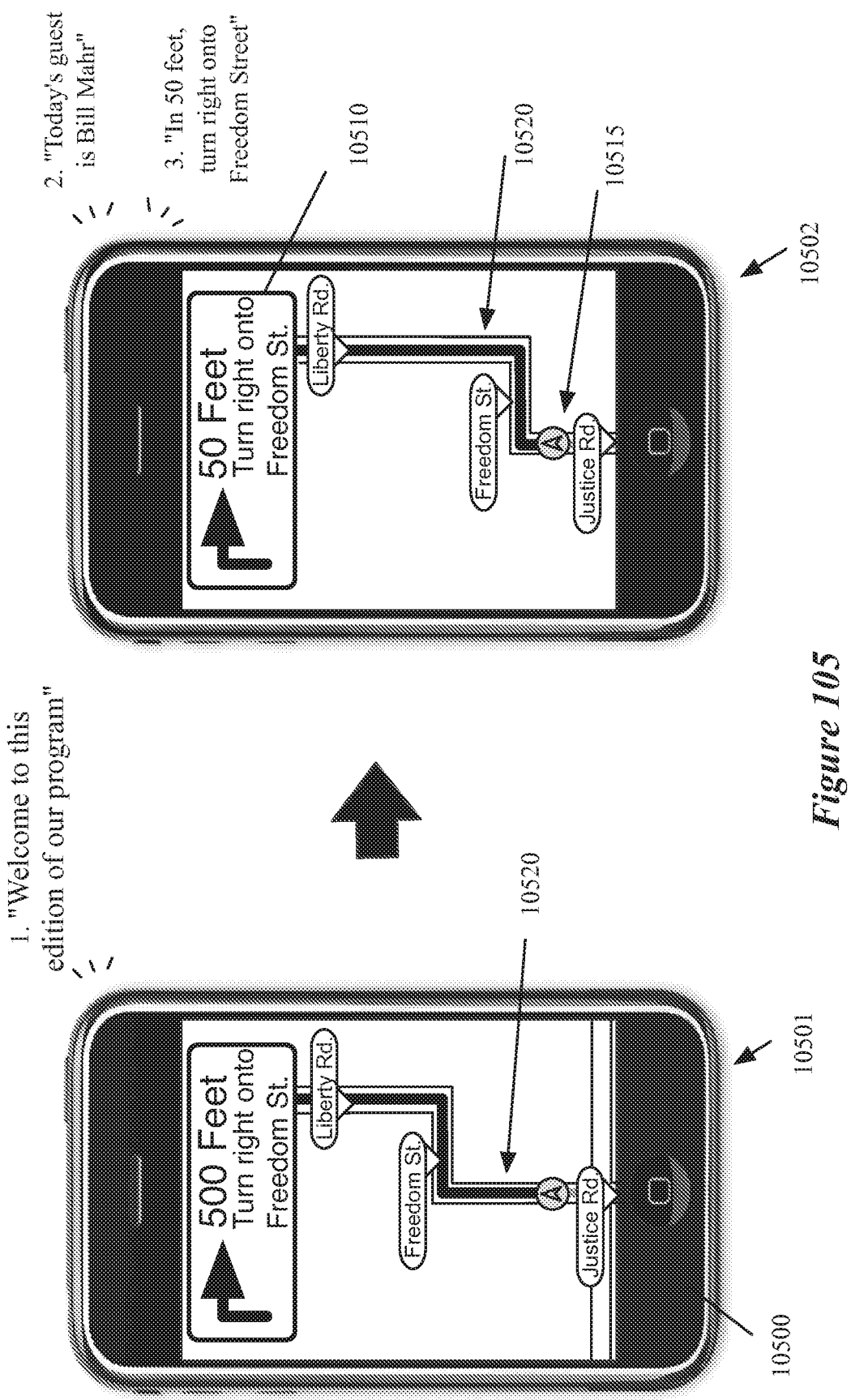
FIG. 105 illustrates providing a voice prompt on a device when the relative prompt volume level is set to low and the content that is inherently soft is being played in some embodiments of the invention.

FIG. 105 illustrates providing a voice prompt on a device when the relative prompt volume level is set to low (i.e., to low volume 10015 as shown in FIG. 100) and the content that is inherently soft is being played in some embodiments of the invention. The device 10500 is shown in two stages 10501 and 10502. In stage 10501, a podcast is played (as shown by the phrase labeled 1) on the device while navigation is in progress (as shown by the route 10520).

In stage 10502 the device has approached the next turn (as shown by navigational direction 10510 and the location 10515 of the device along the route 10520). As described by reference to FIG. 104 above, the volume level of the media content is ducked (as conceptually shown by smaller characters for the phrase labeled 2) while the voice prompt is played (as shown by the phrase labeled 3) at the same or a slightly higher volume level as the ducked media content.

Figure 106:
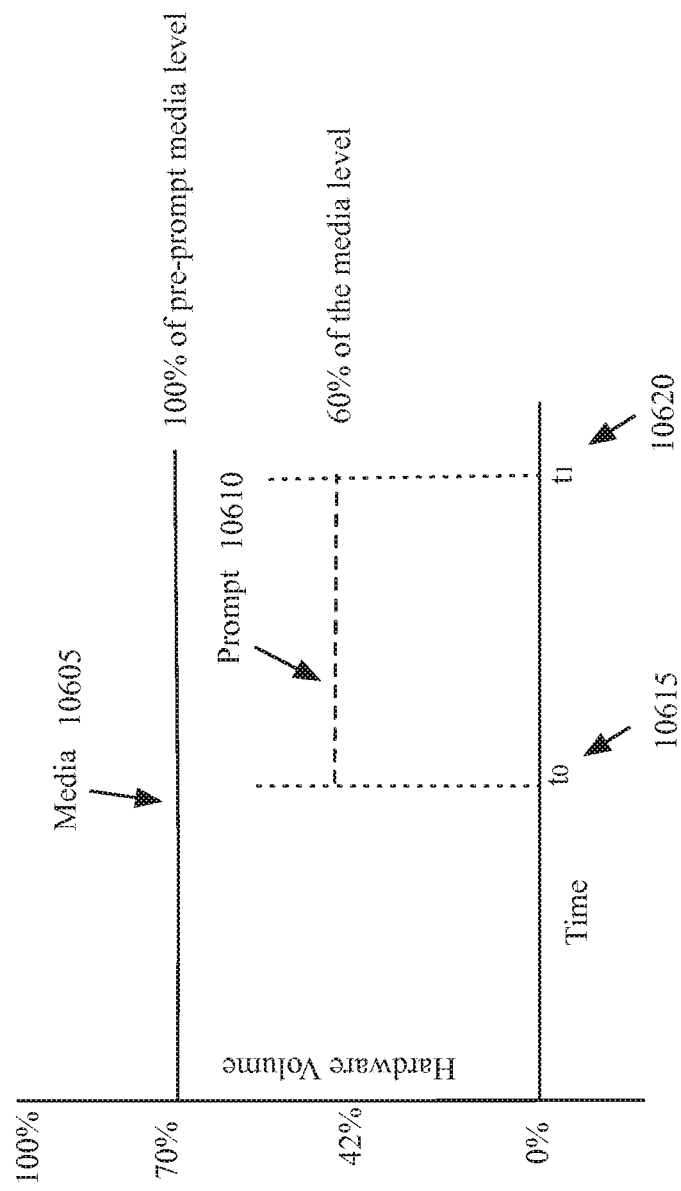
FIG. 106 conceptually illustrates the volume level of audio played on a user device versus time in some embodiments of the invention.

FIG. 106 conceptually illustrates the volume level of audio played on a user device versus time in some embodiments of the invention. This is another example where the media being played is of a type (such as a podcast) that is inherently soft. The voice prompt, on the other hand is not as soft as the spoken words of the podcast. In this example, the media content 10605 continues to be played at the same level while the voice prompt 10610 is being played.

The voice prompt 10610 is played between times to 10615 and $t_1$ 10620. In this example, the content was played at 70% of the maximum hardware volume setting. The prompt is then played at 60% of the level that the media content is played prior to and during the voice prompt (i.e., at 42% of hardware volume level). Since the podcast, is inherently softer that the voice prompt, playing the podcast at 100% and the voice prompt at 60% of the pre-prompt podcast volume level makes the user to perceive the voice prompt and the media content at the same volume level and also creates enough contrast for the user to hear the voice prompt while still being able to cognitively listen to the podcast.

Although specific volume levels and specific type of media being played (inherently soft) are used in the example of FIG. 106, one of ordinary skill in the art will realize that continuing to play the media content at the same level and playing the voice prompt at a lower level than the media content is played can be used with other volume level settings and other types of media being played (other than media that is inherently soft) when the navigation prompt's relative volume level is set to low.

Figure 107:
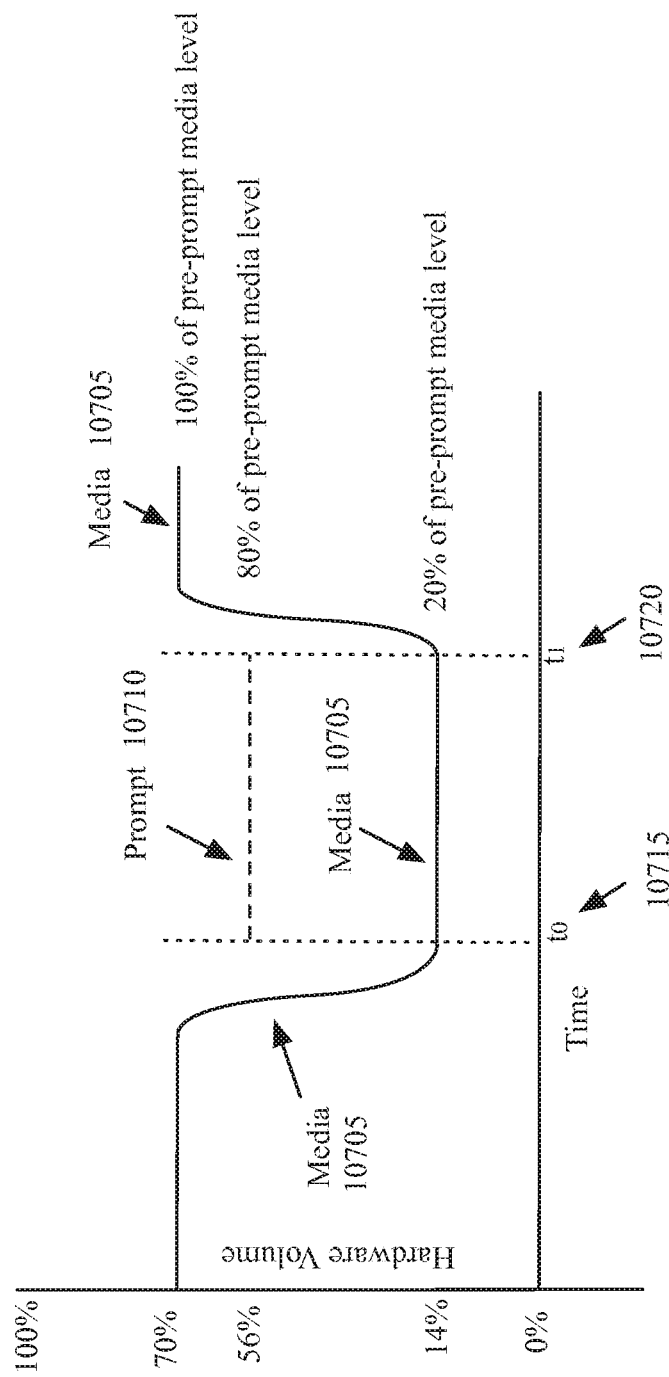
FIG. 107 conceptually illustrates the volume level of audio played on a user device versus time in some embodiments of the invention.

FIG. 107 conceptually illustrates the volume level of audio played on a user device versus time in some embodiments of the invention. In this example, the relative volume level of the prompt is set to normal (i.e. to volume normal 10020 as shown in FIG. 100) and the media being played is of a type (such as an audio book) that is recorded at a normal level.

As shown in FIG. 107, the media content 10705 is ducked. The voice prompt 10710 is then played between times $t_0$ 10715 and $t_1$ 10720. The media level is then brought back to the pre-prompt volume level. In this example, the content was played at 70% of the maximum hardware volume setting. The media content is ducked to 20% of its volume (i.e., 14% of the hardware volume level). The prompt is then played at 80% of the level that the media content was played prior to the prompt (i.e., at 56% of hardware volume level). Since the voice prompt and the audio content were recorded at comparable loudness levels, the prompt played at 80% and the media content at 20% of the pre-prompt media content volume level makes the user to perceive the prompt and the audio content at the same volume level and creates enough contrast for the user to hear the voice prompt while still being able to cognitively listen to the audio book.

Although specific volume levels and specific type of media being played (media recorded at a normal level) are used in the example of FIG. 107, one of ordinary skill in the art will realize that ducking the media content volume level to a lower level and playing the voice prompt at a level between the ducked level of the media content and the level that the media content was played prior to being ducked can be used with other volume level settings and other types of media being played when the navigation prompt's relative volume level is set to normal.

Figure 108:
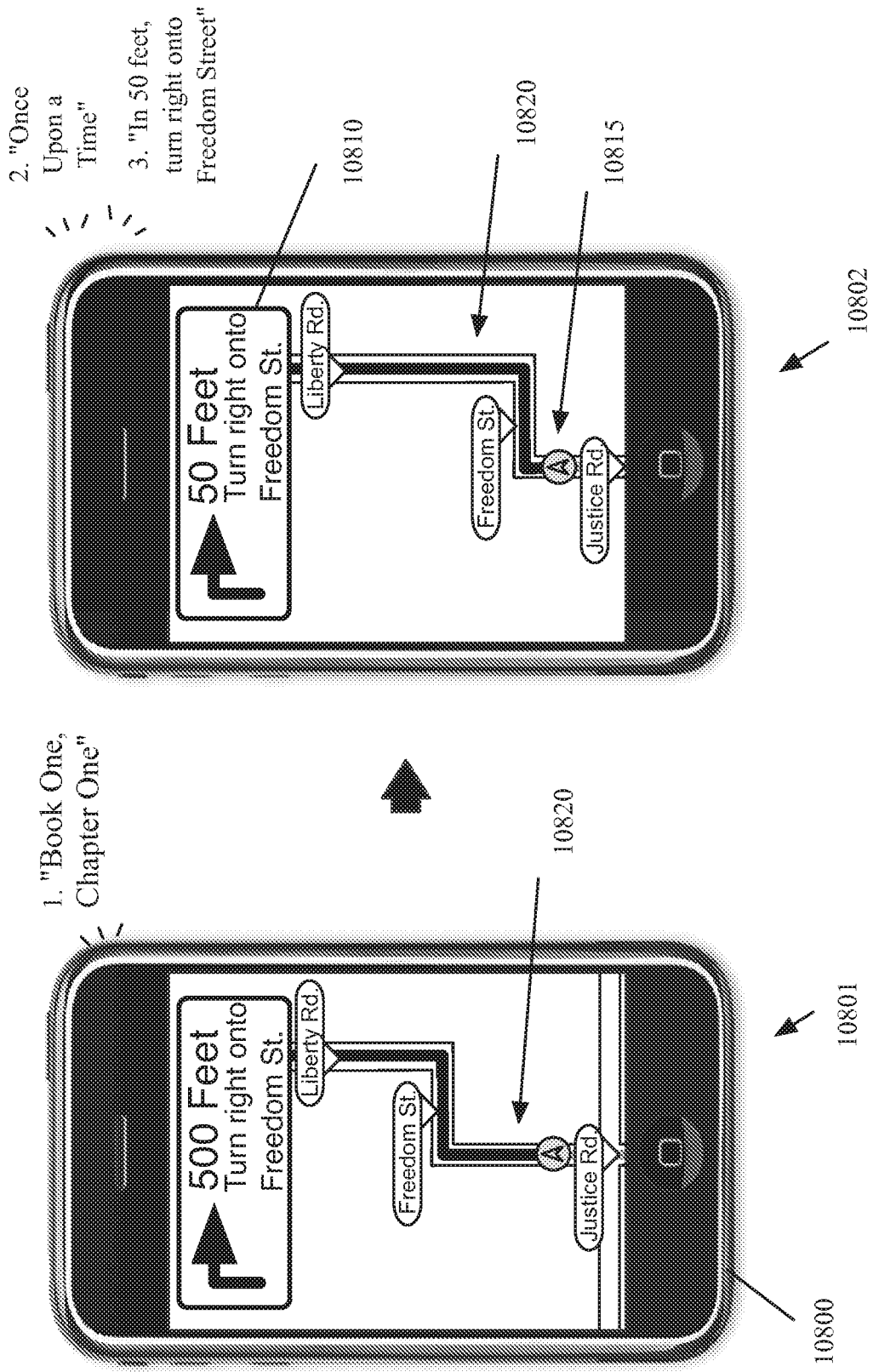
FIG. 108 illustrates providing a voice prompt on a device where the relative volume level of the prompt is set to normal and the content is recorded at a similar loudness level as the voice prompt in some embodiments of the invention.

FIG. 108 illustrates providing a voice prompt on a device where the relative volume level of the prompt is set to normal (i.e. to volume normal 10020 as shown in FIG. 100) and the content is recorded at a similar loudness level as the voice prompt in some embodiments of the invention. The device 10800 is shown in two stages 10801 and 10802. In stage 10801, an audio book is played (as shown by the phrase labeled 1) on the device while navigation is in progress (as shown by the route 10820).

In stage 10802 the device has approached the next turn (as shown by navigational direction 10810 and the location 10815 of the device along the route 10820). As described by reference to FIG. 107 above, the volume level of the media content is ducked (as conceptually shown by smaller characters for phrase labeled 2) while the voice prompt is played (as shown by the phrase labeled 3) at a level (e.g., at 80%) of the pre-prompt audio book volume level to create the perception for the user that the audio prompt and the audio book are played at the same volume level while being able to cognitively listen to the audio book at the same time.

c) Suppressing Voice Prompts

Referring back to FIG. 95, when a voice recognition service (e.g., the voice-activated personal assistant or voice-activated service) is currently receiving voice input from the user or user's voice is being recorded to create a voice memo audio file, the process suppresses (at 9525) the voice prompt. The process optionally displays (9530) or transcribes the voice announcements. The process then exits.

In some embodiments, the process stores the voice prompts and checks at a pre-determined later time whether the prompt is still relevant and whether it can be played. For instance, some embodiments during navigation calculate the estimated time to the upcoming turn and retry operations 9510 and 9515 at a pre-determined time prior to the device reaching the turning point to determine whether the prompt can be played. For instance, a full verbal prompt can be played if the navigation point is not reached yet and the user has ended recording the voice memo or the voice-activated personal assistant. On the other hand, a short non-verbal prompt can be played if the navigation point is not reached yet and the user has ended a verbal request to the personal assistant and the personal assistant is currently finding or playing the response.

2. Alternative Embodiments for Providing Context Aware Audible Prompts

Some embodiments provide additional techniques to enhance the user experience when a voice prompt is played while another audio session is active. As described below different embodiments control the time gap between ducking the media content and playing the voice prompt in order to control the contrast between the voice prompt and the media content. Other embodiments pause the media content (instead of ducking) when pausing the content is possible.

a) Controlling the Gap between the Audio Prompt and Media Content

Figure 109:
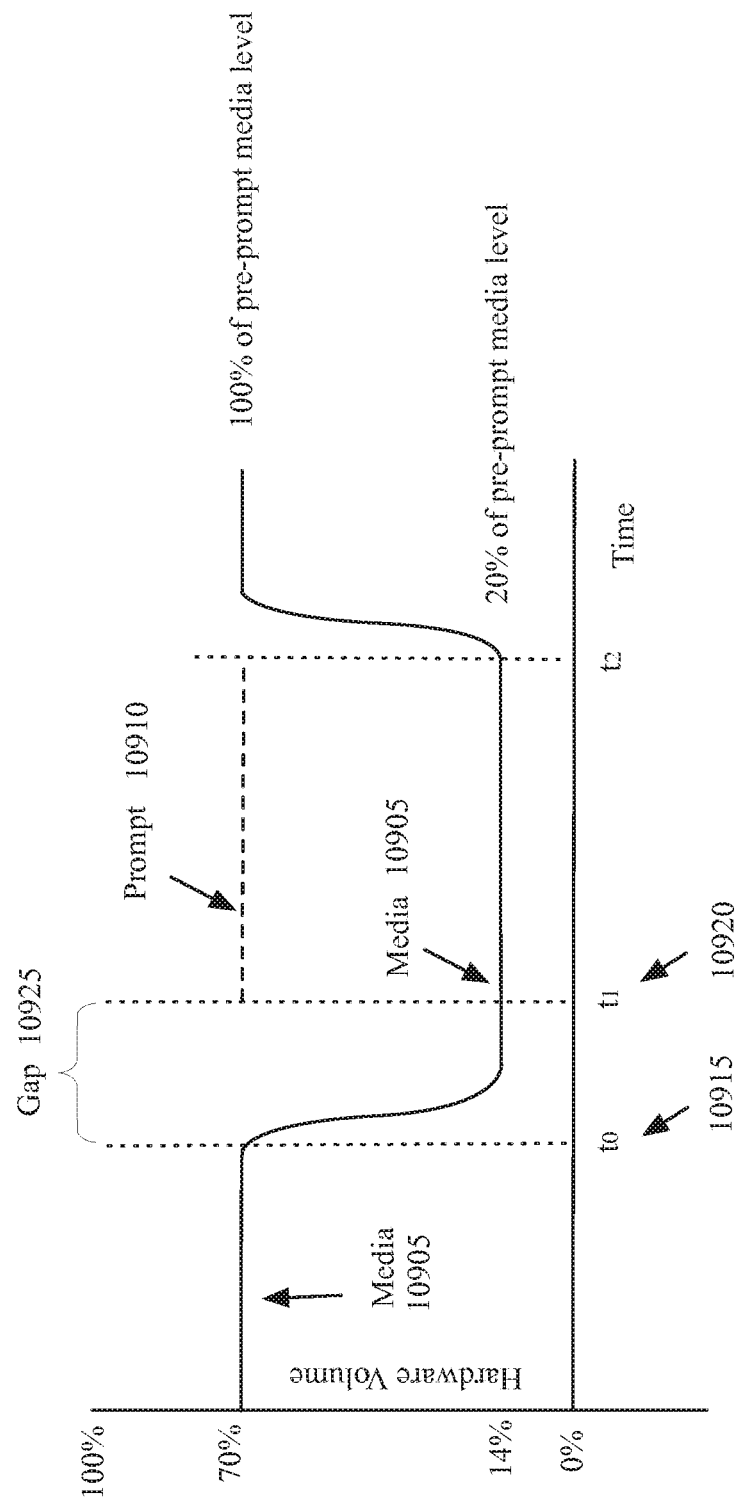
FIG. 109 conceptually illustrates the volume level of audio played on a user device versus time in some embodiments of the invention.

FIG. 109 conceptually illustrates the volume level of audio played on a user device versus time in some embodiments of the invention. In this example, the media content 10905 is ducked at to 10915 but the voice prompt 10910 is not played until time $t_1$ 10920. The gap 10925 is therefore created to make a longer pause before the prompt is played. A more pronounced pause between the media content and the voice prompt (e.g., half a second delay) heightens the user awareness for the upcoming prompt. Although the voice prompt is shown at the level that the content was being played prior to the prompt, a person of ordinary skill in the art will realize that the prompt can be played at any level while a gap is created as shown in FIG. 109.

Figure 110:
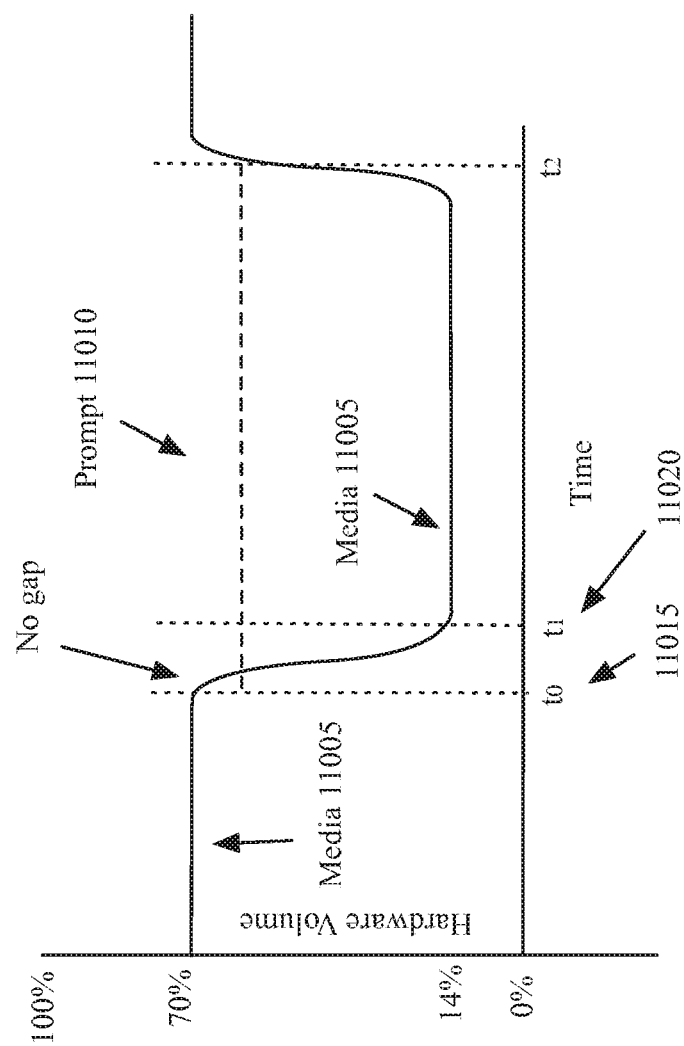
FIG. 110 conceptually illustrates the volume level of audio played on a user device versus time in some embodiments of the invention.

FIG. 110 conceptually illustrates the volume level of audio played on a user device versus time in some embodiments of the invention. In this alternative embodiment, the prompt is played at the moment the media content is being ducked to minimize the period over which the content is ducked. Alternatively, the prompt can start playing while the media is being ducked (i.e., between to 11015 and $t_1$ 11020).

b) Pausing the Media Content

Figure 111:
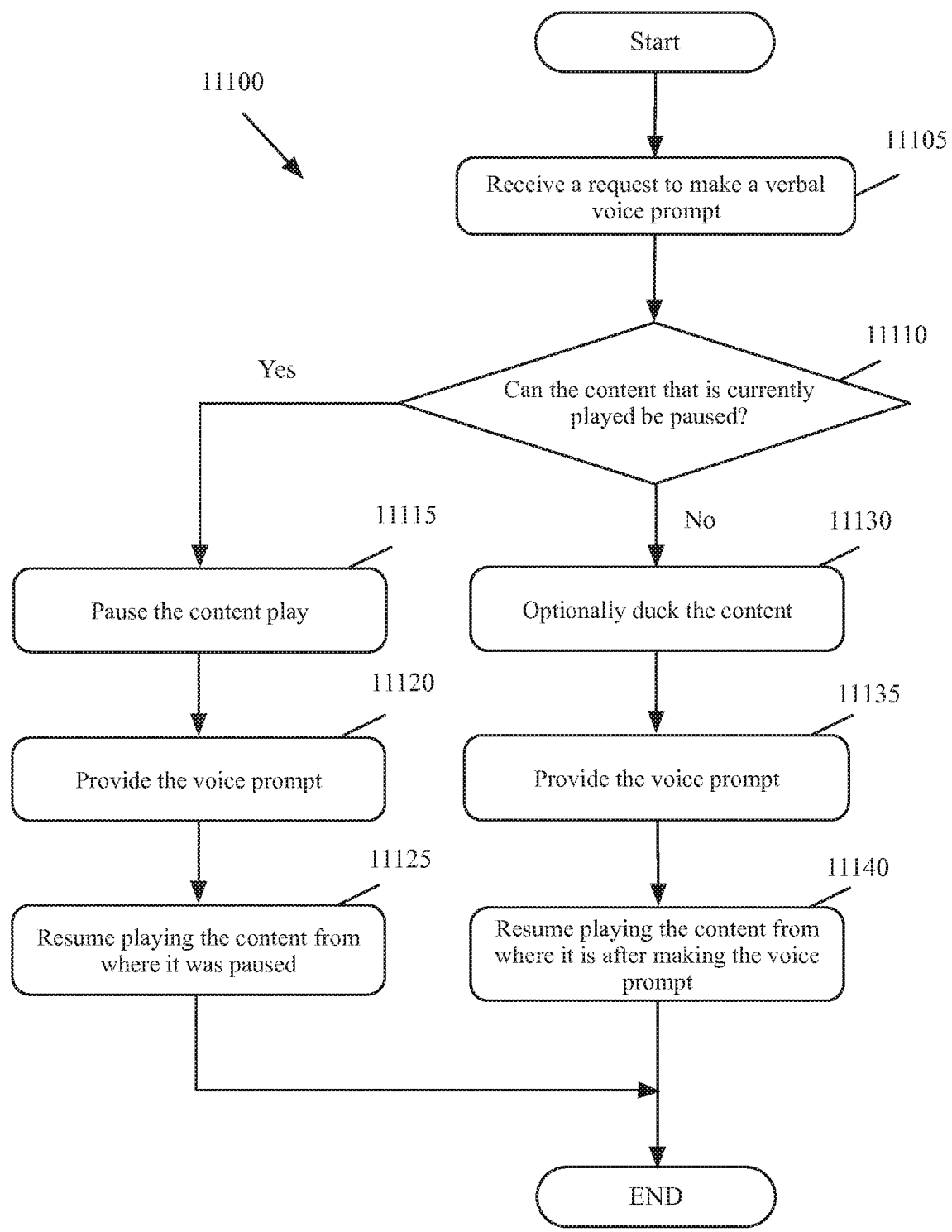
FIG. 111 conceptually illustrates a process for playing a voice prompt in some embodiments of the invention while another audio session is active.

FIG. 111 conceptually illustrates a process 11100 for playing a voice prompt in some embodiments of the invention while another audio session is active. As shown, the process receives (at 11105) a request to make a verbal voice prompt. The process then determines (at 11110) whether the content being played is of a type that can be paused. Similar to the audio types that allow long, short, or no prompts, some audio types allow the playback to be paused. For instance, an audio book (which is played and controlled by the device) can be paused while a phone conversation cannot be paused.

When the content cannot be paused, the process optionally ducks (at 11130) the content. The process then provides (at 11135) the voice prompt. The process then resumes (at 11140) playing the content from where it has reached after making the voice prompt. Details of operations 11130-11140 are similar to operations described by reference to FIG. 95, above and are not repeated here for brevity.

On the other hand, when the content playback can be paused, the process pauses (11115) the content. The process then provides (at 11120) the voice prompt (e.g., a full verbal voice prompt or a non-verbal short prompt). The process then resumes (at 11125) playing the content from where the content was paused.

Figure 112:
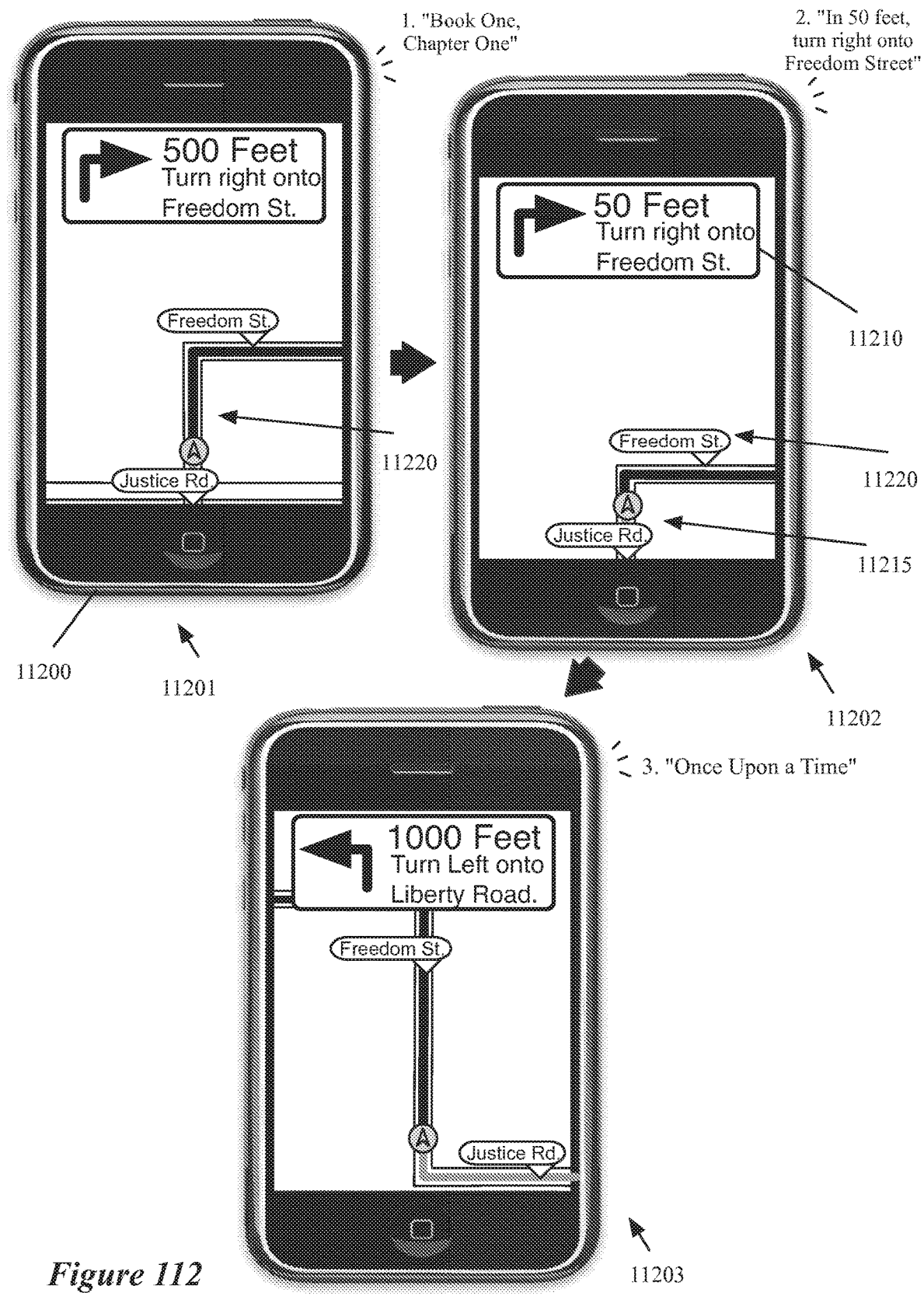
FIG. 112 illustrates providing a voice prompt on a device while a content that can be paused is being played in some embodiments of the invention.

FIG. 112 illustrates providing a voice prompt on a device while content that can be paused is being played in some embodiments of the invention. The device 11200 is shown in three stages 11201-11203. In stage 11201, an audio book is played (as shown by the phrase labeled 1) on the device while navigation is in progress (as shown by the route 11220).

In stage 11202 the device has approached the next turn (as shown by navigational direction 11210 and the location 11215 of the device along the route 11220). Instead of ducking the audio book, the audio book playback is paused and the voice prompt is played (as shown by the phrase labeled 2). In stage 11203, the voice prompt playback is complete and the audio book play is resumed (as shown by the phrase labeled 3).

3. Software Architecture

Figure 113:
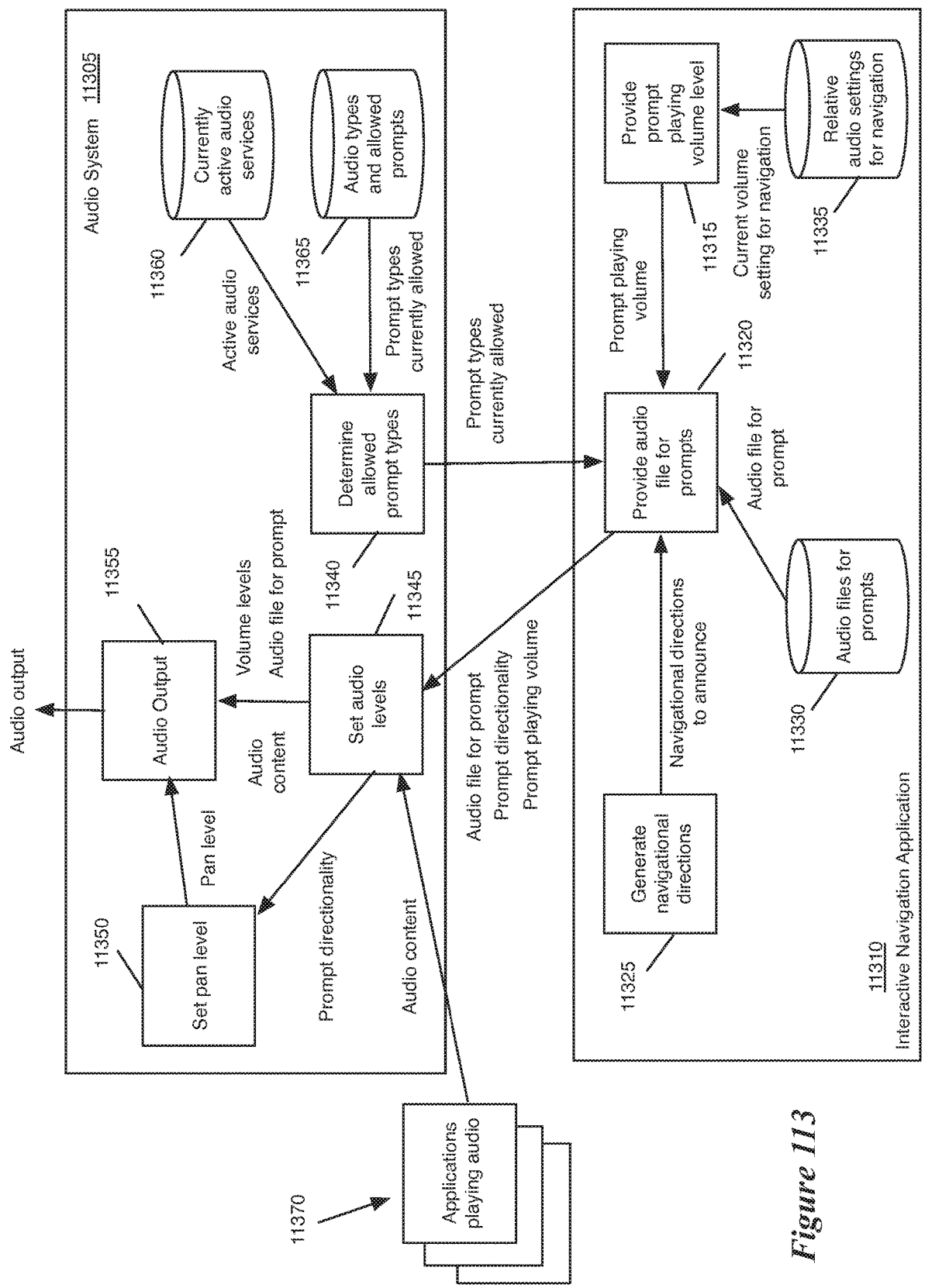
FIG. 113 conceptually illustrates a high-level software architecture of the context aware guidance system of some embodiments.

FIG. 113 conceptually illustrates the high-level software architecture of the context aware guidance system of some embodiments. One of ordinary skill in the art would recognize that the modules shown in FIG. 113 are specific to the context aware guidance system of some embodiments and that the audio service and interactive navigation application of some embodiments include numerous additional modules (e.g., for map display, route display, additional aspects of navigation, text instruction generation, arrow generation, audio input processing, etc.) which are not shown in this figure.

As shown, the interactive navigation application 11310 includes the following modules: "provide prompt playing volume level" 11315. "provide audio file for prompts" 11320, and "generate navigational directions" 11325. In addition, interactive navigation system 11310 includes data storages 11330 and 11335 for storing audio files for different prompts and relative audio settings for navigation respectively.

The audio system 11305 includes the following modules: "determine allowed prompt types" 11340. "set audio levels" 11345, "set pan level" 11350, and "audio output" 11355. In addition, audio system 11305 includes data storages 11360 and 11365 for the currently active audio services and audio types and their corresponding allowed prompts respectively.

As shown, "determine allowed prompt types" module 11340 receives the information regarding the currently active audio services from the currently active audio services storage. The "determine allowed prompt types" module 11340 also receives the list of the audio types and their corresponding allowed prompts from audio types and allowed prompts storage 11365. Based on the type of the active audio services, "determine allowed prompt types" module 11340 determines the audio prompt types that are currently allowed. For instance, if the current active audio service is the voice-activated personal assistant, which is currently providing answer to a user's request, short non-verbal audio prompts are currently allowed. Also, in the event that no prompts are allowed, the audio system 11305 not only informs an inquiring application (such as the interactive navigation application 11310) that no prompts should be played but also enforces across the system that if an application attempt to play a prompt during this time (e.g., from navigation application or any other application), the prompt is suppressed at the system level to ensure that no incidental audio interferes with user audio input where quality is paramount.

The "generate navigational directions" module 11325 sends navigation directions to announce to "provide audio file for prompts" module 11320. The "provide audio file for prompts" module 11320 receives the prompt types that are currently allowed (e.g., when no other audio is being played both short non-verbal prompts and long verbal prompts are allowed). The "provide prompt playing volume level" module 11315 receives the current volume settings for navigation from the relative audio setting for navigation storage 11335, determines the prompt playing volume and forwards it to the "provide audio file for prompts" module 11320.

Based on the received information, the "provide audio file for prompts" module 11320 either generate an audio file for the audio prompts or retrieves an audio file for the prompt from the audio files for prompt storage 11330. The "set audio levels" module 11345 receives audio file for the prompt, the prompt directionality (when the prompt is a non-verbal prompt) and prompt playing volume from "provide audio file for prompts" module 11320. The "set audio levels" module 11345 also receives audio content to play from the currently active audio service 11370.

The "set audio levels" module 11345 determines the volume level for the audio content and sends the volume level along with the volume level for the prompt, the audio file for the prompt, and the concurrently played audio content to "audio output" module 11355. The "set audio levels" module 11345 also sends the prompt directionality (when the prompt is a non-verbal prompt) to "set pan level" module 11350 which sets the pan level and sets the pan level to "audio output" module 11355, which outputs the audio content and the audio prompts. In the embodiments illustrated in FIG. 113, the audio system 11305 (and the "set pan level" 11350 module) is described as being responsible for crating the stereo pan for the directionality of the prompt. In other embodiments (not shown), the interactive navigation application 11310 determines (e.g., by the "provide audio file for prompts" 11320 module) the directionality of the prompt and either creates an audio file or chooses an audio file from the audio files for prompt storage 11330 where the inherent properties authored into the audio file create the panning from one stereo channel to the other. In these embodiments, the "provide audio file for prompts" 11320 module does not send the prompt directionality to the audio system and instead sends an audio file that provides the panning effect when played by the audio system. These embodiments also do not utilize the "set pan level" 11350 module.

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 114:
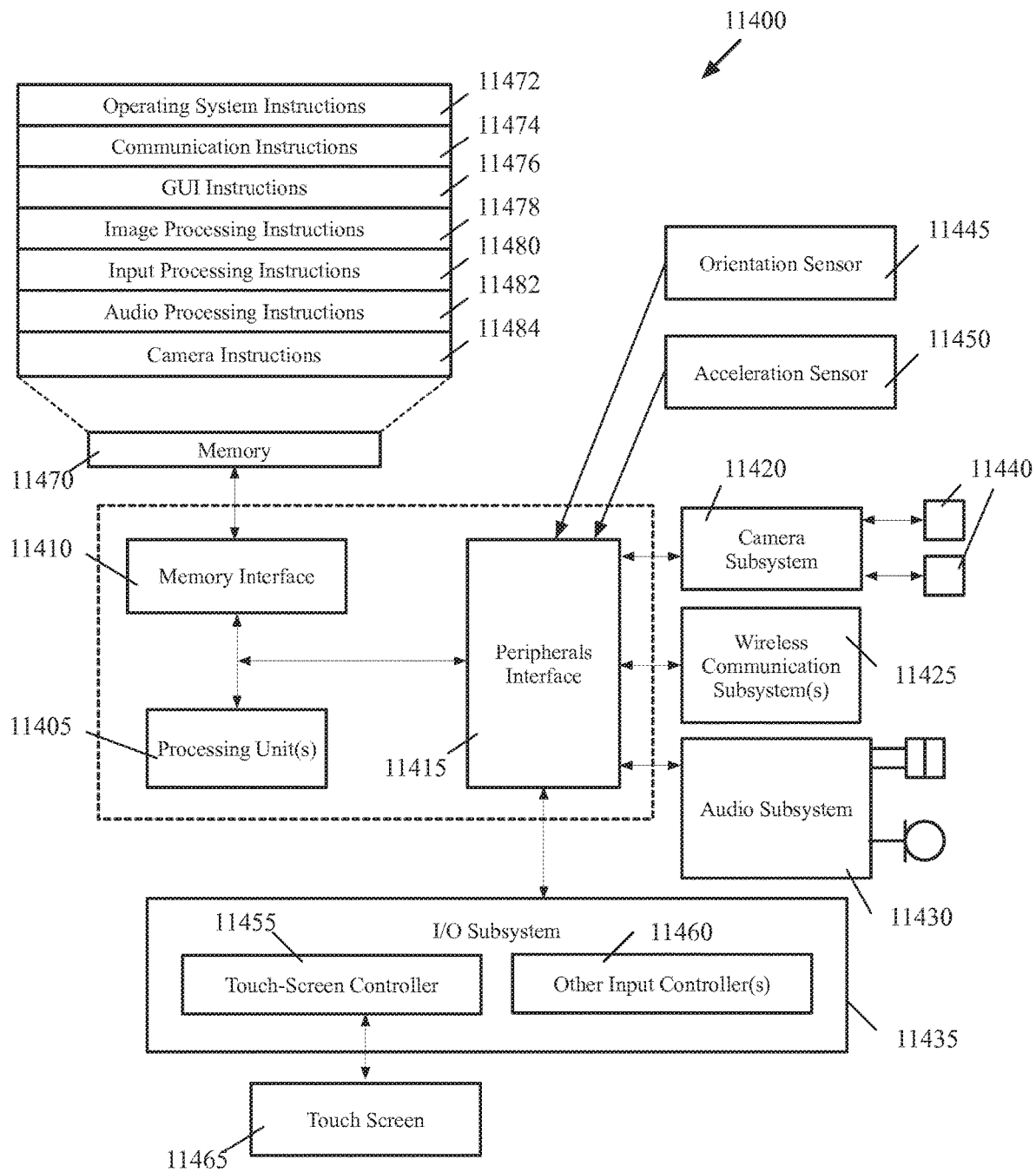
FIG. 114 is an example of an architecture of a mobile computing device of some embodiments.

The mapping and navigation applications of some embodiments operate on mobile devices, such as smart phones (e.g., iPhones®) and tablets (e.g., iPads®). FIG. 114 is an example of an architecture 11400 of such a mobile computing device. Examples of mobile computing devices include smartphones, tablets, laptops, etc. As shown, the mobile computing device 11400 includes one or more processing units 11405, a memory interface 11410 and a peripherals interface 11415.

The peripherals interface 11415 is coupled to various sensors and subsystems, including a camera subsystem 11420, a wireless communication subsystem(s) 11425, an audio subsystem 11430, an I/O subsystem 11435, etc. The peripherals interface 11415 enables communication between the processing units 11405 and various peripherals. For example, an orientation sensor 11445 (e.g., a gyroscope) and an acceleration sensor 11450 (e.g., an accelerometer) is coupled to the peripherals interface 11415 to facilitate orientation and acceleration functions.

The camera subsystem 11420 is coupled to one or more optical sensors 11440 (e.g., a charged coupled device (CCD) optical sensor, a complementary metal-oxide-semiconductor (CMOS) optical sensor, etc.). The camera subsystem 11420 coupled with the optical sensors 11440 facilitates camera functions, such as image and/or video data capturing. The wireless communication subsystem 11425 serves to facilitate communication functions. In some embodiments, the wireless communication subsystem 11425 includes radio frequency receivers and transmitters, and optical receivers and transmitters (not shown in FIG. 114). These receivers and transmitters of some embodiments are implemented to operate over one or more communication networks such as a GSM network, a Wi-Fi network, a Bluetooth network, etc. The audio subsystem 11430 is coupled to a speaker to output audio (e.g., to output voice navigation instructions). Additionally, the audio subsystem 11430 is coupled to a microphone to facilitate voice-enabled functions, such as voice recognition (e.g., for searching), digital recording, etc.

The I/O subsystem 11435 involves the transfer between input/output peripheral devices, such as a display, a touch screen, etc., and the data bus of the processing units 11405 through the peripherals interface 11415. The I/O subsystem 11435 includes a touch-screen controller 11455 and other input controllers 11460 to facilitate the transfer between input/output peripheral devices and the data bus of the processing units 11405. As shown, the touch-screen controller 11455 is coupled to a touch screen 11465. The touch-screen controller 11455 detects contact and movement on the touch screen 11465 using any of multiple touch sensitivity technologies. The other input controllers 11460 are coupled to other input/control devices, such as one or more buttons. Some embodiments include a near-touch sensitive screen and a corresponding controller that can detect near-touch interactions instead of or in addition to touch interactions. The memory interface 11410 is coupled to memory 11470. In some embodiments, the memory 11470 includes volatile memory (e.g., high-speed random access memory), non-volatile memory (e.g., flash memory), a combination of volatile and non-volatile memory, and/or any other type of memory. As illustrated in FIG. 114, the memory 11470 stores an operating system (OS) 11472. The OS 11472 includes instructions for handling basic system services and for performing hardware dependent tasks.

The memory 11470 also includes communication instructions 11474 to facilitate communicating with one or more additional devices; graphical user interface instructions 11476 to facilitate graphic user interface processing; image processing instructions 11478 to facilitate image-related processing and functions; input processing instructions 11480 to facilitate input-related (e.g., touch input) processes and functions; audio processing instructions 11482 to facilitate audio-related processes and functions; and camera instructions 11484 to facilitate camera-related processes and functions. The instructions described above are merely exemplary and the memory 11470 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 114 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 114 may be split into two or more integrated circuits.

B. Computer System

Figure 115:
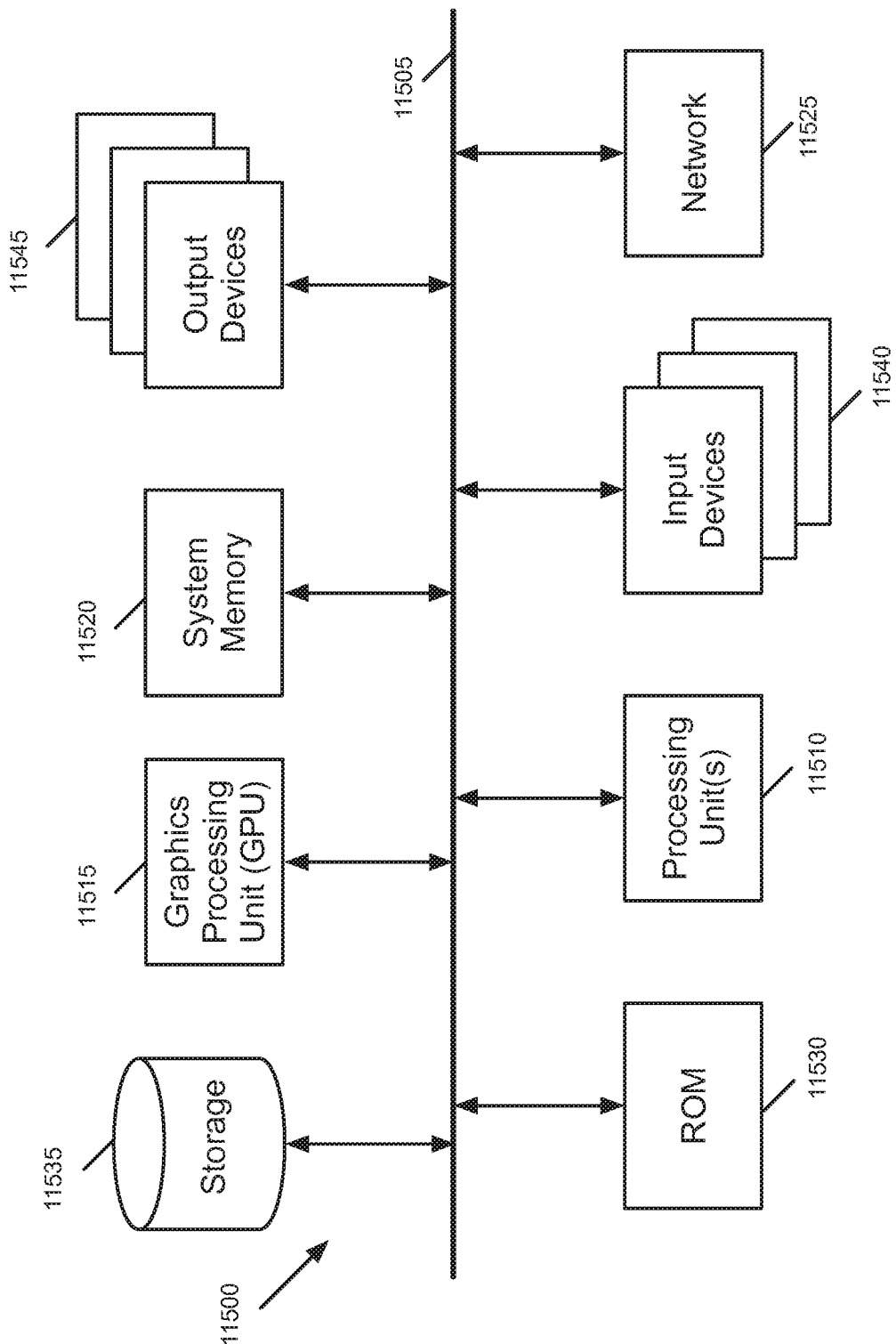
FIG. 115 conceptually illustrates an example of an electronic system with which some embodiments of the invention are implemented.

FIG. 115 conceptually illustrates another example of an electronic system 11500 with which some embodiments of the invention are implemented. The electronic system 11500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 11500 includes a bus 11505, processing unit(s) 11510, a graphics processing unit (GPU) 11515, a system memory 11520, a network 11525, a read-only memory 11530, a permanent storage device 11535, input devices 11540, and output devices 11545.

The bus 11505 collectively represents all system, peripheral, and chipset buses that communicatively connect the numerous internal devices of the electronic system 11500. For instance, the bus 11505 communicatively connects the processing unit(s) 11510 with the read-only memory 11530, the GPU 11515, the system memory 11520, and the permanent storage device 11535.

From these various memory units, the processing unit(s) 11510 retrieves instructions to execute and data to process in order to execute the processes of the invention. The processing unit(s) may be a single processor or a multi-core processor in different embodiments. Some instructions are passed to and executed by the GPU 11515. The GPU 11515 can offload various computations or complement the image processing provided by the processing unit(s) 11510. In some embodiments, such functionality can be provided using CoreImage's kernel shading language.

The read-only-memory (ROM) 11530 stores static data and instructions that are needed by the processing unit(s) 11510 and other modules of the electronic system. The permanent storage device 11535, on the other hand, is a read-and-write memory device. This device is a non-volatile memory unit that stores instructions and data even when the electronic system 11500 is off. Some embodiments of the invention use a mass-storage device (such as a magnetic or optical disk and its corresponding disk drive, integrated flash memory) as the permanent storage device 11535.

Other embodiments use a removable storage device (such as a floppy disk, flash memory device, etc., and its corresponding drive) as the permanent storage device. Like the permanent storage device 11535, the system memory 11520 is a read-and-write memory device. However, unlike storage device 11535, the system memory 11520 is a volatile read-and-write memory, such a random access memory. The system memory 11520 stores some of the instructions and data that the processor needs at runtime. In some embodiments, the invention's processes are stored in the system memory 11520, the permanent storage device 11535, and/or the read-only memory 11530. For example, the various memory units include instructions for processing multimedia clips in accordance with some embodiments. From these various memory units, the processing unit(s) 11510 retrieves instructions to execute and data to process in order to execute the processes of some embodiments.

The bus 11505 also connects to the input and output devices 11540 and 11545. The input devices 11540 enable the user to communicate information and select commands to the electronic system. The input devices 11540 include alphanumeric keyboards and pointing devices (also called "cursor control devices"), cameras (e.g., webcams), microphones or similar devices for receiving voice commands, etc. The output devices 11545 display images generated by the electronic system or otherwise output data. The output devices 11545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 115, bus 11505 also couples electronic system 11500 to a network 11525 through a network adapter (not shown). In this manner, the computer can be a part of a network of computers (such as a local area network ("LAN"), a wide area network ("WAN"), or an Intranet), or a network of networks, such as the Internet. Any or all components of electronic system 11500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW. DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media." and "machine readable medium" are entirely restricted to tangible, physical objects that store information in a form that is readable by a computer. These terms exclude any wireless signals, wired download signals, and any other ephemeral signals.

VIII. Map Service Environment

Figure 116:
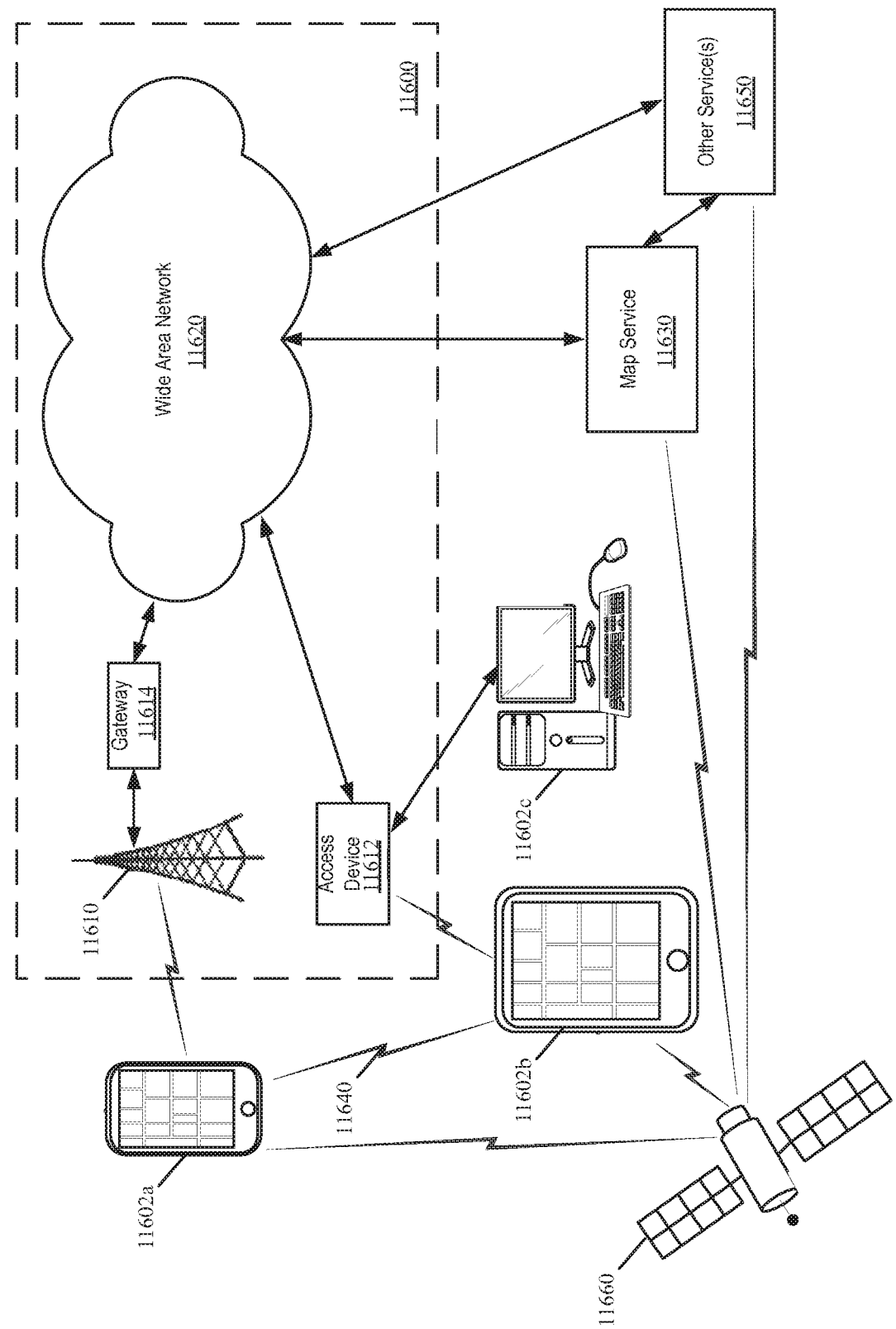
FIG. 116 illustrates a map service operating environment, according to some embodiments.

Various embodiments may operate within a map service operating environment. FIG. 116 illustrates a map service operating environment, according to some embodiments. A map service 11630 (also referred to as mapping service) may provide map services for one or more client devices 11602a-11602c in communication with the map service 11630 through various communication methods and protocols. A map service 11630 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device is currently located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 11602a-11602c may utilize these map services by obtaining map service data. Client devices 11602a-11602c may implement various techniques to process map service data. Client devices 11602a-11602c may then provide map services to various entities, including, but not limited to, users, internal software or hardware modules, and/or other systems or devices external to the client devices 11602a-11602c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map service tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be for a specific maps or portions of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, requests for current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and, as such, the above examples are not intended to be limiting.

Various embodiments of client devices (e.g., client devices 11602a-11602c) are implemented on different portable-multifunction device types. Client devices 11602a-11602c utilize map service 11630 through various communication methods and protocols. In some embodiments, client devices 11602a-11602c obtain map service data from map service 11630. Client devices 11602a-11602c request or receive map service data. Client devices 11602a-11602c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. In some embodiments, the client devices allow the device to adjust the virtual camera display orientation to bias toward the route destination. Some embodiments also allow the virtual camera to navigate turns by simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 116 illustrates one possible embodiment of an operating environment 11600 for a map service 11630 and client devices 11602*a*-11602*c*. In some embodiments, devices 11602*a*, 11602*b*, and 11602*c* communicate over one or more wire or wireless networks 11610. For example, wireless network 11610, such as a cellular network, can communicate with a wide area network (WAN) 11620, such as the Internet, by use of gateway 11614. A gateway 11614 in some embodiments provides a packet oriented mobile data service, such as General Packet Radio Service (GPRS), or other mobile data service allowing wireless networks to transmit data to other networks, such as wide area network 11620. Likewise, access device 11612 (e.g., IEEE 802.11g wireless access device) provides communication access to WAN 11620. Devices 11602*a* and 11602*b* can be any portable electronic or computing device capable of communicating with a map service. Device 11602*c* can be any non-portable electronic or computing device capable of communicating with a map service.

In some embodiments, both voice and data communications are established over wireless network 11610 and access device 11612. For instance, device 11602*a* can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 11610, gateway 11614, and WAN 11620 (e.g., using Transmission Control Protocol/Internet Protocol (TCP/IP) or User Datagram Protocol (UDP)). Likewise, in some implementations, devices 11602*b* and 11602*c* can place and receive phone calls, send and receive e-mail messages, and retrieve electronic documents over access device 11612 and WAN 11620. In various embodiments, any of the illustrated client devices may communicate with map service 11630 and/or other service(s) 11650 using a persistent connection established in accordance with one or more security protocols, such as the Secure Sockets Layer (SSL) protocol or the Transport Layer Security (TLS) protocol.

Devices 11602*a* and 11602*b* can also establish communications by other means. For example, wireless device 11602*a* can communicate with other wireless devices (e.g., other devices 11602*b*, cell phones, etc.) over the wireless network 11610. Likewise devices 11602*a* and 11602*b* can establish peer-to-peer communications 11640 (e.g., a personal area network) by use of one or more communication subsystems, such as Bluetooth® communication from Bluetooth Special Interest Group, Inc. of Kirkland, Wash. Device 11602*c* can also establish peer to peer communications with devices 11602*a* or 11602*b* (not shown). Other communication protocols and topologies can also be implemented. Devices 11602*a* and 11602*b* may also receive Global Positioning Satellite (GPS) signals from GPS satellites 11660.

Devices 11602*a*, 11602*b*, and 11602*c* can communicate with map service 11630 over one or more wired and/or wireless networks, 11612 or 11610. For instance, map service 11630 can provide map service data to rendering devices 11602*a*, 11602*b*, and 11602*c*. Map service 11630 may also communicate with other services 11650 to obtain data to implement map services. Map service 11630 and other services 11650 may also receive GPS signals from GPS satellites 11660.

In various embodiments, map service 11630 and/or other service(s) 11650 are configured to process search requests from any of the client devices. Search requests may include but are not limited to queries for businesses, addresses, residential locations, points of interest, or some combination thereof. Map service 11630 and/or other service(s) 11650 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 11630 and/or other service(s) 11650 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 11630 and/or other service(s) 11650, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 11630 and/or other service(s) 11650 provide one or more feedback mechanisms to receive feedback from client devices 11602*a*-11602*c*. For instance, client devices may provide feedback on search results to map service 11630 and/or other service(s) 11650 (e.g., feedback specifying ratings, reviews, temporary or permanent business closures, errors etc.); this feedback may be used to update information about points of interest in order to provide more accurate or more up-to-date search results in the future. In some embodiments, map service 11630 and/or other service(s) 11650 may provide testing information to the client device (e.g., an A/B test) to determine which search results are best. For instance, at random intervals, the client device may receive and present two search results to a user and allow the user to indicate the best result. The client device may report the test results to map service 11630 and/or other service(s) 11650 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Thus, one of ordinary skill in the art would understand that the invention is not to be limited by the foregoing illustrative details, but rather is to be defined by the appended claims.

What is claimed is:

1. A method of providing context aware audio prompts associated with a navigation presentation on an electronic device, the method comprising:
   identifying an audio prompt of a navigation application to be presented by an audio service of the electronic device;
   determining that the audio service is playing media content;
   determining a perceived volume level of the media content based on a power usage of an audio signal corresponding to the media content;
   suppressing output of the media content to a second volume level that is lower than the perceived volume level; and
   presenting the audio prompt at the perceived volume level.

2. The method of claim 1, further comprising:
   suppressing output of the media content to the second volume level; and
   outputting the audio prompt with a time gap between suppressing output of the media content and output of the audio prompt.

3. The method of claim 2, further comprising:
   determining that the media content is playing at a first volume level that exceeds a volume threshold; and
   based on the determination, determining an amount of the time gap, further comprising determining the amount to be a first amount when the first volume level exceeds the volume threshold, and determining the amount to be a second amount when the first volume level meets or falls below the threshold, where the first amount is larger than the second amount.

4. The method of claim 3, further comprising:
   suppressing output of the media content to the second volume level; and
   outputting the audio prompt at a third volume level, wherein the third volume level exceeds the first volume level.

5. The method of claim 1, further comprising:
   outputting the audio prompt contemporaneously with suppressing output of the media content.

6. The method of claim 1, further comprising:
   suppressing output of the media content to the second volume level; and
   outputting the audio prompt at the second volume level.

7. The method of claim 1, wherein determining the perceived volume level further comprises identifying an audio route in use for playing the media content, the audio route defining an audio output device that is currently in use for playing the media content.

8. The method of claim 1, wherein determining the perceived volume level further comprises identifying an audio output device identifier in use for playing the media content.

9. The method of claim 1, wherein determining the perceived volume level further comprises: identifying one or more audio system settings used to play the media content.

10. The method of claim 1, wherein determining the perceived volume level further comprises identifying an audio setting for the navigation application.

11. A non-transitory machine readable medium storing a program for providing context aware audio prompts associated with a navigation presentation on an electronic device, the program for execution by at least one processing unit, the program comprising sets of instructions for:
   identifying an audio prompt of a navigation application to be presented by an audio service of the electronic device;
   determining that the audio service is playing media content;
   determining a perceived volume level of the media content based on a power usage of an audio signal corresponding to the media content;
   suppressing output of the media content to a second volume level that is lower than the perceived volume level;
   and
   presenting the audio prompt at the perceived volume level.

12. The non-transitory machine readable medium of claim 11, wherein the program further comprises sets of instructions for:
   suppressing output of the media content to the second volume level; and
   outputting the audio prompt with a time gap between suppressing output of the media content and output of the audio prompt.

13. The non-transitory machine readable medium of claim 12, wherein the program further comprises sets of instructions for:
   determining that the media content is playing at a first volume level that exceeds a volume threshold; and
   based on the determination, determining an amount of the time gap, further comprising determining the amount to be a first amount when the first volume level exceeds the volume threshold, and determining the amount to be a second amount when the first volume level meets or falls below the threshold, where the first amount is larger than the second amount.

14. The non-transitory machine readable medium of claim 13,
   wherein the program further comprises sets of instructions for:
   suppressing output of the media content to the second volume level; and
   outputting the audio prompt at a third volume level, wherein the third volume level exceeds the first volume level.

15. The non-transitory machine readable medium of claim 11, wherein the program further comprises sets of instructions for:
   outputting the audio prompt contemporaneously with suppressing output of the media content.

16. The non-transitory machine readable medium of claim 11, wherein the program further comprises sets of instructions for:
   suppressing output of the media content to the second volume level; and
   outputting the audio prompt at the second volume level.

17. The non-transitory machine readable medium of claim 11, wherein the program further comprises sets of instructions for:
   receiving audio property data including one or more of an audio route in use for playing the media content, an audio output device identifier, one or more audio system settings used to play the media content, an audio setting for the navigation application, and a power level of an audio signal for the media content;
   receiving signal measurements from one or more of an audio sensor and a microphone; and determining the perceived volume level based on the received signal measurements and the audio property data.

18. A mobile device comprising:
a set of processing units for processing sets of instructions;
a non-transitory machine readable medium storing a program, which when executed by at least one processing unit of the mobile device, provides context aware audio prompts associated with a navigation presentation on an electronic device, the program comprising sets of instructions for:
identifying an audio prompt of a navigation application to be presented by an audio service of the electronic device;
determining that the audio service is playing media content;
determining a perceived volume level of the media content based on a power usage of an audio signal corresponding to the media content;
suppressing output of the media content to a second volume level that is lower than the perceived volume level; and
presenting the audio prompt at the perceived volume level.

19. The mobile device of claim 18, wherein the program further comprises sets of instructions for:
suppressing output of the media content to the second volume level; and
outputting the audio prompt with a time gap between suppressing output of the media content and output of the audio prompt.

20. The mobile device of claim 19, wherein the program further comprises sets of instructions for:
determining that the media content is playing at a first volume level that exceeds a volume threshold; and
based on the determination, determining an amount of the time gap, further comprising determining the amount to be a first amount when the first volume level exceeds the volume threshold, and determining the amount to be a second amount when the first volume level meets or falls below the threshold, where the first amount is larger than the second amount.

21. The mobile device of claim 20, wherein the program further comprises sets of instructions for:
suppressing output of the media content to the second volume level; and
outputting the audio prompt at a third volume level, wherein the third volume level exceeds the first volume level.

22. The mobile device of claim 18, wherein the program further comprises sets of instructions for:
outputting the audio prompt contemporaneously with suppressing output of the media content.

23. The mobile device of claim 18, wherein the program further comprises sets of instructions for:
receiving audio property data including one or more of an audio route in use for playing the media content, an audio output device identifier, one or more audio system settings used to play the media content, an audio setting for the navigation application, and a power level of an audio signal for the media content;
receiving signal measurements from one or more of an audio sensor and a microphone; and
determining the perceived volume level based on the received signal measurements and the audio property data.

* * * * *